US012625887B2

(12) United States Patent
Ghoshal et al.

(10) Patent No.: US 12,625,887 B2
(45) Date of Patent: May 12, 2026

(54) SYSTEM AND METHOD FOR SMART CATEGORIZATION OF CONTENT IN A CONTENT MANAGEMENT SYSTEM

(71) Applicant: ORACLE INTERNATIONAL CORPORATION, Redwood Shores, CA (US)

(72) Inventors: Sandip Ghoshal, Pleasanton, CA (US); Sreeharsha Kamireddy, New York City, NY (US); Jaswanth Maryala, Hyderabad (IN); Vivek Peter, Hyderabad (IN); Hareesh S Kadlabalu, Plainview, NY (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/748,318

(22) Filed: Jun. 20, 2024

(65) Prior Publication Data

US 2024/0338389 A1      Oct. 10, 2024

Related U.S. Application Data

(63) Continuation of application No. 17/486,524, filed on Sep. 27, 2021, now Pat. No. 12,056,161, which is a (Continued)

(30) Foreign Application Priority Data

Oct. 18, 2018      (IN) ............................. 201841039495

(51) Int. Cl.
G06F 3/048          (2013.01)
G06F 16/28          (2019.01)
(Continued)

(52) U.S. Cl.
CPC ............. *G06F 16/285* (2019.01); *G06N 5/02* (2013.01); *G06N 5/04* (2013.01)

(58) Field of Classification Search
CPC .......... G06F 16/285; G06N 5/02; G06N 5/04
See application file for complete search history.

(56) References Cited

U.S. PATENT DOCUMENTS 5,873,107 A      2/1999    Borovoy
9,864,747 B2     1/2018    Kamimaeda
(Continued)

FOREIGN PATENT DOCUMENTS

CN      101364239      2/2009
CN      102737092      10/2012
(Continued)

OTHER PUBLICATIONS

China National Intellectual Property Administration, Notification of Second Office Action dated Aug. 13, 2024 for China Patent Application No. 201980068390.7 , 10 pages.
(Continued)

Primary Examiner — David Phantana-angkool
(74) Attorney, Agent, or Firm — TUCKER ELLIS LLP

(57) ABSTRACT

In accordance with an embodiment, systems and methods described herein can be used, for example with a content management system, to provide recommendations to categorize/classify content into user-defined categories, which in turn provides an opportunity for content managers to place new content into accurate categories effortlessly, based on previously evaluated/categorized content. A recommendation system or tool can use artificial intelligence (AI) techniques to continuously learn from past data, and assist in placing content into a relevant category through automatic categorization/classification of newly created/edited content. The recommendation tool can be implemented and
(Continued)

applied across diverse domains by generating feature vectors from contents, creating clusters in the feature space based on previously categorized content, and recommending a category for new content through feature space distance calculation from the clusters.

20 Claims, 69 Drawing Sheets

Related U.S. Application Data continuation-in-part of application No. 16/657,395, filed on Oct. 18, 2019, now Pat. No. 11,200,240, which is a continuation-in-part of application No. 16/581,138, filed on Sep. 24, 2019, now Pat. No. 11,163,777.

(60) Provisional application No. 63/084,174, filed on Sep. 28, 2020.

(51) Int. Cl.
*G06N 5/02* (2023.01)
*G06N 5/04* (2023.01)

(56) References Cited

U.S. PATENT DOCUMENTS

| | | | |
|---|---|---|---|
| 10,331,744 B2 | 6/2019 | Boyd | |
| 10,387,526 B2 | 8/2019 | Jones | |
| 10,565,222 B2 | 2/2020 | Murray | |
| 10,798,193 B2 | 10/2020 | Wu | |
| 10,798,446 B2 * | 10/2020 | Delaney | H04N 21/4788 |
| 10,996,974 B2 * | 5/2021 | Dornemann | G06F 11/2094 |
| 11,153,253 B2 | 10/2021 | Zhang | |
| 11,163,777 B2 | 11/2021 | Ghoshal | |
| 11,200,240 B2 | 12/2021 | Ghoshal | |
| 11,604,798 B2 | 3/2023 | Ghoshal | |
| 11,675,874 B2 | 6/2023 | Narth | |
| 12,056,161 B2 | 8/2024 | Ghoshal | |
| 12,094,018 B1 * | 9/2024 | O'Malley | G06N 20/00 |
| 2012/0254310 A1 | 10/2012 | Kamimaeda | |
| 2012/0330932 A1 | 12/2012 | Boyd | |
| 2014/0172961 A1 | 6/2014 | Clemmer | |
| 2014/0278957 A1 | 9/2014 | Ram | |
| 2014/0280223 A1 | 9/2014 | Ram | |
| 2015/0066954 A1 | 3/2015 | Jones | |
| 2016/0147891 A1 | 5/2016 | Chhichhia | |
| 2016/0357770 A1 | 12/2016 | Wu | |
| 2016/0359790 A1 | 12/2016 | Zhang | |
| 2016/0379123 A1 | 12/2016 | Younessian | |
| 2017/0060870 A1 | 3/2017 | Checkley | |
| 2018/0075115 A1 | 3/2018 | Murray | |
| 2018/0144052 A1 | 5/2018 | Sayyadi-Harikandehei | |
| 2018/0276734 A1 | 9/2018 | Wu | |
| 2018/0349388 A1 | 12/2018 | Skiles | |
| 2019/0065991 A1 | 2/2019 | Guggilla | |
| 2019/0208264 A1 | 7/2019 | Delaney | |
| 2020/0125574 A1 | 4/2020 | Ghoshal | |
| 2020/0183975 A1 * | 6/2020 | Provost | H04N 21/25891 |
| 2021/0326718 A1 | 10/2021 | Olson | |
| 2021/0390108 A1 | 12/2021 | Ghoshal | |
| 2022/0012268 A1 * | 1/2022 | Ghoshal | G06F 16/906 |
| 2022/0027578 A1 | 1/2022 | Chorakhalikar | |
| 2022/0100767 A1 | 3/2022 | Ghoshal | |
| 2022/0207073 A1 | 6/2022 | Sohail | |
| 2022/0207484 A1 | 6/2022 | Saha | |
| 2022/0237374 A1 | 7/2022 | Wilde | |
| 2022/0253688 A1 * | 8/2022 | Wu | G06Q 30/0631 |
| 2022/0253722 A1 * | 8/2022 | Wu | G06Q 30/0631 |
| 2022/0358181 A1 | 11/2022 | Narth | |
| 2022/0405621 A1 | 12/2022 | Ankaret Anderson Dean | |
| 2023/0153579 A1 | 5/2023 | Sun | |
| 2023/0206076 A1 * | 6/2023 | Xu | G06N 3/096 706/15 |
| 2023/0244744 A1 | 8/2023 | Narth | |
| 2023/0266863 A1 * | 8/2023 | Govind | G06F 40/279 707/706 |
| 2024/0029107 A1 * | 1/2024 | Chen | G06F 16/9536 |
| 2024/0046075 A1 * | 2/2024 | Chen | G06N 3/09 |
| 2024/0338389 A1 * | 10/2024 | Ghoshal | G06F 16/285 |

FOREIGN PATENT DOCUMENTS

| | | |
|---|---|---|
| CN | 103268310 | 8/2013 |
| CN | 103268310 A | 8/2013 |
| CN | 105718555 | 6/2016 |
| CN | 105718555 A | 6/2016 |
| CN | 108629266 | 10/2018 |
| CN | 110162717 | 8/2019 |
| EP | 1128276 | 8/2001 |
| JP | 2006285656 | 10/2006 |
| JP | 2011221794 | 11/2011 |
| JP | 2012027788 | 2/2012 |
| JP | 2017220205 | 12/2017 |
| JP | 2019008440 | 1/2019 |
| JP | 2019021313 | 2/2019 |

OTHER PUBLICATIONS

Japan Patent Office, Notice of Reasons for Refusal dated Dec. 9, 2024 for Japanese Patent Application No. 2023-171976 , 14 pages.

United States Patent and Trademark Office, Notice of Allowance and Fee(s) Due dated Oct. 13, 2022 for U.S. Appl. No. 17/547,774, 6 pages.

European Patent Office, International Searching Authority, International Search Report and Written Opinion dated Jan. 4, 2022 for International Application No. PCT/US2021/052351, 16 pages.

Keqian Li et al., "HierCon: Hierarchical Organization of Technical Documents Based on Concepts" 2019 IEEE International Conference on Data Mining (ICDM), Nov. 8, 2019, DOI: 10.1109/ICDM.2019.00048, pp. 379-388.

Intellectual Property of India, Examination report under sections 12 & 13 of the Patents Act, 1970 and the Patents Rules, 2003 dated Oct. 21, 2022 for India Patent Application No. 202147014916, 8 pages.

Japan Patent Office, Notice of Reasons for Refusal dated Jul. 10, 2023 for Japanese Patent Application No. 2021-521193, 8 pages.

United States Patent and Trademark Office, Notice of Allowance and Fee(s) Due dated Sep. 22, 2023 for U.S. Appl. No. 17/463,287, 6 pages.

China National Intellectual Property Administration, Notification of the First Office Action dated Jan. 25, 2024 for Chinese Patent Application No. 201980068390.7, 8 pages.

United States Patent and Trademark Office, Office Communication dated Aug. 31, 2023 for U.S. Appl. No. 17/486,524, 8 pages.

United States Patent and Trademark Office, Notice of Allowance and Fee(s) Due dated Jun. 14, 2023 for U.S. Appl. No. 17/463,287, 11 pages.

United States Patent and Trademark Office, Notice of Allowance and Fee(s) Due dated Mar. 14, 2024 for U.S. Appl. No. 17/486,524, 6 pages.

China National Intellectual Property Administration, Notification of Third Office Action dated Jan. 13, 2025 for Chinese Patent Application No. 201980068390.7 , 9 pages.

Japan Patent Office, Decision to Grant a Patent dated Mar. 31, 2025 for Japanese Patent Application No. 2023-171976 , 5 pages.

China National Intellectual Property Administration; Rejection Decision in connection with Chinese Application No. 201980068390.7; Jun. 18, 2025; 6 pages.

China National Intellectual Property Administration; Rejection Decision in connection with Chinese Application No. 201980068390.7 (Translation); Jun. 18, 2025; 11 pages.

Chinese Application No. CN201310176330A; Publication No. CN103268310A.(Abstract machine language translation); as retrieved from <https://worldwide.espacenet.com/patent/search/family/049011941/publication/CN103268310A?q=CN103268310A> on Jul. 11, 2025; 1 page.

(56)     References Cited

OTHER PUBLICATIONS

Chinese Application No. CN201610035896A; Publication No. CN105718555A (Abstract machine language translation); as retrieved from <https://worldwide.espacenet.com/patent/search/family/056147412/publication/CN105718555A?q=CN105718555A> on Jul. 11, 2025; 1 page.
Dong Xiaoying, "Information Resource Management and Information Services in the Network Environment", p. 112, China Foreign Translation & Publishing House, Mar. 2000; as referenced in Rejection Decision in connection with Chinese Application No. 201980068390.7 (Translation); Jun. 18, 2025, 2 pages.
Intellectual Property India, Examination report under sections 12 & 13 of the Patent Act, 1970 and the Patents Rules, 2003 dated Jun. 11, 2025 for India Patent Application No. 202347026903 , 5 pages.
Japan Patent Office, Notice of Reasons for Refusal dated May 7, 2025 for Japanese Patent Application No. 2023-519188 , 11 pages.
China National Intellectual Property Administration, Notification of the First Office Action dated Sep. 9, 2025 for Chinese Patent Application No. 202180075939.2 , 12 pages.
Japan Patent Office, Decision of Refusal dated Oct. 7, 2025 for Japanese Patent Application No. 2023-519188 , 9 pages.

* cited by examiner

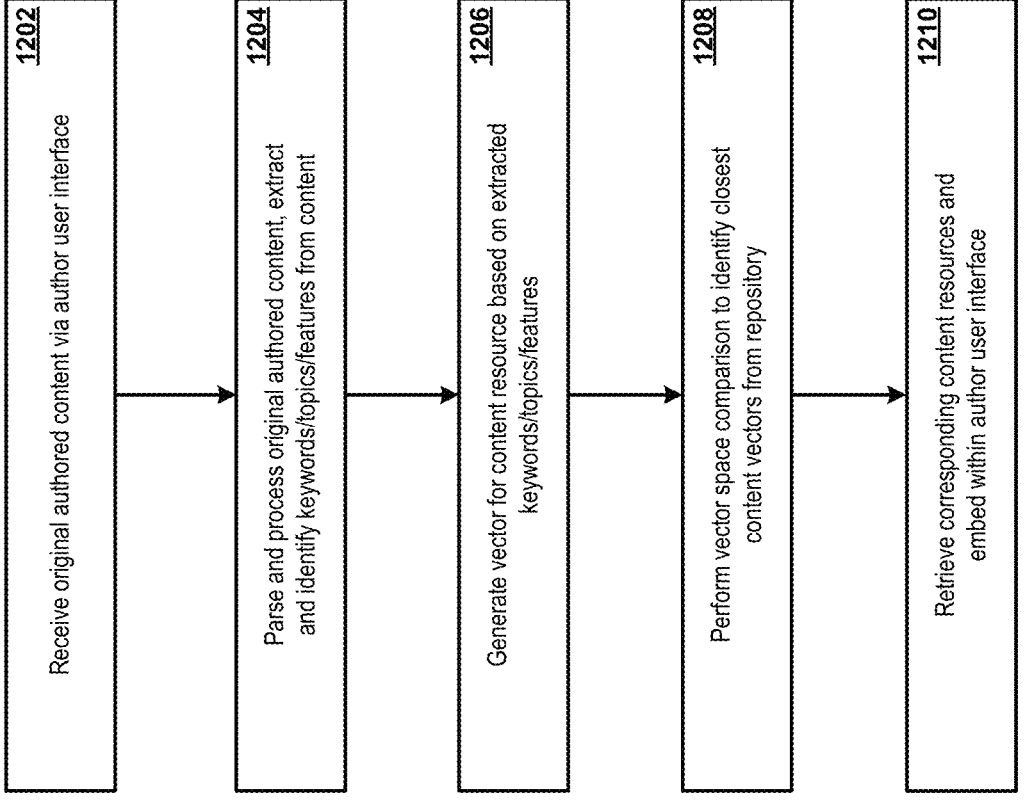

1202

Receive original authored content via author user interface

1204

Parse and process original authored content, extract and identify keywords/topics/features from content

1206

Generate vector for content resource based on extracted keywords/topics/features

1208

Perform vector space comparison to identify closest content vectors from repository

1210

Retrieve corresponding content resources and embed within author user interface

*FIGURE 12*

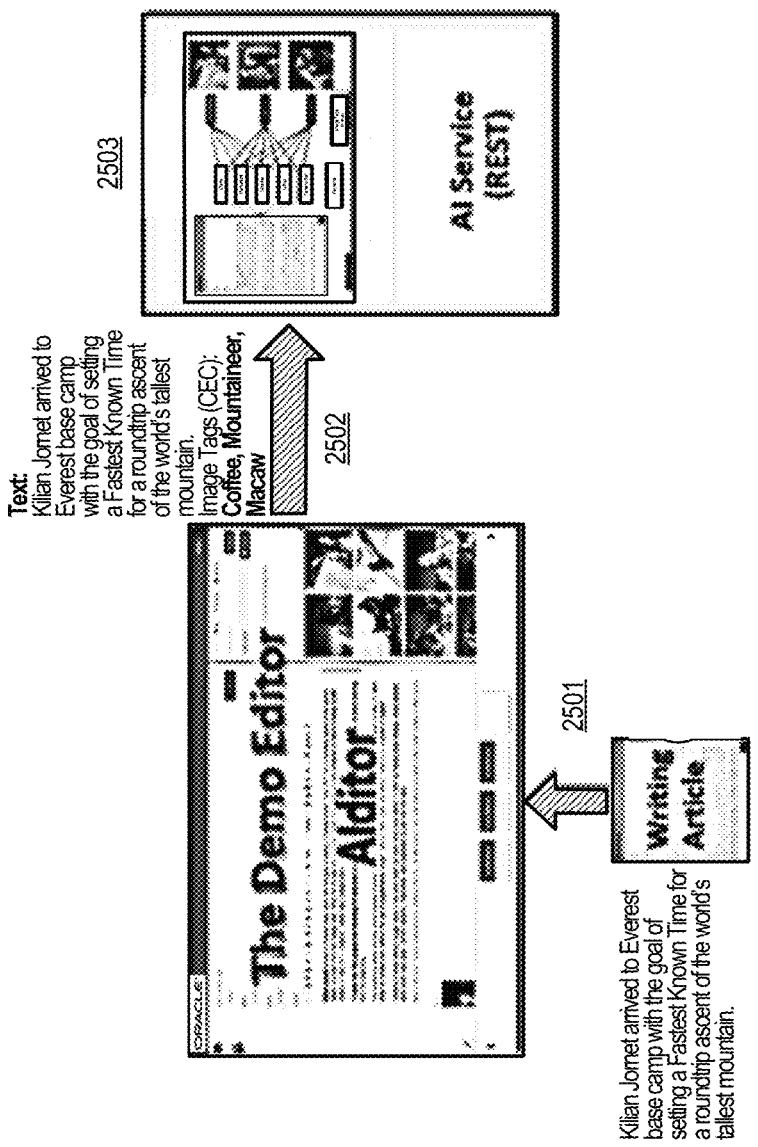
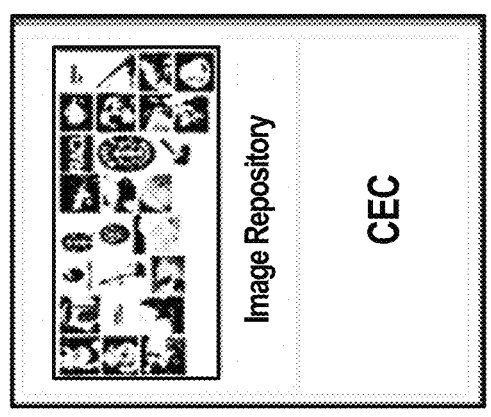
*FIGURE 25*

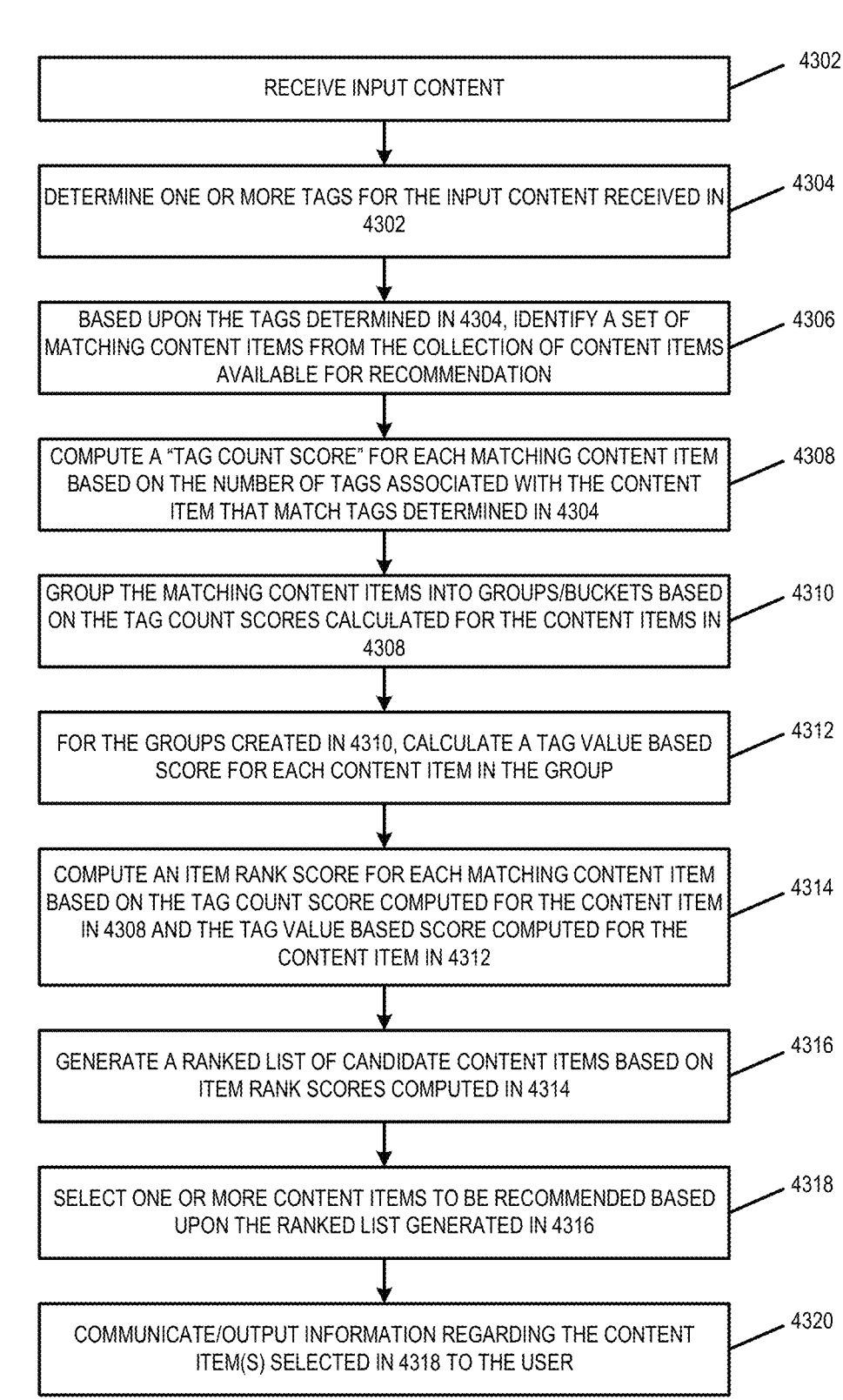

4300

RECEIVE INPUT CONTENT — 4302

DETERMINE ONE OR MORE TAGS FOR THE INPUT CONTENT RECEIVED IN 4302 — 4304

BASED UPON THE TAGS DETERMINED IN 4304, IDENTIFY A SET OF MATCHING CONTENT ITEMS FROM THE COLLECTION OF CONTENT ITEMS AVAILABLE FOR RECOMMENDATION — 4306

COMPUTE A "TAG COUNT SCORE" FOR EACH MATCHING CONTENT ITEM BASED ON THE NUMBER OF TAGS ASSOCIATED WITH THE CONTENT ITEM THAT MATCH TAGS DETERMINED IN 4304 — 4308

GROUP THE MATCHING CONTENT ITEMS INTO GROUPS/BUCKETS BASED ON THE TAG COUNT SCORES CALCULATED FOR THE CONTENT ITEMS IN 4308 — 4310

FOR THE GROUPS CREATED IN 4310, CALCULATE A TAG VALUE BASED SCORE FOR EACH CONTENT ITEM IN THE GROUP — 4312

COMPUTE AN ITEM RANK SCORE FOR EACH MATCHING CONTENT ITEM BASED ON THE TAG COUNT SCORE COMPUTED FOR THE CONTENT ITEM IN 4308 AND THE TAG VALUE BASED SCORE COMPUTED FOR THE CONTENT ITEM IN 4312 — 4314

GENERATE A RANKED LIST OF CANDIDATE CONTENT ITEMS BASED ON ITEM RANK SCORES COMPUTED IN 4314 — 4316

SELECT ONE OR MORE CONTENT ITEMS TO BE RECOMMENDED BASED UPON THE RANKED LIST GENERATED IN 4316 — 4318

COMMUNICATE/OUTPUT INFORMATION REGARDING THE CONTENT ITEM(S) SELECTED IN 4318 TO THE USER — 4320

| Image ID | Image Description | Content Tag | Tag Value |
|---|---|---|---|
| Image_1 | Man sitting alone on park bench | Human | 0.93 |
| | | Park | 0.07 |
| Image_2 | Woman holding cup of coffee | Coffee | 0.5 |
| | | Human | 0.5 |
| Image_3 | Tea leaves drying in greenhouse | Tea | 0.65 |
| | | Greenhouse | 0.35 |
| Image_4 | Coffee shop employee behind counter smiling and holding cup of coffee. | Coffee | 0.35 |
| | | Human | 0.60 |
| | | Cafe | 0.05 |
| Image_5 | Group of men sitting outside drinking tea | Tea | 0.45 |
| | | Human | 0.55 |
| Image_6 | Cup of coffee sitting on desk | Coffee | 1.00 |
| Image_7 | Man sipping tea while listening to music | Human | 0.6 |
| | | Tea | 0.3 |
| | | Music | 0.1 |
| Image_8 | Piles of coffee beans in a sack | Coffee | 0.85 |
| | | Farming | 0.15 |

| Image ID | Tag Count Score | Tag Value Score | Ranking Score |
|---|---|---|---|
| Image_1 | 1 | 0.93 | 1.93 |
| Image_2 | 2 | 0.25 | 2.25 |
| Image_3 | 1 | 0.65 | 1.65 |
| Image_4 | 2 | 0.21 | 2.21 |
| Image_5 | 2 | 0.248 | 2.248 |
| Image_6 | 1 | 1.0 | 2.00 |
| Image_7 | 2 | 0.18 | 2.18 |
| Image_8 | 1 | 0.85 | 1.85 |

4601 4602 4603 4604 4600

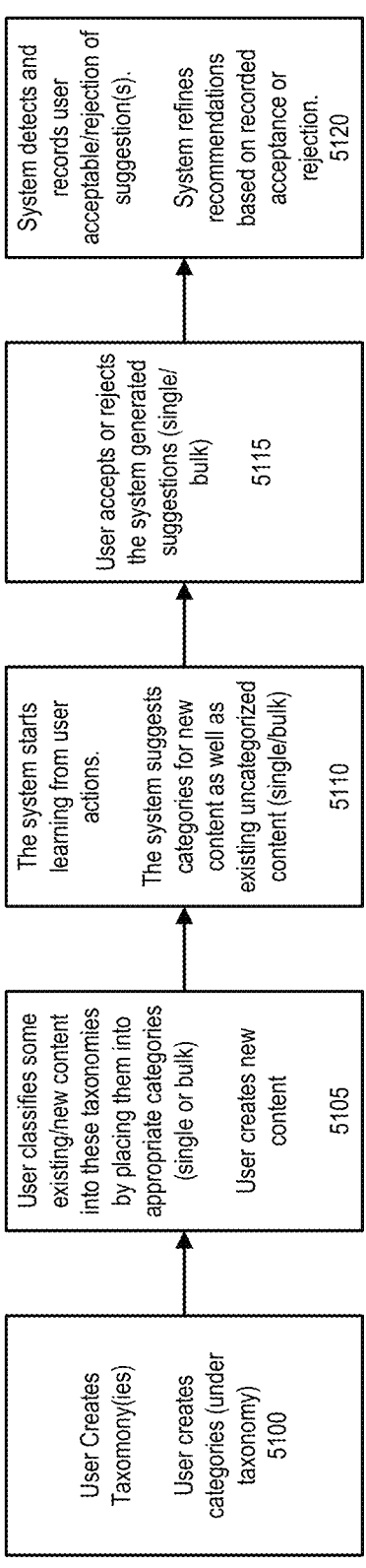

User Creates
Taxomony(ies)

User creates
categories (under
taxonomy)
5100

User classifies some
existing/new content
into these taxonomies
by placing them into
appropriate categories
(single or bulk)

User creates new
content
5105

The system starts
learning from user
actions.

The system suggests
categories for new
content as well as
existing uncategorized
content (single/bulk)
5110

User accepts or rejects
the system generated
suggestions (single/
bulk)
5115

System detects and
records user
acceptable/rejection of
suggestion(s).

System refines
recommendations
based on recorded
acceptance or
rejection.
5120

*FIGURE 51*

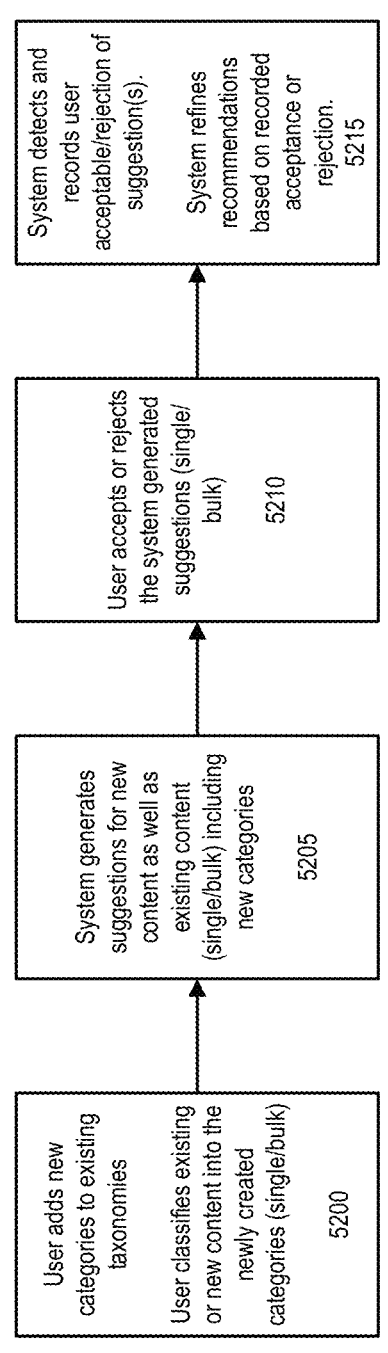

User adds new categories to existing taxonomies

User classifies existing or new content into the newly created categories (single/bulk)

5200

System generates suggestions for new content as well as existing content (single/bulk) including new categories

5205

User accepts or rejects the system generated suggestions (single/bulk)

5210

System detects and records user acceptable/rejection of suggestion(s).

System refines recommendations based on recorded acceptance or rejection.

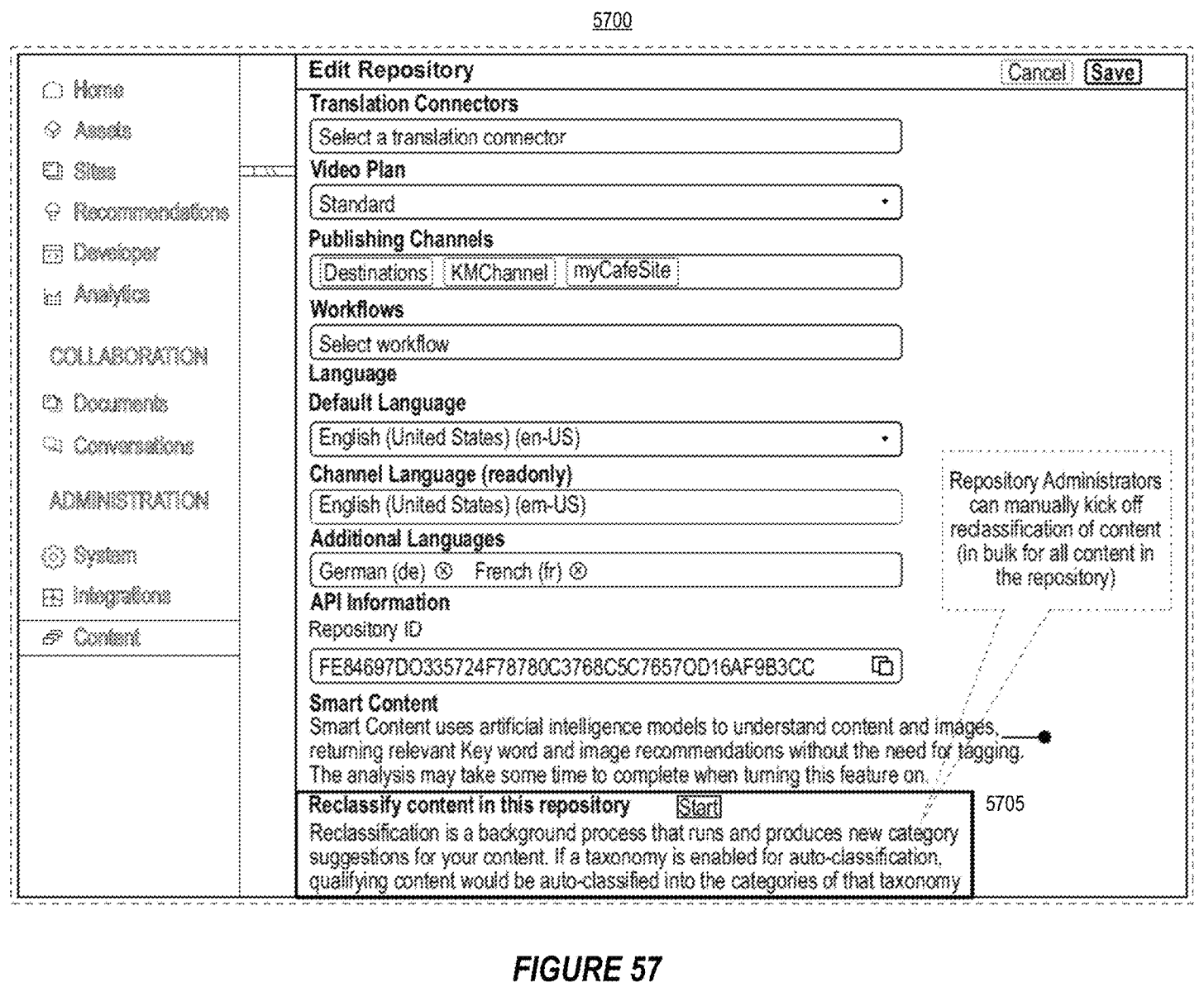

Cancel   Save

Edit Repository

Translation Connectors
Select a translation connector

Video Plan
Standard

Publishing Channels
Destinations   KMChannel   myCafeSite

Workflows
Select workflow

Language

Default Language
English (United States) (en-US)

Channel Language (readonly)
English (United States) (em-US)

Additional Languages
German (de) ⊗   French (fr) ⊗

API Information
Repository ID
FE84697DO3357 24F78780C3768C5C78570D16AF9B3CC

Smart Content
Smart Content uses artificial intelligence models to understand content and images, returning relevant key word and image recommendations without the need for tagging. The analysis may take some time to complete when turning this feature on.

Reclassify content in this repository   Start
Reclassification is a background process that runs and produces new category suggestions for your content. If a taxonomy is enabled for auto-classification, qualifying content would be auto-classified into the categories of that taxonomy.

Repository Administrators can manually kick off reclassification of content (in bulk for all content in the repository)

Home
Assets
Sites
Recommendations
Developer
Analytics
COLLABORATION
Documents
Conversations
ADMINISTRATION
System
Integrations
Content

*FIGURE 57*

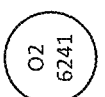
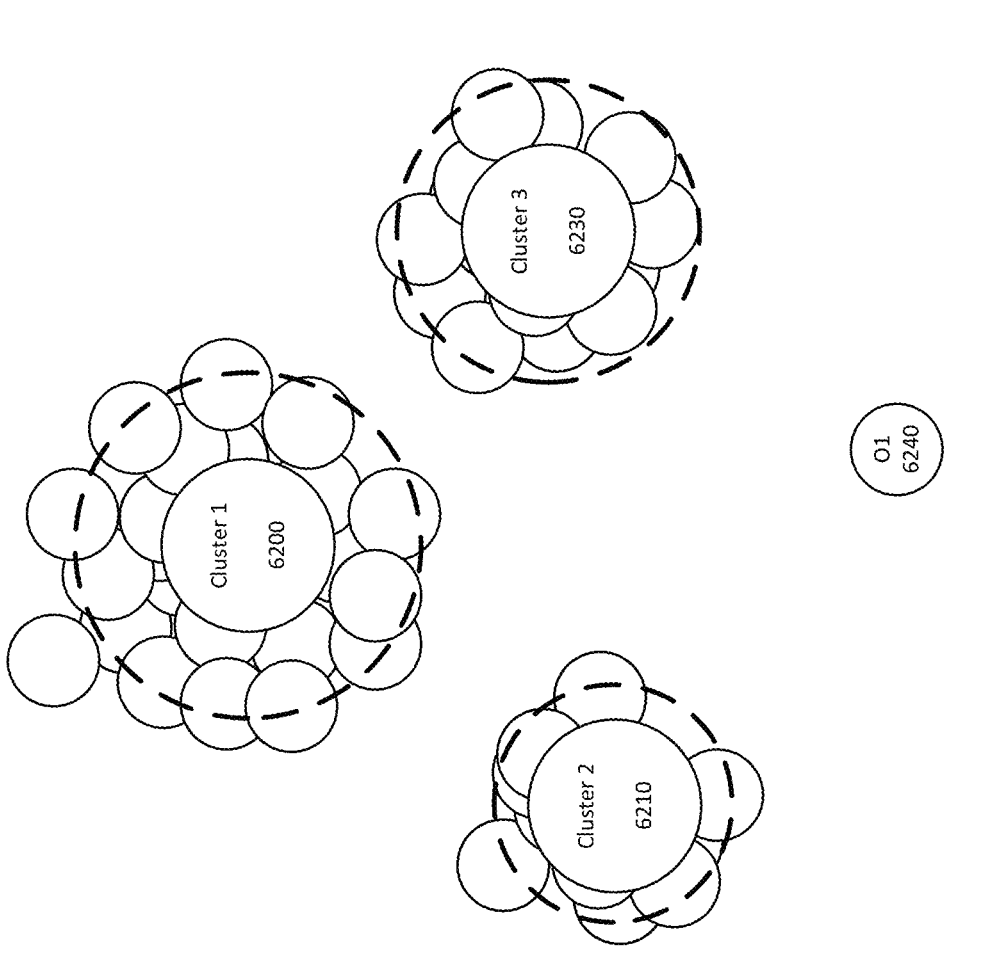
*FIGURE 62*

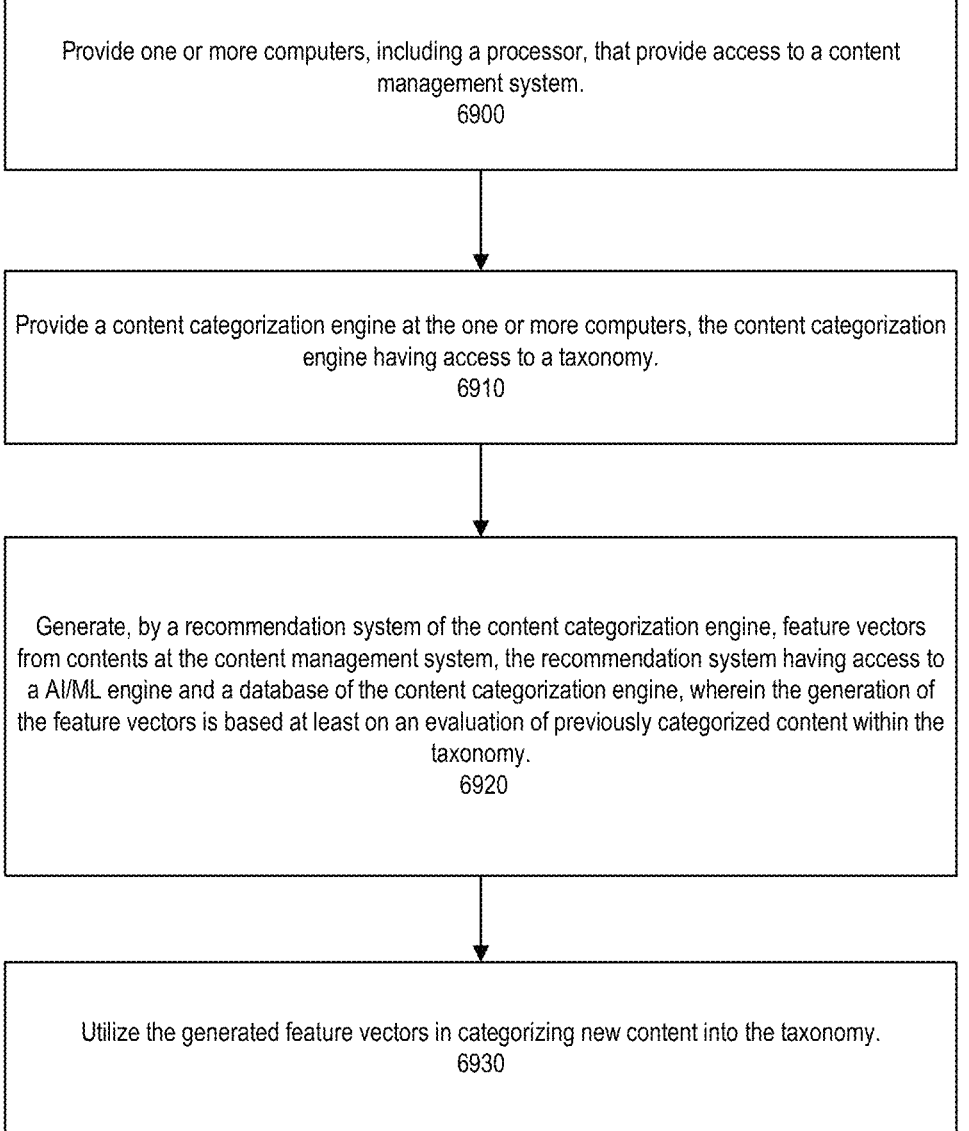

Provide one or more computers, including a processor, that provide access to a content management system.
6900

Provide a content categorization engine at the one or more computers, the content categorization engine having access to a taxonomy.
6910

Generate, by a recommendation system of the content categorization engine, feature vectors from contents at the content management system, the recommendation system having access to a AI/ML engine and a database of the content categorization engine, wherein the generation of the feature vectors is based at least on an evaluation of previously categorized content within the taxonomy.
6920

Utilize the generated feature vectors in categorizing new content into the taxonomy.
6930

*FIGURE 69*

SYSTEM AND METHOD FOR SMART CATEGORIZATION OF CONTENT IN A CONTENT MANAGEMENT SYSTEM

CLAIM OF PRIORITY AND CROSS-REFERENCE TO RELATED APPLICATIONS

This application is a continuation of U.S. patent application titled "SYSTEM AND METHOD FOR SMART CATEGORIZATION OF CONTENT IN A CONTENT MANAGEMENT SYSTEM", application Ser. No. 17/486,524, filed Sep. 27, 2021; which application claims the benefit of priority to U.S. Provisional patent application titled "SYSTEM AND METHOD FOR SMART CATEGORIZATION OF CONTENT IN A CONTENT MANAGEMENT SYSTEM", Application No. 63/084,174, filed Sep. 28, 2020, and is a continuation-in-part of and claims the benefit of priority to U.S. patent application titled "TECHNIQUES FOR RANKING CONTENT ITEM RECOMMENDATIONS", application Ser. No. 16/657,395, filed Oct. 18, 2019, issued as U.S. Pat. No. 11,200,240 on Dec. 14, 2021; which is a continuation-in-part of and claims the benefit of priority to U.S. patent application titled "SMART CONTENT RECOMMENDATIONS FOR CONTENT AUTHORS" application Ser. No. 16/581,138, filed Sep. 24, 2019, issued as U.S. Pat. No. 11,163,777 on Nov. 2, 2021; which claims the benefit of priority to India Provisional patent application titled "SMART CONTENT RECOMMENDATIONS FOR AUTHORS", Application 201841039495, filed Oct. 18, 2018; each of which above applications and their contents are herein incorporated by reference.

COPYRIGHT NOTICE

FIELD OF TECHNOLOGY

This application is generally related to online commerce environments, and management and delivery of content data, and is particularly directed to smart categorization/classification of content in a content management system.

BACKGROUND

Generators and authors of original content for online publication and/or transmission may use a variety of different software-based tools and techniques for generating, editing, and storing the newly generated content.

In a content management system, content of various kinds (e.g., documents, structured content like blogs, articles, press releases; and media files like images and videos) often need to be evaluated/categorized based on their content. Such categorization/classification happens across a hierarchical set of categories or nodes. For example, a contract document for real estate lease may be evaluated/categorized under legal documents→real estate→contracts. It is also possible for the same document (or content) to be in more than one categorization/classification at the same time. For example, the same contract document may exist under active contracts→signed.

Categories are grouped under an organizing concept called taxonomy. Organizations tend to have many taxonomies that mirror their business organization for content. When a new document or content item is added, or when new taxonomies come into existence, or there are significant changes in content organization, the task of correctly classifying or re-classifying content falls to end users (or content authors). This can be an expensive and error prone undertaking when the amount of content as well as the number of taxonomies grow. One of the persistent problems in the space of content management is to ease the job of content authors by making recommendations for categorization/classification.

SUMMARY

In accordance with an embodiment, systems and methods described herein can be used, for example with a content management system, to provide recommendations to categorize/classify content into user-defined categories, which in turn provides an opportunity for content managers to place new content into accurate categories effortlessly, based on previously evaluated/categorized content.

Classifying an enormous amount of content in an online fashion is a complex task that involves challenges such as the single pass constraint over the data, and the requirement for fast response. In accordance with an embodiment, content users categorize similar content through a logical cluster such as a hierarchical taxonomy tree, and place the similar content in the same node/category of the taxonomy tree. Over time, as both the number of content entities and the nodes in the taxonomy tree grows, similar content entities will find themselves residing alongside one another in a node. Given this state of the content organization, the content residing inside an already evaluated/categorized taxonomy can be used by a computer algorithm to determine where a newly created/edited may belong.

In accordance with an embodiment, a recommendation system or tool can use artificial intelligence (AI) techniques to continuously learn from past data, and assist in placing content into a relevant category through automatic categorization/classification of newly created/edited content. The recommendation tool can be implemented and applied across diverse domains by generating feature vectors from contents, creating clusters in the feature space based on previously categorized content, and recommending a category for new content through feature space distance calculation from the clusters.

Aspects of the present disclosure relate to an artificial intelligence (AI) driven tool configured to function as a smart digital assistant to recommend images, text content, and other relevant media content from a content repository. Certain embodiments, may include front-end software tools having graphical user interfaces (GUI) to supplement the content authoring interfaces being used to author the original media content (e.g., blog entries, online articles, etc.). In some cases, the additional GUI screens and features may be incorporated into an existing content authoring software tool, for example, as software plug-ins. The smart digital content recommendation tool may communicate with a number of back-end services and content repositories, for example, to analyze text and/or visual input, extract keywords or topics from the input, classify and tag the input content, and store the classified/tagged content in one or more content repositories.

Additional techniques performed in various embodiments of the smart digital content recommendation tool (e.g., either directly by the software tool, and/or indirectly by invoking back-end services), may include converting input text and/or images into vectors within a multi-dimensional vector space, and comparing input content to a plurality of repository content to find a number of relevant content options within the content repository. Such comparisons may include thorough and exhaustive deep searches and/or more efficient tag-based filtered searches. Finally, relevant content items (e.g., images, audio and/or video clips, links to related articles, etc.), may be retrieved and presented to the content author to be reviewed and embedded within the original authored content.

Although the description herein primarily illustrates an application to text contents, in accordance with various embodiments, the approach can be extended, for example, to multimedia or other types of content, such as images/videos, through metadata extraction.

BRIEF DESCRIPTION OF THE DRAWINGS

A further understanding of the nature and advantages of embodiments according to the present disclosure may be realized by reference to the remaining portions of the specification in conjunction with the following appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 12 is a flowchart illustrating another process for comparing feature vectors and identifying related content within a content repository, in accordance with certain embodiments of the present disclosure.

FIG. 25 is a diagram illustrating a process of comparing feature vectors and identifying related content within a content repository, in accordance with certain embodiments of the present disclosure.

FIG. 43 is a flowchart illustrating a process for identifying and ranking content items that are relevant to user content, in accordance with certain embodiments of the present disclosure.

FIG. 45 shows an example table of a matching set of content items identified by the content recommendation system, in accordance with certain embodiments of the present disclosure.

FIG. 51 illustrates a taxonomy creation flow diagram, in accordance with an embodiment.

FIG. 52 illustrates a taxonomy modification flow diagram, in accordance with an embodiment.

FIG. 57 illustrates a configuration to trigger reclassification of contents (in bulk) in a repository diagram, in accordance with an embodiment.

FIG. 62 illustrates the cluster representation, in accordance with an embodiment.

FIG. 69 is a flowchart of a method for smart categorization of content in a content management system, in accordance with an embodiment.

DETAILED DESCRIPTION

Figure 1:
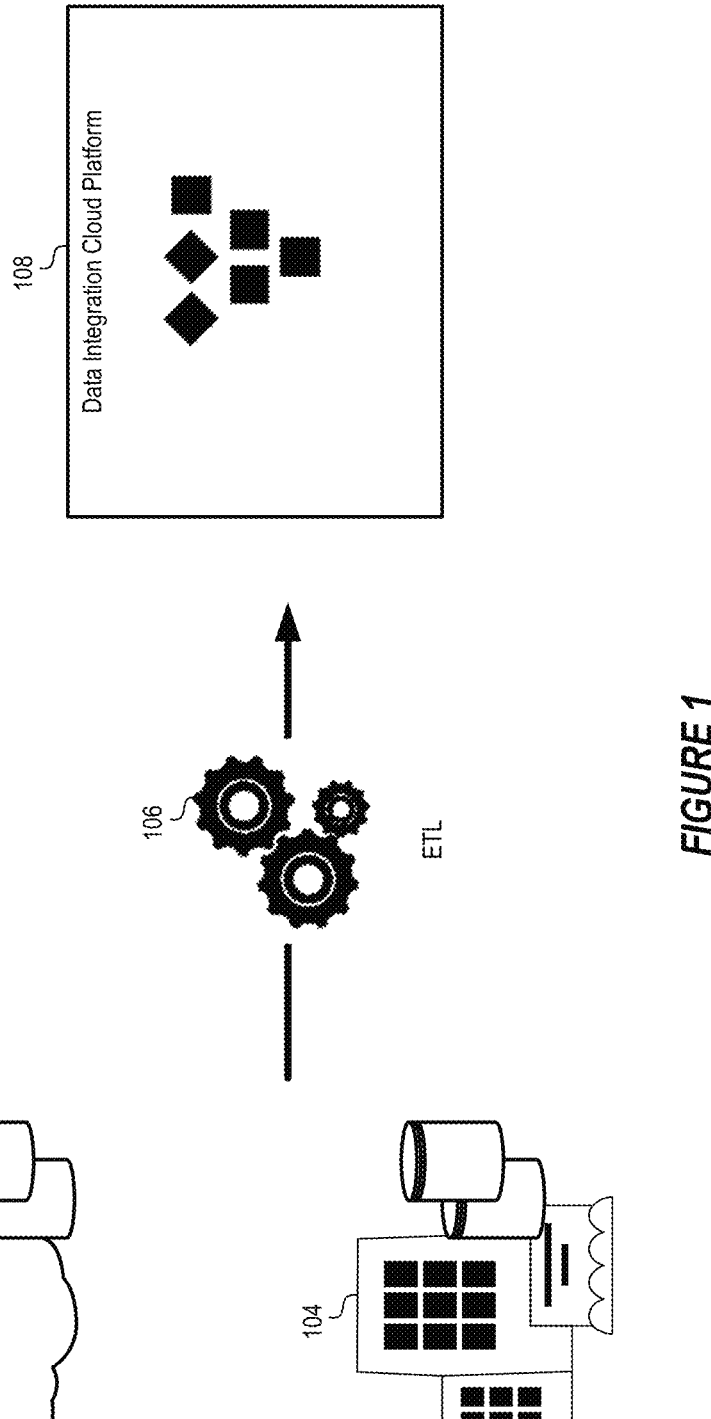
FIG. 1 is a diagram of an example computer system architecture including a data integration cloud platform in which certain embodiments of the present disclosure may be implemented.

In accordance with an embodiment, the invention is illustrated by way of example and not by way of limitation in the figures of the accompanying drawings, in which like references indicate similar elements. It should be noted that references to "an" or "one" or "some" embodiment(s) in this disclosure are not necessarily referencing the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs).

Certain embodiments described herein may be implemented as part of a Data Integration Platform Cloud (DIPC). In general, data integration involves combining data residing in different data sources and providing users with unified access and a unified view of the data. This process often arises and becomes significant in many situations, such as merging commercial entities with existing legacy databases.

Data integration is beginning to appear more frequently in Enterprise software systems as the volume of data continues to increase along with the ability to analyze the data to provide useful results ("big data"). For example, consider a web application where users can query a variety of types of travel information (e.g., weather, hotels, airlines, demographics, crime statistics, etc.). Instead of requiring all of these various data types to be stored in a single database with a single schema, an Enterprise application can instead use the unified views and virtual schemas in the DIPC to combine many heterogeneous data sources such that they can be presented in a unified view to the user.

The DIPC is a cloud-based platform for data transformation, integration, replication, and governance. It provides batch and real-time data movement between cloud and on-premises data sources while maintaining data consistency with default-tolerance and resiliency. The DIPC may be used to connect to various data sources and prepare, transform, replicate, govern, and/or monitored data from these various sources as they are combined into one or more data warehouses. The DIPC can work with any type of data source and support any type of data in any format. The DIPC can use a Platform as a Service (PaaS) or Infrastructure as a Service (IaaS) architecture to provide cloud-based data integration for an Enterprise.

The DIPC may provide a number of different utilities, including transferring entire data sources to new cloud-based deployments and allowing cloud databases to be easily accessed from the cloud platform. Data can be streamed in real-time to new data sources up-to-date and to keep any number of distributed data sources synchronized. Loads may be divided amongst synchronized data sources such that they remain highly available to end-users. An underlying data management system can be used to reduce the amount of data moved over the network for deployments into a database cloud, a big data cloud, third-party clouds, and so forth. A drag-and-drop user interface can be used to execute reusable Extract, Load, and Transform, (ELT) functions and templates. Real-time test environments can be created to perform reporting and data analytics in the cloud on replicated data sources such that the data can remain highly available to end-users. Data migrations can be executed with zero downtime using duplicated, synchronized data sources. The synchronized data sources can also be used for a seamless disaster recovery that maintains availability.

FIG. 1 illustrates a computer system architecture that utilizes the DIPC to integrate data from various existing platforms, according to some embodiments. A first data source 102 may include a cloud-based storage repository. A second data source 104 may include an on-premises data center. In order to provide uniform access and views to the first data source 102 and the second data source 104, the DIPC 108 can use an existing library of high-performance ELT functions 106 to copy data from the first data source 102 and the second data source 104. The DIPC 108 can also extract, enrich, and transform the data as it is stored in a new cloud platform. The DIPC 108 can then provide access to any big data utilities that are resident in or accessible by the cloud platform. In some embodiments, the original data sources 102 and 104 may continue to provide access to customers, while replicated data sources in the cloud platform can be used for testing, monitoring, governance, and big data analytics. In some embodiments, data governance may be provided to profile, cleanse, and govern data sources within an existing set of customized dashboards in a user interface.

Figure 2:
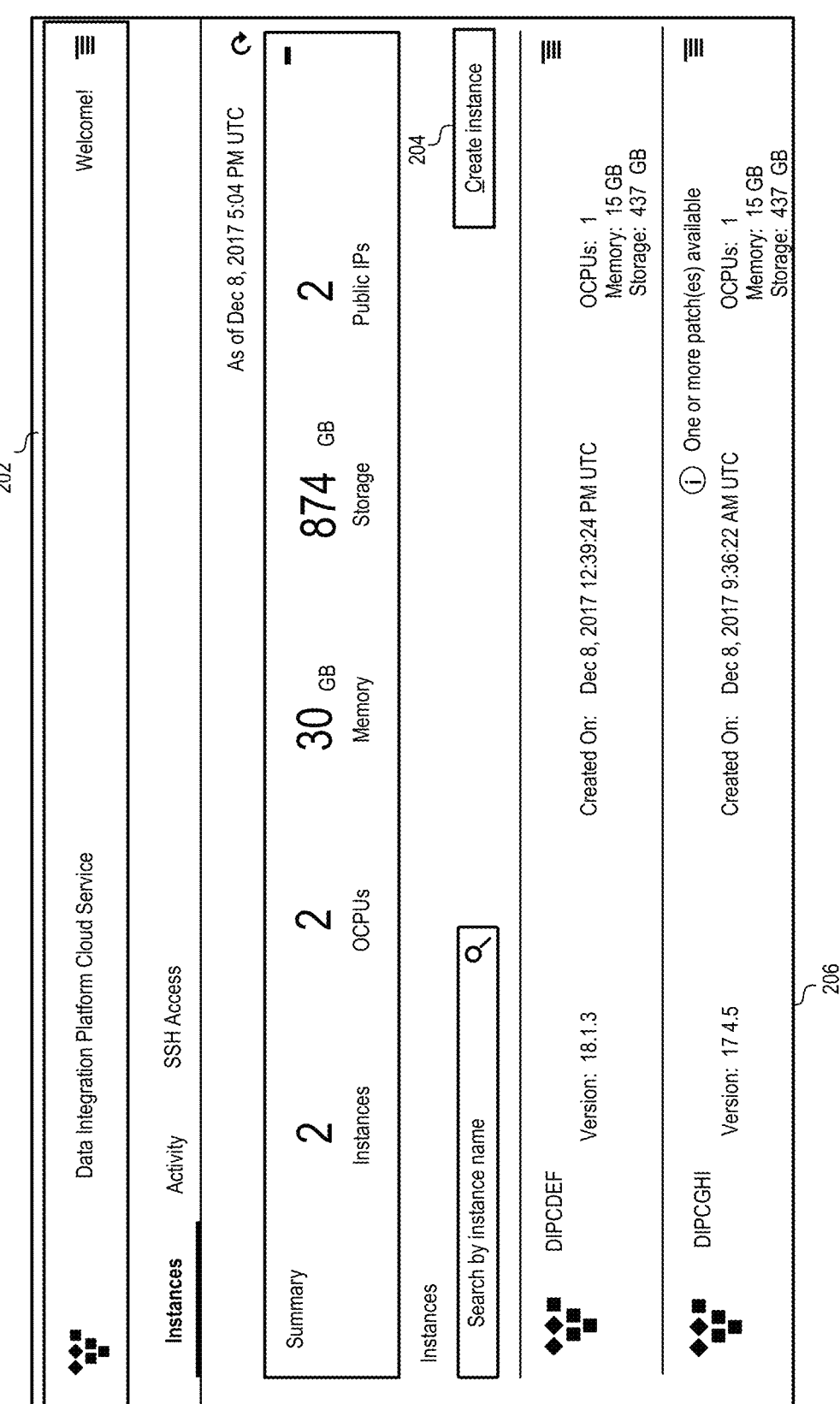
FIG. 2 is an example screen of a customized dashboard in a user interface used to configure, monitor, and control a service instance, in accordance with certain embodiments of the present disclosure.

FIG. 2 illustrates one of the customized dashboards in a user interface that can be used to configure, monitor, and control a service instance in the DIPC 108. A summary dashboard 202 can provide a control 204 that allows users to create a service instance. Next, a series of progressive web forms can be presented to walk the user through the types of information used to create a service instance. In a first step, the user will be asked to provide a service name and description with an email address and a service edition type. The user may also be asked for a cluster size, which specifies a number of virtual machines used in the service. The service edition type determines which applications are installed on the virtual machines. In a second step and corresponding web form, the user may provide a running cloud database deployment to store the schemas of the DIPC server. The same database may later be used to store data entities and perform integration tasks. Additionally, a storage cloud may be specified and/or provisioned as a backup utility. The user may also provide credentials that can be used to access the existing data sources used in the data integration. In a third step, the provisioning information can be confirmed and a service instance can be created. The new service instance may then be displayed in the summary area 206 of the summary dashboard 202. From there, the user can access any information for any running data integration service instance.

Figure 3:
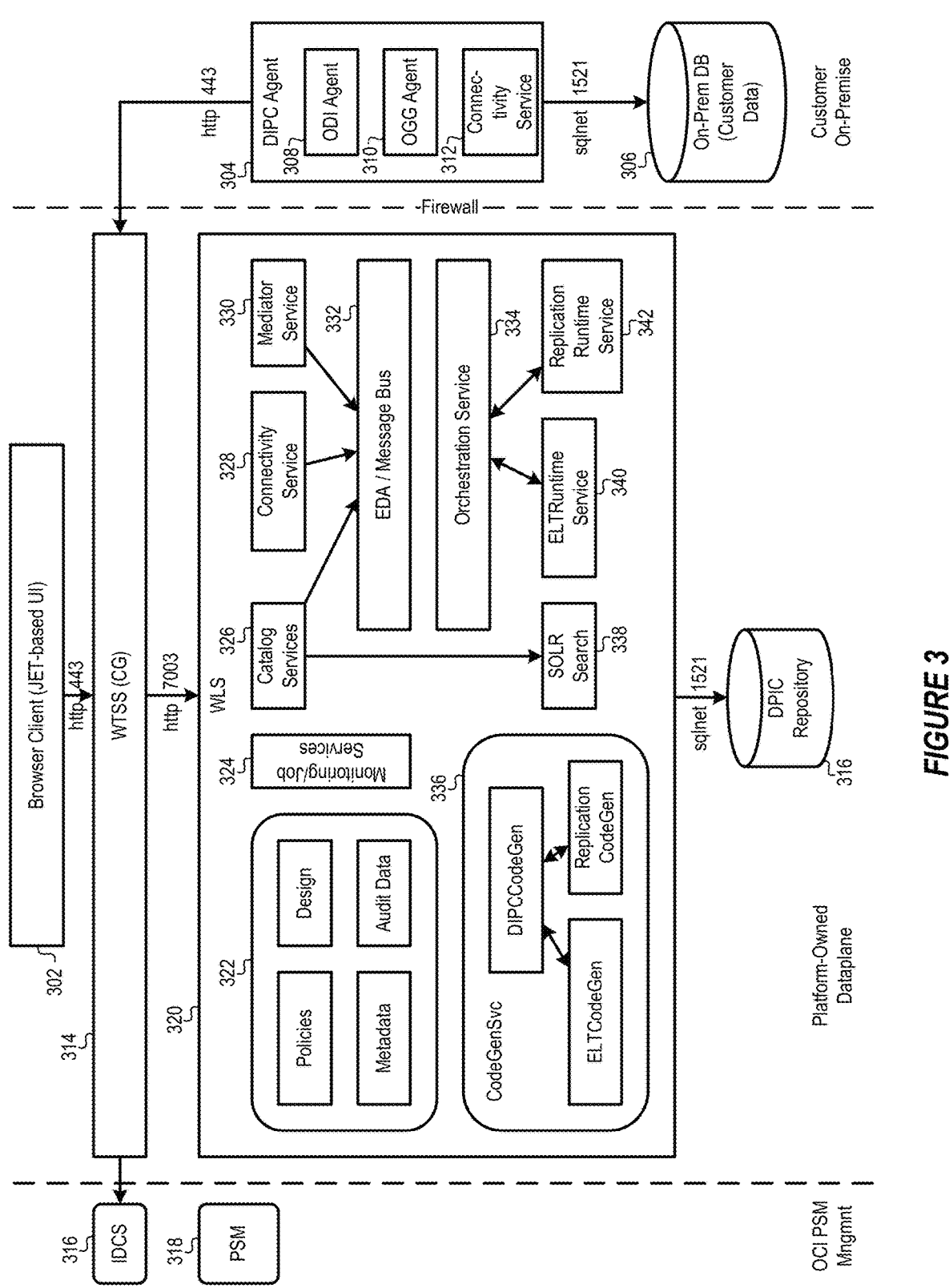
FIG. 3 is an architectural diagram of a data integration cloud platform, in accordance with certain embodiments of the present disclosure.

FIG. 3 illustrates an architectural diagram of the DIPC, according to some embodiments. Requests may be received through a browser client 302, which may be implemented using a JavaScript Extension Toolkit (JET) set of components. Alternatively or additionally, the system may receive requests through a DIPC agent 304 that operates at a customer's on-premises data center 306. The DIPC agent 304 may include a data integrator agent 308 and an agent 310 for a replication service, such as Oracle's GoldenGate® service. Each of these agents 308, 310 may retrieve information from the on-premises data center 306 during normal operations and transmit data using a connectivity service 312 back to the DIPC.

Incoming requests can be passed through a sign-in service 314, which may include load-balancing or other utilities for routing requests through the DIPC. The sign-in service 314 may use an identity management service, such as an identity cloud service 316 to provide security and identity management for the cloud platform as part of an integrated enterprise security fabric. The identity cloud service 316 can manage user identities for both the cloud deployments and the on-premises applications described in this embodiment. In addition to the identity cloud service 316, the DIPC may also use a PaaS Service Manager (PSM) tool 318 to provide an interface to manage the lifecycle of the platform service in the cloud deployment. For example, the PSM tool 318 can be used to create and manage instances of the data integration service in the cloud platform.

The DIPC can be implemented on a Web logic server 320 for building and deploying enterprise applications in the cloud environment. The DIPC may include a local repository 322 that stores data policies, design information, metadata, and audit data for information passing through the DIPC. It may also include a monitoring service 324 to populate the local repository 322. A catalog service 326 may include a collection of machine-readable open APIs to provide access to many of the SaaS and PaaS applications in the cloud deployment. The catalog service 326 may also be available for a search application 338 that uses a distributed indexing service, such as the Apache Solr®. A connectivity service 328 and a mediator service 330 can manage connections and provide transformation, validation, and routing logic for information that passes through the DIPC. Information within the DIPC may be passed using an Event Driven Architecture (EDA) and a corresponding message bus 332.

The DIPC may also include an orchestration service 334. The orchestration service 334 may enable automation tasks by calling REST endpoints, scripts, third-party automation frameworks, and so forth. These tasks can then be executed by the orchestration service 334 to provide the DIPC functionality. The orchestration service 334 can use run-time services to import, transform, and store data. For example, an ELT runtime service 334 can execute the library of ELT functions described above, while the replication runtime service 342 can copy data from various data sources into a cloud-deployed DIPC repository 316. Additionally, the DIPC may include a code generation service 336 that provides automatic code generation for both ELT functions and replication functions.

Smart Content—Smart Content Recommendations

As noted above, when a user is creating/authoring original media content (e.g., articles, newsletters, emails, blog posts, etc.), it is often useful to enhance the authored content with relevant additional content such as related images, audio/video clips, links to related articles or other content. However, searching for such additional content, as well as embedding that additional content within the user's original authored content, may be difficult in several respects. The initial difficulties may involve finding safe/secure additional content from a trusted source, and ensuring that user/author is authorized to incorporate that content within their work. Additionally, from any such secure and authorized content repositories, it may be a manually intensive and inefficient process for the user/author to locate and incorporate/embed any relevant content within their original authored content.

Therefore, certain aspects described herein relate to a smart digital content recommendation tool. In certain embodiments, the smart digital content recommendation tool may be an artificial intelligence (AI) driven tool configured to process and analyze input content (e.g., text, images) from a content author in real-time, and to recommend relevant images, additional text content, and/or other relevant media content (e.g., audio or video clips, graphics, social media posts, etc.), from one or more trusted content repositories. A smart digital content recommendation tool may communicate with a number of back-end services and content repositories, for example, to analyze text and/or visual input, extract keywords or topics from the input, classify and tag the input content, and store the classified/tagged content in one or more content repositories.

Additional aspects described herein, each of which may be performed directly via a smart digital content recommendation tool executing on a client operated by the content author, and/or indirectly by invoking various back-end services, may include (a) receiving original content as input, in the form of text and/or images, (b) extracting keywords and/or topics from the original content, (c) determining and storing associated keyword and/or topic tags for the original content, (d) converting the original content (e.g., input text and/or images) into vectors within a multi-dimensional vector space, (e) comparing such vectors to a plurality of other content vectors, each of which represents additional content in a content repository, in order to find and identify various potentially-relevant additional content related to the original content input authored by the user/author, and finally (f) retrieve and present the identified additional content to the author via the smart digital content recommendation tool. In some embodiments, each additional content item (e.g., images, links to related articles or web pages, audio or video files, graphics, social media posts, etc.) may be displayed and/or thumbnailed by the smart digital content recommendation tool, in a GUI-based tool that allows the user to drag-and-drop or otherwise place the additional content within the user's original authored content, including content positioning, formatting, re-sizing, etc.

Figure 4:
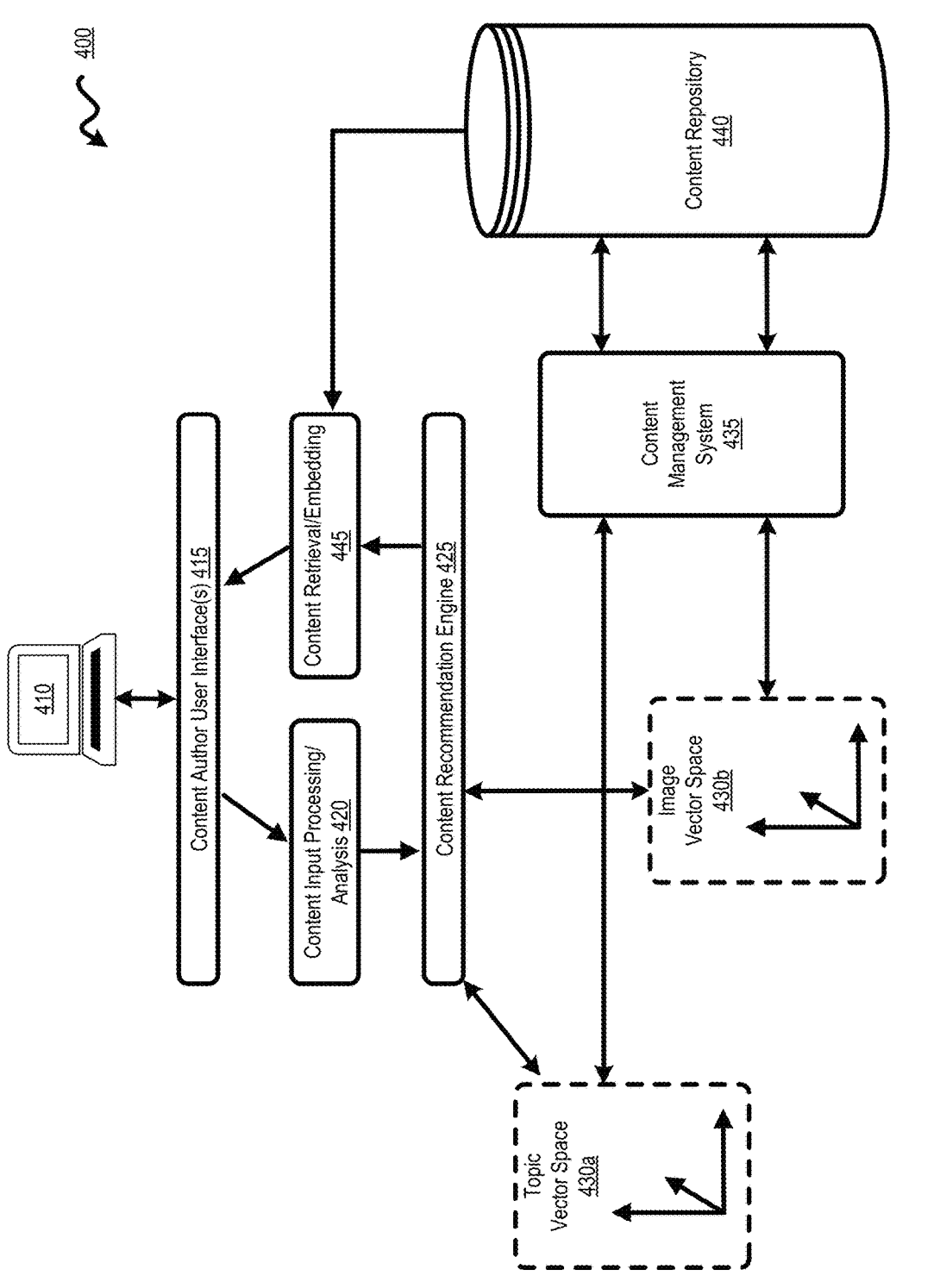
FIG. 4 is a diagram of an example computing environment configured to perform content classification and recommendation, in accordance with certain embodiments of the present disclosure.

With reference now to FIG. 4, a block diagram is shown illustrating various components of a system 400 for smart content classification and recommendation, including a client device 410, content input processing and analysis service 420, content recommendation engine 425, a content management system 435, and a content retrieval and embedding service 445. Additionally, system 400 includes one or more content repositories 440 storing content files/resources, and one or more vector spaces 430. As described in more detail below, a vector space may refer to a multi-dimensional data structure configured to store one or more feature vectors. In some embodiments, the recommendation engine 425, associated software components and services 420 and 445, content management system 435, and content repositories 440 (which may store one or more data stores or other data structures) may be implemented and stored as back-end server systems remote from the front-end client device 410. Thus, interactions between client device 410 and content recommendation engine 425 may be Internet-based web browsing sessions, or client-server application sessions, during which users access may input original authored content via the client device 410, and receive content recommendations from content recommendation engine 425 in the form of additional content that is retrieved from the content repository 440 and linked or embedded into the content authoring user interface at the client device 410. Additionally or alternatively, the content recommendation engine 425 and/or content repository 440 and related services may be implemented as specialized software components executing on the client device 410.

The various computing infrastructure elements shown in this example (e.g., content recommendation engine 425, software components/services 420, 435, and 445, and content repositories 440) may correspond to a high-level computer architecture created and maintained by an enterprise or organization that provides Internet-based services and/or content to various client devices 410. The content described herein (which also may be referred to as content resources and/or content files, content links, etc.) may be stored in one or more content repositories, retrieved and classified by the content recommendation engine 425, and provided to content authors at client devices 410. In various embodiments, various different media types or file types of content may be input as original content by a content author at client device 410, and similarly various different media types or file types of content may be stored in the content repositories 440 and recommended for/embedded into the front-end user interfaces at the client device 410. These various different media types authored by or recommended to the content author may include text (e.g., authoring a letter, article, or blog), images (selected by or for the author), audio or video content resources, graphics, social media content, (e.g., posts, messages, or tweets).

In some embodiments, system 400 shown in FIG. 4 may be implemented as a cloud-based multi-tier system, in which upper-tier user devices 410 may request and receive access to the network-based resources and services via the content processing/analysis component 420, and wherein the application servers may be deployed and executed upon an underlying set of resources (e.g., cloud-based, SaaS, IaaS, PaaS, etc.) including hardware and/or software resources. Additionally, although cloud-based systems may be used in some embodiments, systems 400 in other examples may use on-premise datacenters, server farms, distributed computing systems, and other various non-cloud computing architectures. Some or all of the functionality described herein for the content processing/analysis component 420, content recommendation engine 425, content management system 435, content retrieval and embedding component 445, and the generation and storage of the vector spaces 430 may be performed by Representational State Transfer (REST) services and/or web services including Simple Object Access protocol (SOAP) web services or APIs, and/or web content exposed via Hypertext Transfer Protocol (HTTP) or HTTP Secure protocols. Thus, although not shown in FIG. 4 so as not to obscure the components shown with additional details, the computing environment 400 may include additional client devices 410, one or more computer network(s), one or more firewalls 435, proxy servers, and/or other intermediary network devices, facilitating the interactions between the client devices 410, content recommendation engine 425, and back-end content repositories 440. Another embodiment of similar system 500 is shown in more detail in FIG. 5.

Figure 5:
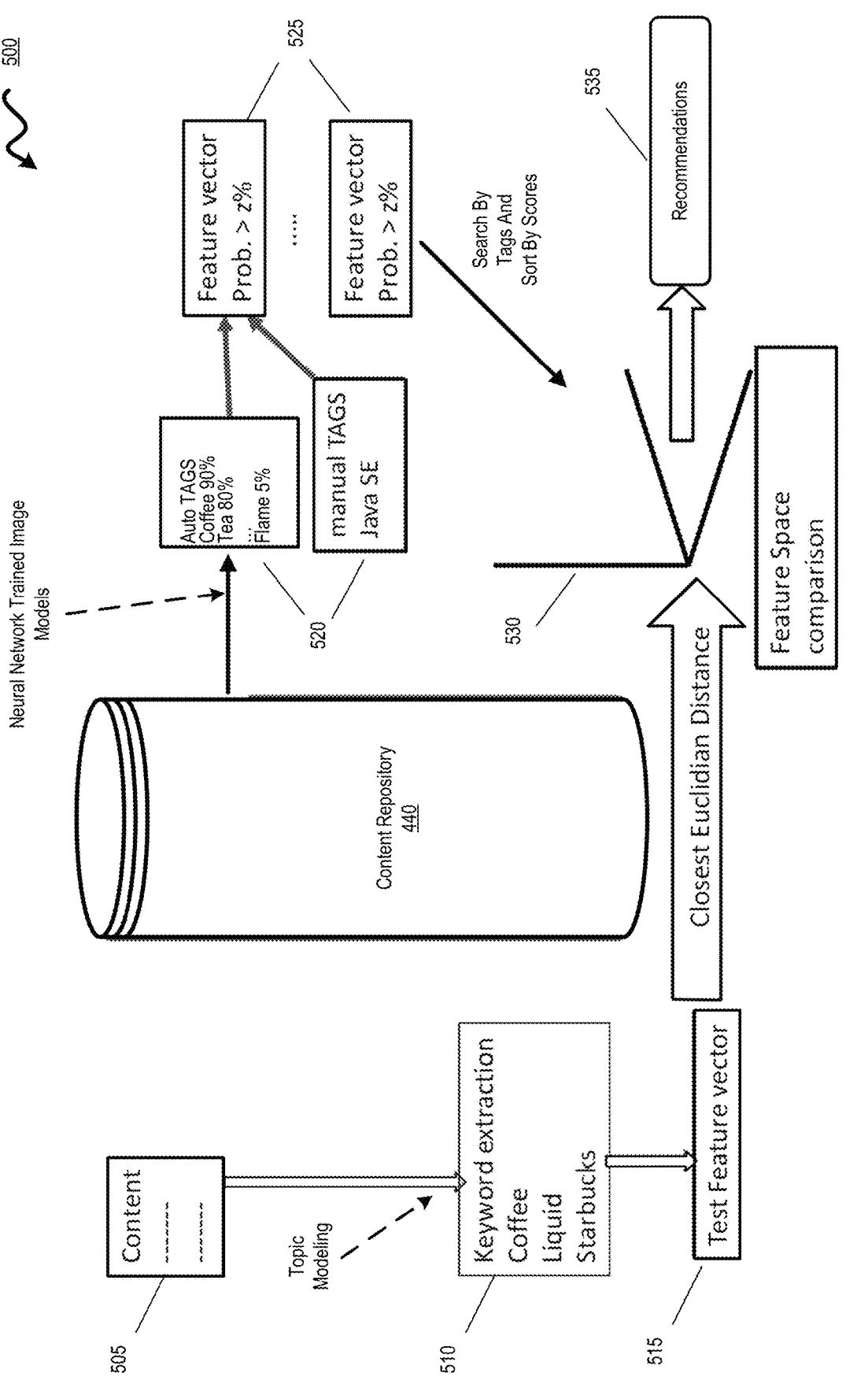
FIG. 5 is another diagram of an example computing environment configured to perform content classification and recommendation, in accordance with certain embodiments of the present disclosure.

Referring briefly to FIG. 5, another example diagram is shown of a computing environment 500 showing a data flow/data transformation diagram for performing content classification and recommendation. Thus, the computing environment 500 shown in this example may correspond to one possible implementation of the computing environment 400 described above in FIG. 4. In FIG. 5, several of the diagram blocks shown represent specific data states or data transformations, rather than the structural hardware and/or software components described above in FIG. 4. Thus, block 505 may represent input content data received via a user interface. Block 510 represents a set of keywords determined by the system 400, based on the input content 505. As discussed above, the keywords 510 may be determined using one or more keyword extraction and/or topic modeling processes, by the input processing/analysis component 420, and a text feature vector 515 may be generated based on the determined keywords 510.

Continuing with the example shown in FIG. 5, a number of additional feature vectors 520 may be retrieved from the content repository 440. In this example, the additional feature vectors 520 may be selected from the content repository 440 by executing one or more neural network trained image models, and providing the determined keywords 510 into the trained models. The resulting feature vectors 520 may further be narrowed to exclude those having a feature vector probability of less than z %, based on the output of the trained model, resulting in a subset of the retrieved feature vectors 525. A feature space comparison 530 then may be performed between the test feature vector 515 and the subset of retrieved feature vectors 525. In some embodiments, and as shown in this example closest Euclidean distance calculation may be used to identify the closest retrieved feature vectors 525 to the test feature 515. Based on the feature space comparison 530, one or more recommendations 530 may be determined, each recommendation 530, based on the associated feature vector 525 having a threshold closeness to the test feature vector 515, and each recommendation 530 corresponding to an image within the content repository 440.

The components shown in system 400 for providing AI-based and feature vector analysis-based content recommendations and services to client devices 410 may be implemented in hardware, software, or a combination of hardware and software. For example, web services may be generated, deployed, and executed within datacenters 440, using the underlying system hardware or software components such as data storage devices, network resources, computing resources (e.g., servers), and various software components. In some embodiments, web services may correspond to different software components executing on the same underlying computer server(s), networks, data stores, and/or within the same virtual machines. Some web-based content, computing infrastructure instances, and/or web services provided within the content recommendation engine 425 may use dedicated hardware and/or software resources, while others may share underlying resources (e.g., shared cloud). In either case, certain higher-level services (e.g., user applications), as well as users at client devices, need not ever be aware of the underlying resources being used to support the services.

In such implementations, the various application servers, database servers and/or cloud storage systems, and other infrastructure components such as web caches, network components, etc. (not shown in this example), may include various hardware and/or software components (e.g., application programming interfaces (APIs), cloud resource managers, etc.) to provide and monitor the classification and vectorization of content resources, as well as to manage the underlying storage/server/network resources. The underlying resources of the content repositories 440 may be stored within content repositorys and/or cloud storage systems which may include, for example, a set of non-volatile computer memory devices implemented as databases, file-based storage, etc., a set of network hardware and software components (e.g., routers, firewalls, gateways, load balancers, etc.), a set of host servers, and various software resources such as, store software images, installations, builds, templates, configuration files, and the like, corresponding to different versions of various platform, server, middleware, and application software. The datacenters housing the application servers of the recommendation engine 425, vector spaces 430, and related services/components also may include additional resources such as hypervisors, host operating systems, resource managers and other cloud-based applications, along with the hardware and software infrastructure to support various Internet-based services, such as Infrastructure as a Service (IaaS), Platform as a Service (PaaS), and Software as a Service (SaaS). Additionally, the underlying hardware of the datacenters may be configured to support a number of internal shared services, which may include, for example, security and identity services, integration services, repository services, enterprise management services, virus scanning services, backup and recovery services, notification services, file transfer services, and the like.

As noted above, many different types of computer architectures (cloud-based, web-based, hosting, multi-tier computing environments, distributed computing environments, etc.) may be used to provide the web-based content recommendations from the content recommendation engine 425 (which may be implemented via one or more content recommendation application servers) to the client devices 410 in accordance with various embodiments described herein. However, in certain implementations, cloud computing platforms may be used to provide certain advantageous features for generation and management of web-based content. For example, cloud computing platforms may provide elasticity and scalability to quickly provision, configure, and deploy many different types of computing infrastructure instances, in contrast to non-cloud based implementations having fixed architectures and limited hardware resources. Moreover, public cloud, private cloud, and public-private hybrid cloud platforms may be used in various embodiments to leverage the features and advantages of each distinct architecture.

Additionally, as shown in this example, system 400 also includes a content management system 435. In some embodiments, the content management system 435 may include a distributed storage processing system, one or more machine learning-based classification algorithms (and/or non-machine learning-based algorithms), and/or a storage architecture. As discussed in more detail below, in some embodiments the content management system 435 may access content resources (e.g., web-based articles, images, audio files, video files, graphics, social media content, etc.) via one or more content repositories 440 (e.g., network-based document stores, web-based content providers, etc.). For example, within system 400, specialized JavaScript or other software components may be installed and operate on one or more application servers, database servers and/or cloud systems storing content objects or network-based content. These software components may be configured to retrieve and transmit content resources (e.g., articles, images, web pages, documents, etc.), to the content management system 435 for analysis and classification. For example, each time a user within the operating organization of the system 400 imports or creates new content such as an image or article, a software component may retrieve the content back to the content management system 435, for various processing and analysis described below (e.g., image processing, keyword extraction, topic analysis, etc.). Additionally, although in this example, the content management system 435 is depicted as being implemented separately from the content recommendation engine 425 and content repositories 440, in other examples, content management systems 435 may be implement locally with either the content recommendation engine 425 and/or the storage devices storing content repositories 440, and thus need not receive separate transmissions of content from those device, but rather may analyze and classify those content resources that are stored or provided by their respective systems.

One or more vector spaces 430 also may be generated and used to store feature vectors corresponding to the different content items within the content repositories 440, and to compare the feature vectors for original authored content (e.g., received from a client device 410) to the feature vectors of the additional content items in the content repositories 440. In some embodiments, a plurality of multi-dimensional feature spaces 430 may be implemented within the system 400, such as first feature space 430a for topics of text input/articles, and a second feature space 430b for images. In other embodiments, additional separate multi-dimensional feature spaces 430 may be generated for different types of content media (e.g., a feature space for audio data/files, a feature space for video data/files, a feature space for graphics, a feature space for social media content, etc.). As discussed below, comparison algorithms may be used to determine distances between the vectors within a feature space. Thus, in a feature space of image feature vectors, the algorithms may be used to identify the closest images to a received input image, in a feature space of text feature vectors, the algorithms may be used to identify the closest texts (e.g., articles) to a received input text block, and so on. Additionally or alternatively, the comparison algorithm may use keywords/tags of the vector space to determine similarity between various media types.

In various implementations, system 400 may be implemented using one or more computing systems and/or networks. These computing systems can include one or more computers and/or servers, which may be general purpose computers, specialized server computers (such as desktop servers, UNIX servers, mid-range servers, mainframe computers, rack-mounted servers, etc.), server farms, server clusters, distributed servers, or any other appropriate arrangement and/or combination of computing hardware. The content recommendation engine 425 may run an operating system and/or a variety of additional server applications and/or mid-tier applications, including HyperText Transport Protocol (HTTP) servers, File Transport Service (FTP) servers, Common Gateway Interface (CGI) servers, Java servers, database servers, and other computing systems. The content repository 440 may include database servers, for example, those commercially available from Oracle, Microsoft, etc. Each component in system 400 may be implemented using hardware, firmware, software, or combinations of hardware, firmware, and software.

In various implementations, each component within system 400 may include at least one memory, one or more processing units (e.g., processor(s)), and/or storage. The processing unit(s) can be implemented as appropriate in hardware (e.g., integrated circuits), computer-executable instructions, firmware, or combinations of hardware and instructions. In some examples, the various components of system 400 may include several subsystems and/or modules. The subsystems and/or modules in the content recommendation engine 425 may be implemented in hardware, software (e.g., program code or instructions executable by a processor) executing on hardware, or combinations thereof. In some examples, the software may be stored in a memory (e.g., a non-transitory computer-readable medium), on a memory device, or some other physical memory, and may be executed by one or more processing units (e.g., one or more processors, one or more processor cores, one or more Graphics Process Units (GPUs), etc.). Computer-executable instructions or firmware implementations of the processing unit(s) can include computer-executable or machine-executable instructions written in any suitable programming language, which can perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some examples, computer-readable storage media may be configured to protect a computer from an electronic communication containing malicious code.

Figure 6:
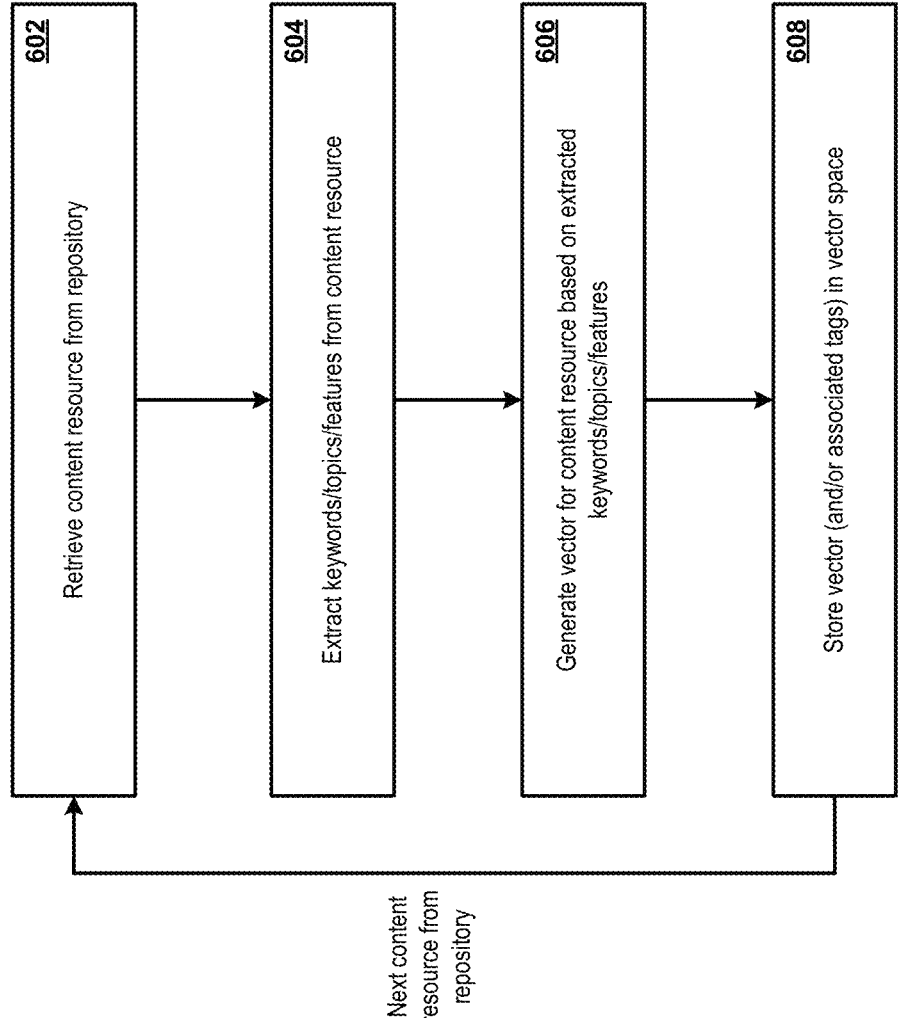
FIG. 6 is a flowchart illustrating a process for generating feature vectors based on content resources within a content repository, in accordance with certain embodiments of the present disclosure.

Referring now to FIG. 6, a flowchart is shown illustrating a process for generating feature vectors based on content resources within a content repository 440, and storing the feature vectors within a feature space 430. As described below, the steps in this process may be performed by one or more components in the computing environment 400, such as the content management system 435, and the various subsystems and subcomponents implemented therein.

In step 602, a content resource may be retrieved from a content repository 440 or other data store. As discussed above, an individual content resource (which also may be referred to as content or a content item) may correspond to a data object of any various content type: a text item (e.g., text file, article, email, blog entry, etc.), an image, an audio file, a video file, a 2D or 3D graphic object, a social media data item, etc. In some embodiments, content items may be retrieved from particular content repositories 440, such as proprietary data stores owned and operated by a particular trusted organization. Although content repositories 440 may be external data sources, such as Internet web servers or other remote data stores, systems 400 that retrieve and vectorize content from local and/or privately-controlled content repositories 440 may realize several technical advantages in the operation of system 400, including assurances that the content from repository 440 will be preserved and accessible when needed, and that the user/author is authorized to use and reproduce the content from repository 440. In some cases, the retrieval in step 602 (and subsequent steps 604-608) may be triggered in response to a new content item being stored in the content repository 440, and/or to a modification to an item in the content repository 440.

Figure 7:
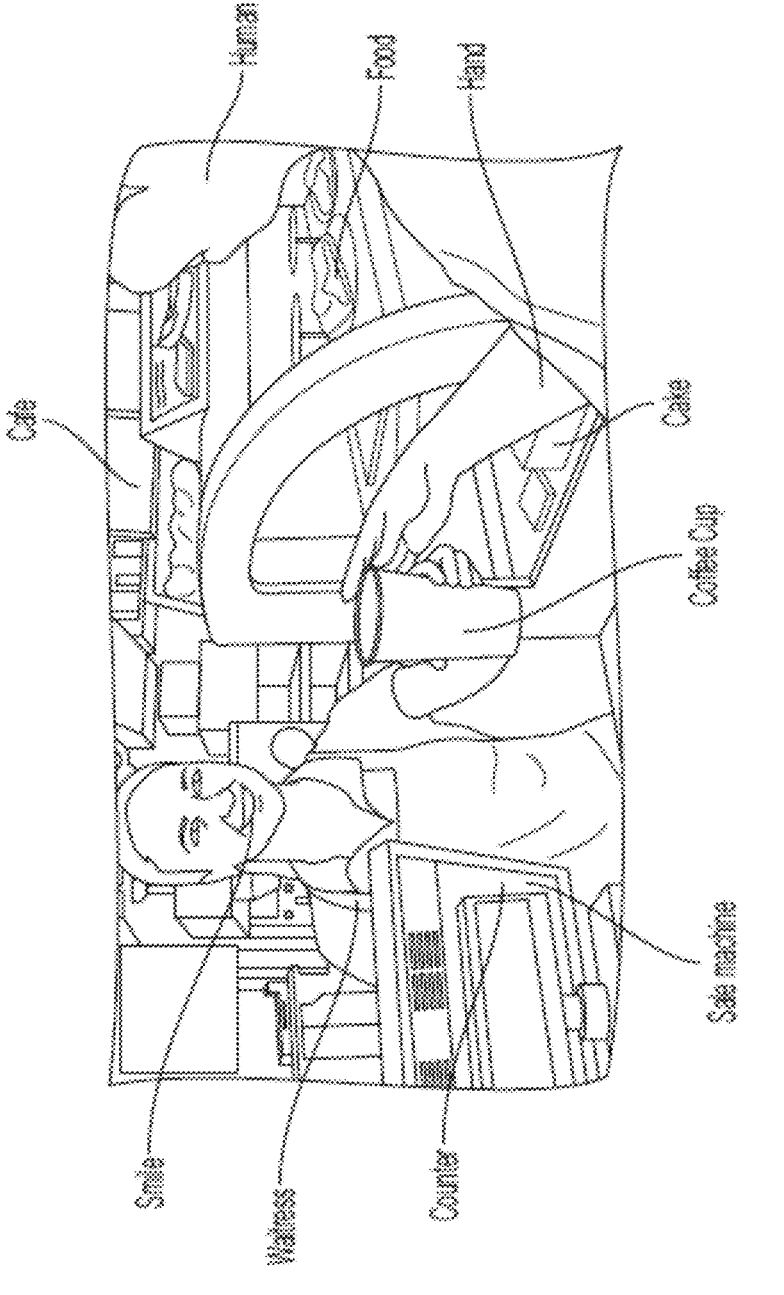
FIG. 7 is an example image identifying a plurality of image features, in accordance with certain embodiments of the present disclosure.
Figure 8:
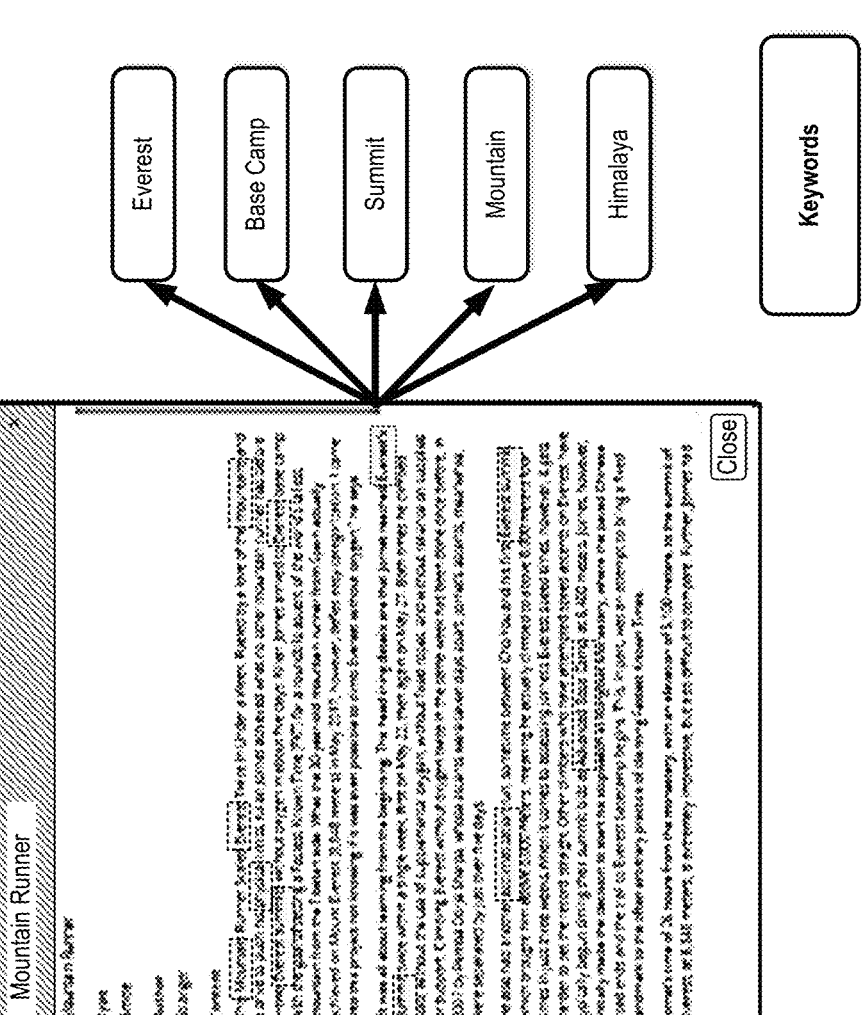
FIG. 8 is an example of a text document illustrating a keyword extraction process, in accordance with certain embodiments of the present disclosure.
Figure 9:
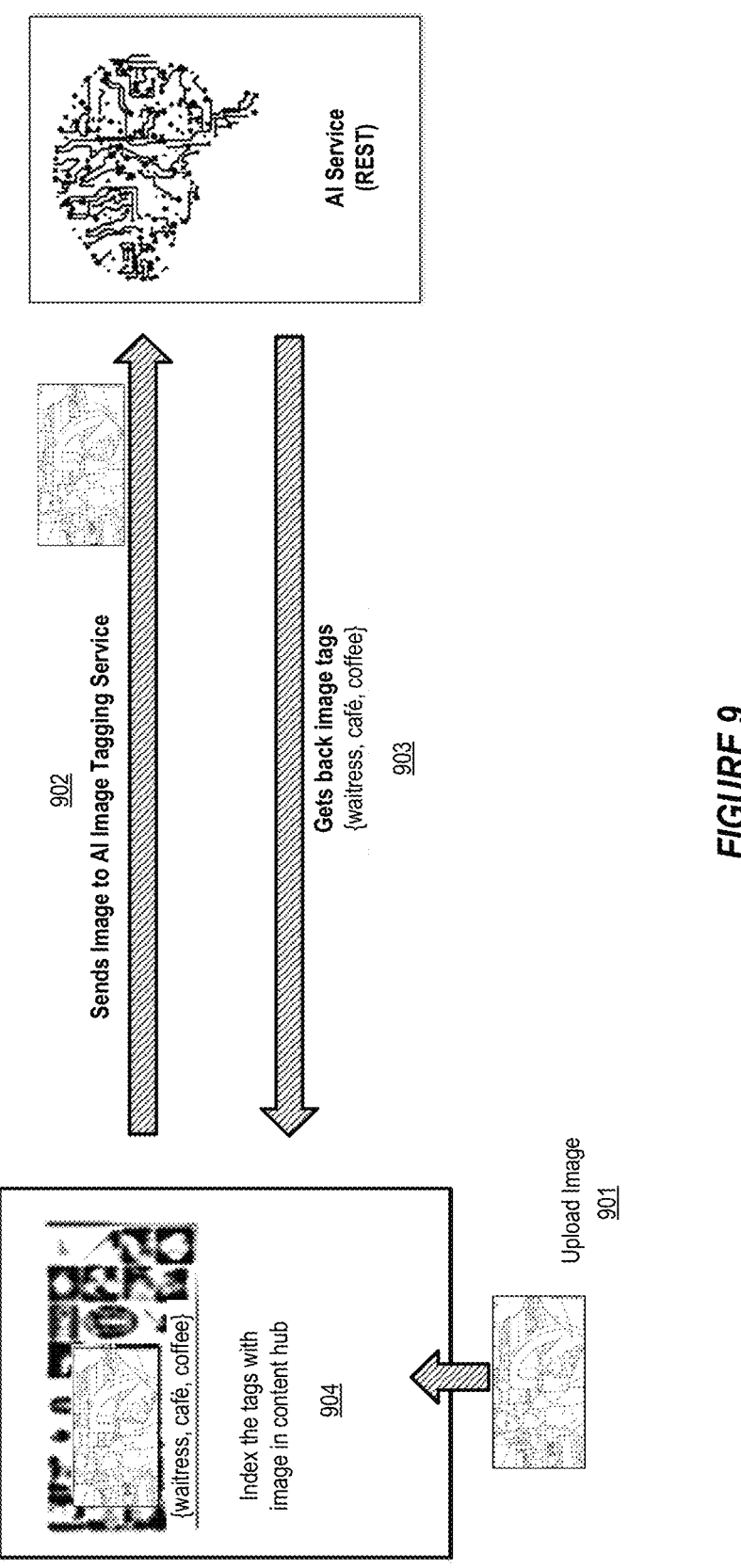
FIG. 9 is a diagram illustrating a process of generating and storing image tags, in accordance with certain embodiments of the present disclosure.

In step 604, the content item retrieved in step 602 may be parsed/analyzed/etc. in order to extract a set of item features or characteristics. The type of parsing, processing, feature extraction, and/or analysis performed in step 604 may depend on the type of the content item. For image content items, artificial intelligence-based image classification tools may be used to identify particular image features and/or generate image tags. As shown in the example image of FIG. 7, the image analyses may identify a plurality of image features (e.g., smile, waitress, counter, sale machine, coffee cup, cake, hand, food, human, café, etc.), and the image may be tagged with each of these identified features. For text-based content items, such as blog posts, letters, emails, articles, etc., the analysis performed in step 604 may include keyword extraction and processing tools (e.g., stemming, synonym retrieval, etc.) as shown in FIG. 8. One or both types of analyses (i.e., feature extraction from images as shown in FIG. 9, and keyword/topic extraction from text content as shown in FIG. 8), may be performed via REST-based services or other web services, using analytics, machine-learning algorithms, and/or artificial intelligence (AI), such as an AI-based cognitive image analysis service, or a similar AI/REST cognitive text service to be used for the text content of FIG. 8. Similar techniques may be used in step 604 for other types of content items, such as video files, audio files, graphics, or social media posts, where a specialized web-service of the system 400 is used to extract and analyze specific features (e.g., words, objects within images/video, facial expressions, etc.) depending on the media type of the content item.

In step 606, after extracting/determining the specific content features (e.g., visual objects, keywords, topics, etc.) from the content item, a feature vector may be generated based on the extracted/determined features. Using various transformation techniques, each set of features associated with a content item may be transformed into a vector that can be input into a common vector space 430. The transformation algorithm may output a predetermined vector format (e.g., 1×4096 dimension vector). Then, in step 608, the feature vector may be stored in one or more of the vector spaces 430 (e.g., topic vector space 430a for text content, image vector space 430b for image content, and/or a combined vector space for multiple content types). The vector spaces and feature vectors stored therein may be generated and maintained by the content management system 435, the content recommendation engine 425, and/or other components of the system 400.

Figure 10:
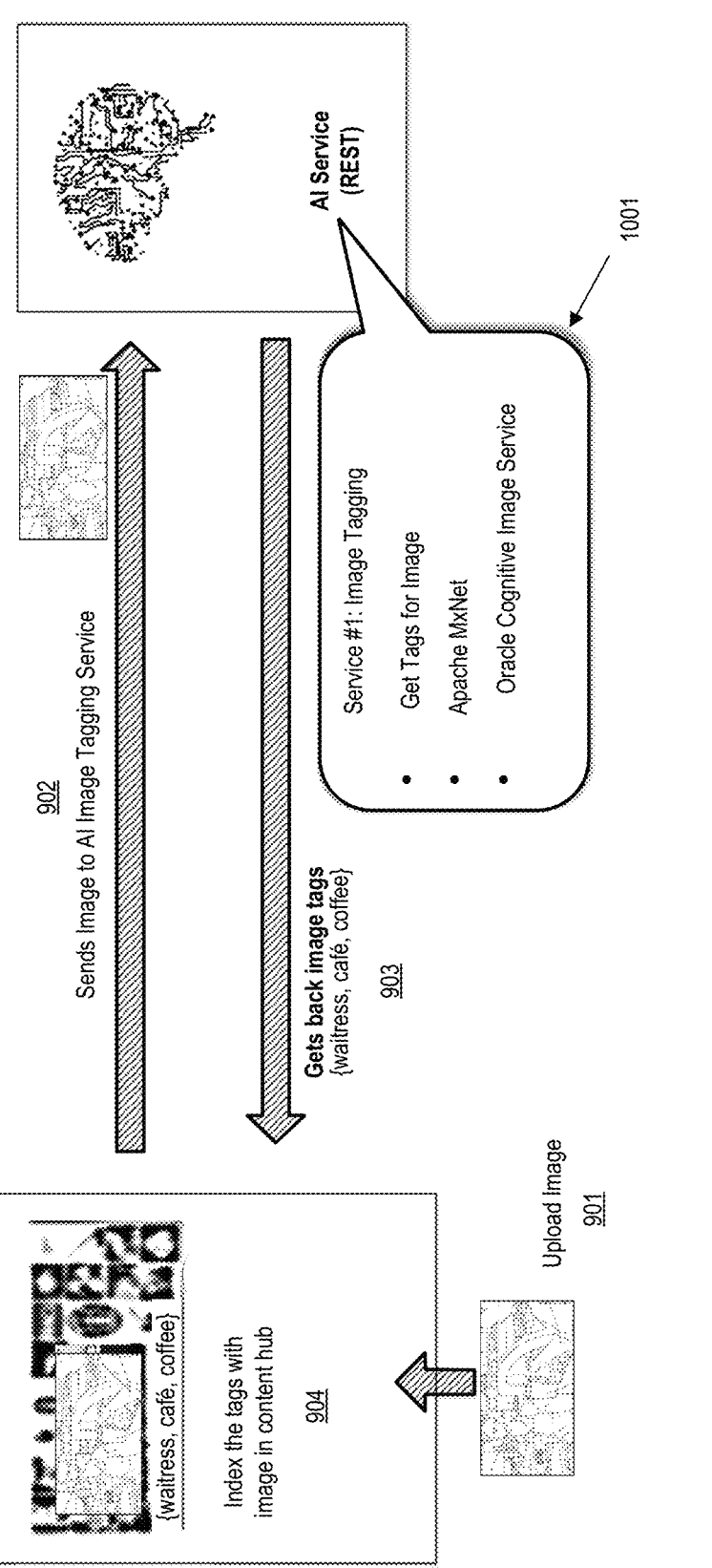
FIG. 10 is a diagram illustrating a process of generating and storing image tags, in accordance with certain embodiments of the present disclosure.
Figure 11:
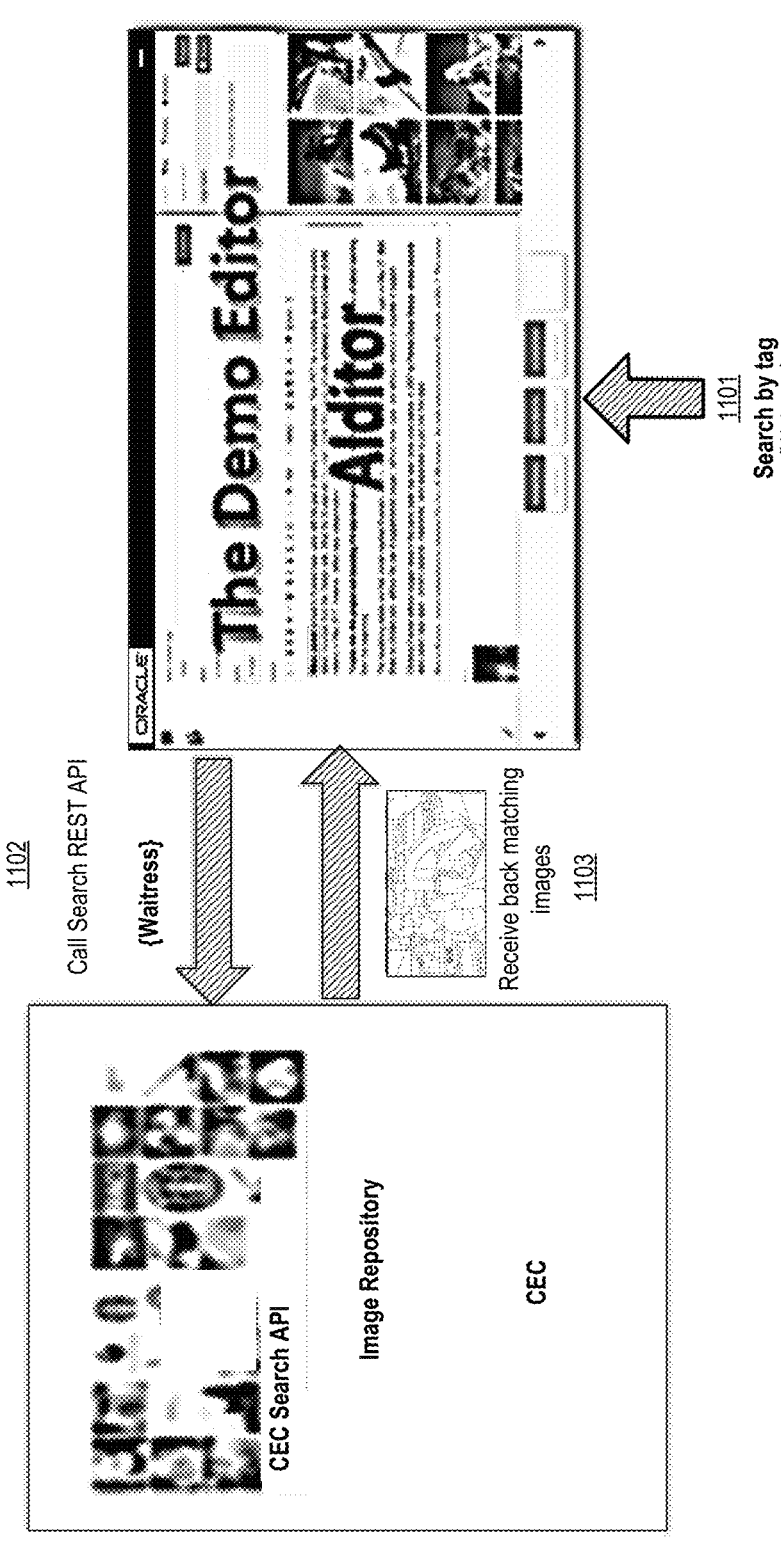
FIG. 11 is a diagram illustrating a process of generating and storing image tags, in accordance with certain embodiments of the present disclosure.

In some embodiments, a subset of the extracted/determined content features also may be saved as tags associated with the content item. Example processes for generating and storing image tags based on images, and conversely retrieving images based on image tags, are shown in FIGS. 9-11. Although these examples relate to image content items, similar tagging processes and/or keyword or topic extraction may be performed for text content items, audio/video content items, etc. As shown in FIG. 9, in step 901 an image may be created and/or uploaded, for example, into a content repository 440. In step 902, the image may be transmitted from the content repository 440 to an artificial intelligence (AI) based REST service configured to analyze the image and extract topics, themes, specific visual feature, and the like. The AI REST service may determine one or more specific image tags based on the identified image features, and in step 903 may transmit the image tags back to the content repository, to be stored either within or associated with the image in step 904. In FIG. 10, an identical process to that described in FIG. 9 is shown for generating and storing image tags based on images. Additionally, FIG. 10 shows several illustrative features 1001 that may implemented within the AI REST service in certain embodiments, including an image tag determination/retrieval component, an Apache MxNet component, and a cognitive image service. After determining one or more tags for a content item, the tags may be stored either back in the content repository 440, or in a separate storage location. For instance, referring to the example image of FIG. 7, a dozen or more potential image features may be extracted from this single image, all of which may be incorporated into the feature vector. However; AI REST service and/or the content repository 440 may determine that it is optimal for content match to tag the image only with a few of the most prevalent themes of the image (e.g., coffee, retail).

Referring briefly now to FIG. 11, another example process is shown relate to the described in FIGS. 9 and 10 for generating and storing image tags based on images. In FIG. 11, a converse process is illustrated, in which image tags are used to retrieve matching images from a content repository 440. In step 1101, a content authoring user interface 415 or other front end interface may determine one or more content tags based on the input received via the interface. In this example, a single content tag ("waitress") is determine from the received user input, and in step 1102 the content tag is transmitted to a search API associated with the content repository 440. A search API may be implemented within one or more separate layers of the computing system, including within a content input processing/analysis component 420, the content recommendation engine 425, and/or the content management system 435. In step 1103, data identifying the matching images determined by the search API may be transmitted back to the content authoring user interface 415 to be integrated within the interface or otherwise presented to the user.

Thus, upon the completion of the steps 602-608 for a plurality of content resources in a content repository 440, one or more vector spaces 430 may be populated with vectors wherein each vector corresponds to a content item in the repository 440. Additionally, in some embodiments, a separate set of metadata tags may be generated for some or all of the content items, and stored as separate objects from the vectors in vector spaces 430. Such tags may be stored in any data storage or component shown in FIG. 4, or a separate data store, and each tag may be associated with content items in a repository 440, vectors in a vector space 430, or both.

Referring now to FIG. 12, another flowchart is shown illustrating a second process for receiving original authored content from a user via the client device 410, extracting features and/or tags from the content in real-time (or near real-time) during the user's authoring session, vectorizing the authored content (also in real-time or near real-time), and comparing the vector of the original authored content to one or more existing vector spaces 430 in order to identify and retrieve related/associated content from one or more available content repositories 440. The steps in this process also may be performed by one or more components within the computing environment 400, such as the content recommendation engine 425 in collaboration with the client device 410, input processing/analysis component 420 and retrieval/embedding component 445, and the various subsystems and subcomponents implemented therein.

In step 1202, original authored content may be received from a user via the client device 410. As discussed above, the original authored content may correspond to text typed by the user, a new image created or imported by the user, new audio or video input recorded or imported by the user, a new graphic created by the user, etc. Thus, step 1202 may be similar to step 602, discussed above. However, whereas the content in step 602 may be previously authored/stored content that is retrieved from a repository 440, in step 1202 the content may be newly authored content received via a user interface, such as a web-based text input control, image importer control, image creation control, audio/video creation control, etc.

In step 1204, the content received in step 1202 (e.g., original authored content) may be processed, for example, by the input processing/analysis component 420. Step 1204 may be similar or identical to step 604, discussed above, with respect to the parsing steps, processing steps, keyword/data feature extraction steps, etc. For example, for text input received in step 1202 (e.g., blog posts, letters, emails, articles, etc.), the processing in step 1204 may include text parsing, identification of keywords, stemming, synonym analysis/retrieval, and the like. In other examples, when an image is received in step 1202 (which may be uploaded by the user, imported from another system, and/or created or modified manually by the user via the content author user interface 415), then step 1204 may include using AI-based image classification tools as described above to identify particular image features and/or generate image tags. These analyses in step 1204 may be performed via REST-based services or other web services, using analytics, machine-learning algorithms, and/or AI, such an AI-based cognitive image analysis service, and/or AI/REST cognitive text services. Similar techniques/services may be used in step 1204 for other types of content items, such as video files, audio files, graphics, or social media posts, where a specialized web-service of the system 400 is used to extract and analyze specific features (e.g., words, objects within images/video, facial expressions, etc.) depending on the media type of the content item. Step 1204 may also include any of the tagging processes described herein for tagging of text blocks, images, audio/video data, and/or other content with tags corresponding to any identified content topics, categories, or features.

Figure 13:
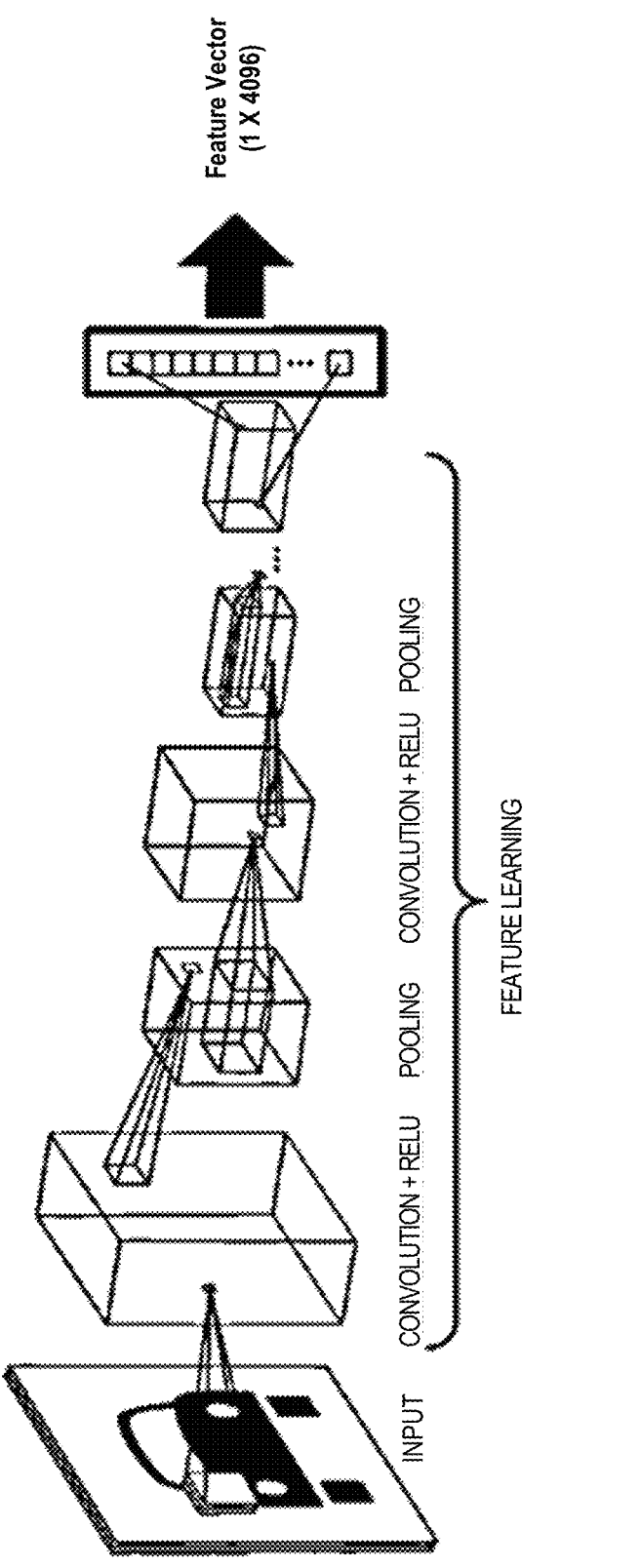
FIG. 13 is a diagram illustrating a technique of transforming an image filed into a feature vector, in accordance with certain embodiments of the present disclosure.

In step 1206, one or more vectors, compatible with one or more of the available vector spaces 430, may be generated based on the content received in step 1202. Step 1206 may be similar or identical to step 606, discussed above. As discussed above, a vector may be generated based on the particular features within the content (and/or tags) identified in step 1204. The vector generation process in step 1206 may use one or more data transformation techniques, whereby the set of features associated with the originally authored content item may be transformed into a vector compatible with one of the common vector spaces 430. For example, FIG. 13 illustrates a technique by which image input received in step 1202 may be transformed into a feature vector of a predetermined vector format (e.g., 1×4096 dimension vector) in step 1206. As shown in FIG. 13, an image may be provided as input to a model, which is configured to extract and learn features in the image (e.g., using convolution, pooling, and other functions) and output a feature vector representing the input image. For example, as described in the paper "Visualizing and Understanding Convolutional Networks," by Matthew D. Zeiler and Rob Fergus, of New York University, 2014, which is incorpo- rated by reference herein, within convolution neural net- works, the initial layers of the neural network may detect simple features from the image like linear edge, in the later layers it detects more complex shapes and patterns. For instance, the first and/or second layers in a convolutional neural network may detect simple edges or patterns, while the later layers can detect the actual complex objects present in the image (a cup, a flower, a dog, etc.) As an example, when receiving and processing an image of a face using convolutional neural network, the first layer may detect the edges in various directions, the second layer may detects different parts (e.g., eyes, nose, etc.) of the given face, and the third layer may get the feature map of the entire face.

Figure 14:
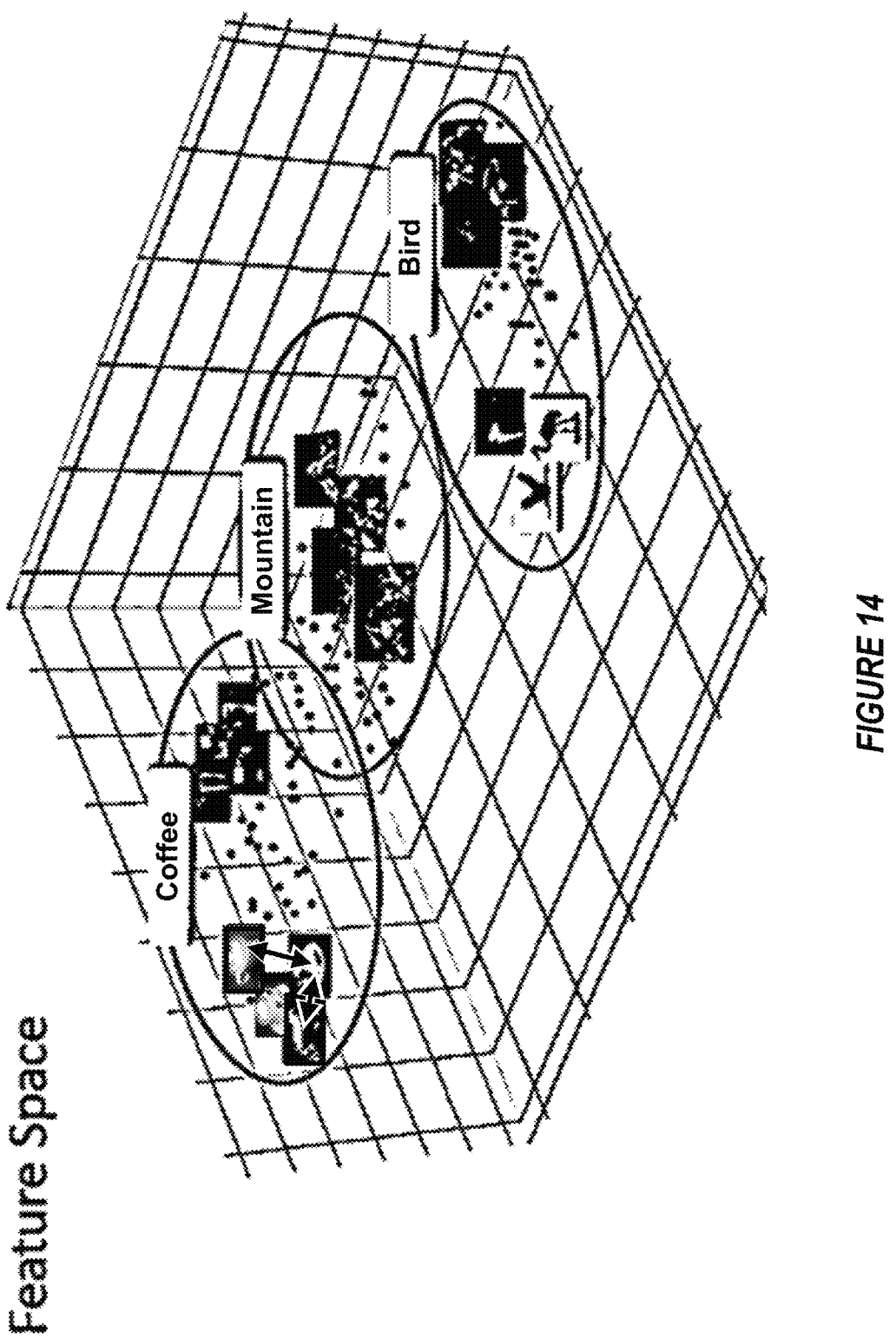
FIG. 14 is an illustrative vector space populated with feature vectors, in accordance with certain embodiments of the present disclosure.

In step 1208, the feature vector generated in step 1206 may be compared to the compatible feature vector space 430 (or spaces 430a-n) that were populated during the processes 602-608, discussed above. For example, an illustrative vec- tor space populated with feature vectors corresponding to images is shown in FIG. 14. In this example, each dot may represent a vectorized image, and the circles (and corre- sponding dot colors) in FIG. 14 may indicate one of three example tags associated with the images. The image tags in this case are "Coffee," "Mountain," and "Bird," and it should be understood that these tags are not mutually- exclusive (i.e., an image may be tagged with one, two, or all three tags). Additionally, it should be understood that these tags and the layout of the multi-dimensional vector space in FIG. 14 are illustrative only. In various embodiments, there is no limit the number or type of tags that may be used, or to the number of dimensions of a vector space 430.

To perform the vector space comparison in step 1208, the content recommendation engine 425 may calculate the Euclidean distance between the feature vector generated in step 1206, and each of the other feature vectors stored in the vector space/spaces 430. Based on the distances calculated, the engine 425 may rank feature vectors in ascending order of feature space distance, so that the smaller the distance between the two feature vectors, the higher the rank. Such techniques may allow the content recommendation engine 425 to determine a set of highest ranking feature vectors within the vector space(s) 430, which are most similar in features/characteristics/etc. to the feature vector generated in step 1206 based on the input received in step 1202. In some cases, a predetermined number (N) of the highest-ranking feature vectors may be selected in step 1208 (e.g., the 5 most similar articles, 10 most similar images, etc.), while in other cases all of the feature vectors satisfying a particular close- ness threshold (e.g., distance between vectors<threshold (T)) may be selected.

Figure 15:
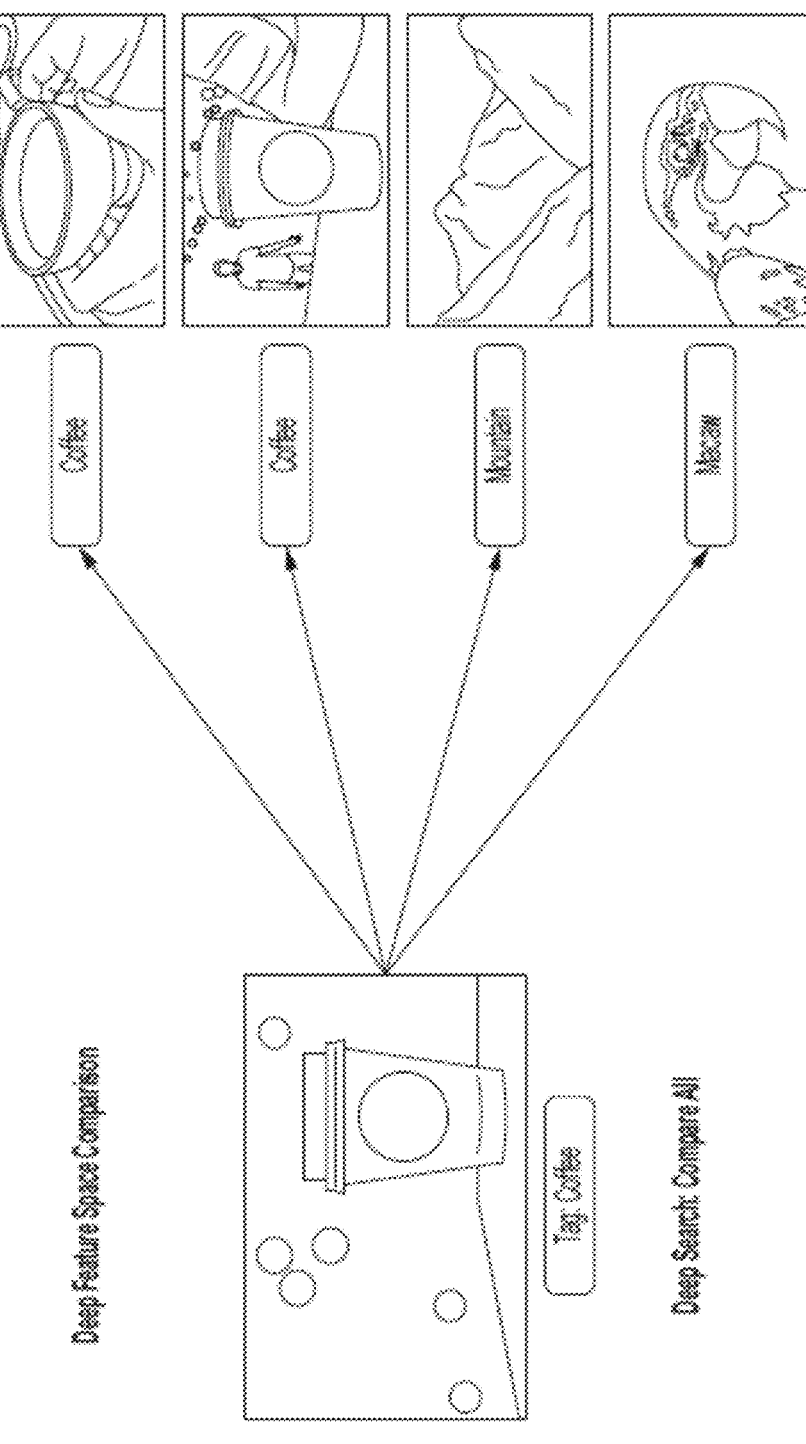
FIG. 15 is a diagram illustrating a deep feature space vector comparison, in accordance with certain embodiments of the present disclosure.

In some embodiments, the vector comparison in step 1208 may be a "deep feature space" comparison, illustrated in FIG. 15. In these embodiments, the feature vector generated in step 1206 may be compared without respect to any tags or other metadata. In other words, in a deep feature com- parison, the feature vector generated in step 1206 may be compared to every other feature stored in the vector space 430. While a deep feature comparison may be guaranteed to find the closest vectors in the vector space 430, this sort of comparison may require additional processing resources and/or additional time to return the vector results. This is especially true for large vector spaces, which may include thousands or event millions of features vectors, each of which representing a separate content object/resource stored in a repository 440. For instance, to compute the Euclidean distance between two image feature vectors of size 1×4096 requires approximately 10,000 addition and multiplication instructions to be performed by the system 400. Thus, if there are 10,000 images in the repository, 10,000,000 opera- tions must be performed.

Figure 16:
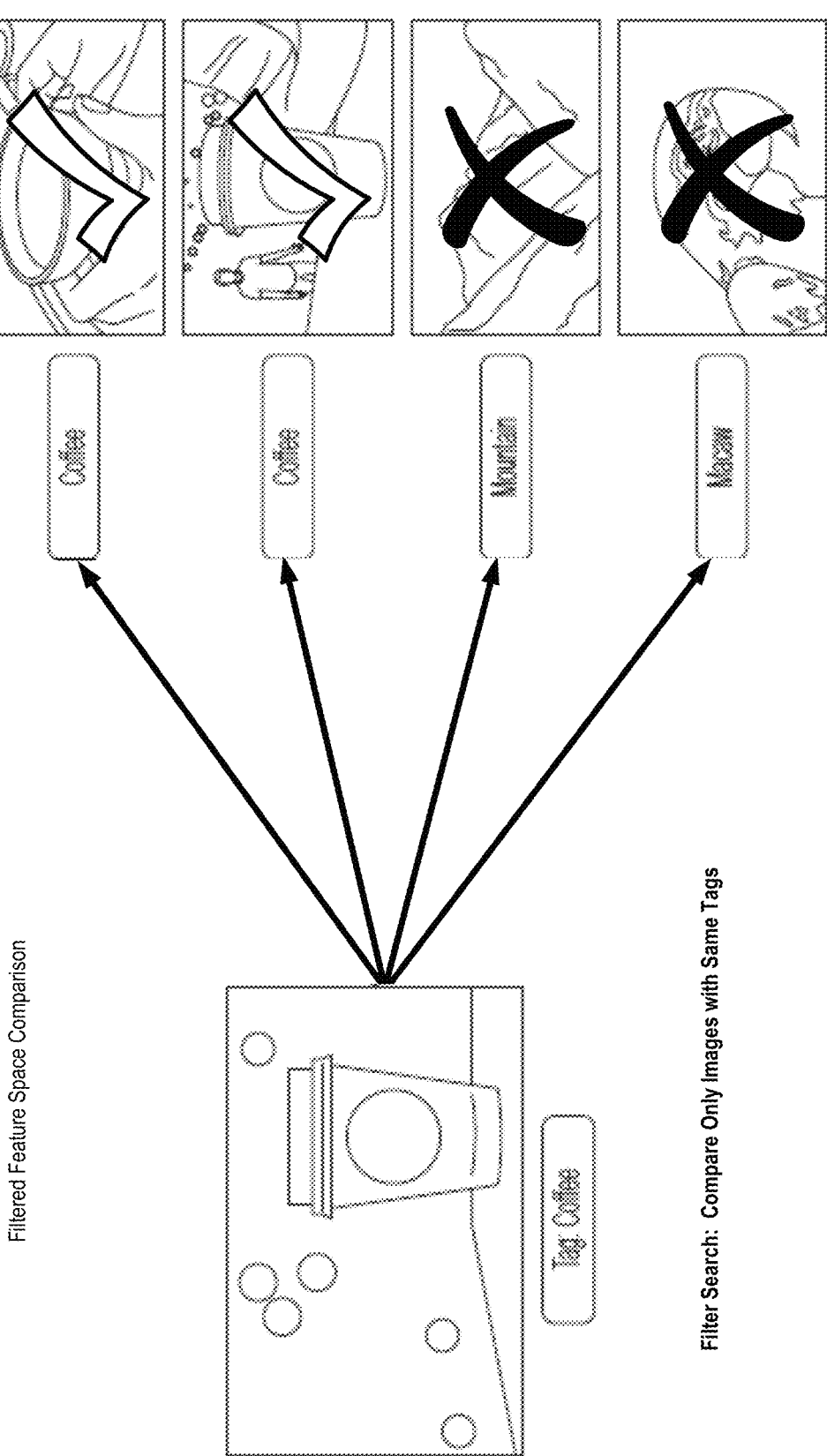
FIG. 16 is a diagram illustrating a filtered feature space vector comparison, in accordance with certain embodiments of the present disclosure.
Figure 17:
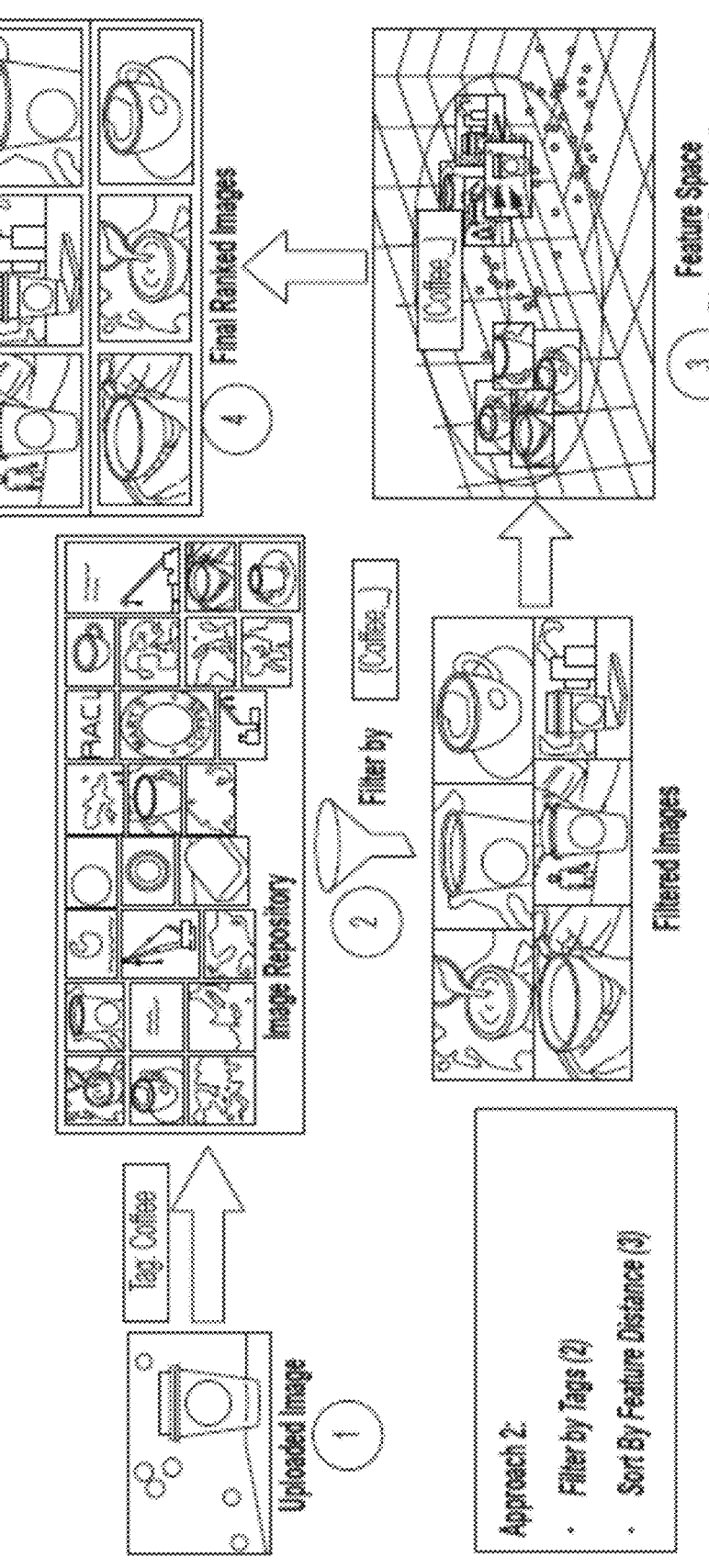
FIG. 17 is a diagram illustrating a filtered feature space vector comparison, in accordance with certain embodiments of the present disclosure.

Accordingly, in other embodiments, the vector compari- son in step 1208 may be a "filtered feature space" compari- son, illustrated in FIGS. 16-17. In filtered feature space comparisons, the vector space may first be filtered based on tags (and/or other properties, such as resource media type, creation date, etc.), to identify subset of the feature vectors within the vector space(s) 430 having tags (and/or other properties) that match those of the feature vector generated in step 1206. Then, the feature vector generated in step 1206 may be compared to only those feature vectors in the subset having matching tags/properties. Accordingly, a filtered fea- ture space comparison may be executed faster and more efficiently than a deep space comparison, although the possibility exists of missing close feature vectors that are filtered out and not compared.

Figure 18:
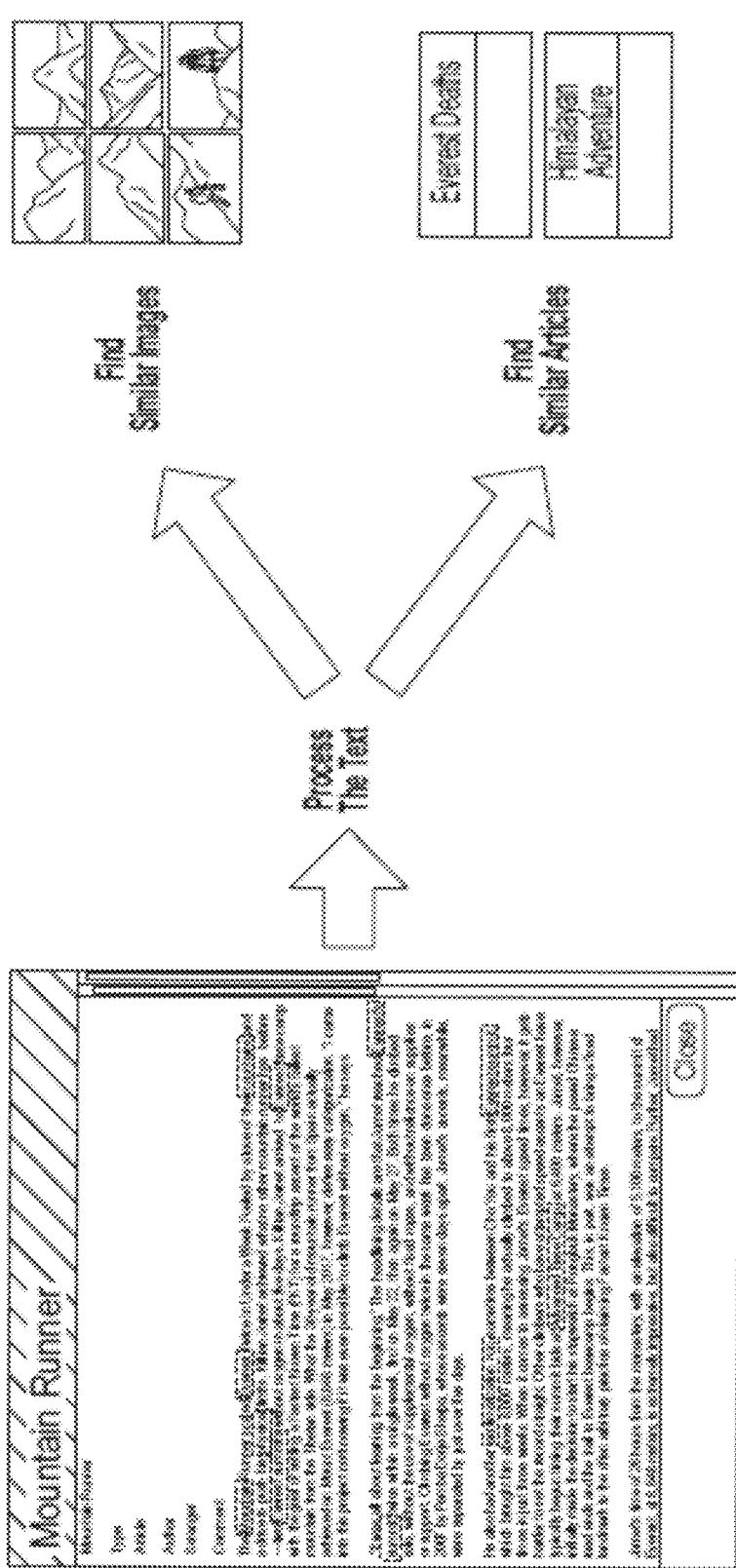
FIG. 18 is a diagram representing a process of receiving and processing text input to identify related images or articles, in accordance with certain embodiments of the present disclosure.

As noted above, step 1208 may include a comparison of the feature vector generated in step 1206 to a single vector space, or to multiple vector spaces. In some embodiments, the feature vector generated in step 1206 may be compared to the corresponding type of vector space. For instance, when text input is received in step 1202, the resulting feature vector may be compared to the vectors within the topic vector space 430a, and when an image is received as input in step 1202, the resulting feature vector may be compared to the vectors within the image vector space 430b, and so on. In some embodiments, it may be possible to compare feature vectors corresponding to one type of input, to vector spaces contain different types of vectors (e.g., identifying the image resources most closely related to a text-based input, or vice versa). For instance, FIG. 18 represents a process of receiv- ing text input in step 1402, and in step 1408 retrieving both similar images (e.g., the closest-to from an image vector space 430b) and similar articles (e.g., the closest-to from a topic vector space 430b).

Figure 19:
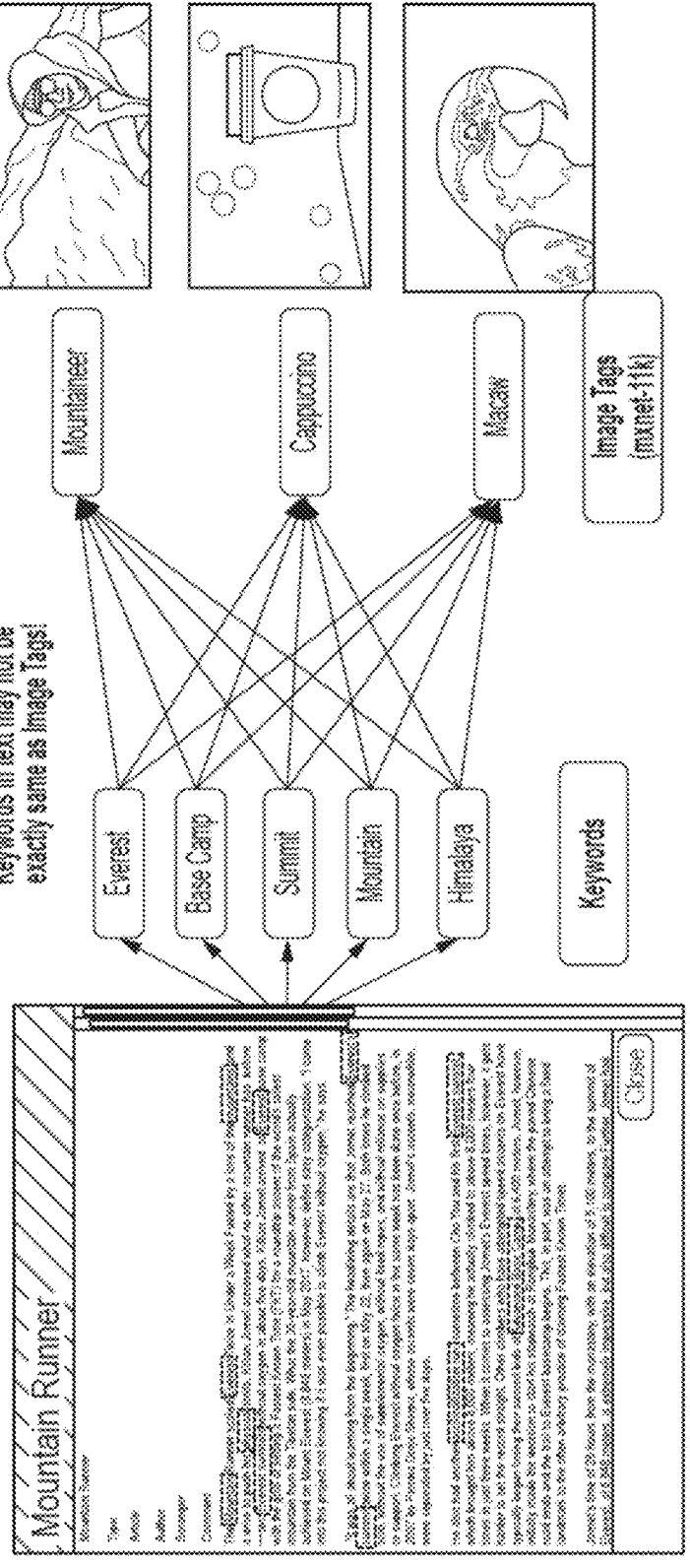
FIG. 19 is an example diagram illustrating a comparison of extracted keywords to image tags, in accordance with certain embodiments of the present disclosure.
Figure 20:
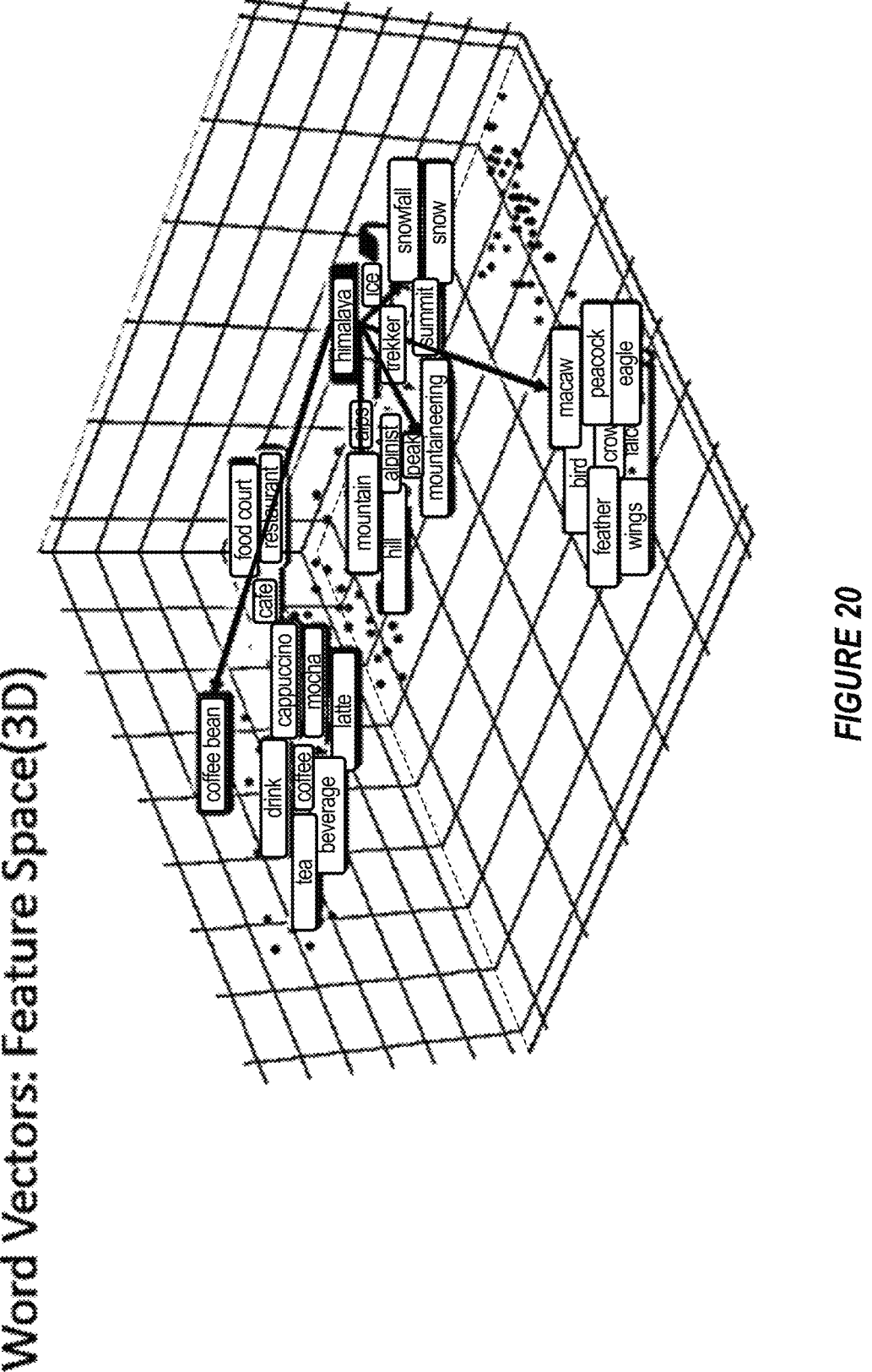
FIG. 20 is an example of a keyword analysis within a 3D word vector space, in accordance with certain embodiments of the present disclosure.
Figure 21:
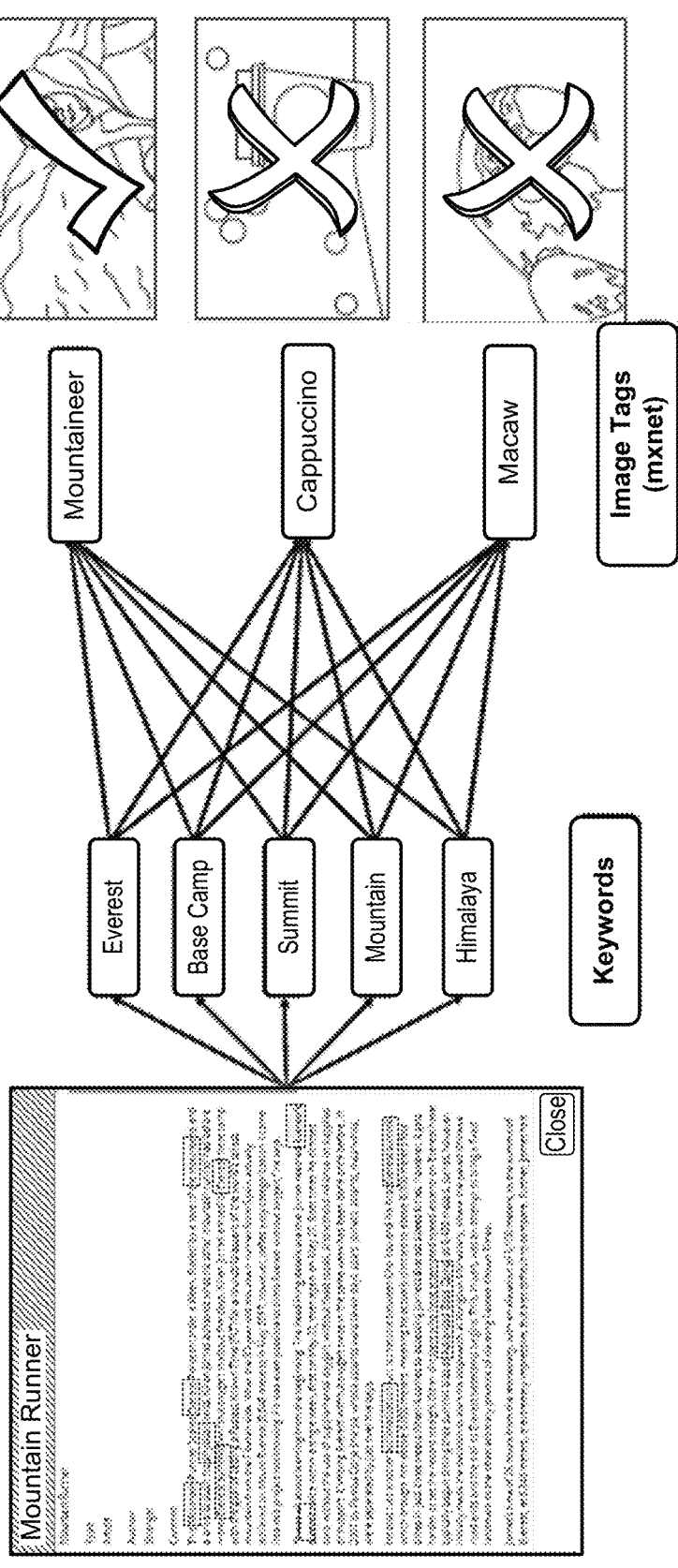
FIG. 21 is a diagram illustrating a keyword-to-tag vector space analysis, in accordance with certain embodiments of the present disclosure.

For embodiments that involve retrieving and/or compar- ing tags associated with content resources, a problem may arise when the tags of one resource are related but do not exactly match the corresponding tags/keywords/characteris- tics of another resource. An example of this potential prob- lem is illustrated in FIG. 19, where the keywords extracted from an original authored text content resource are com- pared to a set of image tags stored for a set of image content resources. In this example, none of the extracted keywords ("Everest," "Base Camp," "Summit," "Mountain," or "Himalaya") are exact matches for the image tags ("Moun- taineer," "Cappuccino," or "Macaw"). In some embodi- ments, word/phrase parsing and processing techniques such as word stemming, word definition and/or synonym retrieval and analysis, etc., may be used to detect matches among related but non-matching terms. However, these techniques also may fail, even for related keywords/tags. Therefore, in some embodiments, the content processing/analysis component 420 and/or content recommendation engine 425 may perform a word vector comparison to address this problem. As illustrated in the example shown of FIG. 20, the keywords extracted from the text document in FIG. 19 may be analyzed within a 3D word vector space, and the distance between those keywords and each of the image tags may be computed. As shown in FIG. 21, the keyword-to-tag vector space analysis performed in FIG. 20 may determine that the image tag "Mountaineer" sufficiently close within the word vector space to the extracted keywords, and thus should be considered as an image tag match for the filtered feature space comparison.

Figure 22:
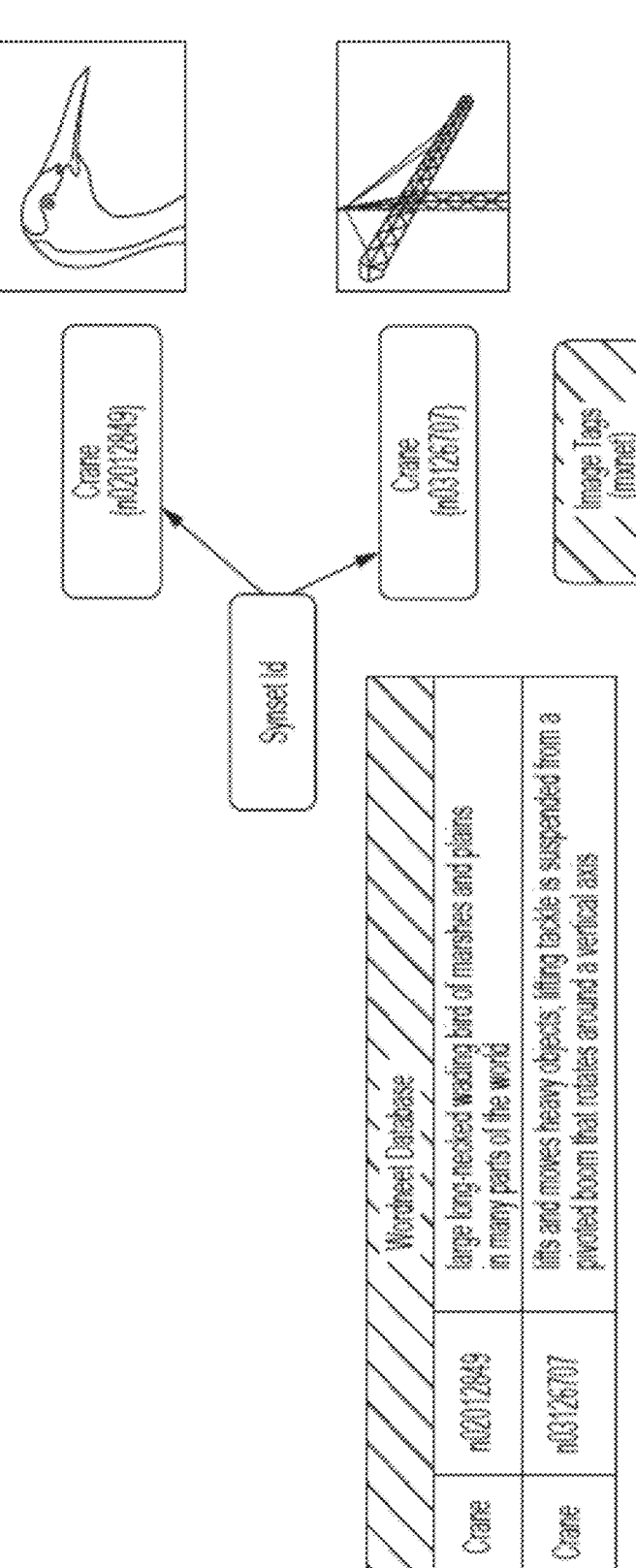
FIG. 22 is a diagram illustrating an example of homonym image tags, in accordance with certain embodiments of the present disclosure.

Another potential problem that may arise in embodiments of retrieving and/or comparing tags associated with content resources, is caused by homographic keywords and/or resource tags. A homographic word or phrase (or homonym) is one that has different and non-related meaning with the same spelling. An example of homonym image tags is shown in FIG. 22, where a first image is tagged with the word "Crane," meaning the long-legged and long-necked bird, and a second image tagged with the same word "Crane," meaning the machine with a projecting arm used for moving heavy objects. In this case, the content processing/analysis component 420 and/or the content recommendation engine 425 may perform a word sense disambiguation process on the two image tags, to determine which sense of the word crane each refers to. In this example, the word sense disambiguation process may initially retrieve a Wordnet database entry (or other definition data) associated with the each tag, as shown in FIG. 22 for the two different "Crane" tags.

Figure 23:
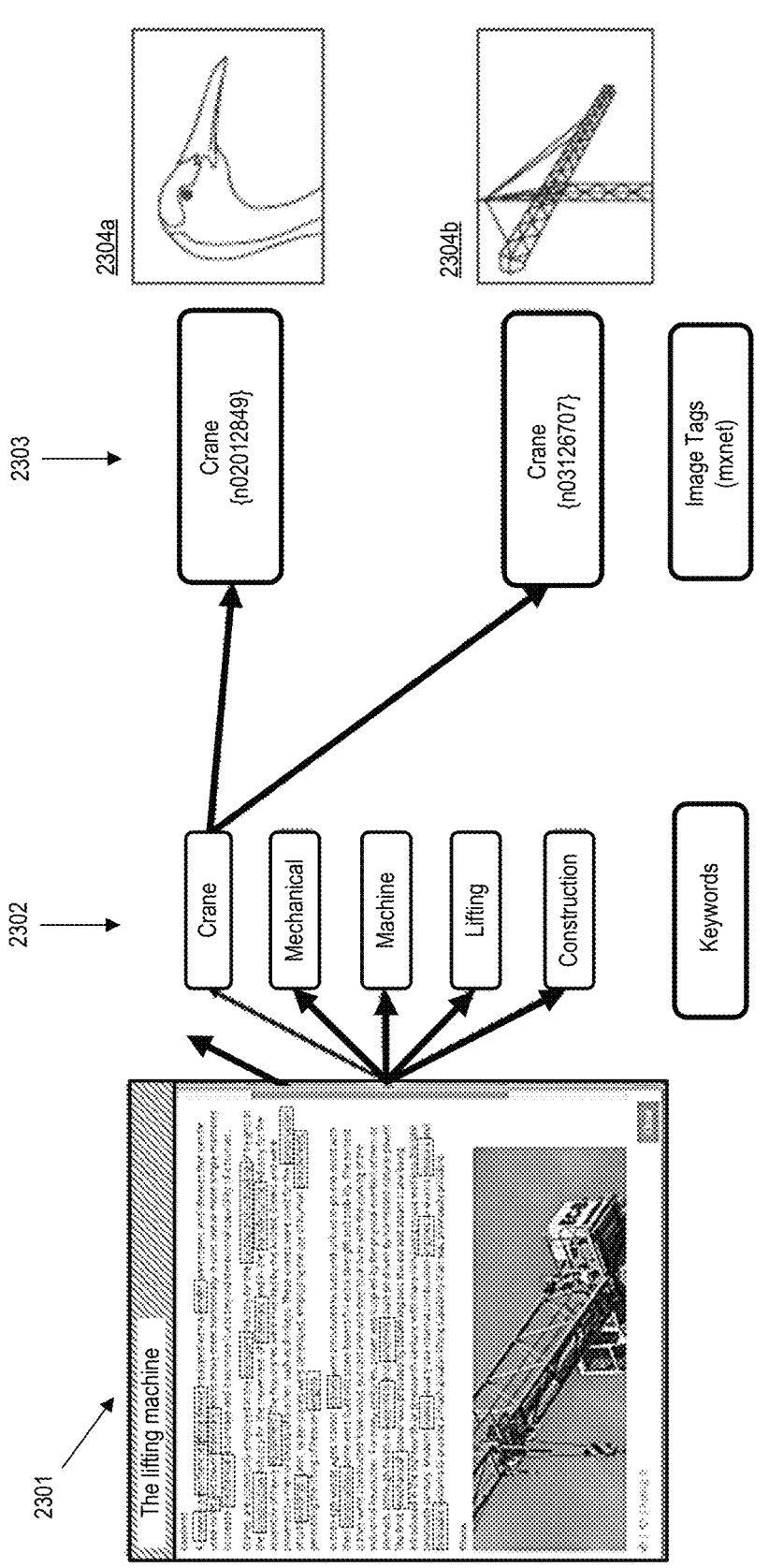
FIG. 23 is a diagram illustrating an example disambiguation process, in accordance with certain embodiments of the present disclosure.
Figure 24:
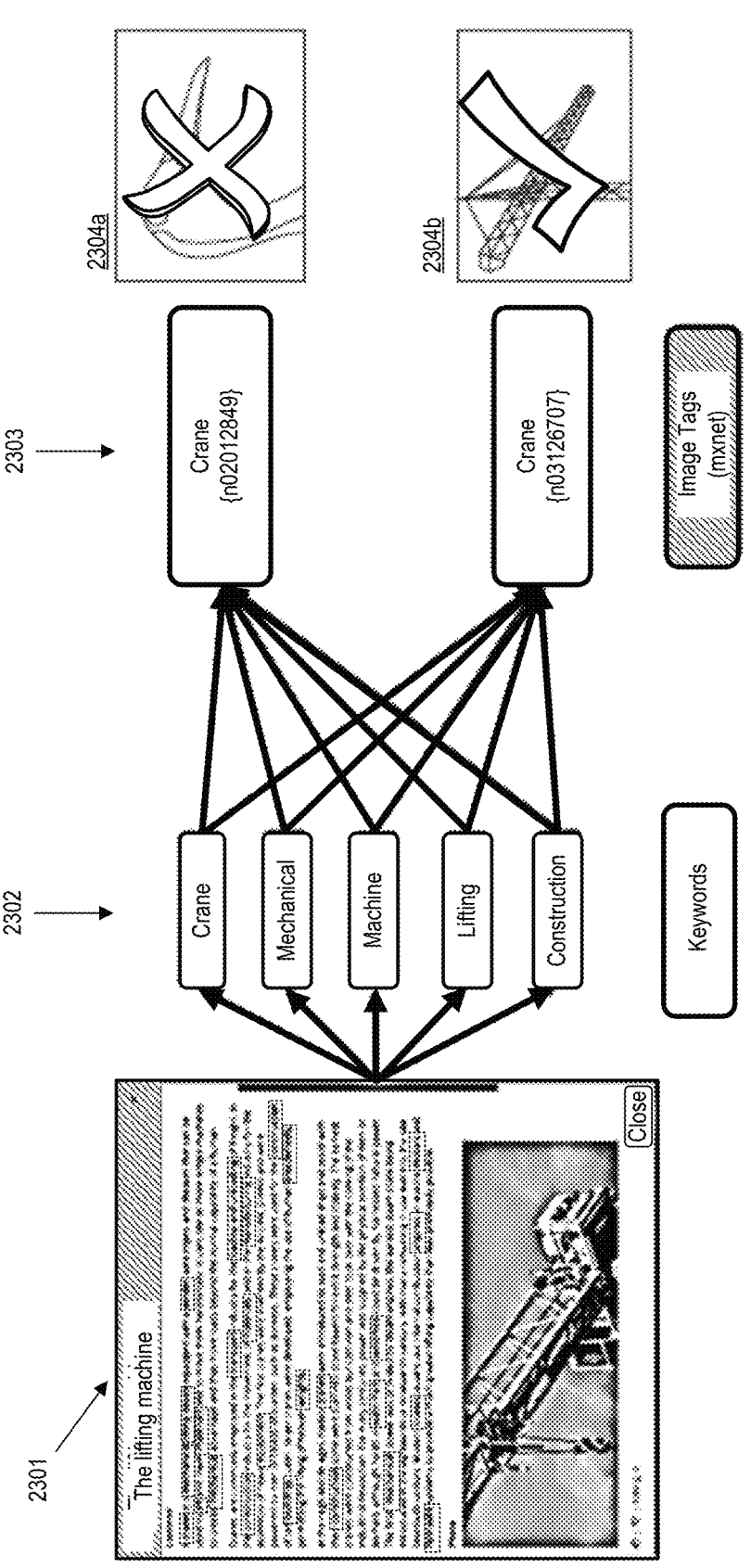
FIG. 24 is a diagram illustrating an example disambiguation process, in accordance with certain embodiments of the present disclosure.

An illustrative word sense disambiguation process is shown in FIGS. 23-24. In this process, other keywords within the authored document may be used, and/or the specific context of the word "Crane" within the document (e.g., description, part of speech, tense, etc.), by the content processing/analysis component 420 and/or the content recommendation engine 425 to determine the most likely meaning of the word crane within the authored text document, and thus which of the "Crane" image tags is related to the authored text document. For example, referring now to FIG. 23, an input text 2301 is shown, from which a number of relevant keywords 2302 have been extracted. The first extracted keyword ("Crane") may be compared to the image tags within the content repository 440, and in this example two matching tags 2303 have been identified corresponding to two "Crane" tagged images 2304a and 2304b within the content repository 440.

As shown in FIG. 24, to address this potential problem of word sense ambiguity, the disambiguation process may continue by comparing one or more additional keywords 2302 extracted from the input content 2301, to the other content tags of the two matching images 2304a and 2304b. In this example, the additional extracted keywords of "mechanical," "machine," "lifting," and "construction" may be compared to the content tags and/or extracted features associated with each of the images 2304a and 2304b. As shown in FIG. 24, these additional comparisons may disambiguate the initial keyword match of "Crane," so that avian crane image 2304a is not returned by the content recommendation system 425, but the construction crane image 2304b is returned.

In other examples, a similar disambiguation process may be performed using image similarity. For instance, the content processing/analysis component 420 and/or the content recommendation engine 425 may identify common image features between the images associated with the authored content (e.g., drawn or authored images) and the two different "Crane" images, in order to determine which crane is the appropriate related image. These disambiguation processes also may be combined in various ways, for example, comparing keywords extracted from the authored text document to the visual features extracted from the images, etc. Therefore, in an authored text document referring to a crane, the related words "boom" and "pulley" might be matched visually to the lower crane image if a boom and pulley can be visually identified within that image. Similarly, if the authored text document refers to a crane and includes the related words "beak" and "feathers," then the "crane" keyword might be matched visually to the upper crane image if a beak and feathers can be visually identified within that image.

Figure 26:
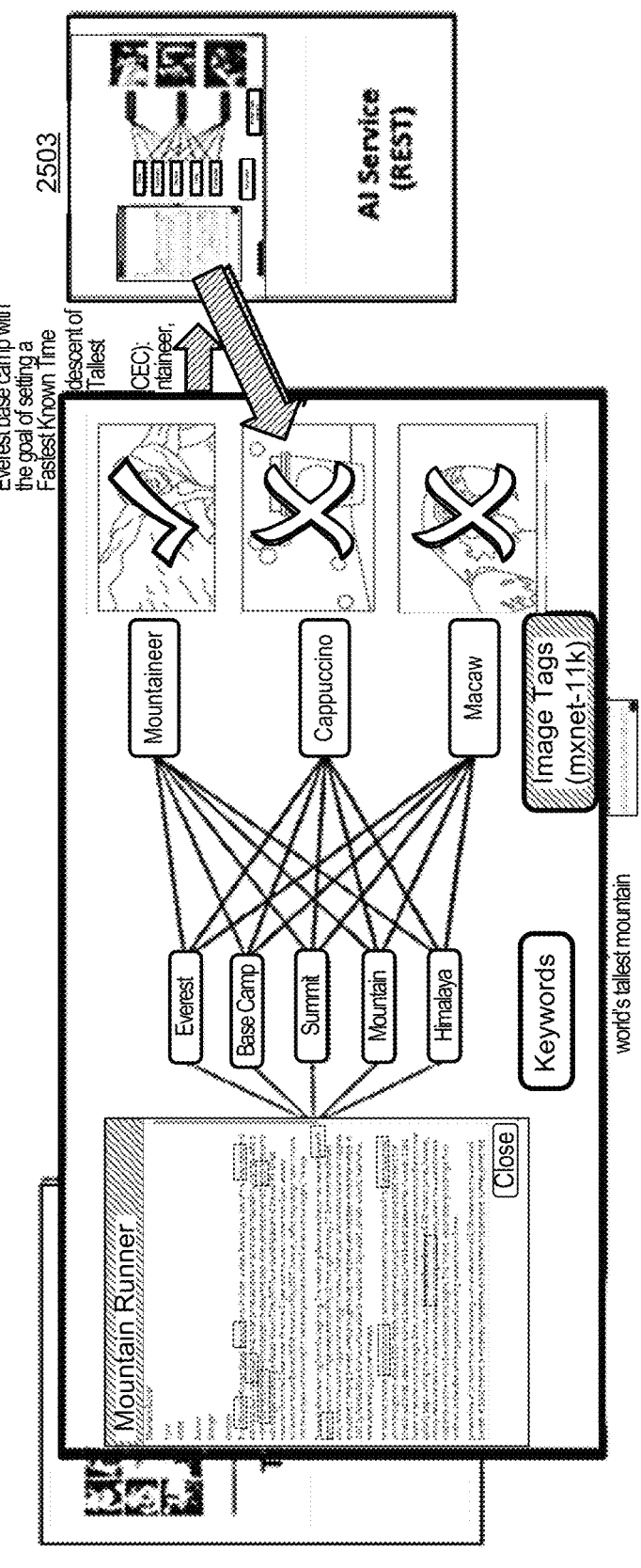
FIG. 26 is a diagram illustrating a process of comparing feature vectors and identifying related content within a content repository, in accordance with certain embodiments of the present disclosure.
Figure 27:
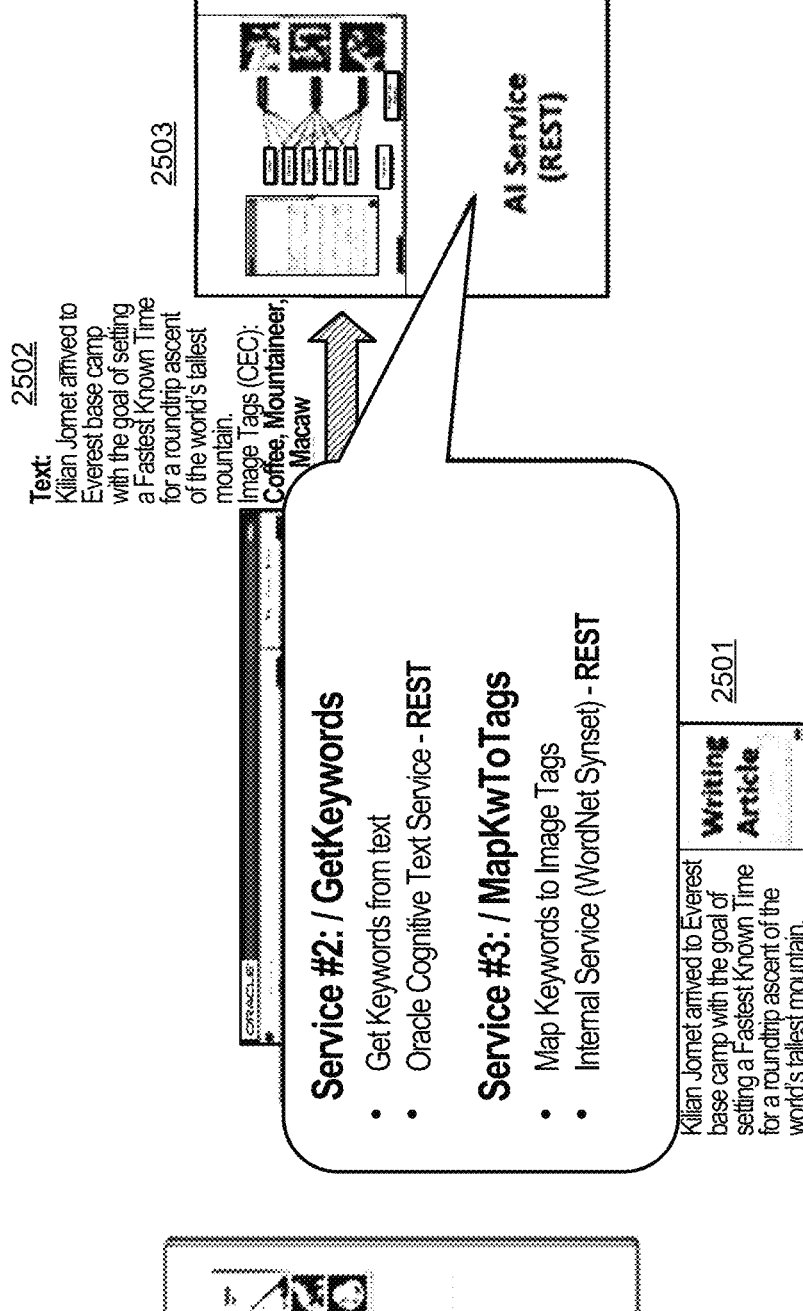
FIG. 27 is a diagram illustrating a process of comparing feature vectors and identifying related content within a content repository, in accordance with certain embodiments of the present disclosure.
Figure 28:
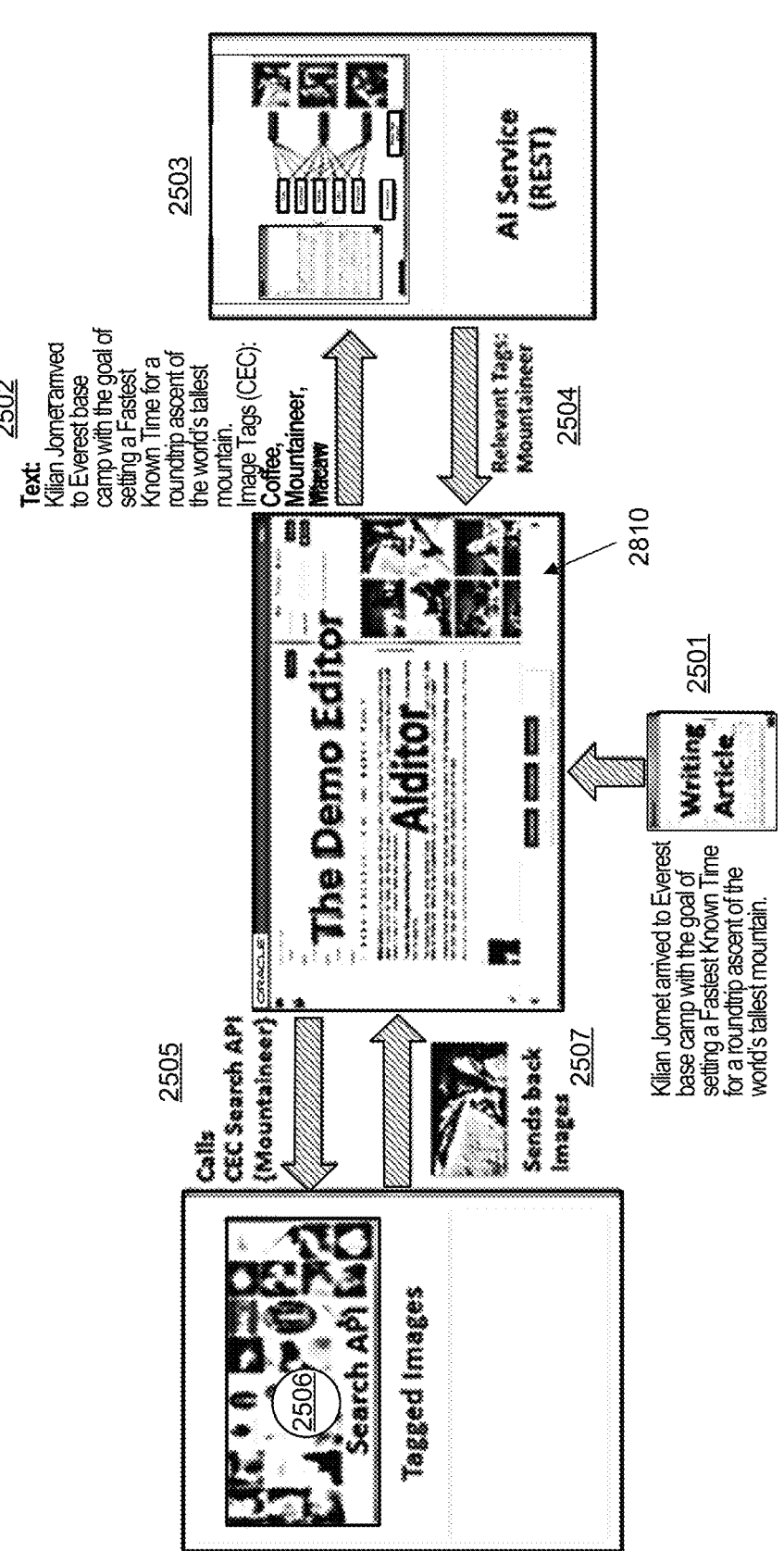
FIG. 28 is a diagram illustrating a process of comparing feature vectors and identifying related content within a content repository, in accordance with certain embodiments of the present disclosure.

Referring now to FIGS. 25-28, an end-to-end example is shown of performing the process in FIG. 12, specifically for the embodiment retrieving a set of relevant images for an article authored by a user via the user interface 415. Initially, at 2501 (FIG. 25), a user types the text for an article into the Demo Editor (Alditor) user interface. At 2502, a number of keywords are extracted from the text of the article, and at 2503 the extracted keywords are compared by an AI Rest Service to the image tags stored for a library of images within an image content repository 440. FIGS. 26 and 27 illustrate the same example process of FIG. 25, but with additional details regarding the operation of the AI Rest Service. As shown in FIG. 26, using the techniques discussed above, an AI Rest Service identifies one or more tags (e.g., "mountaineer" as being related to the authored article. Then, as shown in FIG. 27, in some embodiments a combination of different software services may be used to perform this step, such as first cognitive text REST service used to determine a set of keywords from the text input, and a second internal REST service used to map the keywords to image tags. Each of these services may be implemented within the content recommendation engine 425 and/or via an external service provider. Then, in step 2505 (shown in FIG. 28), the content recommendation engine 425 may transmit the determined image tag(s) to a search API associated with an image content repository 440. In some cases, the search API may be implemented within a cloud-based content hub, for instance an Oracle Content Management (OCM). In step 2506, the Search API may retrieve a set of relevant images based on the tag matching, and in step 2507 the retrieved images (or scaled-down versions of the images) may be transmitted back and embedded within the user interface at 415 (at screen region 2810).

Although the example shown in FIGS. 25-28 illustrates a specific embodiment of retrieving a set of relevant images for an article authored by a user, it should be understood that the steps in FIG. 12 may be similarly executed to retrieve other types of content as well. For instance, similar steps may be performed to retrieve articles (or other text documents) related to the text input by the user via the user interface 415. Related content resources of other media types (e.g., audio files, video clips, graphics, social media posts, etc.) also may be retrieved in other embodiments. Additionally, when the user imports/creates other types of input besides text into the user interface (e.g., a drawn or uploaded image, a spoken audio input, a video input, etc.), similar steps may be executed to retrieve related content resources of various different types (e.g., related articles, images, video, audio, social media, etc.), depending on the configuration of the content recommendation engine 425 and/or the user preferences.

Figure 29:
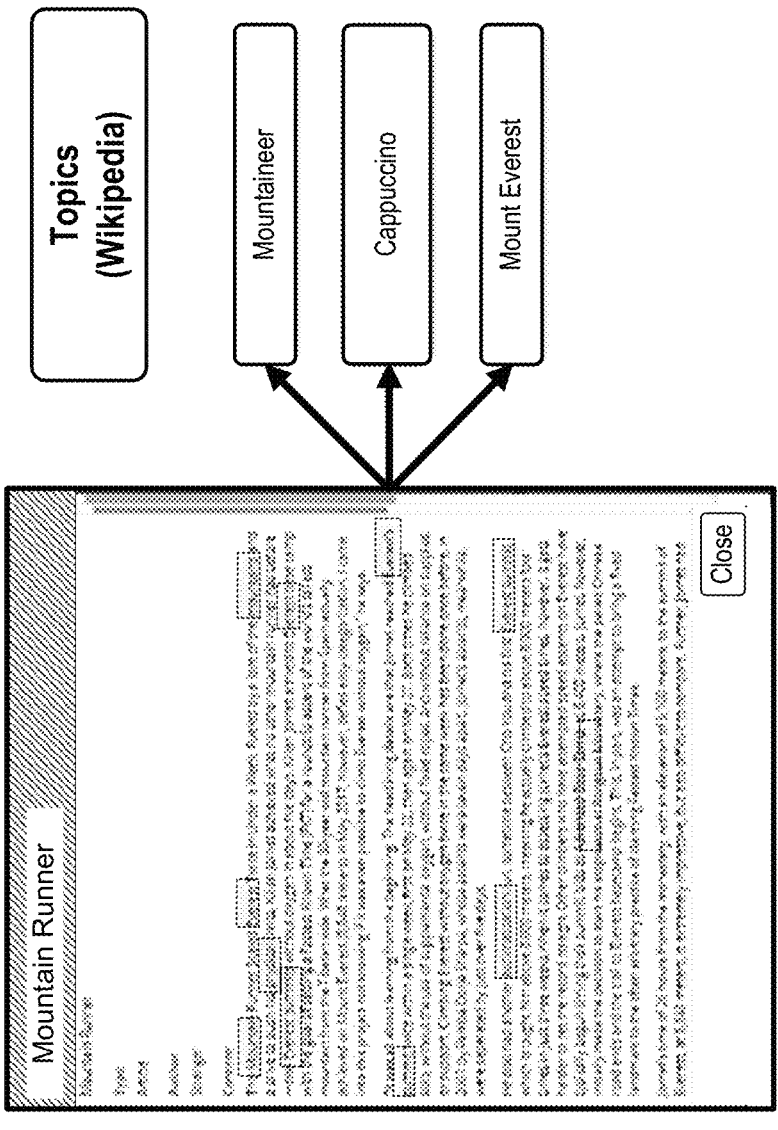
FIG. 29 is an example diagram of a text document illustrating a topic extraction process, in accordance with certain embodiments of the present disclosure.
Figure 30:
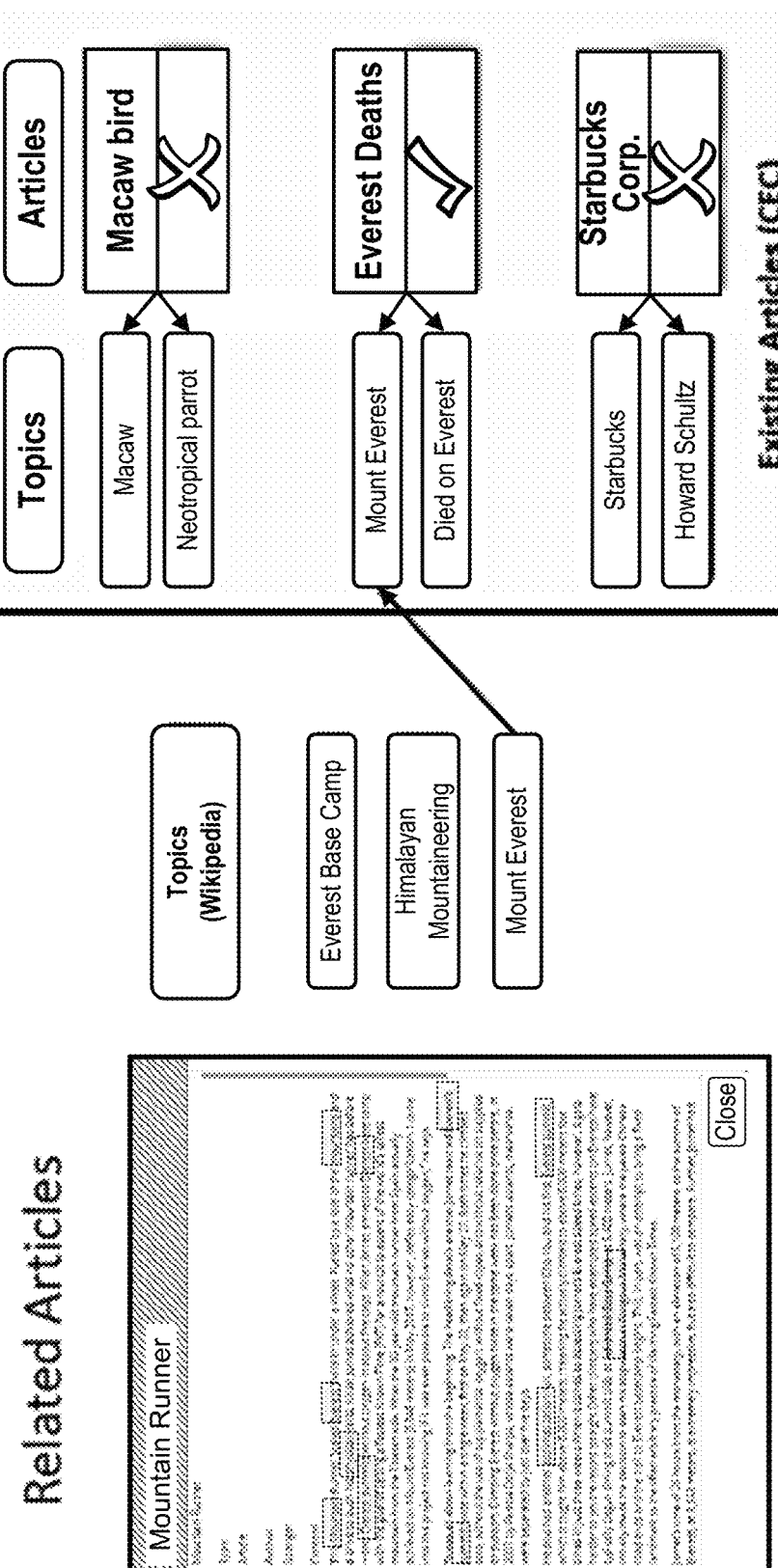
FIG. 30 is an example diagram of a text document illustrating a topic extraction process, in accordance with certain embodiments of the present disclosure.
Figure 31:
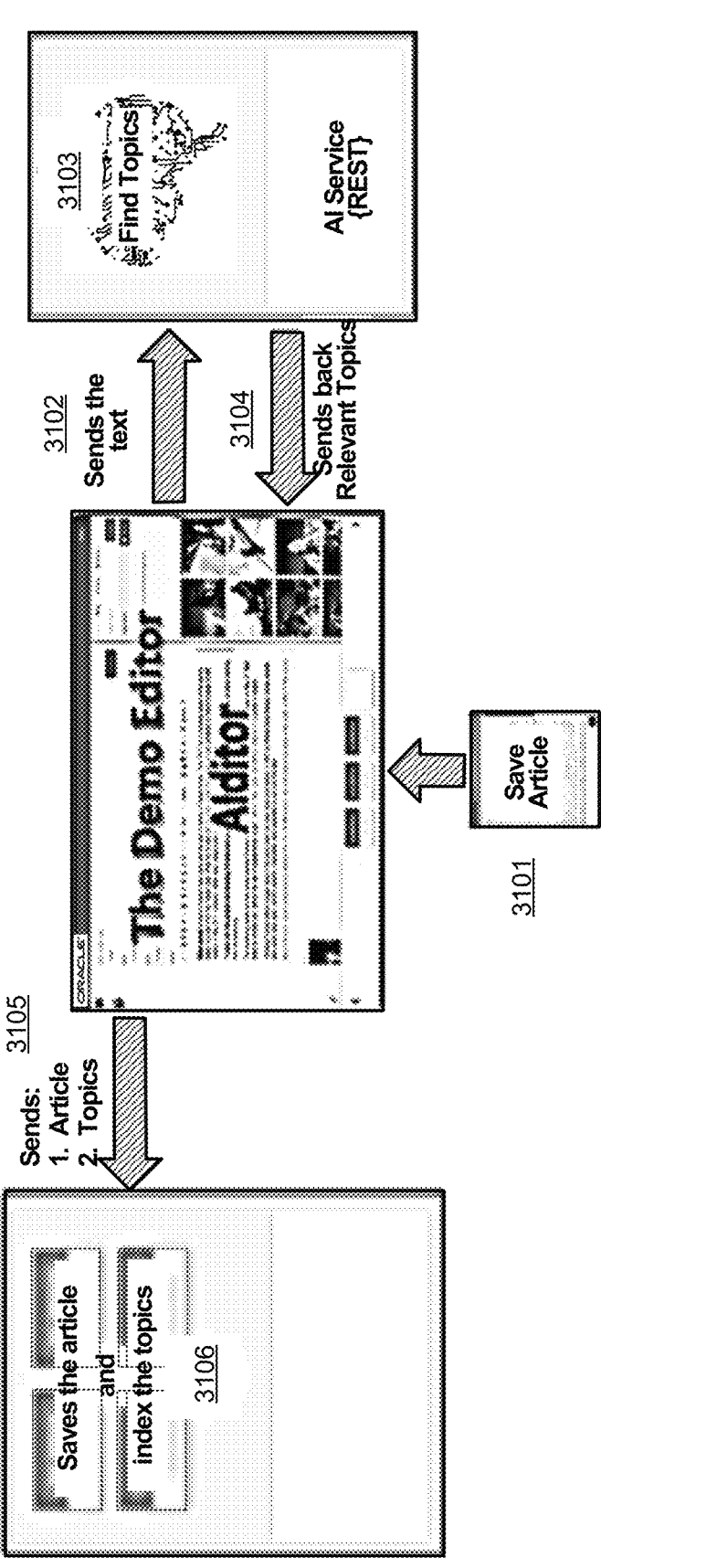
FIG. 31 is a diagram illustrating a process of identifying related articles based on input text data, in accordance with certain embodiments of the present disclosure.
Figure 32:
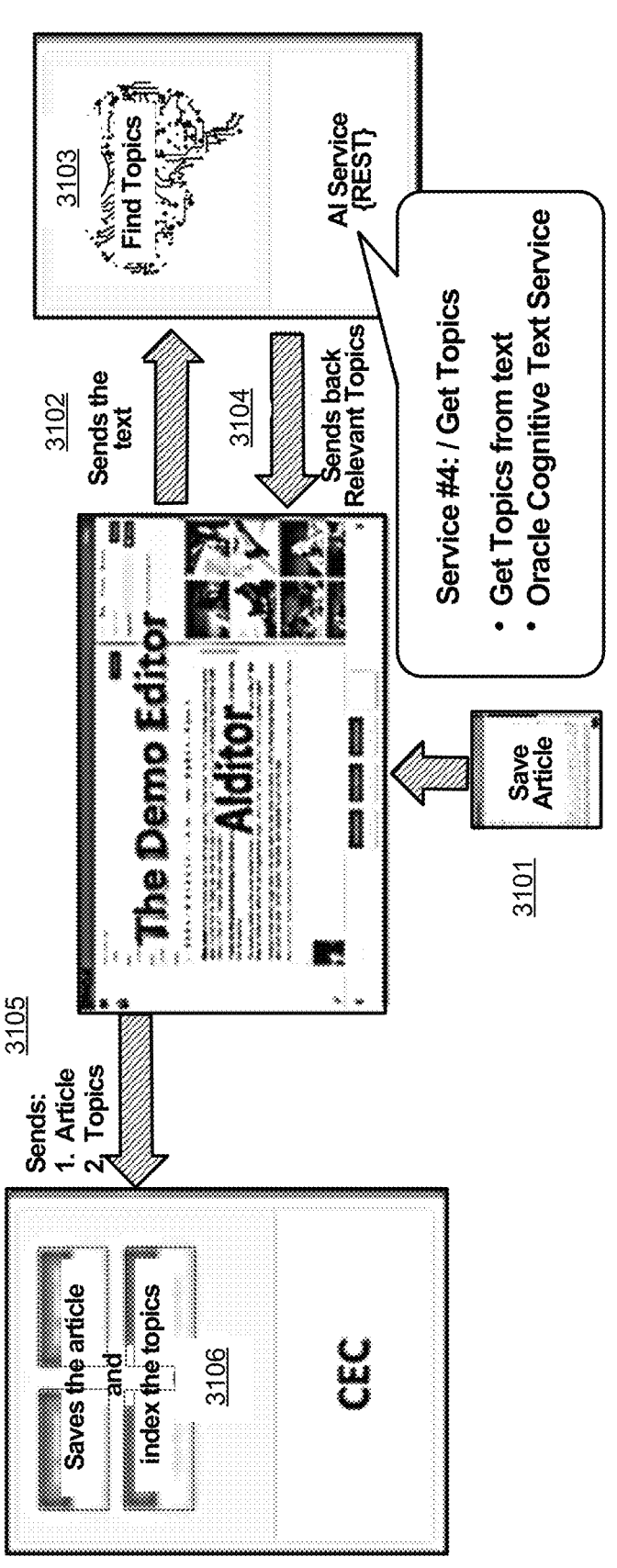
FIG. 32 is a diagram illustrating a process of identifying related articles based on input text data, in accordance with certain embodiments of the present disclosure.
Figure 33:
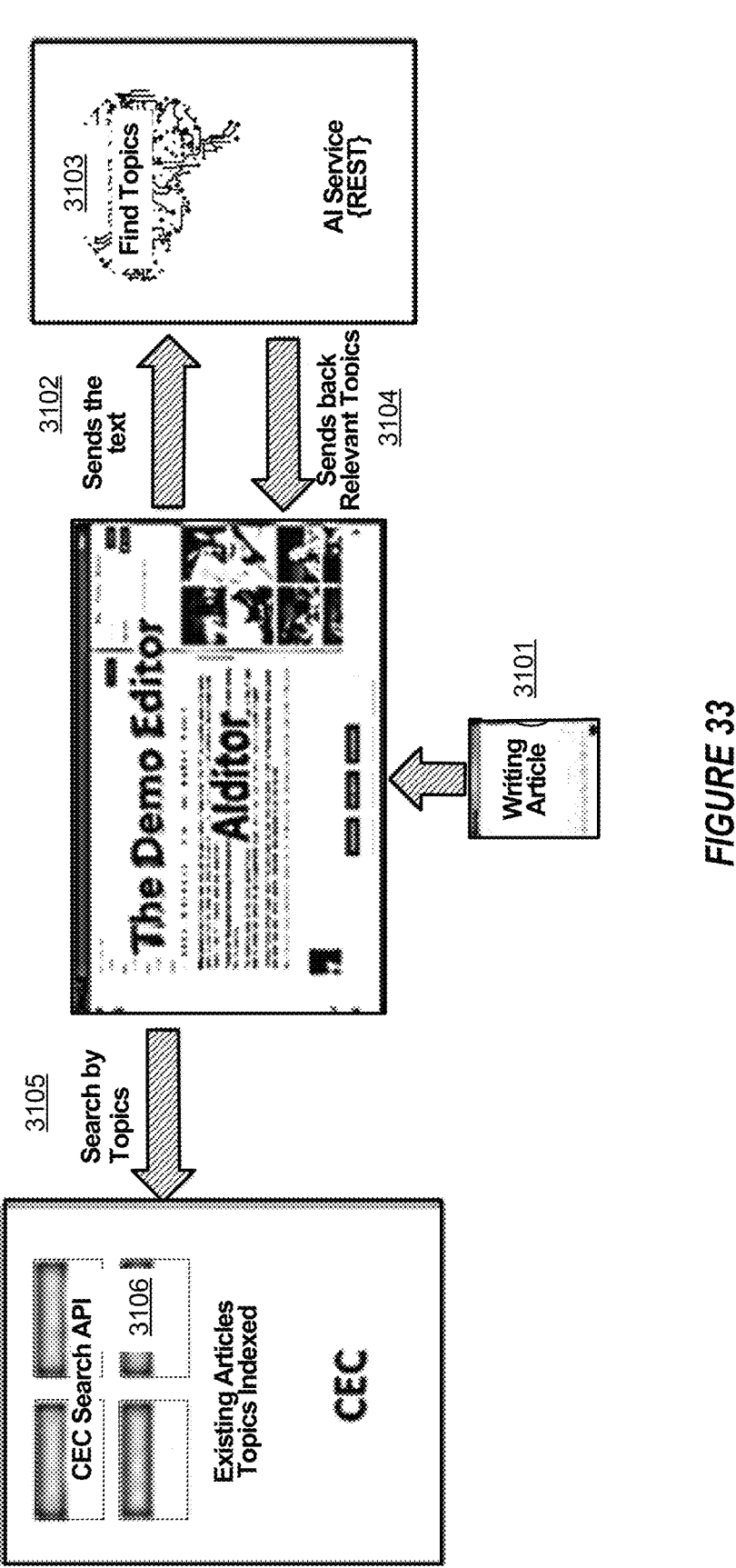
FIG. 33 is a diagram illustrating a process of identifying related articles based on input text data, in accordance with certain embodiments of the present disclosure.
Figure 34:
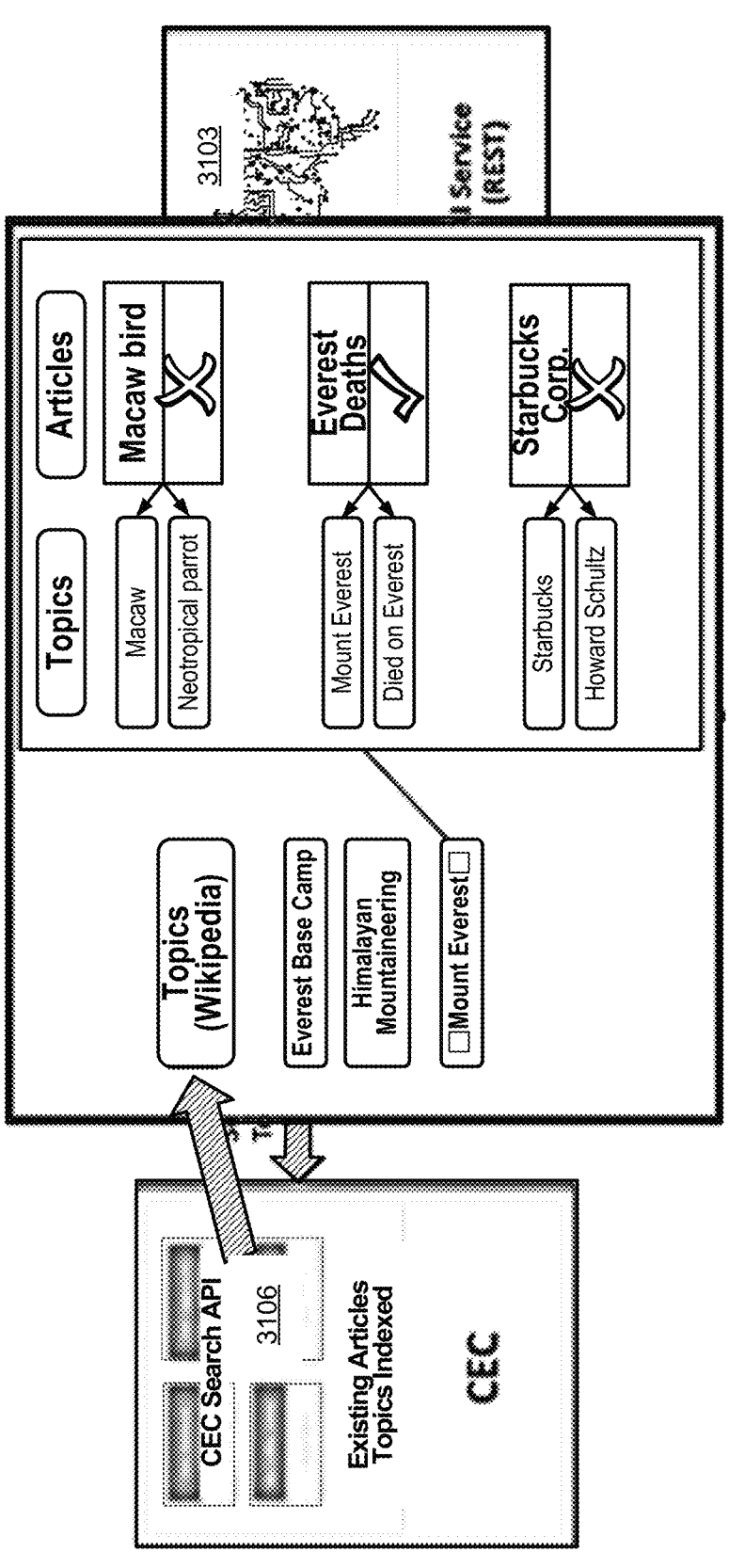
FIG. 34 is a diagram illustrating a process of identifying related articles based on input text data, in accordance with certain embodiments of the present disclosure.
Figure 35:
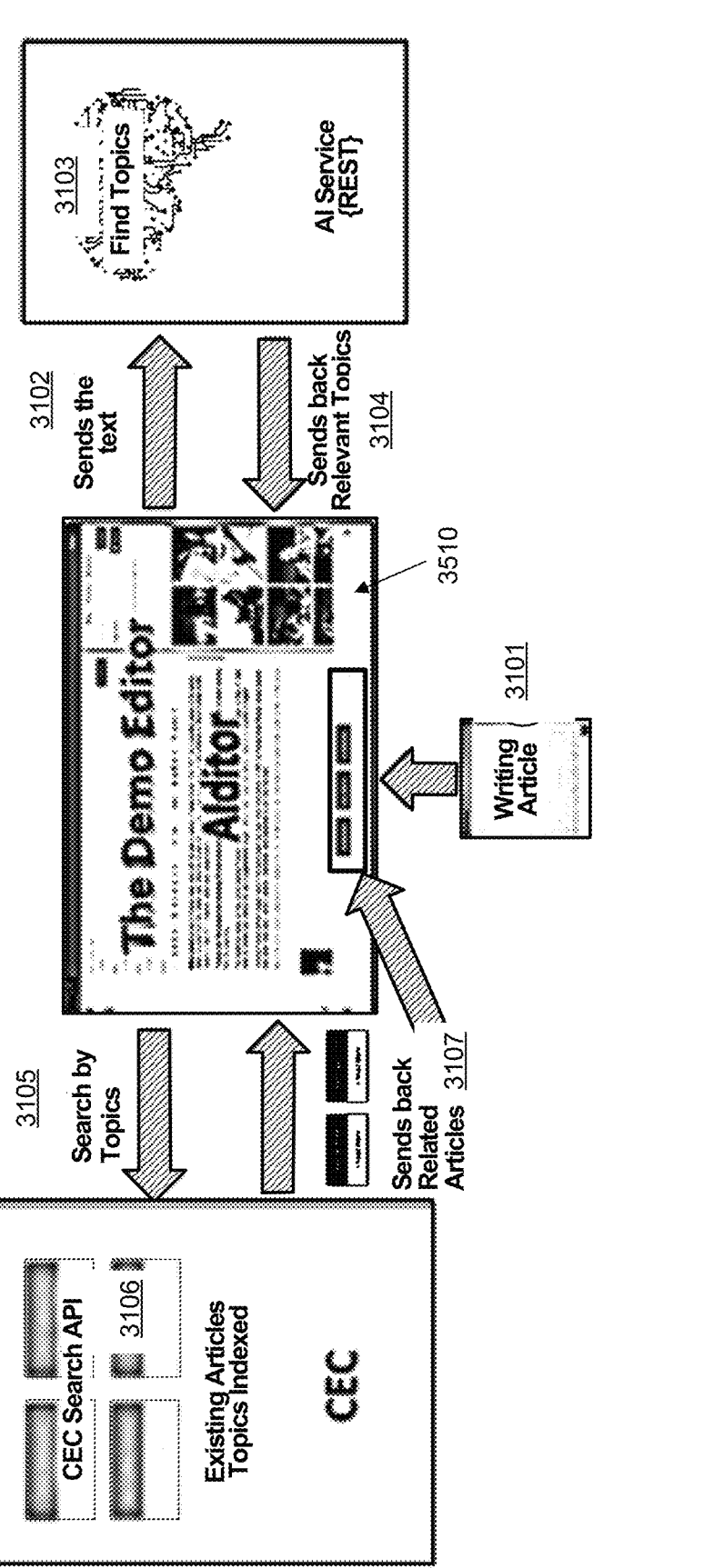
FIG. 35 is a diagram illustrating a process of identifying related articles based on input text data, in accordance with certain embodiments of the present disclosure.

For instance, referring now to FIGS. 29-35, another example embodiment is shown in which the process steps of FIG. 12 are performed to retrieve a set of related articles (or other text content resources), based on the original authored text input received via the user interface 415 (e.g., a user's blog post, email, article, etc.). As shown in FIG. 29, a user has authored a new article via the user interface 415, and a set of article topics has been identified by an AI-based REST service invoked by the content recommendation engine 425. As shown in FIG. 30, the identified article topics may be compared to the topics previously-identified for a set of articles in an article content repository 440. In these examples, FIG. 29 shown according to one embodiment, while FIG. 30 shows another embodiment. FIG. 29 is just a subset of FIG. 30, we can safely remove FIG. 29 from the diagrams. Thus, the article topics may be determined and stored as metadata or other associated data objects, using similar techniques to the processes described above in FIG. 6), in which image features/tags were determined and stored associated with images. Similarly, an article content repository 440 may have metadata or other associated storage including article topics, dates, keywords, authors, publications, etc., for each article stored in the repository 440. In the example shown in FIG. 30, an article relating to deaths on Mount Everest has been identified as potentially related to the user's newly-created article, based on matching of the article topics. FIGS. 31-35 illustrate an end-to-end process of using system 400 to find related articles to a user input article, similar to the steps shown in FIG. 25-28 for finding related images. In step 3101 (FIG. 31), a user creates a new article via the user interface 415. In step 3102, the article text is transmitted to one or software services by the content recommendation engine 425 (e.g., AI-based REST services), and in step 3103 (FIG. 32) the software service(s) use cognitive text service functionality to analyze the text of the article to determine one or more topics of the article. In step 3104, the determined article topics are transmitted back to the content recommendation engine 425, and in step 3105 the recommendation engine 425 sends both the article text and the identified topics to a separate API (e.g., within a cloud-based content hub), where in step 3106, the article may be saved to a repository 440 for future reference and indexed based on the identified topics. Also in step 3106 (FIG. 33), the existing repository 440 of articles may be searched via a search API to identify potentially related topics based on a topic matching process (FIG. 34). Finally, in step 3107 (FIG. 35), the articles identified as being potentially related to the newly-created article may be transmitted back (in whole, or just links) to be embedded within the user interface 415 (e.g., at user interface region 3510).

As illustrated in the above example of FIGS. 29-33, certain embodiments described herein may include identification of topics of newly-created text documents, and/or topics of text documents stored within content repositories 440, as well as comparisons and identifications of topic closeness and matches. In various embodiments described herein, various techniques including explicit semantic analyses may be used for text topic evaluation and topic "closeness" techniques. As shown in FIGS. 29-30, in some cases, such techniques may use a large-scale data source (e.g., Wikipedia), to provide fine-grained semantic representation of unrestricted natural language texts, to represent meaning in a high-dimensional space of natural concepts derived from the data sources. For instance, text classification techniques may be used to explicitly represent the meaning of any text in terms of Wikipedia-based concepts. The semantic representation may be the feature vector of the text snippet, that is converted through topic modeling. Wikipedia (or another large-scale data source) may be used to include a larger vocabulary (e.g., bag of words) to the system, to cover a large universe of words. Wikipedia-based concepts may be the titles of the Wikipedia pages which are used as the classes/categories while classifying a given text snippet. Given a text snippet, the nearest Wikipedia page title may be returned (e.g., "Mount Everest," "Stephen Hawking," "Car Accident," etc.), which may be used as the class/category of the text. The effectiveness such techniques may be evaluated automatically by computing the degree of semantic relatedness between fragments of natural language text.

In these text classification/relatedness evaluation techniques, one advantage of using large-scale publically available knowledge sources (e.g., Wikipedia or other encyclopedias) is access to vast amounts of highly organized human knowledge pre-encoded into the publically available sources, which are in constant change/development. Machine learning techniques may be used based on Wikipedia and/or other sources to build a semantic interpreter that maps fragments of natural language text into a weighted sequence of Wikipedia concepts ordered by their relevance to the input. Input texts therefore may be represented as weighted vectors of concepts, called interpretation vectors. The meaning of a text fragment is thus interpreted in terms of its affinity with a host of Wikipedia concepts. Semantic relatedness of texts then may be computed by comparing their vectors in the space defined by the concepts, for example, using the cosine metric. Such a semantic analysis may be explicit in the sense the manifest concepts may be grounded in human cognition. Because, the user input may be received via the user interface 415 as plain text, conventional text classification algorithms may be used to rank the concepts represented by these articles according to their relevance to the given text fragment. Thus, an online encyclopedia (e.g., Wikipedia) may be used directly, without the need for deep language understanding or pre-cataloged common-sense knowledge. In some embodiments, each Wikipedia concept may be represented as an attribute vector of words that occur in the corresponding article. Entries of these vectors may be assigned weights using, for example, a term frequency-inverse document frequency (TFIDF) scheme. These weights may quantify the strength of association between words and concepts. To speed up semantic interpretation, an inverted index, which maps each word into a list of concepts in which it appears, may be used. The inverted index also may be used to discard insignificant associations between words and concepts, by removing those concepts whose weights for a given word are below a certain threshold. A semantic interpreter may be implemented as a centroid-based classifier, which may rank Wikipedia concepts by relevance, based on a received text fragment. For instance, a semantic interpreter within the content recommendation engine may receive an input text fragment T, and represent the fragment as a vector (e.g., using the TFIDF scheme). The semantic interpreter may iterate over the text words, retrieve corresponding entries from the inverted index, and merges them into a weighted vector. Entries of the weighted vector may reflect the relevance of the corresponding concepts to text T. To compute semantic relatedness of a pair of text fragments, their vectors may be compared using, e.g., the cosine metric.

In other examples, similar methods for generating features for text categorization may include supervised learning tasks, in which words occurring in the training documents may be used features. Therefore, in some examples Wikipedia concepts may be used to augment the bag of words. On the other hand, computing semantic relatedness of a pair of texts is essentially a "one-off" task, therefore, the bag of words representation may be replaced with a representation based on concepts. These and other related techniques are described in the more detail in the paper "Computing Semantic Relatedness using Wikipedia-based Explicit Semantic Analysis," by Evgeniy Gabrilovich and Shaul Markovitch, Department of Computer Science Technion—Israel Institute of Technology, which is fully incorporated by reference herein for all purposes, as well as the other related discussed therein. Using the techniques described in this paper and others, with a filtered subset of Wikipedia, for each article there may be one concept which is the title of the article. When the content recommendation engine 425 receives a text document via user interface 415, the text may first be summarized. In these cases, each unique word in the text, after the stop words are removed and the words stemmed, may be given a weight based on frequency and inverse frequency of the word in the article. Each word may then be compared to see what Wikipedia articles (concepts) it appears in, and thus for that word the content recommendation engine 425 may create a concept vector. The concept vectors for all the words in the text document can be combined to form a weighted concept vector for the text document. The content recommendation engine 425 then may measure the similarity between each word concept vector and the text concept vector. All words above a certain threshold then may be selected as the "keywords" for the document.

Figure 36:
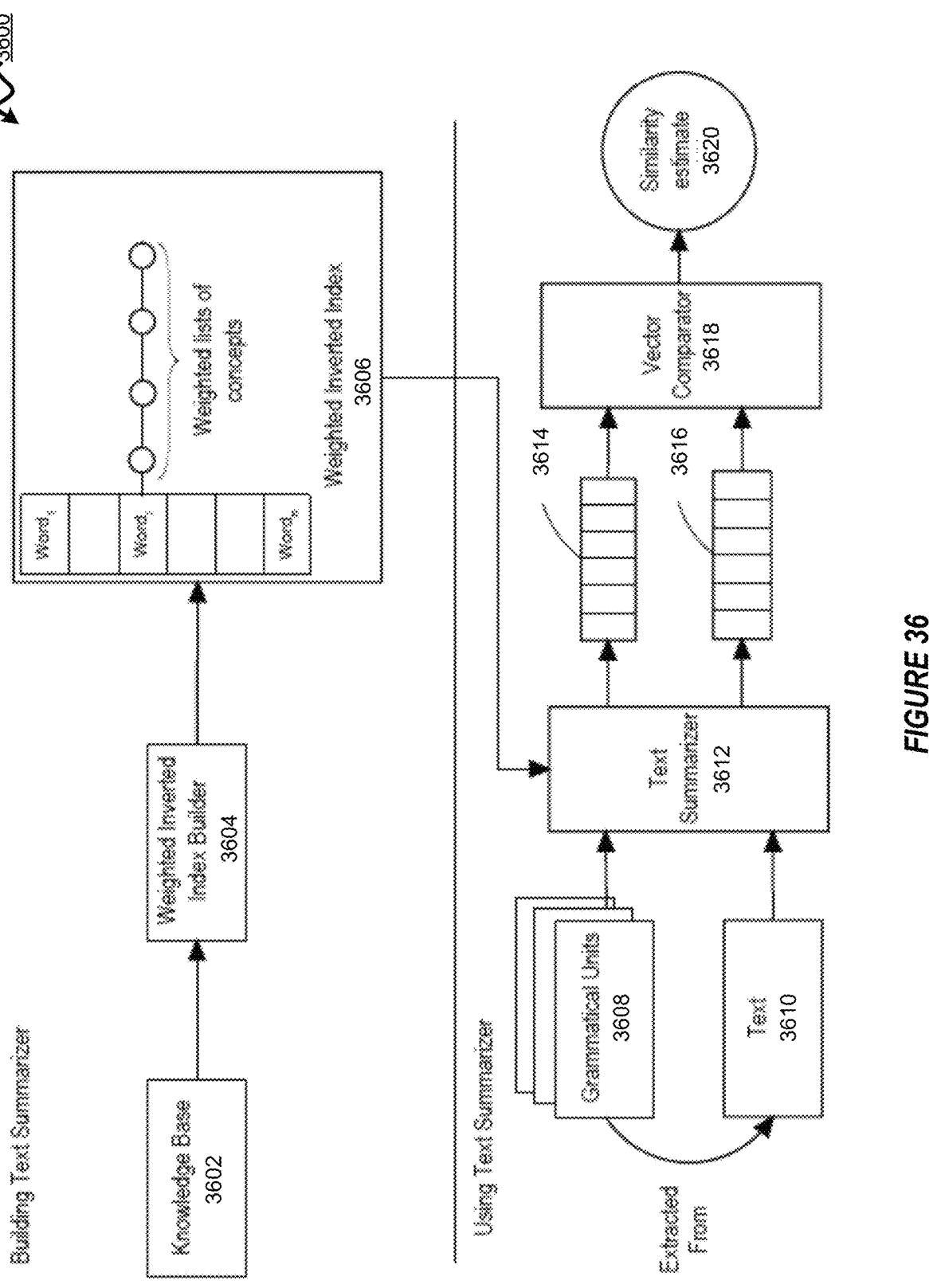
FIG. 36 is a diagram of an example semantic text analyzer system, in accordance with certain embodiments of the present disclosure.

With reference now to FIG. 36, an example semantic text analyzer system 3600 is shown, illustrating the techniques used by the analyzer system 3600 to perform semantic text summarization in certain embodiments described above. Such a system 3600 may be incorporated into and/or separate from by accessed by the content recommendation engine 425 in various implementations.

In some implementations, explicit semantic analysis for computing semantic relatedness is repurposed for computing a text summary of a given text document. More specifically, the text summary is derived based on word embeddings. In other words, the context of n-grams (e.g., words) is captured for purpose of determining semantic similarity, in contrast to typical similarity measures such as cosine on bag of words or edit distance on strings.

The given text document can be an article, a web page, or other piece text for which a text summary is desired. As with the classification approach described herein, the text is not limited to written language but may include other human-readable symbols, numbers, charts, tables, equations, formulas, etc.

The text summary approach using explicit semantic analysis operates generally as follows: (1) grammatical units (e.g., sentences or words) are extracted from the given text document using any known technique for identifying and extracting such units, (2) each of the extracted grammatical units and the text document are represented as weighted vectors of knowledge base concepts, (3) the semantic relatedness between the text document as a whole and each grammatical unit is computed using the weighted vectors, and (4) one or more of the grammatical units most semantically relatedly to the text document as a whole are selected for inclusion in a text summary of the text document. In some cases, representation of weighted vectors of knowledge base concepts may correspond to topic modeling, in which each sentence or word first may be converted into a feature vector, and then the feature difference/similarity may be calculated in the high-dimensional vector space. There may be various methods to convert the words to vectors, for example, WORD2VEC or a Latent Dirichlet Allocation.

FIG. 36 illustrates text summarization using explicit semantic analysis. First a text summarizer is built based on a knowledge base 3602. The knowledge base 3602 can be general or domain-specific. An example of a general knowledge base is a collection of encyclopedia articles such as a collection of Wikipedia articles or other encyclopedic collection of text articles. However, the knowledge base 3602 can instead be domain-specific such as a collection of text articles specific to a particular technical field such as a collection of medical, scientific, engineering, or financial articles.

Each article of the knowledge base 3602 is represented as an attribute vector of n-grams (e.g., words) that occur in the article. Entries in the attribute vector are assigned weights. For example, the weights may be used using a term frequency-inverse document frequency scoring scheme. The weights in the attribute vector for an article quantify the strength of association between the n-grams (e.g., words) of the article and the article as a concept.

In some implementations, the term frequency-inverse document frequency scoring scheme computes a weight for a given n-gram t of a given article document d as represented by the following equation:

$$\frac{(k+1)tf_{t,d}}{tf_{t,d} + k\left(1 - b + b\frac{L_d}{L_{avg}}\right)} \cdot \log\frac{M - df_t + 0.5}{df_t + 0.5} \tag{1}$$

Here, $tf_{t,d}$ represents the frequency of n-gram t in document d. And $df_t$ represents the document frequency of n-gram t in the knowledge base 3602. M represents the total number of documents in the training set, $L_d$ represents the length of the document d in number of terms, and $L_{avg}$ represents the average length in the training corpus, and K and b are free parameters. In some implementations, k is approximately 1.5 and b is approximately 0.75.

The preceding is one example of a term frequency-inverse document frequency scoring scheme that may be used to weight attributes of an attribute vector. Other statistical measures that reflect how important an attribute (e.g., an n-gram) is to an article in the knowledge base 3602 may be used. For example, other TF/IDF variations such as BM25F that takes anchor text into account may be used with certain types knowledge bases such as, for example, a knowledge base of web pages or other set of hyperlinked documents.

A weighted inverted index builder computer 3604 builds a weighted inverted index 3606 from the attribute vectors representing the articles of the knowledge base 3602. The weighted inverted index 3606 maps each distinct n-gram represented in the set of attribute vectors to a concept vector of concepts (articles) in which the n-gram appears. Each concept in the concept vector may be weighted according to the strength of association between the concept and the n-gram to which the concept vector is mapped by the weighted inverted index 3606. In some implementations, the indexer computer 3604 uses the inverted index 3606 to discard insignificant associations between n-grams and concepts by removing from the concept vectors those concepts whose weights for a given n-gram are below a threshold.

To generate a text summary of a given text document 3610, grammatical units 3608 are extracted from a given text document 3610 and the semantic relatedness between each grammatical unit and the given text document 3610 is computed. A number of grammatical units having a high degree of semantic relatedness to the given text document 3610 are selected for inclusion in the text summary.

The number of grammatical units that are selected for inclusion in the text summary may vary based on a variety of different factors. One approach is to select a predefined number of grammatical units. For example, the predefined number may be configured by a user of the system or learned by a machine learning process. Another approach is to select all grammatical units having a degree of semantic relatedness to the given text document 3610 that is above a predefined threshold. The predefined threshold can be configured by a user of the system or learned by a machine learning process. Yet another possible approach is determine the grammatical unit having the highest degree of semantic relatedness to the given text document 3610 and then selecting all other grammatical units where the difference in the degree of semantic relatedness to the given text document 3610 of the grammatical unit and the highest degree is below a predefined threshold. The grammatical unit having the highest degree and any other grammatical units below the predefined threshold are selected for inclusion in the text summary. Again, the predefined threshold can be configured by a user of the system or learned by a machine learning process.

In some implementations, a grammatical unit having the highest or a relatively high degree of semantic relatedness to the given text document 3610 is not always selected for inclusion in the text summary. For example, a first grammatical unit that has a lower degree of semantic relatedness to the given text document 3610 than a second grammatical unit may be selected for inclusion in the text summary and the second grammatical unit may not be selected for inclusion in the text summary if the first grammatical unit is not sufficiently dissimilar with respect to the grammatical units that have already been selected for inclusion in the text summary. The extent of a grammatical unit's dissimilarity with respect to the existing text summary can be measured in a variety of different ways such as, for example, by using a lexical approach, a probabilistic approach, or a hybrid of the lexical approach and the probabilistic approach. Using a dissimilarity measure to select grammatical units for inclusion in the text summary can prevent multiple similar grammatical units from being included in the same text summary.

In some implementations, other techniques for selecting a number of grammatical units for inclusion in the text summary as a function of the units' semantic relatedness to the given text document 3610 and its dissimilarity relative to one or more of the other units may be used and is not limited to any particular technique. For example, given a number of grammatical units with a semantic relatedness to the given text document 3610 above a threshold, the dissimilarity of each composite grammatical unit with respect the combination of the number of grammatical units may be measured and a number of grammatical units that are most dissimilar to each other may be selected for inclusion in the text summary. As a result, the grammatical units selected for inclusion in the text summary are highly semantically related to the text document, as a whole, yet dissimilar from each other. This is a more useful text summary than one containing highly semantically related but similar grammatical units because similar grammatical units are more likely to be redundant of each other in terms of the information conveyed by the grammatical units than dissimilar grammatical units.

Another possibility is to compute a composite similarity/dissimilarity measure for grammatical units and then select grammatical units for inclusion in the text summary based on their composite scores. For example, the composite measure might be a weighted average of the semantic relatedness measure and a dissimilarity measure. For example, a possible composite measure computed as a weighted average is:

$$(a * \text{Similarity}) + (b * \text{Dissimilarity})$$

Here, the parameter Similarity represents the semantic relatedness of a grammatical unit to the input text 3610 as a whole. For example, the parameter Similarity could be the similarity estimate 3620 computed for the grammatical unit. The parameter Dissimilarity represents a dissimilarity measure of the dissimilarity of the grammatical unit to the set of one or more grammatical units. For example, the set of one or more grammatical units can be a set of one or more grammatical units that are already selected for inclusion in the text summary. The parameter a represents the weight applied to the similarity measure in the weighted average. The parameter b represents the weight application to the dissimilarity measure in the weighted average. The composite measure effectively balances the similarity measure and the dissimilarity measure against each other. They can be balanced against each other equally (e.g., a=0.5 and b=0.5). Alternatively, the similarity measure may be given more weight (e.g., a=0.8 and b=0.2).

A grammatical unit extracted from the given text document can be a sentence, a phrase, a paragraph, a word, an n-gram, or other grammatical unit. In the case, where the grammatical units 3608 extracted from the given text document 3610 are words or n-grams, the process may be viewed as keyword generation, as opposed to text summarization.

The text summarizer 3612 accepts a piece of text. The piece of text is the given text document 3610 or a grammatical unit thereof. The piece of text is represented as an "input" vector of weighted attributes (e.g., words or n-grams) of the piece of text. Each weight in the input vector is for a corresponding attribute (e.g., word or n-gram) identified in the piece of text and represents the strength of association between the piece of text and the corresponding attribute. For example, the weights may be calculated according to a TF-IDF scheme or the like.

In some implementations, the weight of an attribute in the input vector is computed as follows:

$$\frac{(k+1)tf_{t,d}}{tf_{t,d} + k\left(1 - b + b\frac{L_d}{L_{avg}}\right)}$$

Here, $tf_{t,d}$ is the frequency of n-gram t in the piece of text d. Parameters k, b, $L_d$, and $L_{avg}$ are as before except with respect to knowledge base 3602 instead of a classification training set. In some implementations, k is approximately 1.5 and b is approximately 0.75.

It should be noted that other weighting schemes are possible and embodiments are not limited to any particular weighting scheme when forming the input vector. Forming the input vector may also include unit length normalization such as described above with respect to the training data item vectors.

The text summarizer 3612 iterates over the non-zero weighted attributes of the input vector formed based on the piece of text, retrieves attribute vectors corresponding to the attributes from the weighted inverted index 3606, and merges the retrieved attribute vectors into a weighted vector of concepts that represents the piece of text. This weighted vector of concepts is referred to hereinafter as a "concept" vector.

The attribute vectors retrieved from the weighted inverted index 3606 corresponding to the attributes of the input vector are also each a vector of weights. However, the weights in the attribute vector quantify the strength of association between respective concepts of the knowledge base 3602 and the attribute mapped to the attribute vector by the inverted index 3606.

The text summarizer 3612 creates a concept vector for the piece of text. The concept vector is a vector of weights. Each weight in the concept vector represents the strength of association between a respective concept of the knowledge base 3602 and the piece of text. A concept weight in the concept vector is computed by the text summarizer 3612 as a sum of values, one value for each attribute non-zero weighted in the input vector. Each value for an attribute of the sum is computed as the product of (a) the weight of the attribute in the input vector and (b) the weight of the concept in the attribute vector for the attribute. Each concept weight in the concept vector reflects the relevance of the concept to the piece of text. In some implementations, the concept vector is normalized. For example, the concept vector may be normalized for unit length or concept length (e.g., like class length above).

The text summarizer 3612 may generate a concept vector 3616 for the input text 3610 and a concept vector 3614 for each of the grammatical units 3608. The vector comparator 3618 compares a concept vector 3614 generated for a grammatical unit to the concept vector 3616 generated for the input text 3610 using a similarity measure to generate a similarity estimate 3620. In some implementations, a cosine similarity measure is used. Implementations are not limited to any particular similarity measure and any similarity measure capable of measuring the similarity between two non-zero vectors may be used.

The similarity estimate 3620 quantifies the degree of semantic relatedness between a grammatical unit and the input text 3610 from which the grammatical unit was extracted. For example, the similarity estimate 3620 may be a value between 1 and 0 inclusive with values closer to 1 representing a higher degree of semantic relatedness and values closer to 0 representing a lower degree of semantic relatedness.

A similarity estimate 3620 may be computed for each of the grammatical units 3608. The similarity estimates 3620 generated for the grammatical units 3608 may be used to select one or more of the grammatical units 3608 for inclusion in a text summary of the input text 3610 (or to select one or more keywords for keyword generation for the input text 3610).

There a variety of applications of the above technique for text summarization to provide an accurate text summary of longer text such as, for example, news stories, blog posts, journal articles, web pages, etc.

Figure 37:
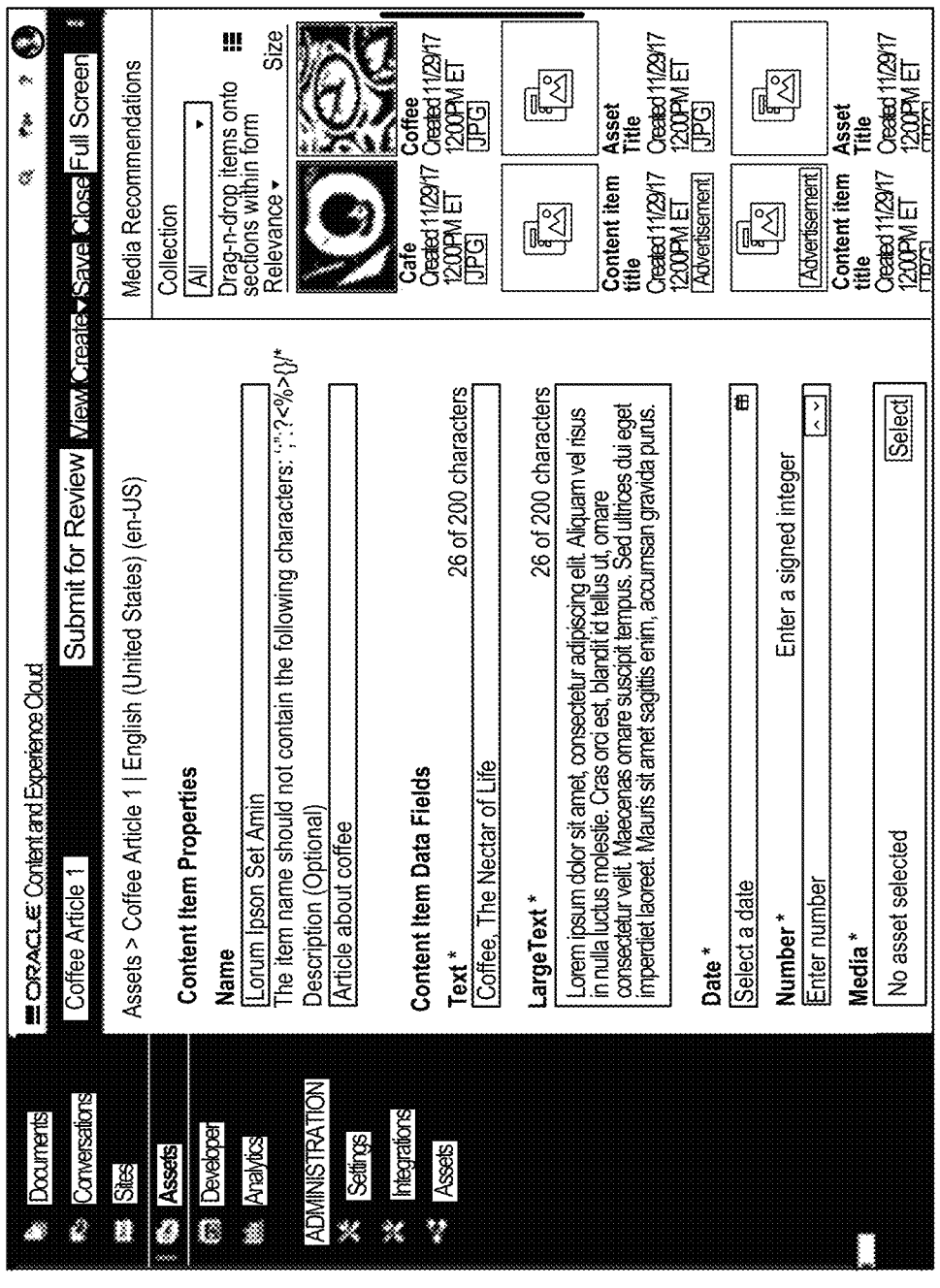
FIG. 37 is an example user interface screens showing image recommendations provided to a user during the creation of content, in accordance with certain embodiments of the present disclosure.
Figure 38:
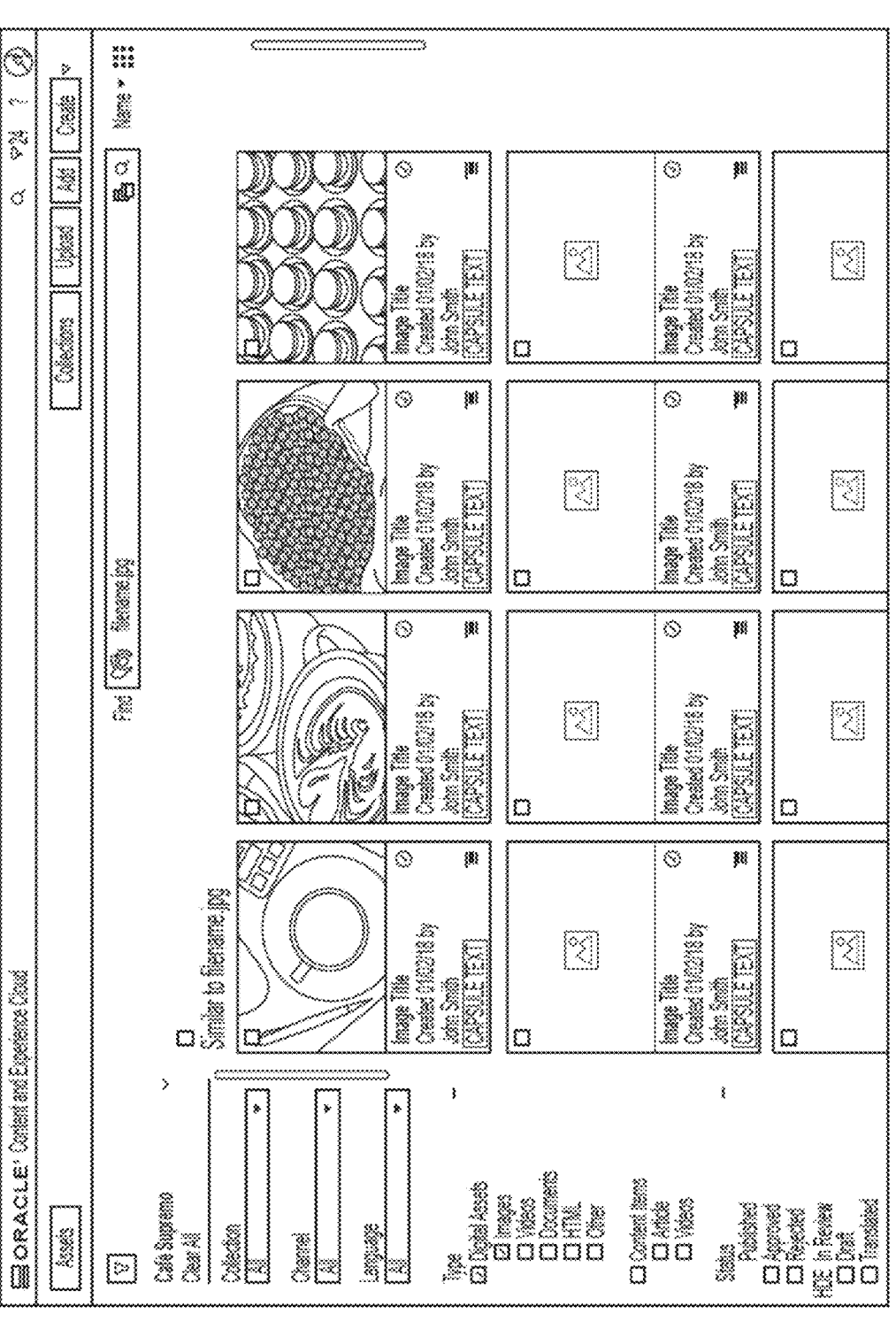
FIG. 38 is an example user interface screens showing image recommendations provided to a user during the creation of content, in accordance with certain embodiments of the present disclosure.

In any or all the above embodiments, after one or more content resources (e.g., images, articles, etc.) have been identified as potentially related to the content currently being created by the user via the user interface 415, the related content resources are transmitted back to the content recommendation engine 425, where they may be retrieved, modified, and embedded into the user interface 415, for example, by the content retrieval/embedding component 445. Using the retrieval/embedding component 445, the potentially related content resources may be provided to the user via the user interface 415 in such a way that they may be optionally selected to be included with the content currently being created. Two example user interfaces are shown in FIGS. 37 and 38, in which image recommendations are provided to a user during the creation of content. In FIG. 37, a media recommendation pane is shown including images selected based on the text of the content currently being authored by the user via the user interface. In FIG. 38, a visual-feature analysis has been used to select a set of images that are potentially related to a first image ("file-name.JPG) selected by the user. Similar techniques and user interface screens may be used to allow users to select, drag-and-drop, and embed images, links to articles and other text documents, audio/video files, etc. into the content currently being created by the user.

Figure 39:
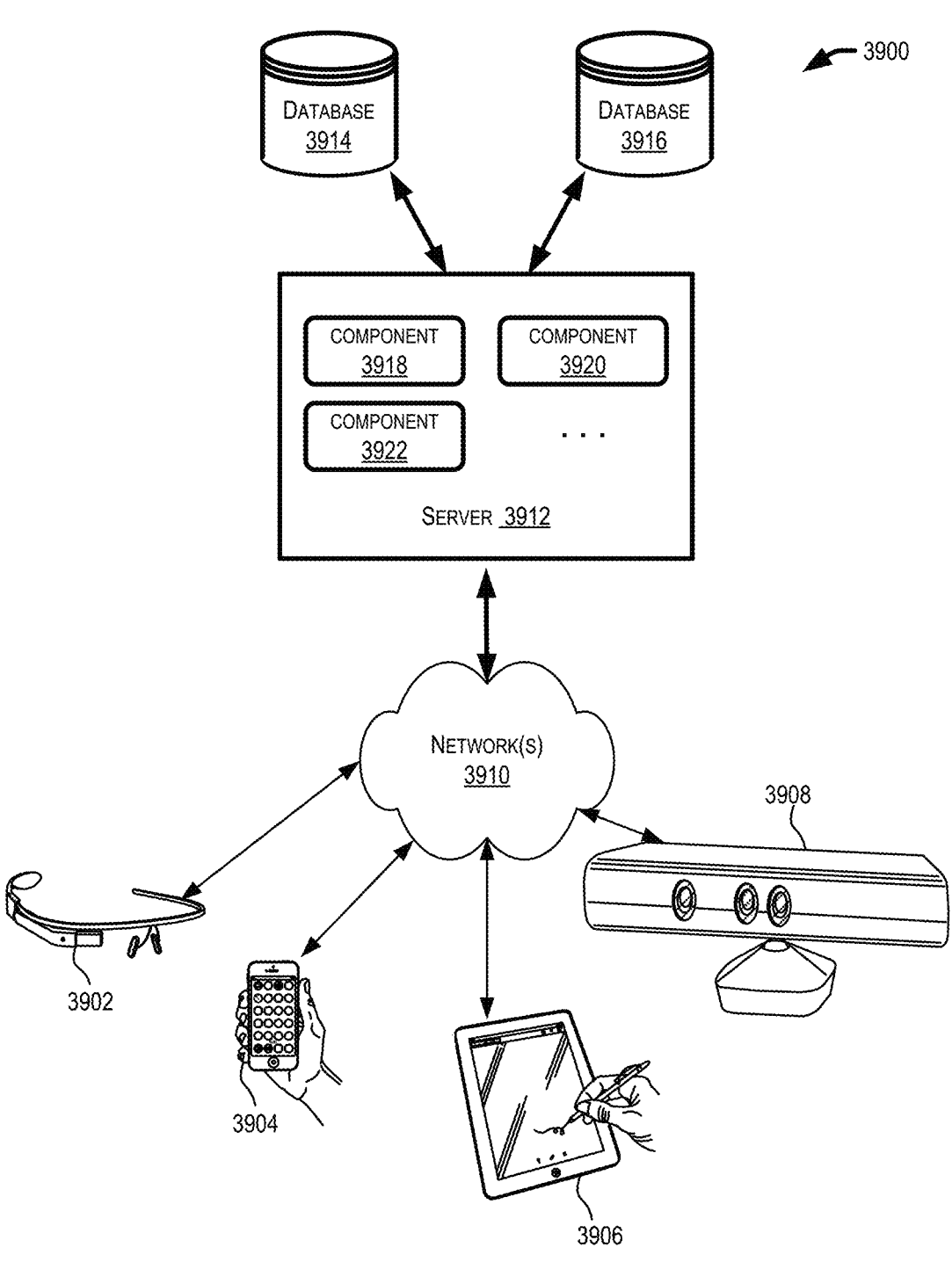
FIG. 39 depicts a simplified diagram of a distributed system for implementing certain embodiments in accordance with present disclosure.

FIG. 39 depicts a simplified diagram of a distributed system 3900 in which the various examples discussed above can be implemented. In the illustrated example, the distributed system 3900 includes one or more client computing devices 3902, 3904, 3906, 3908, coupled to a server 3912 via one or more communication networks 3910. The client computing devices 3902, 3904, 3906, 3908 may be configured to run one or more applications.

In various embodiments, server 3912 may be adapted to run one or more services or software applications that enable one or more operations associated with the content recommendation system 400. For example, users may use the client computing devices 3902, 3904, 3906, 3908 (e.g., corresponding to content author device 410) to access one or more cloud-based services provided by via the content recommendation engine 425.

In various examples, the server 3912 may also provide other services or software application, and can include non-virtual and virtual environments. In some examples, these services may be offered as web-based or cloud services or under a Software as a Service (Saas) model to the users of the client computing devices 3902, 3904, 3906, 3908. Users operating the client computing devices 3902, 3904, 3906, 3908 may in turn use one or more client applications to interact with the server 3912 to use the services provided by these components.

In the configuration depicted in FIG. 39, the server 3912 may include one or more components 3918, 3920, 3922 that implement the functions performed by the server 3912. These components may include software components that may be executed by one or more processors, hardware components, or combinations thereof. It should be appreciated that various different system configurations are possible, which may be different from the example distributed system 3900.

The client computing devices 3902, 3904, 3906, 3908 may include various types of computing systems, such as portable handheld devices such as smartphones and tablets; general purpose computers such as personal computers and laptops; workstation computers; wearable devices such as a head-mounted display; gaming systems such as handheld gaming devices, gaming consoles, and Internet-enabled gaming devices; thin clients; various messaging devices; sensors and other sensing devices; and the like. These computing devices may run various types and versions of software applications and operating systems (e.g., Microsoft Windows®, Apple Macintosh®, UNIX® or UNIX-like operating systems, Linux or Linux-like operating systems, including various mobile operating systems (e.g., Microsoft Windows Mobile®, iOS®, Windows Phone®, Android™, BlackBerry®, Palm OS®). The client devices may be capable of executing various different applications such as various Internet-related apps, communication applications (e.g., e-mail applications, short message service (SMS) applications) and may use various communication protocols. A client device may provide an interface that enables a user of the client device to interact with the client device. The client device may also output information to the user via this interface. Although FIG. 39 depicts only four client computing devices, any number of client computing devices may be supported.

Network(s) 3910 in the distributed system 3900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 3910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 3912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 3912 can include one or more virtual machines running virtual operating systems, or other computing architectures involving virtualization, such as one or more flexible pools of logical storage devices that can be virtualized to maintain virtual storage devices for the server. In various examples, the server 3912 may be adapted to run one or more services or software applications that perform the operations as described above.

The server 3912 may run an operating system including any of those discussed above, as well as any commercially available server operating system. The server 3912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include, without limitation, those commercially available from Oracle, Microsoft, Sybase, IBM (International Business Machines), and the like.

In some implementations, the server 3912 may include one or more applications to analyze and consolidate data feeds and/or event updates received from users of the client computing devices 3902, 3904, 3906, 3908. As an example, data feeds and/or event updates may include, but are not limited to, feeds, or real-time updates received from one or more third-party information sources and continuous data streams, which may include real-time events related to sensor data applications, financial tickers, network performance measuring tools (e.g., network monitoring and traffic management applications), clickstream analysis tools, automobile traffic monitoring, and the like. The server 3912 may also include one or more applications to display the data feeds and/or real-time events via one or more display devices of the client computing devices 3902, 3904, 3906, 3908.

The distributed system 3900 may also include one or more data repositories 3914, 3916. These data repositories may provide a mechanism for storing information various types of information, such as the information described by the various examples discussed above. The data repositories 3914, 3916 may reside in a variety of locations. For example, a data repository used by the server 3912 may be local to server 3912 or may be remote from server 3912 and in communication with server 3912 via a network-based or dedicated connection. The data repositories 3914, 3916 may be of different types. In some examples, a data repository used by the server 3912 may be a database, for example, a relational database, such as databases provided by Oracle Corporation® and other vendors. One or more of these databases may be adapted to enable storage, update, and retrieval of data to and from the database in response to SQL-formatted commands.

In some examples, one or more of the data repositories 3914, 3916 may also be used by applications to store application data. The data repositories used by applications may be of different types such as, for example, a key-value store repository, an object store repository, or a general storage repository supported by a file system.

Figure 40:
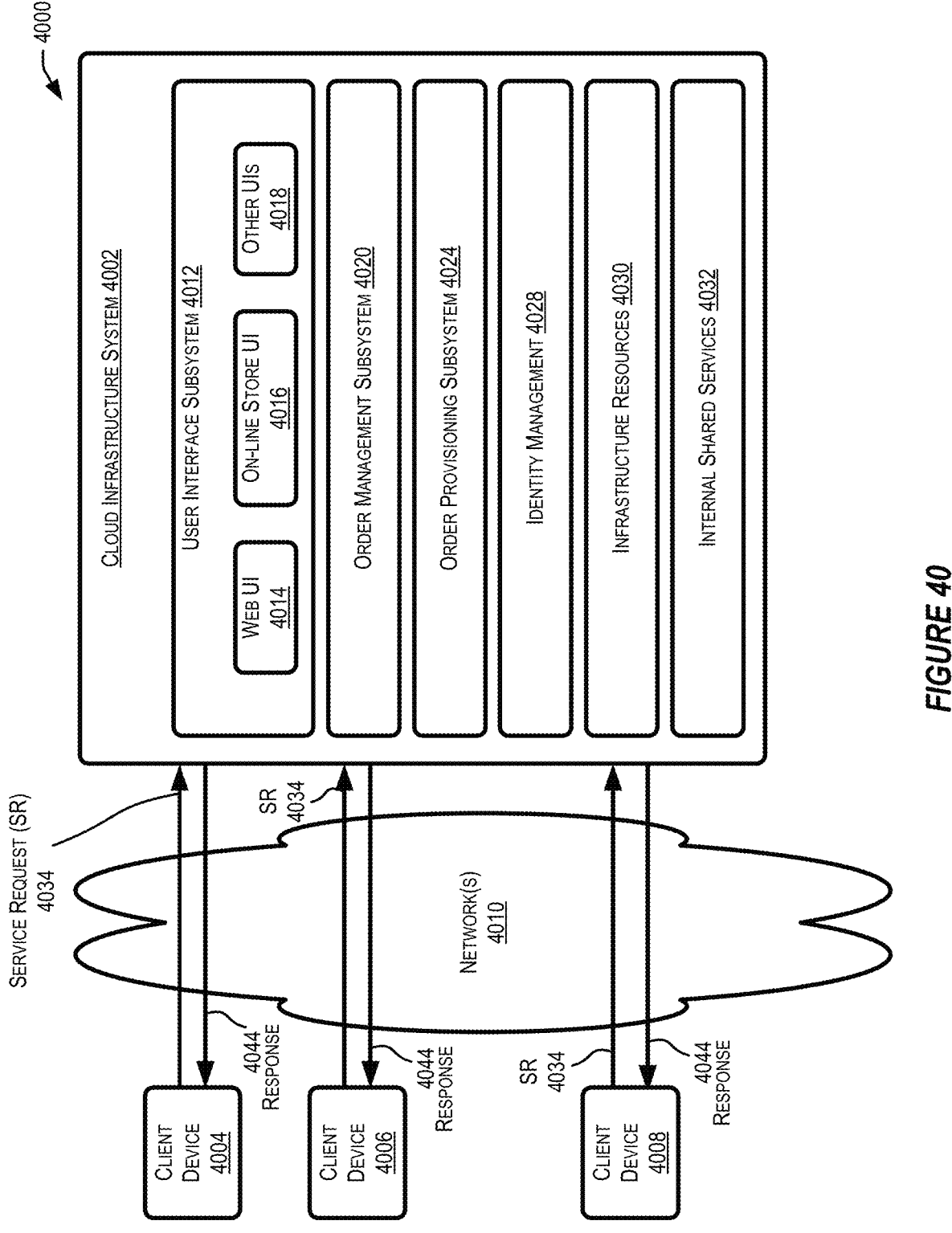
FIG. 40 is a simplified block diagram of one or more components of a system environment by which services provided by one or more components of a system may be offered as cloud services, in accordance with certain embodiments of the present disclosure.

In some examples, a cloud environment may provide one or more services such as those discussed above. FIG. 40 is a simplified block diagram of one or more components of a system environment 4000 in which these and other services can be offered as cloud services. In the example illustrated in in FIG. 40, a cloud infrastructure system 4002 may provide one or more cloud services that may be requested by users using one or more client computing devices 4004, 4006, and 4008. The cloud infrastructure system 4002 may include one or more computers and/or servers that may include those described above for server 3912 of FIG. 39. The computers in cloud infrastructure system 4002 of FIG. 40 may be organized as general purpose computers, specialized server computers, server farms, server clusters, or any other appropriate arrangement and/or combination.

Network(s) 4010 may facilitate communication and exchange of data between the clients 4004, 4006, 4008 and the cloud infrastructure system 4002. The network(s) 4010 may include one or more networks. The networks may be of the same or different types. The network(s) 4010 may support one or more communication protocols, including wired and/or wireless protocols, for facilitating the communications.

The example depicted in FIG. 40 is only one example of a cloud infrastructure system and is not intended to be limiting. It should be appreciated that, in other examples, the cloud infrastructure system 4002 may have more or fewer components than those depicted in FIG. 40, may combine two or more components, or may have a different configuration or arrangement of components. For example, although FIG. 40 depicts three client computing devices, any number of client computing devices may be supported in other examples.

The term cloud service is generally used to refer to a service that is made available to users on demand and via a communication network such as the Internet by systems (e.g., the cloud infrastructure system 4002) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand and self-service, order and use the application without the user having to buy infrastructure resources for executing the application. Cloud services are designed to provide easy, scalable access to applications, resources and services. Several providers offer cloud services. For example, several cloud services are offered by Oracle Corporation®, such as middleware services, database services, Java cloud services, and others.

In various examples, the cloud infrastructure system 4002 may provide one or more cloud services using different models, such as under a Software as a Service (SaaS) model, a Platform as a Service (PaaS) model, an Infrastructure as a Service (IaaS) model, and others, including hybrid service models. The cloud infrastructure system 4002 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by the cloud infrastructure system 4002. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

In some examples, resources in the cloud infrastructure system 4002 may be shared by multiple users and dynamically re-allocated per demand. Additionally, resources may be allocated to users in different time zones. For example, the cloud infrastructure system 4002 may enable a first set of users in a first time zone to utilize resources of the cloud infrastructure system for a specified number of hours and then enable the re-allocation of the same resources to another set of users located in a different time zone, thereby maximizing the utilization of resources.

The cloud infrastructure system 4002 may provide the cloud services via different deployment models. In a public cloud model, the cloud infrastructure system 4002 may be owned by a third party cloud services provider and the cloud services are offered to any general public customer, where the customer can be an individual or an enterprise. In certain other embodiments, under a private cloud model, the cloud infrastructure system 4002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 4002 and the services provided may be shared by several organizations in a related community. Various other models such as hybrids of the above mentioned models may also be used.

The client computing devices 4004, 4006, 4008 may be devices similar to those described above for the client computing devices 3902, 3904, 3906, 3908 of FIG. 39. The client computing devices 4004, 4006, 4008 of FIG. 40 may be configured to operate a client application such as a web browser, a proprietary client application (e.g., Oracle Forms), or some other application, which may be used by a user of the client computing device to interact with the cloud infrastructure system 4002 to use services provided by the cloud infrastructure system 4002.

In various examples, the cloud infrastructure system 4002 may also provide "big data" and related computation and analysis services. The term "big data" is generally used to refer to extremely large data sets that can be stored and manipulated by analysts and researchers to visualize large amounts of data, detect trends, and/or otherwise interact with the data. The analysis the cloud infrastructure system 4002 can perform may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 40, cloud infrastructure system 4002 may include infrastructure resources 4030 that are used for facilitating the provision of various cloud services offered by cloud infrastructure system 4002. Infrastructure resources 4030 may include, for example, processing resources, storage or memory resources, networking resources, and the like.

In some examples, to facilitate efficient provisioning of these resources for supporting the various cloud services provided by cloud infrastructure system 4002 for different customers, the resources may be bundled into sets of resources or resource modules (also referred to as "pods"). Each resource module or pod may comprise a pre-integrated and optimized combination of resources of one or more types. In some examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

The cloud infrastructure system 4002 may itself internally use the services 4032 that are shared by different components of cloud infrastructure system 4002 and which facilitate the provisioning of services by cloud infrastructure system 4002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various examples, the cloud infrastructure system 4002 may include multiple subsystems. These subsystems may be implemented in software, or hardware, or combinations thereof. As depicted in FIG. 40, the subsystems may include a user interface subsystem w that enables users or customers of cloud infrastructure system 4002 to interact with cloud infrastructure system 4002. The user interface subsystem 4012 may include various different interfaces such as a web interface 4014, an online store interface 4016 where cloud services provided by cloud infrastructure system 4002 are advertised and are purchasable by a consumer, and other interfaces 4018. For example, a customer may, using a client device, request (service request 4034) one or more services provided by cloud infrastructure system 4002 using one or more of interfaces 4014, 4016, 4018. For example, a customer may access the online store, browse cloud services offered by cloud infrastructure system 4002, and place a subscription order for one or more services offered by cloud infrastructure system 4002 that the customer wishes to subscribe to. The service request may include information identifying the customer and one or more services that the customer desires to subscribe to. For example, a customer may place a subscription order for services such as those discussed above. As part of the order, the customer may provide information identifying the amount of resources the customer needs and/or for what time frame, among other things.

In some examples, such as the example depicted in FIG. 40, the cloud infrastructure system 4002 may include an order management subsystem (OMS) 4020 that is configured to process the new order. As part of this processing, OMS 4020 may be configured to: generate an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning, among other operations.

Once properly validated, OMS 4020 may then invoke the order provisioning subsystem (OPS) 4024 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 4024 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like.

The allocated pods may then be customized for the particular requesting customer for providing the requested service.

The cloud infrastructure system 4002 may send a response or notification 4044 to the requesting customer to indicate when the requested service is now ready for use. In some instances, information (e.g., a link) may be sent to the customer that enables the customer to start using and availing the benefits of the requested services.

The cloud infrastructure system 4002 may provide services to multiple customers. For each customer, the cloud infrastructure system 4002 is responsible for managing information related to one or more subscription orders received from the customer, maintaining customer data related to the orders, and providing the requested services to the customer. The cloud infrastructure system 4002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

The cloud infrastructure system 4002 may provide services to multiple customers in parallel. The cloud infrastructure system 4002 may store information for these customers, including possibly proprietary information. In some examples, the cloud infrastructure system 4002 includes an identity management subsystem (IMS) 4028 that is configured to manage customers information and provide the separation of the managed information such that information related to one customer is not accessible by another customer. IMS 4028 may be configured to provide various security-related services such as identity services, such as information access management, authentication and authorization services, services for managing customer identities and roles and related capabilities, and the like.

Figure 41:
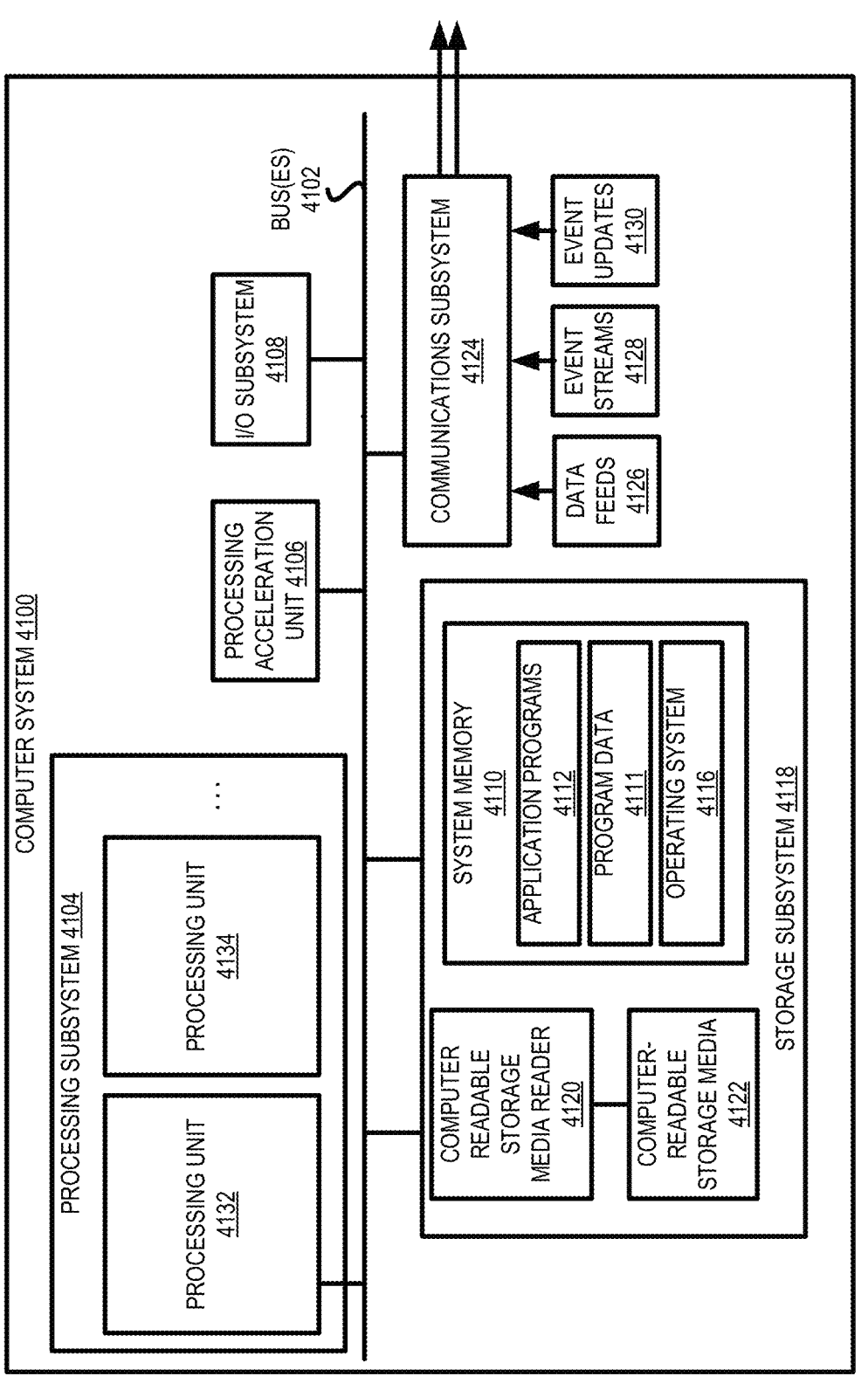
FIG. 41 illustrates an exemplary computer system, in which various embodiments may be implemented.

FIG. 41 illustrates an example of a computer system 4100 that may be used to implement the various examples discussed above. In some examples, the computer system 4100 may be used to implement any of the various servers and computer systems described above. As shown in FIG. 41, the computer system 4100 includes various subsystems including a processing subsystem 4104 that communicates with a number of other subsystems via a bus subsystem 4102. These other subsystems may include a processing acceleration unit 4106, an I/O subsystem 4108, a storage subsystem 4118 and a communications subsystem 4124. The storage subsystem 4118 may include non-transitory computer-readable storage media 4122 and a system memory 4110.

The bus subsystem 4102 provides a mechanism for letting the various components and subsystems of the computer system 4100 communicate with each other as intended. Although the bus subsystem 4102 is shown schematically as a single bus, alternate examples of the bus subsystem may utilize multiple buses. The bus subsystem 4102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

The processing subsystem 4104 controls the operation of the computer system 4100 and may comprise one or more processors, application specific integrated circuits (ASICs), or field programmable gate arrays (FPGAs). The processors may include be single core or multi-core processors. The processing resources of computer system 4100 can be organized into one or more processing units 4132, 4134. A processing unit may include one or more processors, including single core or multi-core processors, one or more cores from the same or different processors, a combination of cores and processors, or other combinations of cores and processors. In some examples, the processing subsystem 4104 can include one or more special purpose co-processors such as graphics processors, digital signal processors (DSPs), or the like. In some examples, some or all of the processing units of the processing subsystem 4104 can be implemented using customized circuits, such as application specific integrated circuits (ASICs), or field programmable gate arrays (FPGAs).

In some examples, the processing units in the processing subsystem 4104 can execute instructions stored in the system memory 4110 or on the computer readable storage media 4122. In various examples, the processing units can execute a variety of programs or code instructions and can maintain multiple concurrently executing programs or processes. At any given time, some or all of the program code to be executed can be resident in the system memory 4110 and/or on the computer-readable storage media 4122 including potentially on one or more storage devices. Through suitable programming, the processing subsystem 4104 can provide various functionalities described above. In instances where computer system 4100 is executing one or more virtual machines, one or more processing units may be allocated to each virtual machine In some examples, a processing acceleration unit 4106 may be provided for performing customized processing or for off-loading some of the processing performed by the processing subsystem 4104 so as to accelerate the overall processing performed by the computer system 4100.

The I/O subsystem 4108 may include devices and mechanisms for inputting information to the computer system 4100 and/or for outputting information from or via the computer system 4100. In general, use of the term "input device" is intended to include all possible types of devices and mechanisms for inputting information to the computer system 4100. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices that detects eye activity (e.g., "blinking" while taking pictures and/or making a menu selection) from users and transforms the eye gestures as input into an input device. Additionally, user interface input devices may include voice recognition sensing devices that enable users to interact with voice recognition systems, through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

In general, use of the term "output device" is intended to include all possible types of devices and mechanisms for outputting information from computer system 4100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

The storage subsystem 4118 provides a repository or data store for storing information that is used by the computer system 4100. The storage subsystem 4118 provides a tangible non-transitory computer-readable storage medium for storing the basic programming and data constructs that provide the functionality of some examples. Software (e.g., programs, code modules, instructions) that when executed by the processing subsystem 4104 provide the functionality described above may be stored in the storage subsystem 4118. The software may be executed by one or more processing units of the processing subsystem 4104. The storage subsystem 4118 may also provide a repository for storing data used in accordance with the present disclosure.

The storage subsystem 4118 may include one or more non-transitory memory devices, including volatile and non-volatile memory devices. As shown in FIG. 41, the storage subsystem 4118 includes a system memory 4110 and a computer-readable storage media 4122. The system memory 4110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within the computer system 4100, such as during start-up, may typically be stored in the ROM. The RAM typically contains data and/or program modules that are presently being operated and executed by the processing subsystem 4104. In some implementations, the system memory 4110 may include multiple different types of memory, such as static random access memory (SRAM) or dynamic random access memory (DRAM), and the like.

By way of example, and not limitation, as depicted in FIG. 41, the system memory 4110 may load application programs 4112 that are being executed, which may include client applications, Web browsers, mid-tier applications, relational database management systems (RDBMS), etc., program data 4111, and an operating system 4116. By way of example, the operating system 4116 may include various versions of Microsoft Windows®, Apple Macintosh®, and/or Linux operating systems, a variety of commercially-available UNIX® or UNIX-like operating systems (including without limitation the variety of GNU/Linux operating systems, Chrome® OS, and the like) and/or mobile operating systems such as iOS, Windows® Phone, Android® OS, BlackBerry® 10 OS, and Palm® OS operating systems.

The computer-readable storage media 4122 may store programming and data constructs that provide the functionality of some examples. The computer-readable media 4122 may provide storage of computer-readable instructions, data structures, program modules, and other data for the computer system 4100. Software (programs, code modules, instructions) that when executed by the processing subsystem 4104 provides the functionality described above that may be stored in the storage subsystem 4118. By way of example, the computer-readable storage media 4122 may include non-volatile memory such as a hard disk drive, a magnetic disk drive, an optical disk drive such as a CD ROM, DVD, a Blu-Ray® disk, or other optical media. The computer-readable storage media 4122 may include, but is not limited to, Zip® drives, flash memory cards, universal serial bus (USB) flash drives, secure digital (SD) cards, DVD disks, digital video tape, and the like. Computer-readable storage media 4122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The computer-readable storage media 4122 may provide storage of computer-readable instructions, data structures, program modules, and other data for the computer system 4100.

In some examples, the storage subsystem 4118 may also include a computer-readable storage media reader 4120 that can further be connected to the computer-readable storage media 4122. The reader 4120 may receive and be configured to read data from a memory device such as a disk, a flash drive, etc.

In some examples, the computer system 4100 may support virtualization technologies, including but not limited to virtualization of processing and memory resources. For example, the computer system 4100 may provide support for executing one or more virtual machines. The computer system 4100 may execute a program such as a hypervisor that facilitates the configuring and managing of the virtual machines. Each virtual machine generally runs independently of the other virtual machines. A virtual machine may be allocated memory, compute (e.g., processors, cores), I/O, and networking resources. Each virtual machine typically runs its own operating system, which may be the same as or different from the operating systems executed by other virtual machines executed by the computer system 4100. Accordingly, multiple operating systems may potentially be run concurrently by the computer system 4100.

The communications subsystem 4124 provides an interface to other computer systems and networks. The communications subsystem 4124 serves as an interface for receiving data from and transmitting data to other systems from the computer system 4100. For example, the communications subsystem 4124 may enable the computer system 4100 to establish a communication channel to one or more client computing devices via the Internet for receiving and sending information from and to the client computing devices.

The communication subsystem 4124 may support both wired and/or wireless communication protocols. For example, in some examples, the communications subsystem

4124 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples, the communications subsystem 4124 can provide wired network connectivity (e.g., Ethernet) in addition to or instead of a wireless interface.

The communication subsystem 4124 can receive and transmit data in various forms. For example, in some examples, the communications subsystem 4124 may receive input communication in the form of structured and/or unstructured data feeds 4126, event streams 4128, event updates 4130, and the like. For example, the communications subsystem 4124 may be configured to receive (or send) data feeds 4126 in real-time from users of social media networks and/or other communication services such as feeds, updates, web feeds such as Rich Site Summary (RSS) feeds, and/or real-time updates from one or more third party information sources.

In some examples, the communications subsystem 4124 may be configured to receive data in the form of continuous data streams, which may include event streams 4128 of real-time events and/or event updates 4130, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

The communications subsystem 4124 may also be configured to output the structured and/or unstructured data feeds 4126, event streams 4128, event updates 4130, and the like to one or more databases that may be in communication with one or more streaming data source computers coupled to the computer system 4100.

The computer system 4100 can be one of various types, including a handheld portable device (e.g., an iPhone® cellular phone, an iPad® computing tablet, a PDA), a wearable device (e.g., a head mounted display), a personal computer, a workstation, a mainframe, a kiosk, a server rack, or any other data processing system.

Due to the ever-changing nature of computers and networks, the description of the computer system 4100 depicted in FIG. 41 is intended only as a specific example. Many other configurations having more or fewer components than the system depicted in FIG. 41 are possible. Based on the disclosure and teachings provided herein, a person of ordinary skill in the art will appreciate other ways and/or methods to implement the various examples.

Smart Content—Result Ranking

For a content recommendation system that is configured to recommend specific content (content items) in response to input from a client or user, the process of evaluating and ranking the content items relative to each other plays an important role in the overall recommendation. For example, a user may input one or more search terms into a search engine query interface, the recommendation system may recommend one or more relevant content items (e.g., web pages, documents, images, etc.) that most closely match the input search terms. In other examples, a user may author original content such as an email, a document, an on-line article, a blog post, etc., using a content authoring system, which may be configured to provide recommendations of related content items that may be relevant to the content authored by the user. For instance, as described above, a content recommendation system may recommend relevant images or links to web pages, etc. to the user such that the author, if so desired, can incorporate one or more of the recommended content items into the content being authored by the user. Several examples of such techniques are described in the sections above. As these examples illustrate, the ranking and recommendations of specific content items may apply to many different use cases, in response to receiving manually entered user input and/or automated input from other processes. The content items to be ranked and/or recommended may correspond to images, web pages, other media files, documents, digital objects, etc., which are available to the recommendation system for searching. These content items may be stored in one or more repositories, which may be private or public repositories (e.g., the Internet), that are accessible to the recommendation system.

However, ranking of content items is a non-trivial task. For example, consider a recommendation system that uses tag matching techniques for performing the recommendations. In such a system, the content items that are available for searching by the recommendation system are tagged and the content items along with the tags may be stored in one or more repositories. The tagging may be performed by a content item tagging service/application. For a content item, the one or more tags associated with the content item are indicative of the content contained by the content item. A value (also sometimes referred to as a tag probability) may also be associated with each tag, where the value provides a measure (e.g., a probability) of the content indicated by the tag occurring in the content item. Upon receiving user input (e.g., a search term/phrase, content being authored by a user) for which recommendation of content items is to be provided, the user input may be analyzed to identify one or more tags to be associated with the user input. The recommendation system may then use a tag matching technique to identify a set of content items, from the content items available for searching, whose associated tags match the tags associated with the user input. The recommendation system may then use some ranking algorithm to rank the content items within the identified set and display the results to the user.

The effectiveness of the ranking algorithm used by the recommendation system may however be limited in certain use cases and may not produce optimal results. For example, consider a situation where there are multiple tags associated with the user input. For example, if the user types the words "coffee" and "human" into an image search engine, then tags "coffee" and "human" may be associated with the user input. In certain embodiments, the search terms themselves may be treated as tags associated with the user input. For purposes of simplicity, assume that the collection of content items available for searching includes tagged images. Using these two tags, the recommendation system may retrieve a set of matching content items from the collection of content items (e.g., images), where a content item is deemed to be matching if at least one tag associated with the content item matches a tag associated with the user input. Consider a scenario (Case 1) where multiple matching content items are retrieved by the recommendation system and each content item has both the "coffee" and "human" tags associated with it. One possible way of ranking these retrieved content items is to (a) for each matching content item, add the values associated with the tags "coffee" and "human" for that content item, and then (b) rank the content items based upon their associated added sums. This however presents a problem because, for multiple matching content items, the values associated with matching tags can add up to the same value, which is a very likely situation since most tagging services normalize probabilities on a scale of one. For example, three matching images may have associated tag values as follows: Image A (("coffee", 0.5), ("human", 0.5)), Image B (("coffee", 0.2), ("human", 0.8)), and Image C (("coffee", 0.7), ("human", 0.3)). As can be seen, the sum of the values of the matching tags for each of these matching images is one ("1"), and thus there is no way, using conventional summing techniques, to rank one of these images over the other. Accordingly, simply ranking the images based upon the added sum of their matching tag values cannot be used for ranking the images.

Extending the above example, it is also possible that the set of matching images includes images that matched only one tag (e.g., only matched "coffee," or only matched "human") and have the same associated tag value. This again presents a problem for ranking the images. For example, consider, three matching images may have associated tag values as follows: Image A (("coffee", 0.5)), and Image B (("human", 0.5)). There is again, using conventional techniques, no way to rank one of these images over the other.

The situation is further aggravated when there are more than two tags associated with the user input. For example, if the user types the words "coffee," "human," and "café" into an image search engine, then there are three search tags "coffee", "human", and "café" associated with the user input. The recommendation system may retrieve a set of matching content items from the collection of content items (e.g., images), where a content item is deemed to be matching if at least one tag associated with the content item matches a tag associated with the user input. The number of matching tags for a matching content item may vary from only one matching tag to multiple matching tags (maximum of three matchings tags for the "coffee," "human," and "café" example). Again in this scenario, for multiple matching content items, the values associated with matching tags can add up to the same value. For example, three matching images may have associated tag values as follows: Image A (("human", 0.8), ("coffee", 0.2)), Image B (("human", 0.2), ("coffee", 0.2), ("café", 0.6)), and Image C (("human", 0.5), ("café", 0.5)). As can be seen, the sum of the values of the matching tags for each of these matching images is one ("1"), and thus there is no way, using conventional summing techniques, to rank one of these images over the other.

Accordingly, in many cases, simple tag matching techniques might not return optimal content recommendations for a variety of reasons. For example, certain images (or other content items) in the repository may be tagged with only one or two content tags, while other images/content items may be tagged with large numbers of tags, including potentially dozens or even hundreds of tags for a single content item. In such cases, conventional tag matching techniques might over recommend a heavily tagged content item (e.g., because it more frequently includes at least one tag matching the input terms) and/or might under recommend such an item (e.g., because even when matching one or more content tags the majority of its tags will still fail to match the input terms). Similarly, the input content provided by the user or client system might include only a few input terms (e.g., expressly input search terms or topics extracted from a larger input text), or might include a relatively large number of input terms, depending on the input data received. In such cases, conventional tag matching techniques might either fail to identify certain relevant content items in the repository (e.g., because too few input terms match the tags of related content items), or might mistakenly recommend less relevant content items (e.g., because the less relevant content items include one or more matching tags).

In certain embodiments, improved techniques for evaluating, ranking, and recommending tagged content items are described herein. In some embodiments, a content recommendation system may receive input content from a client device, such as a search query, newly authored text input, or the like. One or more tags may be included in or associated with the input content received from the client device, and/or may be determined and extracted from the input content based on preprocessing and analyses techniques performed on the input content. Additionally, the content recommendation system may access a content repository storing a plurality of tagged content items, such as images, media content files, links to web pages and/or other documents. In some cases, the content repository may store the data identifying tagged content items, and for each of the tagged content item, may further store associated tag information for each item, where the tag information for a content item includes information identifying one or more tags associated with the content item and a tag value for each associated tag.

In response to receiving the input data for which a recommendation is to be made, the content recommendation system may retrieve, from the collection of searchable content items, a set of matching tagged content items from the content repository, where a content item is deemed to be a matching content item if at least one content tag associated with the content item matches a tag associated with the input content. Then, for each of the matching tagged content items retrieved from the content repository, the content recommendation system may calculate two scores: (1) a first score (also referred to as tag count score) based on the number of tags associated with the content item that match tags associated with the input content, and (2) a second score (also referred to as tag value based score or TVBS) based on the tag value for each of the matching tags for the content item. The content recommendation system then calculates a final ranking score for each of the matching content items, based on the first score and the second score for that matching content item. The final ranking scores computed for the set of matching content items are then used to generate a ranked list of the matching content items. This ranked list is then used for identifying a recommended subset of the matching content items to be output to the user or client system.

Figure 42:
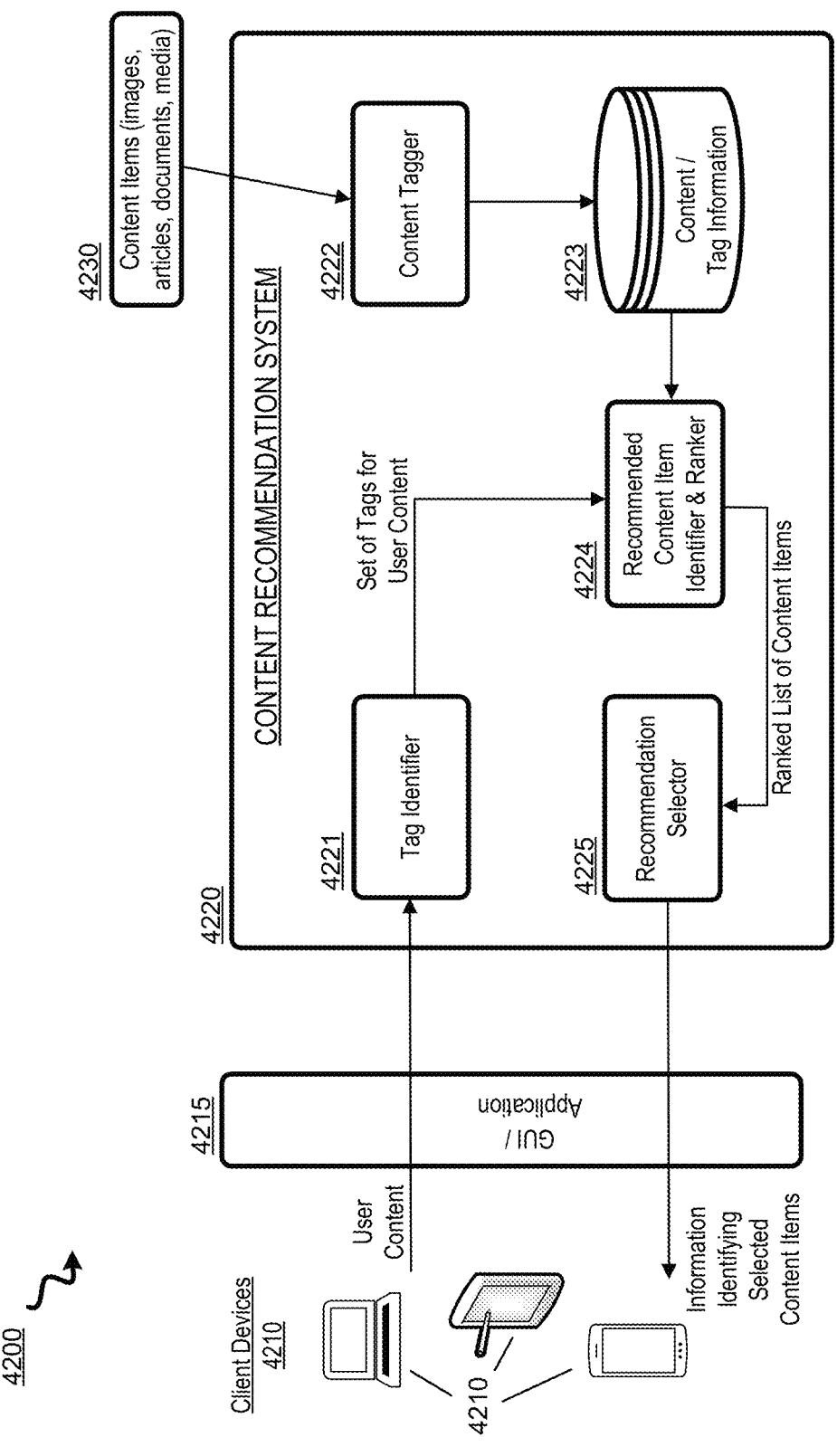
FIG. 42 is a diagram of an example computing environment configured to evaluate and rank content items from a content repository in response to input content received from user or client systems, in accordance with certain embodiments of the present disclosure.

Referring now to FIG. 42, a block diagram is shown illustrating a computing environment 4200 with a content recommendation system 4220 implemented to evaluate and rank content items from a content repository 4230, in response to input content received from user or client systems 4210 according to certain embodiments. Various components and subsystems within the content recommendation system 4220 are also shown in this example, including a graphical user interface (GUI) 4215 through which client systems 4210 may interact with the content recommendation system 4220, to provide input content and to receive data identifying a subset of recommended content items. In certain embodiments, the GUI 4215 may be a GUI of a separate client application 4215 (e.g., a web browser application) used by a user to author content. In this embodiment, the content recommendation system 4220 may receive the user provided or authored content from the client application. The content may be received by the content recommendation system 4220 using an application programming interface (API) that enables the client application and the content recommendation system 4220 to interact and exchange information with each other.

The embodiment depicted in FIG. 42 is merely an example and is not intended to unduly limit the scope of claimed embodiments. One of ordinary skill in the art would recognize many possible variations, alternatives, and modifications. For example, in some implementations, the content recommendation system 4220 may have more or fewer systems or subsystems than those shown in FIG. 42, may combine two or more systems, or may have a different configuration or arrangement of systems. The content recommendation system 4220 may be implemented one or more computing systems including, in some embodiments, separate systems using independent computing and network infrastructures with dedicated and specialized hardware and software. Alternatively or additionally, one or more of these components and subsystems may be integrated into a single system performing separate functionalities. The various systems, subsystems and components depicted in FIG. 42 may be implemented in software (e.g., code, instructions, program) executed by one or more processing units (e.g., processors, cores) of the respective systems, hardware, or combinations thereof. The software may be stored on a non-transitory storage medium (e.g., on a memory device).

At a high level, the content recommendation system 4220 is configured to receive user input content and then make content item recommendations responsive to and based upon the user input content. The recommendations are made from a collection of content items that are available and accessible to the content recommendation system 4220 for making recommendations. The collection of content items can include images, various types of documents, media content, digital objects, and the like. Based upon tags information associated with the user input content and tags information associated with the collection of content items, the content recommendation system 4220 is configured to, using a tag matching technique, identify a set of matching content items for the user input content. The content recommendation system 4220 is then configured to rank the content items in the set of matching content items using innovative ranking techniques described in this disclosure. Based upon the ranking, the content recommendation system 4220 is then configured to identify and recommend a subset of the matching content items to be output to the user or client system.

The content recommendation system 4220 includes a content tagger subsystem 4222 that is configured to receive or retrieve content items that are available for recommendation by the content recommendation system 4220. The content items can include, without limitation, images, webpages, documents, media files, etc. The content items may be received or retrieved from one or more content repositories 4230. The content repositories 4230 may include various public or private content repositories such as libraries or databases, including image libraries, document stores, local or wide area networks of web-based resources (e.g., the Internet), and the like. One or more content repositories 4230 may be stored locally to the content recommendation system 4220, while other content repositories may be separate, remote from the content recommendation system 4220 and accessible to the content recommendation system 4220 via one or more computer networks.

In certain embodiments, for each content item, the content tagger subsystem 4222 is configured to retrieve and analyze the contents of the content item and identify one or more content tags (tags) to be associated with the content item. For each tag that is associated with a content item, the content tagger 4222 may also determine a tag value associated with the tag, where the value provides a measure (e.g., a probability) of the content indicated by the tag occurring in the content item. The tag value for a tag may correspond to a numerical value measure representing how applicable the particular content tag is to that content item. One or more tags and corresponding tag values may be associated with a content item. For a content item having multiple associated tags and corresponding tag values, the tag values may represent the relative prominence of the image topic or theme indicated by the tags in that image. For example, a first tag associated with a content item having a relatively high tag value may indicate that the content or feature indicated by that first tag is particularly relevant and prominent in the content item. In contrast, a second tag associated with the same content item having a lower tag value may indicate that the content or feature indicated by the second tag is not as prominent or prevalent in the content item relative to the content indicated by the first content tag. For example, an image content item may have two associated tags and values as follows: ("human", 0.8), ("coffee", 0.2)). This indicates that image contains content related to coffee (e.g., a coffee cup) and a human (e.g., a human drinking the coffee), and the human is more prominently depicted in the image as compared to the depiction of the coffee (e.g., a large portion of the image may depict a human and the coffee cup may cover a small area of the image. The tag values may be represented using different formats. For example, in some implementations, that tag values may be expressed as floating point numbers between 0.0 and 1.0. In some implementations, the sum of all tag values for tags associated with a particular content item may sum to a fixed and uniform value (e.g., add up to 1).

In some embodiments, the content tagger 4222 may use the services of a content tagging service to perform the tagging task for the content items, including identifying one or more tags to be associated with a content item and a tag value for each tag. In certain embodiments, content tagger 4222 is implemented using one or more predictive machine-learning models that have been trained to take a content item as input and predict tags for the content item and the associated tag values. In some embodiments, the tags may be selected from a set of preconfigured tags that are used to train the models. Various machine learning techniques using pre-trained machine learning models and/or other artificial intelligence based tools, including AI-based text or image classification systems, topic or feature extractions, and/or any other combination of techniques described above, may be used for determining the tags to be associated with a content item and the corresponding tag values.

In some embodiments, the content items retrieved from content repositories 4230 might already include associated content tags and tag values. When the retrieved content items do not include the tags information, and/or when the content recommendation system 4220 is configured to determine additional tags for the content items, then the content tagger 4222 may be used to update or generate new tags for the retrieved content items. The content tagger 4222 may use various different techniques to generate the tag information (e.g., one or more tags and associated tag values) for a content item. For example, the content tagger 4222 may use any or all of the previously described techniques for analyzing the retrieved content items and determining content tags, such as parsing, processing, feature extraction, and/or other analysis techniques. The type of parsing, processing, feature extraction, and/or analysis may depend on the type of the content item. For instance, for text-based content items, such as blog posts, letters, emails, articles, documents, etc., the analysis may include keyword extraction and processing tools (e.g., stemming, synonym retrieval, etc.), topic analysis tools, etc. For content items that are images, artificial intelligence-based image classification tools may be used to identify particular image features and/or generate image tags. For instance, analysis of an image may identify a plurality of image features, and the image may be tagged with each of these identified features. One or both types of analyses (i.e., tag extraction from images, and keyword/topic extraction from text content), may be performed via REST-based services or other web services, using analytics, machine-learning algorithms, and/or artificial intelligence (AI) based techniques, such as an AI-based cognitive image analysis service, or a similar AI/REST cognitive text service to be used for text content. Similar techniques may be used for other types of content items, such as video files, audio files, graphics, or social media posts, where a specialized web-service may be used to extract and analyze specific features (e.g., words, objects within images/video, facial expressions, etc.) depending on the media type of the content item.

In some embodiments, the content tagger 4222 may use one or more machine-learning and/or artificial intelligence-based pre-trained models trained with training data to identify and extract content features to be used for determining the tags and the tag values for the content items. For example, a model training system may generate one or more models, which may be trained in advance using machine-learning algorithms based on training data sets including a training data set of previous input data (e.g., text input, images, etc.), and the corresponding tags for the previous input data. In various embodiments, one or more different types of trained models may be used, including classification systems that execute supervised or semi-supervised learning techniques, such as a Naïve Bayes model, a Decision Tree model, a Logistic Regression model, or a Deep Learning Model, or any other machine learning or artificial intelligence based prediction system that may execute supervised or unsupervised learning techniques. For each machine learning model or model type, the trained models may be executed by one or more computing systems during which a content item is provided as input to the one or more models and the output from the models may identify the one or more tags to be associated with the content item, or the output of the models may be used to identify the one or more tags to be associated with the content item. Accordingly, content tagger 4222 may use various different tools or techniques such as, without limitation, keyword extraction and processing (e.g., stemming, synonym retrieval, etc.), topic analysis, feature extraction from images, machine learning and AI-based modeling tools and text or image classification systems, and/or any other combination of techniques described above to determine or generate the tag information (e.g., one or more tags and associated tag values) for each content item that is available for recommendation.

In certain embodiments, the content items available for recommendations and their associated tag information (e.g., for each content item, one or more tags associated with the content item and the corresponding tag values) may be stored in a data store 4223. In some embodiments, the content/tag information data store 4223 may store data identifying the content items retrieved from content repositories 4230, which may include the items themselves (e.g., images, web-pages, documents, media files, etc.), or additionally/alternatively may include references to the items (e.g., item identifiers, network addresses from which the content items can be retrieved, descriptions of the items, thumbnails of the items, etc.). An example illustrating the type of data that may be stored in the content/tag information data store 4223 is shown in FIG. 45 and discussed in more detail below.

The content recommendation system 4220 includes a tag identifier subsystem 4221 that is configured to receive the user input content from devices 4210 and determine one or more tags to be associated with the user content. In some embodiments, the user content received from devices 4210 may include the associated tags. In some other embodiments, the tag identifier 4221 may be configured to process the input data to determine one or more tags to be associated with the input data. As one example, the tag identifier 4221 may use a data tagging service to identify a set of one or more tags to be associated with the input data. The tag identifier 4221 may provide then provide the tags associated with the input data (and also the user content in some implementations) to a recommended content item identifier and ranker subsystem 4224 (which may be referred to for brevity as the content item ranker 4224) for further processing.

In some embodiments, tag identifier 4221 may use the various techniques used by the content tagger 4222, and described above, to determine the one or more tags to be associated with the received user content. In some embodiments, tag identifier 4221 and content tagger 4222 may both use the same superset of tags from which tags to be associated with the user input and the content items are determined. In certain embodiments, tag identifier 4221 and content tagger 4222 may use the same data tagging service for identifying tags to be associated with the user content, and the content items, respectively. In yet other embodiments, the tag identifier 4221 and content tagger 4222 subsystems may be implemented as a single subsystem configured to perform similar (or even identical) processes on the content items received from repositories 4230 and the input content received from client systems 4210.

As described, when the content items are tagged by content tagger 4222, for each content item, one or more tags to be associated with the content item are identified along with a tag value for each tag. With respect to tagging for user contents, in some embodiments, tag identifier 4221 is configured to only determine the tags to be associated with the user input without any associated tag values. In such embodiments, each tag is given equal weight with respect to the ranking performed by the content item ranker 4224 based upon the tags associated with the user input. In some other embodiments, both tags and associated tag values may be determined for the user content and used by the content item ranker 4224 for ranking the content item recommendations.

As described above, the user content that is received and processed by tag identifier 4221 can come in different forms. For example, the user content can include contents of a document (e.g., emails, articles, blog posts, documents, social media posts, images, etc.) being authored by a user, content created or selected by a user (e.g., multi-media files), and the like. As another example, the user input can be a document (e.g., a webpage) accessed by a user. As yet another example, the user content could be search terms input by a user (e.g., a browser-based search engine) for performing a search. In certain embodiments, for example, for search terms, the terms themselves may be used as tags.

As depicted in FIG. 42 and described above, the content item ranker 4224 receives as input, from the tag identifier 4221, information identifying a set of one or more tags associated with the user content. Based upon this tag information for the user content and based upon the content items available for recommendations, the content item ranker 4224 is configured use tag matching techniques to identify one or more content items that are most related to and/or relevant to the input content. In cases where multiple content items are identified as being related or relevant to the user input, the content item ranker 4224 is further configured to use innovative ranking techniques described herein to rank the content items. More details related to various techniques used by the content item ranker 4224 for scoring and ranking the content items are described in more detail below. The content item ranker 4224 is configured to generate a ranked list of content items to be recommended to the user in response to the user input received for the user. The ranked list of the content items is then provided to a recommendation selector subsystem 4225 for further processing.

Using the ranked list of content items received from the content item ranker 4224, the recommendation selector 4225 is configured to select one or more particular content items to be recommended to user responsive to the input content received from the client system 4210. In certain scenarios, all the content items in the ranked list may be selected for recommendation. In some other scenarios, a subset of the ranked content items may be selected for recommendation, where the subset includes less than all the content items in the ranked list and the one or more content items included in the subset are selected based upon the rankings of the content items in the ranked list. For example, the recommendation selector 4225 may select the top "X" ranked (e.g., top 5, top 10, etc.) content items from the ranked list for the recommendation, where X is some integer that is less than or equal to the number of ranked items. In certain embodiments, the recommendation selector 4225 may select the content items to be included in the subset to be recommended to the user based upon the scores associated with the content items in the ranked list. For example, only those content items having associated scores above a user-configurable threshold score may be selected to be recommended to the user.

Information identifying the content items selected for recommendation by the recommendation selector 4225 may then be communicated from the content recommendation system 4220 to a user client device 4210 of the user. The information regarding the recommend content items may then be output to the user via the user client device. For example, information regarding the recommendations may be output via a GUI 4215 displayed on the user client device or via an application 4215 executed by the user client device. For example, if the user input corresponded to a search query input by a user via a webpage displayed by a browser executed by the user device, the information regarding the recommendations may also be output to the user via that webpage or additional webpages displayed by the browser. In certain embodiments, for each recommended content item, the information output to the user may include information identifying the content item (e.g., text information, a thumbnail of an image, etc.) and information for accessing the content item. For example, the information accessing the content item may be in the form of a link (e.g., an URL), which when selected by the user (e.g., by a mouse clicking action) causes the corresponding content item to be accessed and displayed to the user via the user client device. In some embodiments, the information identifying the content item and information for accessing the content item may be combined (e.g., a thumbnail representation of a recommended image that both identifies the image content item and can also be selected by the user to access the image itself.)

In various embodiments, the content recommendation system 4220, including its associated hardware/software components 4221-4225 and services may be implemented as back-end services remote from the front-end client devices 4210. Interactions between client devices 4210 and the content recommendation system 4220 may be Internet-based web browsing sessions, or client-server application sessions, during which users access may input user content (e.g., search terms, original authored content, etc.) via client devices 4210, and may receive content item recommendations from the content recommendation system 4220. Additionally or alternatively, the content recommendation system 4220 and/or content repositories 4230 and related services may be implemented as specialized software components executing directly on a client device In some embodiments, system 4200 shown in FIG. 42 may be implemented as a cloud-based multi-tiered system, in which upper-tier user devices 4210 may request and receive access to the network-based resources and services via the content recommendation system 4220 residing on back-end application servers deployed and executed upon an underlying set of resources (e.g., cloud-based, SaaS, IaaS, PaaS, etc.). Some or all of the functionality described herein for the content recommendation system 4220 may be performed by or accessed using Representational State Transfer (REST) services and/or web services including Simple Object Access protocol (SOAP) web services or APIs, and/or web content exposed via Hypertext Transfer Protocol (HTTP) or HTTP Secure protocols. Thus, although not shown in FIG. 42 so as not to obscure the components shown with additional details, the computing environment 4200 may include additional client devices, one or more computer network(s), one or more firewalls, proxy servers, routers, gateways, load balancers, and/or other intermediary network devices, facilitating the interactions between the client devices 4210, content recommendation system 4220, and content repositories 4230.

In various implementations, the systems depicted in computing environment 4200 may be implemented using one or more computing systems and/or networks, including specialized server computers (such as desktop servers, UNIX servers, mid-range servers, mainframe computers, rack-mounted servers, etc.), server farms, server clusters, distributed servers, or any other appropriate arrangement and/or combination of computing hardware. For instance, content recommendation system 4220 may run an operating system and/or a variety of additional server applications and/or mid-tier applications, including HyperText Transport Protocol (HTTP) servers, File Transport Service (FTP) servers, Common Gateway Interface (CGI) servers, Java servers, database servers, and other computing systems. Any or all of the components or subsystems within the content recommendation system 4220 may include at least one memory, one or more processing units (e.g., processor(s)), and/or storage. The subsystems and/or modules in the content recommendation system 4220 may be implemented in hardware, software (e.g., program code or instructions executable by a processor) executing on hardware, or combinations thereof. In some examples, the software may be stored in a memory (e.g., a non-transitory computer-readable medium), on a memory device, or some other physical memory, and may be executed by one or more processing units (e.g., one or more processors, one or more processor cores, one or more Graphics Process Units (GPUs), etc.). Computer-executable instructions or firmware implementations of the processing unit(s) can include computer-executable or machine-executable instructions written in any suitable programming language, which can perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some examples, computer-readable storage media may be configured to protect a computer from an electronic communication containing malicious code.

FIG. 43 depicts a simplified flowchart 4300 depicting processing performed by a content recommendation system for identifying and ranking content items that are relevant to user content according to certain embodiments. The processing depicted in FIG. 43 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 43 and described below is intended to be illustrative and non-limiting. Although FIG. 43 depicts the various processing steps occurring in a particular sequence or order, this is not intended to be limiting. In certain alternative embodiments, the processing may be performed in some different order or some steps may also be performed in parallel. The processing depicted in FIG. 43 may be performed by one or more systems depicted in FIG. 42, such as by the content recommendation system 4220. As an example, for the embodiment depicted in FIG. 42, the processing in 4302 and 4304 may be performed by tag identifier 4221, the processing in 4306 to 4316 may be performed by the content item ranker 4224, and the processing in 4318 and 4320 may be performed by recommendation selector 4225. However, it should be understood that the techniques and functionalities described in connection with FIG. 43 need not be limited only to implementations within the specific computing infrastructure shown in FIG. 42, but may be implemented using the other compatible computing infrastructures described herein.

In 4302, the content recommendation system 4220 may receive input content from one or more user or client systems 4210. As discussed above in reference in to FIG. 42, the input content may be received from a client device 4210, through a graphical user interface 4215 (e.g., a web-based GUI) provided by the content recommendation system 4220. In other examples, the input content may be received by a web server or backend service executing within the content recommendation system 4220, based on data transmitted by a front-end application (e.g., mobile application) installed on the client device 4210.

In some embodiments, the input content received in step 4302 may correspond to a set of search terms or phrases, input by a user into a search engine user interface. In other embodiments, the input content may correspond to original content authored by a user and input into a specialized user interface. For example, new original content may include on-line articles, newsletters, emails, blog entries, and the like, and such content may be input by the user via software-based word processor tools, email client applications, web-development tools, etc. In still other examples, the input content received in step 4302 may be an image, graphic, audio input, or any other text and/or multimedia content which is generated or selected by the user via a client device 4310.

Figure 44:
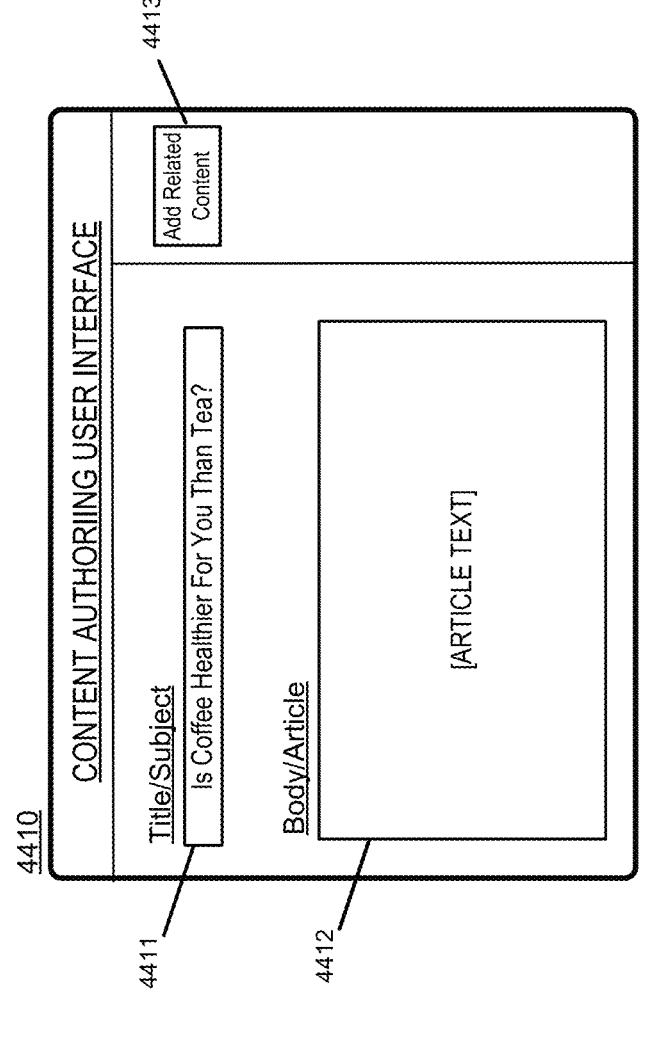
FIG. 44 is an example screen of a content authoring user interface in accordance with certain embodiments of the present disclosure.

Referring briefly to FIG. 44, an example user interface 4400 is shown, including a user interface screen 4410 that allows users to input original authored content. In this example, the user interface screen 4410 is generically labeled "Content Authoring User Interface," however, in various embodiments the user interface 4410 may correspond to an interface for a word processor, an article designer or blog entry creator, an email client application, or the like. In this example, the user interface 4410 includes a first textbox 4411 where the user may input a title or subject for the authored content, and a second textbox 4412 where the user may input the full text (e.g., article, email body, document, etc.) for the input content. Additionally, user interface 4410 includes a selectable button 4413 that allow the user to initiate a search for relevant content items (e.g., images, related articles, etc.) that may be incorporated into the newly authored content. In some cases, the selection of button 4413, or a similar user interface component, may initiate the process shown in FIG. 43, by initially analyzing and transmitting the user content received via the user interface 4410 (e.g., user content entered in 4411 and/or 4412) to the content recommendation system 4220. In other embodiments, a background process may run continuously (or periodically) within the front-end user interface, to continuously (or periodically) analyze the new text input received from the user (e.g., content input by the user in 4411 and/or 4412) and to re-initiate the process of FIG. 43 in response to text updates, so that the content item recommendations may be continuously or periodically updated in real time.

Referring back for FIG. 43, in 4304, the content recommendation system 4220 determines one or more tags for the input content received in step 4302. In some embodiments, the input content received in 4302 may already have tags associated with it or embedded in the input content, and the tag identifier 4221 may identify and extract a set of predetermined tags associated with the input content. If the input content received in step 4302 corresponds to search terms, then the tag identifier 4221 may simply use the search terms inputted by the user as the tags (e.g., excluding certain words such as articles, connective words, prepositions, quantifiers, etc.). In the case of originally authored text content, or any other non-tagged input content received by the content recommendation system 4220, the tag identifier 4221 may be configured to analyze the various features of the input content received in 4302, and determine one or more tags to be associated with the received input content based on the analysis. As previously described, the tag identifier 4221 may use various different techniques to determine one or more tags to be associated with the input content received in 4302.

Returning to the example user interface 4400 shown in FIG. 44, for this example, the input content received in 4302 may correspond to text input by the user in the subject/topic box 4411, namely, "Is Coffee Healthier For You Than Tea?" and text entered in box 4412 Based on an analysis of the subject content in 4411 and the body text of the authored article in 4411, and any additional input content that may be provided, the content recommendation system 4220 may determine in 4304 that tags "coffee," "tea," and "human" are to be associated with the user content.

In 4306, based upon the tags determined for the input content in 4302, the content recommendation system 4220 uses a tag matching technique to identify a set of matching content items from the collection of content items available for recommendation, where a content item is considered to be a match and identified in 4306 if at least one tag associated with the content item matches a tag determined for the input content in 4304. The set of content items identified in 4306 may also be referred to the matching set of content items and includes content items that are candidates for being recommend to the user responsive to the input content received in 4302. In various embodiments, data processing techniques such as stemming and synonym retrieval/comparison may be used as part of the matching process in 4306 to identify matching tags.

For example, in the embodiment depicted in FIG. 42, the collection of content items available for recommendations along with their associated tag information (e.g., tags associated with the content items and associated tag values) may be stored in the content/tag information data store 4223. As part of the processing in 4306, the content recommendation system 4220 may compare the one or more tags determined in 4304 to the tags associated with content items available for recommendation and identify those content items from the collection having at least one associated tag that matches a tag identified in 4304.

Continuing with the example of FIG. 44 and assuming that tags "coffee," "human," and "tea" have been determined in 4304 for the user input content received in 4302, example table 4500 in FIG. 45 shows a matching set of content items that have been identified by the content recommendation system 4220 (e.g., by the content item ranker 4224) from the collection of content items available for making recommendations. As can be seen from table 4500, eight different image content items have been identified as having at least one associated tag that matches at least one of tags "coffee," "human," or "tea." As shown in this example, each matched image content item is identified using an image identifier 4501. The image description 4502 provided in FIG. 45 is a description of the contents of the matched images and has been provided in FIG. 45 so that that actual images do not have to be shown. Each matched image has one or more associated tags 4503 and a tag value 4504 is associated with each tag. In the example in table 4500, the tag values are floating point values with a predetermined range (e.g., between 0.0 and 1.0), and where the sum of the tag values for each content item sum to the same total (e.g., 1.0). Such embodiments provide additional technical advantages, for example, the uniformity in the sums of the tag count score and the TVBS may assure that content items having more associated tags are not ranked higher artificially or over-recommended based on the larger number of associated tags. Further, as discussed below, by having tag values ranging between 0.0 and 1.0, when they are multiplied (for example, in a use case described below), the resultant values allow content items to be ranked within a particular group or bucket, while assuring that the highest ranked content items within one group do not outrank the lowest ranked content items within the next higher group.

It can be seen from FIG. 45 that a content item (in this example, an image) is deemed to be a match if at least one tag associated with the content item matches a tag associated with the input content. A matched content item may have associated tags that match one or more of the tags associated with the input content. A matched content item may also have other tags associated with it that are different from the tags for the input content (e.g., Image_1, Image_3, etc.)

In 4308, a tag count score (first score) is computed for each matching content item identified in 4306 based upon the number of tags associated with the content item that match tags determined for the input content. In some scenarios, each matching tag of the content item is given a value of one, and so the tag count score computed in 4308 for a content item equals the number of tags of the content item that match the tags associated with the input content. For the example matching images identified in FIG. 45, table 4600 in FIG. 46 identifies that tag count scores 4602 for each of the matching images identified in FIG. 45 (and also in FIG. 46). For example, the tag count score for Image_1 is "1" (one) since one tag ("human") associated with the image matched tags associated with the input content. As another example, the tag count score for Image_2 is "2" (two) since two tags ("coffee" and "human") associated with the image matched tags associated with the input content. As yet another example, the tag count score for Image_8 is "1" (one) since one tag ("coffee") associated with the image matched tags associated with the input content.

In 4310, the matching content items are grouped (bucketed) into groups or buckets based upon the tag counts scores computed for the content items in 4308. In certain embodiments, a group (or bucket) contains all content items having the same tag count score. In scenarios where each matching tag of the content item is given a value of one, each group or bucket includes content items having the same number of matched tags. Processing in 4310 may be optional and may not be performed in certain embodiments.

Figure 46:
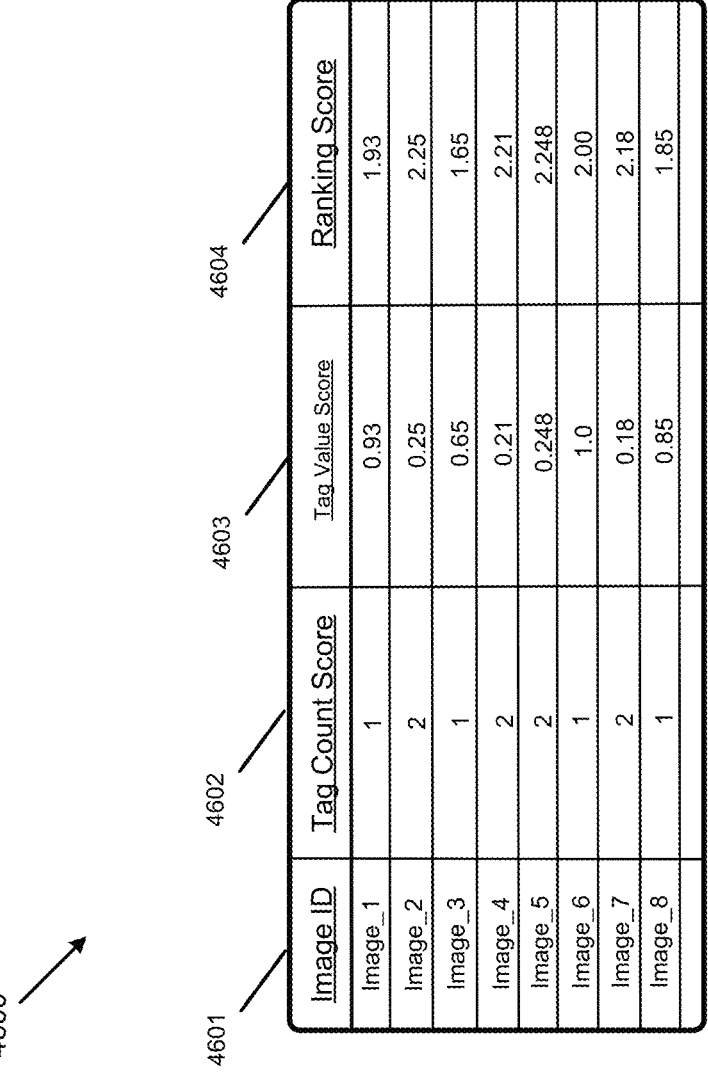
FIG. 46 shows another example table of a matching set of content items including ranking scores, in accordance with certain embodiments of the present disclosure.

Continuing with the example shown in FIG. 46, the eight matching image may be grouped into two groups or buckets: a first group or bucket including content items having a tag count score of 1 (one) and a second group of bucket having a tag count score of 2 (two). The first group will include images {Image_1, Image_3, Image_6, and Image_8} and the second group will include images {Image_2, Image_4, Image_5, and Image_7}. Notably, in this example, none of the matched images matched all three tags ("coffee," "human," "tea") associated with the input content.

In 4312, for each group identified in 4310, a tag value based score (second score) is calculated for each of the candidate content items in that group. In some embodiments, the tag value based score TVBS) for a particular content item is based upon and calculated using the tag values associated with the matching tags for the content item.

In certain embodiments, the TVBS for a content item is calculated by multiplying the tag values associated with the tags of the content item that matched the tags associated with the input content. For example:

TVBS for Image_1 in FIG. 46=0.93

TVBS for Image_2 in FIG. 46=0.5*0.5=0.25

TVBS for Image_3 in FIG. 46=0.65

TVBS for Image_4 in FIG. 46=0.35*0.60=0.21, and so on.

Table 4600 shows TVBSs 4603 calculated for the various matching images using the above-described technique. In certain embodiments, a Naïve Bayes approach is used for computing the tag value based score for a content item. For example, assuming that two tags $tag_1$ and $tag_2$ are determined for the input content, then the tag value based score (TVBS) for an image content item can be expressed as:

$TVBS$ for $Image_i =$ $P(Image_i/tag_1, tag_2) =$ probability of $Image_i$ given tags $tag_1$ and $tag_2$ Extending this for "$n$" tags:

$P(Image_i/tag_1, tag_2 \ldots, tag_n) =$ probability of $Image_i$ given (tags $tag_1$ and $tag_2$ and $\ldots tag_n$)

Assuming the tags $tag_1$, $tag_2 \ldots$, $tag_n$ to be mutually independent:

$TVBS$ for $Image_i = TVBS_i = P(Image_i/tag_1, tag_2 \ldots, tag_n) =$ $P(Image_i/tag_1) * P(Image_i/tag_2) * \ldots * P(Image_n/tag_n)$ Now by Simple Naïve Bayes:

$$P(Imagei \mid tagt) = \frac{P(tagt \mid Imagei) * P(Imagei)}{P(tagt)}$$

Where:

P($Image_i$| $tag_t$)=probability of $tag_t$ for the $Image_i$

P($Image_i$)=consider every image as unique and this term can be discarded or ignored P($tag_t$)=frequency of the tag in the collection of content items (i.e., the number of content items (e.g., images) in the collection of content items available for recommendation that are tagged with $tag_t$). As this term is in the denominator, the less frequent the tag is present in the collection of content items (i.e., the lesser number of content items having this associated tag), the higher will be the TVBS score for an image having the tag.

Upon expansion, the above formula becomes:

$P(Imagei \mid tag1, tag2 \ldots, tagn) =$ $$\frac{P(tag1 \mid Imagei)}{P(tag1)} * \frac{P(tag2 \mid Imagei)}{P(tag2)} * \ldots * \frac{P(tagn \mid Imagei)}{P(tagn)}$$

The numerator in the above Equation 3 is the multiplication of the probabilities that will result in higher score when the probabilities are equally likely (given the same tags matched for multiple images, the denominator will remain the same).

The following example illustrates the application of Equation 3 for calculating TVBSs for content items. Assume that the tags determined for input content are "human" and "coffee." Further assume that a collection of content items (images) available for recommendations contains three images with the following tags and tag values:

Image A: ("human", 0.5), ("coffee", 0.5)

Image B: ("human", 0.1), ("coffee", 0.9)

Image C: ("human", 0.8), ("coffee", 0.2)

For Image A:

$$P(\text{human} \mid \text{image}) = 0.5 \text{ and } P(\text{coffee} \mid \text{image}) = 0.5$$

Applying Equation 3, $$TVBS \text{ for Image } A = P(\text{Image } A \mid \text{human, coffee})$$

$$= P(\text{Image } A \mid \text{human}) * P(\text{Image } A \mid \text{coffee})$$

$$= \frac{P(\text{human} \mid \text{Image } A)}{P(\text{human})} * \frac{P(\text{coffee} \mid \text{Image } A)}{P(\text{coffee})}$$

$$= \frac{0.5}{\text{Frequency(human)}} * \frac{0.5}{\text{Frequency(coffee)}}$$

$$= \frac{0.5}{\text{Frequency(human)}} * \frac{0.5}{\text{Frequency(coffee)}}$$

Where "Frequency (human)" is the number of content items in the collection of content items available for recommendation that have a "human" tag associated with them, and "Frequency (coffee)" is the number of content items in the collection of content items available for recommendation that have a "coffee" tag associated with them $$= \frac{0.5}{3} * \frac{0.5}{3}$$

$$TVBS \text{ for Image } A = 0.028$$

Using a similar technique, $$TVBS \text{ for Image } B = (0.1/3) * (0.9/3) = 0.01$$

$$TVBS \text{ for Image } C = (0.8/3) * (0.2/3) = 0.018$$

As can be seen from this example, where the frequencies are the same, the TVBS is higher when the probabilities are equally likely (given the same tags matched for multiple images, the denominator will remain the same).

As per the expansion of Equation 3, the frequencies of content items in the collection of content items having a particular associated tag are taken into consideration for calculating TVBSs (and thus also impact the overall ranking score as described below). The fewer number of content items having a particular associated tag (i.e., lower frequency), the higher the TVBS score will be for an image having the particular tag. In some embodiments this is desirable to increase the likelihood of such content items with "rare" or less frequent tags to be ranked higher than content items with more frequent tags ranked higher and thus increase the likelihood of them being included in the list of content items that is recommended to a user. The value of the TVBS for a content item is thus inversely proportional to the frequency of occurrences of a particular tag appearing in the collection of content items (i.e., the number of content items in the collections having the associated particular tag).

In 4314, an overall ranking score is calculated for each matching content item identified in 4306 based upon the tag count score calculated for the content item in 4308 and the TVBS calculated for the content item in 4312. In some embodiments, the overall ranking score for a candidate content item may be calculated as the sum of the tag count score (calculated in 4308) and the TVBS (calculated in 4312) calculated for the content item. That is, for the image content item Image$_i$:

$$\text{Ranking Score (Image}_i) = TagsCountScore_i + TVBS_i$$

For the example depicted in FIG. 46, column 4604 indicates the overall ranking score computed for each matching image by, for each matching image, adding the tag count score for that image (indicated in column 4602) and the TVBS for the image (indicated in column 4603). For example, the calculated overall ranking scores are as follows:

$$\text{Image\_1:1} + 0.93 = 1.93$$

$$\text{Image\_2:2} + 0.25 = 2.25$$

$$\text{Image\_3:1} + 0.65 = 1.65, \text{ and so on.}$$

In step 4316, the content recommendation system 4220 (e.g., the content items ranker 4224 in the content recommendation system 4220) generates a ranked list of the matching content items based upon the overall ranking scored computed for the content items in 4314. Thus, continuing with the example of FIGS. 44-46, based upon the overall ranking scores (in column 4604) computed for the matching images, the Images may be ranked, from highest to lowest, as follows: (1) Image_2, (2) Image_5, (3) Image_4, (4) Image_7, (5) Image_6, (6) Image_1, (7) Image_8, (8) Image_3.

In certain embodiments wherein the tag values for the tags are in the range between 0.0 and 1.0, the computation of the overall ranking score using the (TagCountScore+TVBS) approach ensures that a content item having a higher number of associated tags that matched tags associated with the input content is ranked higher than a content item with a lower number of tag matches. For example, in the example in FIG. 46, an image with a tag count score of 2 (corresponding to two tags associated with the image matched tags associated with the input content) will always have an overall ranking score and thus be ranked higher than an image with a tag count score of 1 (corresponding to two tags associated with the image matched tags associated with the input content). This is because, given that the tag values range between zero and one, the TVBS for the image, which is computed by multiplying the tag values associated with the matching tags, cannot exceed one. This also implies that, for a first group or bucket of content items corresponding to a first tag count score and a second group or bucket of content items corresponding to a second tag count score, if the first tag count score is higher than the second tag count score, then each content item in the first group will be ranked higher (sue to higher overall ranking scores) than the content items in the second group. Thus, in the example where three tags ("coffee," "human," and "tea") were determined for the input content, content items having three content tag matches to the tags for the input content will always outrank the content items having two matching content tags, each of which will always outrank the content items having one matching content tag, and so on. Within each group or bucket, the content items may be ranked based on their TVBSs, which favor both higher and more equal parameters for the matching content tags. However, it should be understood that in other embodiments, different equations or logic may be used for calculating tag count scores, TVBSs, and overall ranking scores, in order to implement different content item ranking priorities and policies.

In 4318, the content recommendation system 4220 (e.g., the recommendation selector 4225) may use the ranked list generated in 4316 to select one or more content items to be recommended to the user. In certain scenarios, all the content items in the ranked list may be selected for recommendation. In some other scenarios, a subset of the ranked content items may be selected for recommendation, where the subset includes less than all the content items in the ranked list and the one or more content items included in the subset are selected based upon the rankings of the content items in the ranked list. For example, the recommendation selector 4225 may select the top "X" ranked (e.g., top 5, top 10, etc.) content items from the ranked list for the recommendation, where X is some integer that is less than or equal to the number of ranked items in the list. In certain embodiments, the recommendation selector 4225 may select the content items to be included in the subset to be recommended to the user based upon the overall ranking scores associated with the content items in the ranked list. For example, only those content items having associated scores above a user-configurable threshold score may be selected to be recommended to the user.

In 4320, the content recommendation system 4220 may communicate information regarding the content items selected in 4318 to the user device. This information may be referred to as recommendation information since it includes information regarding the content items to be recommended to the user, The recommendation information communicated in 4320 may also include ranking information (e.g., overall ranking scores associated with the selected content items). This information may be used on the user device to determine how (e.g., the order) information regarding the recommended content items is to be displayed to the user via the user device. In some embodiments, as part of the recommendation information, the recommendation selector 4225 may transmit either the content items themselves, or certain information identifying the content items (e.g., content item identifier and description, thumbnail image, network path or link for downloading, etc.) to the client device 4310 from which the input content was received in step 4302.

Information regarding the selected recommendations may then be output to the user via the user device. For example, information regarding the recommendations may be output via a GUI 4215 displayed on the user client device or via an application 4215 executed by the user client device. For example, if the user input corresponded to a search query input by a user via a webpage displayed by a browser executed by the user device, the information regarding the recommendations may also be output to the user via a webpage showing results of the search or additional webpages displayed by the browser. In certain embodiments, for each recommended content item, the information output to the user may include information identifying the content item (e.g., text information, a thumbnail of an image, etc.) and information for accessing the content item. For example, the information accessing the content item may be in the form of a link (e.g., an URL), which when selected by the user (e.g., by a mouse clicking action) causes the corresponding content item to be accessed and displayed to the user via the user client device. In some embodiments, the information identifying the content item and information for accessing the content item may be combined (e.g., a thumbnail representation of a recommended image that both identifies the image content item and can also be selected by the user to access the image itself.)

Figure 47:
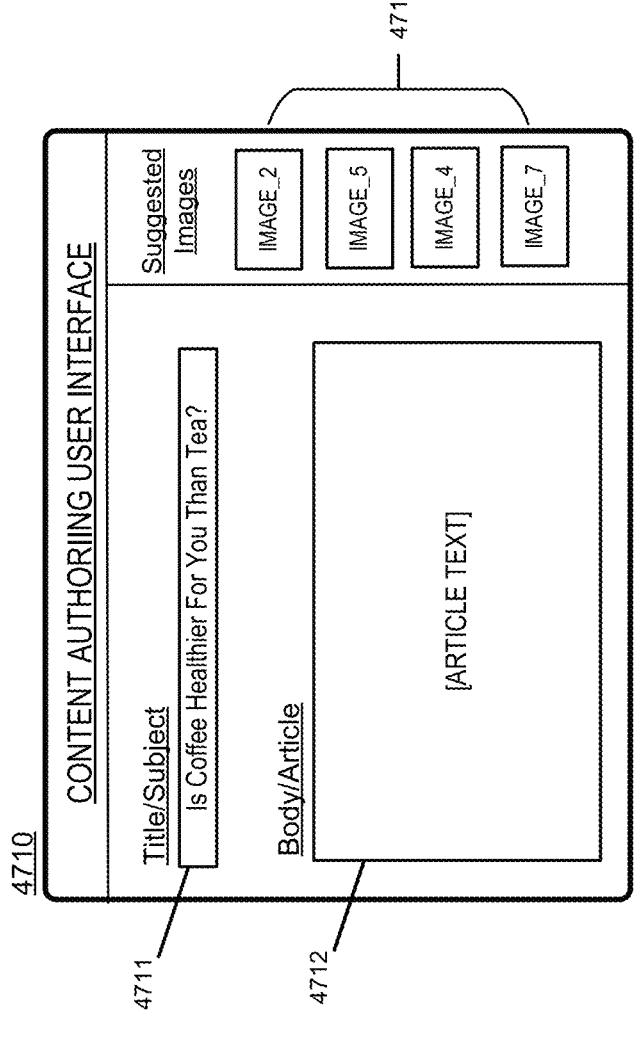
FIG. 47 is another example screen of a content authoring user interface in accordance with certain embodiments of the present disclosure.

For example, referring to FIG. 47, an example user interface 4700 is shown, corresponding to an update of the user interface screen 4400 from FIG. 44 that displays information related to recommended images. In this example, based on the title/subject 4711, the body text 4712, and/or any other input content, the content recommendation system 4220 has selected, from the ranked list of images, the four highest-ranked content item images for recommendation to the user. Information related to these top four ranked images is displayed in order of their rank within a dedicated portion 4714 of the user interface 4700 for showing content item recommendations. In certain embodiments, thumbnail representations of the recommended images may be displayed in 4714. The user interface 4700 may support drag-and-drop functionality or other techniques to allow the user to incorporate one or more of the suggested images displayed in 4714 into the body 4712 of the authored content.

The processing depicted in FIG. 43 and described above is not intended to be limiting. Various variations may be provided in different embodiments. For example, for the embodiment depicted in FIG. 43 and described above, the processing in 4312, 4314, and 4316 is performed for all the matching content items identified in 4306. In certain variations, the tag count scores calculated in 4308 may be used to filter out certain content items from further processing. For example, where the content items have different tag count scores, the content items with the lowest tag count score (or some other threshold) may be filtered out from further processing in the flowchart. In some other embodiments, only those content items having the highest tag count scores may be selected for further processing, filtering out the other content items from further processing. For example, the content item ranker 4224 might only calculate TVBSs for the highest tag score group (as determined in step 4304), or may calculate TVBSs in order from the highest to the lowest tag count score groups, during which the calculation process may stop upon reaching a threshold number of candidate content items or a threshold tag count score. Such filtering reduces the number of content items to be processed and may make the overall recommendation operation be performed faster and more efficiently using lesser processing resources (e.g., processor, memory, networking resources).

In the method depicted in FIG. 43 and described above, each tag associated with or determined for the input content in 4304 is given equal weight with respect to the ranking performed by the content recommendation system 4220. Based upon this assumption, the tag score for each matching content item was determined as the number of its content tags matching the tags of the input content. Accordingly, each of the matching content tags associated with a matching content item were valued/weight equally with respect to the determination of the tag count score. However, in other embodiments, different weights may be given to the tags associated with the input content. For example, for two tags determined for the input content, one tag may be indicated as "more important" for the input content by giving it a higher weight than the other tag. For example, for the example depicted in FIGS. 44-47 and described above, in which tags "human," "coffee," and "tea") were determined for the input content, instead of giving equal importance to the three tags, the tags be instead be weighed as follows: human=1, coffee=2, and tea=4. This weighing may indicate a relative importance of the tags to the input contents, for example, "tea" is weighed heavier than "coffee," which is weighed heavier than "human." In certain embodiments, the logic used for computing tag count scores for each content item may be modified to take into consideration the different weights assigned to the tags for the input content. According to one such modified logic, the contribution of each matching tag of the content item is multiplied by the weight associated with that same tag for the input content. For example, using the (human=1, coffee=2, and tea=4) weighing for the input content, the tag count score for the matching images in FIG. 45 would be as follows:

Image_1:
  TagCountScore (without weighing)="human" tag match=1
  TagCountScore (with weighing)="human" tag match=1*1=1

Image_2:
  TagCountScore (without weighing)="coffee" and "human" tags match=1+1=2
  TagCountScore (with weighing)="coffee" and "human" tags match=2 (1)+1 (1)=3

Image_3:
  TagCountScore (without weighing)="tea" tag match=1
  TagCountScore (with weighing)="tea" tag match=4 (1)=4

Image_4:
  TagCountScore (without weighing)="coffee" and "human" tags match=1+1=2
  TagCountScore (with weighing)="coffee" and "human" tags match=2 (1)+1 (1)=3

Image_5:
  TagCountScore (without weighing)="tea" and "human" tags match=1+1=2
  TagCountScore (with weighing)="tea" and "human" tags match=4 (1)+1 (1)=5

Image_6:
  TagCountScore (without weighing)="coffee" tag match=1
  TagCountScore (with weighing)="coffee" tag match=2 (1)=2

Image_7:
  TagCountScore (without weighing)="tea" and "human" tags match=1+1=2
  TagCountScore (with weighing)="tea" and "human" tags match=4 (1)+1 (1)=5

Image_8:
  TagCountScore (without weighing)="coffee" tag match=1
  TagCountScore (with weighing)="coffee" tag match=2 (1)=2

As a result of the different tag count scores, the grouping or bucketing of the content items performed in 4310 would be different. Thus, content items having content tags matching both the "Tea" and "Human" tags would be grouped together and assigned a tag score of 5, while content items having only one matching content tag for "Tea" would be grouped together and assigned a tag score of 4, and content items having content tags matching both the "Coffee" and "Human" tags would be grouped together and assigned a tag score of 3, and so on. Thus, in such embodiments, the overall ranking of the candidate content items is impacted by not just how many tags of the content item matched the tags of the input content but also by which specific tags of the content items match the input content tags and the weights of relative importance given to those tags. In this example, images Image_5 and Image_7 would be the highest ranking overall content items, based on their highest tag count score of 5 (Tea=4+Human=1).

Smart Content—Smart Categorization/Classification

Classifying a large amount of content in an online fashion is a complex task that involves challenges such as the single pass constraint over the data, and the requirement for fast response. In accordance with an embodiment, content users categorize similar content through a logical cluster such as a hierarchical taxonomy tree, and place similar content in the same node/category of the taxonomy tree. Over time, as both the number of content entities and the nodes in the taxonomy tree grows, similar content entities will find themselves residing alongside one another in a node. Given this state of the content organization, the content residing inside an already evaluated/categorized taxonomy can be used by a computer algorithm, such as a categorization engine, to determine where a newly created/edited may belong.

In accordance with an embodiment, systems and methods described herein can be used, for example with a content management system, to provide recommendations to categorize/classify content into user-defined categories, which in turn provides an opportunity for content managers to place new content into accurate categories with less effort, based on previously evaluated/categorized content.

A recommendation system or tool can use artificial intelligence (AI) techniques to continuously learn from past data and/or newly inputted results from generated recommendations, and assist in placing content into a relevant category through automatic categorization/classification of newly created/edited content.

The recommendation tool can be implemented and applied across diverse domains by generating feature vectors from contents, creating clusters in the feature space based on previously categorized content, and recommending a category for new content through feature space distance calculation from the clusters.

Figure 48:
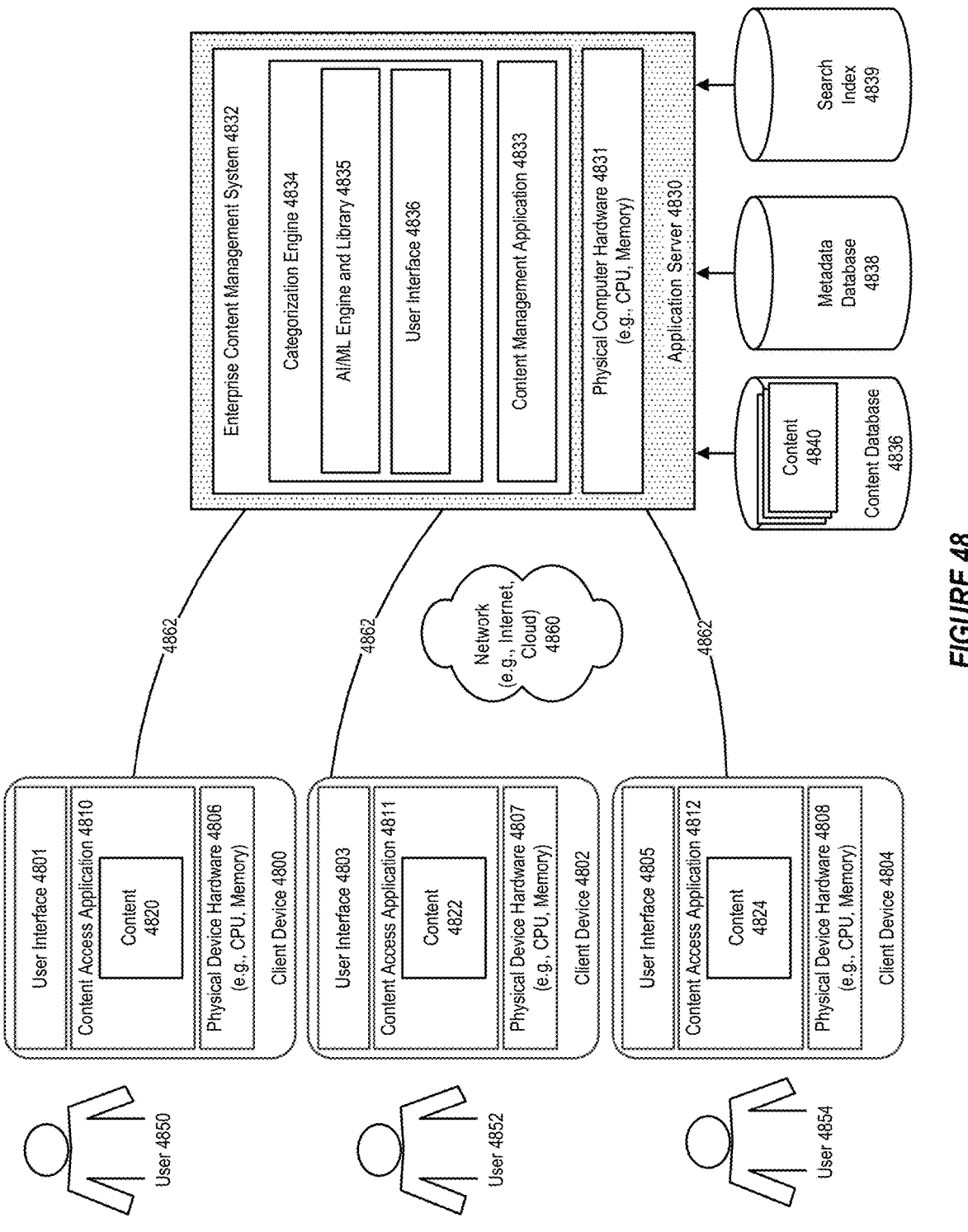
FIG. 48 illustrates an example of a content management system environment, in accordance with an embodiment.

FIG. 48 illustrates an example use of a content management system environment, in accordance with an embodiment.

More specifically, FIG. 48 illustrates an exemplary content management system which can comprise a categorization engine for the smart categorization of content at the content management system.

As illustrated in FIG. 48, in accordance with an embodiment, for each of a plurality of client devices 4800, 4802, and 4804 having a user interface 4801, 4803, 4805 and physical device hardware 4806, 4807, 4808 (e.g., CPU, memory), the client device can be provided with a content access application 4810, 4811, 4812 for execution thereon.

In accordance with an embodiment, the client device can communicate 4862 with an application server 4830 that includes a physical computer hardware 4831 (e.g. CPU, memory) and a content management system 4832.

In accordance with an embodiment, the content access application at the client device can communicate with the content management system via a network 4860 (e.g., the Internet, or a cloud environment). The content access application can be configured to enable a user 4850, 4852, 4854 to view, upload, modify, delete, or otherwise access content such as, for example content items 4820, 4822, 4824 at each client device. For example, new content can be added or uploaded to the content management system by a user interacting with the content access application on an associated client device. The content can be transmitted to the content management system for, e.g., tagging and storage.

In accordance with an embodiment, the content management system can be or include a platform for consolidating content that can be managed by a number of users or clients. In accordance with an embodiment, the content management system can be configured to communicate with a content repository 4836 for storing content (or content items) 4840, and can deliver the content to users via their client devices. In accordance with an embodiment, the content repository can be a relational database management system (RDBMS), file system, or other data store which the content management system can access. Content can include, for example, documents, files, e-mails, memos, images, videos, slide presentations, conversations, and user profiles.

In accordance with an embodiment, the content management system can be configured to associate metadata with the content. Metadata can include information about an item of content, such as, for example its title, author, release date, historical data such as, for example who has accessed the item and when, a location where the content is stored, and the like.

In accordance with an embodiment, the metadata can be stored in a metadata database 4838. In accordance with an embodiment, the content management system can be configured to communicate with the metadata database to access metadata stored therein, and to store metadata generated by the system in the metadata database.

In accordance with an embodiment, the content management system can also be configured to communicate with a search index 4839. The search index can be configured to provide indexing and searching of content and data stored in the content repository and the metadata database. In accordance with an embodiment, the search index can be a relational database management system (RDBMS) or a search tool such as, for example Oracle Secure Enterprise Search (Oracle SES).

In accordance with an embodiment, the content management system can further include a content management application 4833, and a categorization engine 4834. The categorization engine can comprise an Artificial Intelligence/Machine Learning Engine and Library 4835, as well as a user interface 4836, which can be used, for example, to display outputs indicative of recommendations for content categorizations and/or receive inputs indicative of selections of content categorizations.

In accordance with an embodiment, the categorization engine can be used, for example with a content management system, to provide recommendations to categorize/classify content into defined (e.g., user-defined) categories, which in turn provides an opportunity for content managers to place new content into accurate categories effortlessly, based on previously evaluated/categorized content. The categorization engine can use artificial intelligence (AI) techniques and a, e.g., machine learning library, to continuously learn from past data, and assist in placing content into a relevant category through automatic categorization/classification of newly created/edited content. The recommendation tool can be implemented and applied across diverse domains by generating feature vectors from contents, creating clusters in the feature space based on previously categorized content, and recommending a category for new content through feature space distance calculation from the clusters. The engine can, additionally or alternatively, automatically categorized content via its calculations.

Generally described, in accordance with an embodiment, the categorization engine can be used to create a new taxonomy, modify an existing taxonomy structure, and/or categorize/classify existing and/or new content in bulk according to various recommendations or suggestions associated with various confidence scores or confidence levels (such as high, medium, or low confidences).

For example, in accordance with an embodiment, lower-confidence recommendations of categories/classifications associated with a particular set of content can be ignored by the system or user, while high/medium-confidence recommendations of categories can be accepted.

In accordance with an embodiment, the categorization engine can display such recommendations or suggestions of categories/classifications associated with a particular set of content in a user interface, for a content administrator to review and/or act upon.

For example, while working with a set of new content, the system can, based on a previous classification of various content, suggest or recommend one or more categories/classifications for the new content, and the content administrator can then elect to accept or reject the assignation of those categories/classifications to that content.

In accordance with an embodiment, such acceptances or rejections of the categorization suggestions by the users or content administrators can be stored at a database, such as the database of the content categorization engine. Such historical records can be utilized to refine future recommendations for content categorizations.

In accordance with an embodiment, classification can be performed as a two-phase process, including a macro-level classification phase, wherein a topic distribution and named entity distribution of a document can be matched with higher-level cluster nodes; and a micro-level classification phase, wherein categories can be expanded and compared in a feature space based on an evaluation of micro-clusters.

Figure 49:
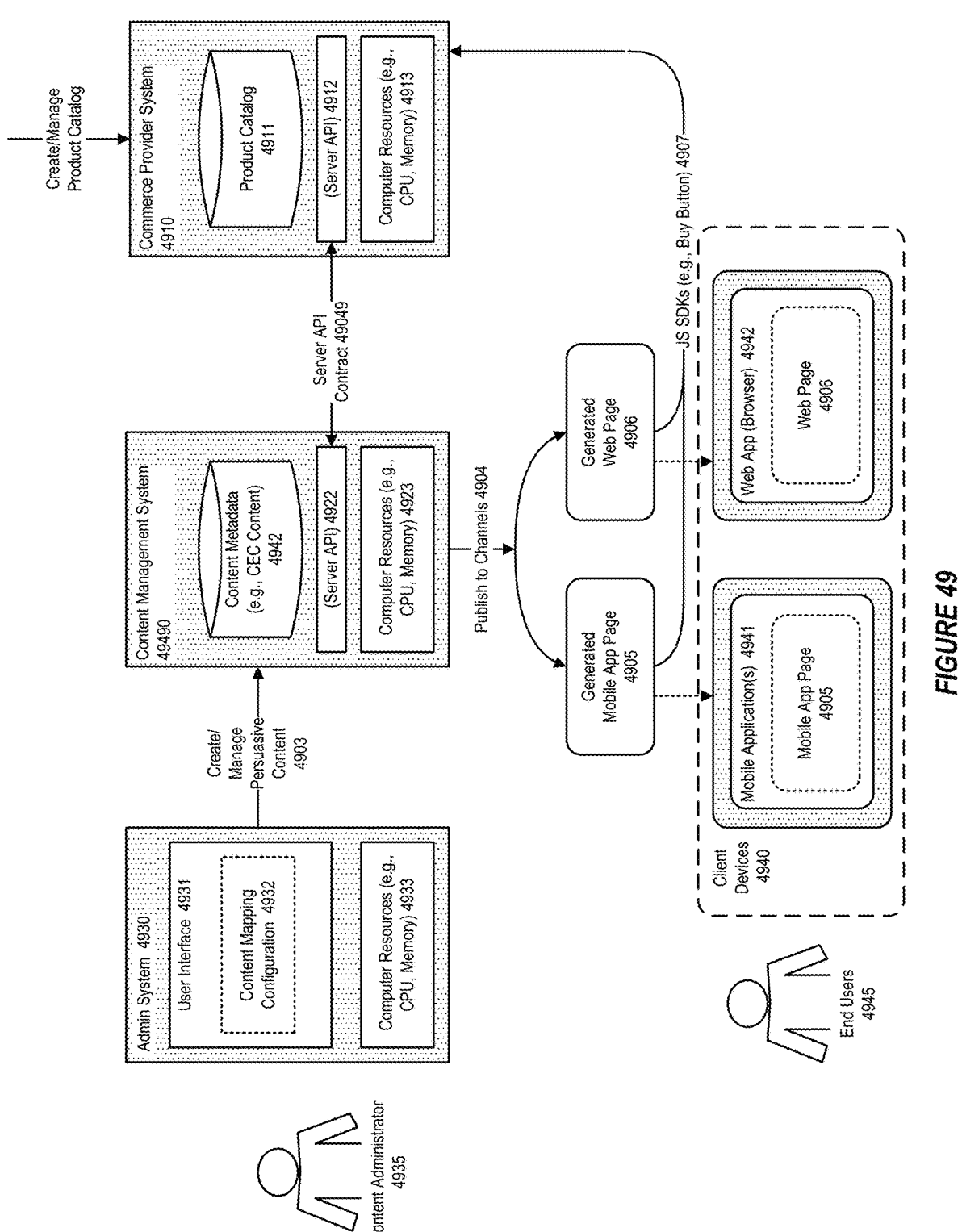
FIG. 49 illustrates an example use of a content management system for management and delivery of content data, in accordance with an embodiment.

FIG. 49 illustrates an example use of a content management system for management and delivery of content data, in accordance with an embodiment.

In accordance with an embodiment, a content management system (CMS) allows users to collaboratively manage digital content, including web content. An example content management system is Oracle Content Management (OCM), which can be offered from and accessed through cloud services. Content management systems provide various features, such as for example, storing, administering, and publishing associated digital content. Systems such as, for example OCM, allow rapid development and publishing of content across multiple delivery channels.

In accordance with an embodiment, a delivery channel can be any form in which content is delivered to a consumer of the content. Exemplary delivery channels include websites, blogs, HTML emails, story boards, mobile applications, etc. In order to provide rapid development of the documents used by associated delivery channels, the system can include features such as, for example out-of-the-box templates, drag-and-drop components, sample page layouts, and site themes, which allow a user to assemble content into a publishable document from predefined building blocks. The content management system can use these components to generate the markup language and code (referred to herein collectively as the "code") of the document.

In accordance with an embodiment, a server application program interface (API) contract (admin API contract) can be provided that establishes interactions between a content management system and a commerce provider system (commerce provider). The server API contract operates as a contract between the content management system and the commerce provider, for example an online retailer, and enables communication and data exchange between the content management system and the commerce provider. Based on an interaction with the interactive features, in accordance with an embodiment, data and other metrics associated with the product can be retrieved from the commerce provider; or data associated with a request can be sent to the commerce provider, to perform an action associated with the product.

In accordance with an embodiment, a commerce provider system 4910 can be provided in a system to manage and deliver content data. The commerce provider system can comprise a product catalog 4911, an API, such as, for example server API 4912, as well as physical computer resources, such as, for example CPU, memory 4913.

In accordance with an embodiment, a content management system 4920 can comprise a content metadata database 4921 (e.g., OCM Content and Metadata databases), an API, such as, for example server API 4922, as well as physical computer resources, such as, for example CPU, memory 4923.

In accordance with an embodiment, a content administrator 4935 can interact with an admin system 4930 in such a system to create/manage and deliver content data 4903. The admin system can comprise or provide a user interface 4931, which can comprise or provide a content mapping configuration 4932. The admin system can also comprise physical computer resources, such as, for example CPU, memory, 4933.

In accordance with an embodiment, a server API contract (admin API contract) 49049 can operate as a contract between the content management system and the commerce provider. For example, the server API contract can be configured to receive account information and credentials that are associated with a user account at the commerce provider.

In accordance with an embodiment, the content management system can use the received account credentials to authenticate an administrative user (e.g., content administrator) of the content management system, at the commerce provider system, via the server API (admin API); which provides access by the content management system to data stored at the commerce provider system. For example, the content management system can request, via the server API, that the commerce provider send data describing/defining a set of products offered for sale by the commerce provider. The commerce provider system can then send such data to the content management system via the server API. This data can include, for example, a list of products, along with the data describing the list of products.

In accordance with an embodiment, the content management system can publish the content 4904 in a number of different channels, such as, for example via a generated mobile application page 4905, or via a generated web page 4906.

In accordance with an embodiment, end users 4945 can access such generated pages via a client device 4940, for example via a mobile application 4941 displaying the generated mobile application page 4905, or via a web application, such as, for example a browser 4942, accessing and displaying the generated web page 4906.

In accordance with an embodiment, publishable content (e.g., a web page or mobile application (app) page) can be built using code libraries, such as, for example a software development kit (SDK) 4907, which defines functionality and visual content components such as, for example a "Buy" button.

Macro/Micro Classification Process

In accordance with an embodiment, classification can be performed as a two-phase process, including a macro-level classification phase, wherein a topic distribution and named entity distribution of a document can be matched with higher-level cluster nodes; and a micro-level classification phase, wherein categories can be expanded and compared in a feature space based on an evaluation of micro-clusters.

Figure 50:
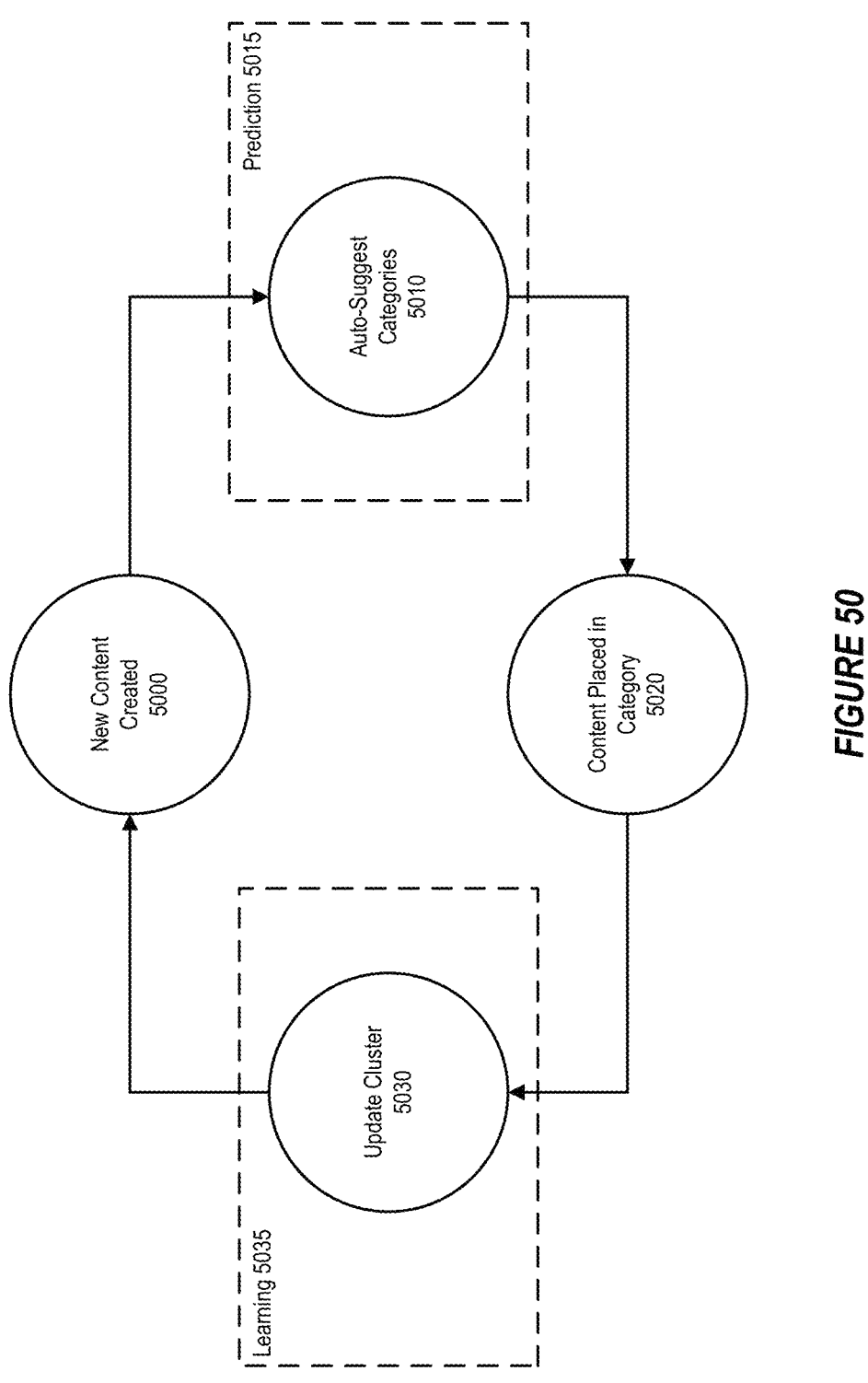
FIG. 50 illustrates a smart content classification flow diagram, in accordance with an embodiment.

FIG. 50 illustrates a smart content classification flow diagram, in accordance with an embodiment.

As illustrated in FIG. 50, automatic classification (also referred to herein as "auto-classification) of content into known taxonomy (such as domain specific ontologies) an be accomplished via an AI/ML system.

When new content is created 5000 (that is, new content at a content management system, such as content generated therein, or uploaded to a content management system), an engine, such as a categorization engine as described above, during a prediction phase 5015, can automatically suggest 5010 a category, or a plurality of categories, to which the newly created content should be categorized.

In accordance with an embodiment, after receiving a selection, or selections, for the categorization of the content, the content can be placed 5020 in such selected category or categories.

From such a selection, during a learning phase 5035, a cluster (e.g., a cluster stored a memory or library of a categorization engine) can be updated 5030 accordingly. As such, the prediction phase 5015 can be updated upon another newly created content 5000.

In other systems, such categorization is usually accomplished by analyzing large amount of similar data in public domain. However, in accordance with an embodiment, the described auto-classification of content in user defined category hierarchies requires a new approach; an approach that continuously observes previously evaluated/categorized content, category metadata as well as user behavior in response to categorization/classification suggestions.

In accordance with an embodiment, unevaluated/categorized or thinly evaluated/categorized content into category hierarchies presents a special challenge, in that at cold start, a system would have very little information to go on for making suggestions. Over time, businesses that use content management systems evolve, rendering old category hierarchies less relevant and even obsolete.

In accordance with an embodiment, described herein is a system and tool for automatically classifying content of various kinds into categories based on clusters of related concepts, using micro-clustered approach. This approach outperforms the classical clustering approach. Furthermore, the tool can learn from user behavior and tune itself over time by producing a number of productivity improvements for content authors. In accordance with an embodiment the system incorporates the following set of use cases:

Creation of a New Taxonomy

In accordance with an embodiment, a new taxonomy can be created using utilizing the disclosed systems and methods by, for example:

a. Receiving instructions indicative of a user creating taxonomies. In certain embodiments, a taxonomy can comprise a hierarchical classification structure, each node of the structure being a category.

b. Receiving instructions indicative of a user classifying/categorizing at least a portion of existing content items (e.g., content items already within a content management system) into these taxonomies by placing them into appropriate categories (e.g., one at a time or in bulk).

c. Receiving new content (e.g., uploaded or created within the content management system).

d. The system automatically gets notified and starts learning from the above actions.

e. The system starts recommending categories for newly created content and existing uncategorized content may belong to (for single content or in bulk).

f. The user accepts or rejects suggestions (one at a time or in bulk), the user actions inform the system to learn from it and make better recommendations.

FIG. 51 illustrates a taxonomy creation flow diagram, in accordance with an embodiment.

In accordance with an embodiment, at step 5100, as described above, the system can receive instructions indicative of a user creating one or more taxonomies. In creating the taxonomies, the instructions can further include categories under the taxonomies. In certain embodiments, a taxonomy can comprise a hierarchical classification structure, each node of the structure being a category.

In accordance with an embodiment, at step 5105, the system can receive instructions indicative of a user classifying/categorizing at least a portion of existing content items (e.g., content items already within a content management system) into these taxonomies by placing them into appropriate categories (e.g., one at a time or in bulk). This can also include the classification/categorizing of new content as well (e.g., newly content uploaded to the content management system). New content does not necessarily receive a classification or categorization.

In accordance with an embodiment, at step 5110, the system automatically is notified and starts learning from the above actions. The system starts recommending categories that newly created content and existing uncategorized content may belong to. This can be performed on an individual/ single piece of content, or such suggestions can be performed for bulk content categorizations.

In accordance with an embodiment, at step 5115, the system can receive instructions indicative of a user accepting or rejecting the generated suggestions (e.g., one at a time or in bulk).

In this way, in accordance with an embodiment at step 5120, the instructions indicative of the user actions inform the system to learn from it and make better recommendations. Based on ML and AI, the system can refine recommendations based on the recorded acceptance or rejection of the categorization suggestions.

Modification within an Existing Taxonomy Structure

In accordance with an embodiment, a modification within an existing taxonomy structure can be created using the following process.

a. The user creates new categories or changes the structure of taxonomies or classifies content.

b. The system generates suggestions for existing unevaluated/categorized or newly added content (one at a time or in bulk), including any newly added categories.

c. The user accepts or rejects suggestions (one at a time or in bulk), the user actions inform the system to make better recommendations.

FIG. 52 illustrates a taxonomy modification flow diagram, in accordance with an embodiment.

In accordance with an embodiment, at step 5200, as described above, the system can receive instructions indicative of a user adding new categories or modifying one or more existing taxonomies. The system can then receive instructions indicative of the user classifying existing or new content into the newly created category (e.g., individually or in bulk).

In accordance with an embodiment, at step 5205, the system can automatically start generating suggestions and recommendations for categorization of new content as well as existing content including the newly created categories.

In accordance with an embodiment, at step 5210, the system can receive instructions indicative of a user accepting or rejecting the generated suggestions (e.g., one at a time or in bulk).

In this way, in accordance with an embodiment at step 5215, the instructions indicative of the user actions inform the system to learn from it and make better recommendations. Based on ML and AI, the system can refine recommendations based on the recorded acceptance or rejection of the categorization suggestions.

Classifying of Content in Bulk

In accordance with an embodiment, a classification of content in bulk can be created using the following process.

a. The system enables the user to categorize/classify the set of contents into a suggested category, based on confidence score.

b. For a category, the system can place the recommended contents into three disjoint buckets (high, medium, low) based on a confidence score of the predictions for each content item.

c. The confidence score buckets provide a mechanism to group sets of content items such that bulk categorization is more easily achieved. For example, the user can accept all the content categorization suggestions for content within a high confidence score bucket and reject all the content categorization suggestions for other content within a low confidence score bucket.

d. Additionally, the user can skip the acceptance/rejection of suggestions through a global classification threshold configuration. If selected, the system can automatically assign contents into categories having a recommendation confidence score higher than a user configured threshold.

e. Usually the suggestions are generated through a backend job that automatically runs periodically. Also, the system allows a repository administrator to trigger the job manually, results in the recommender system to generate suggestions or classify contents into taxonomies assigned to the repository immediately.

Figure 53:
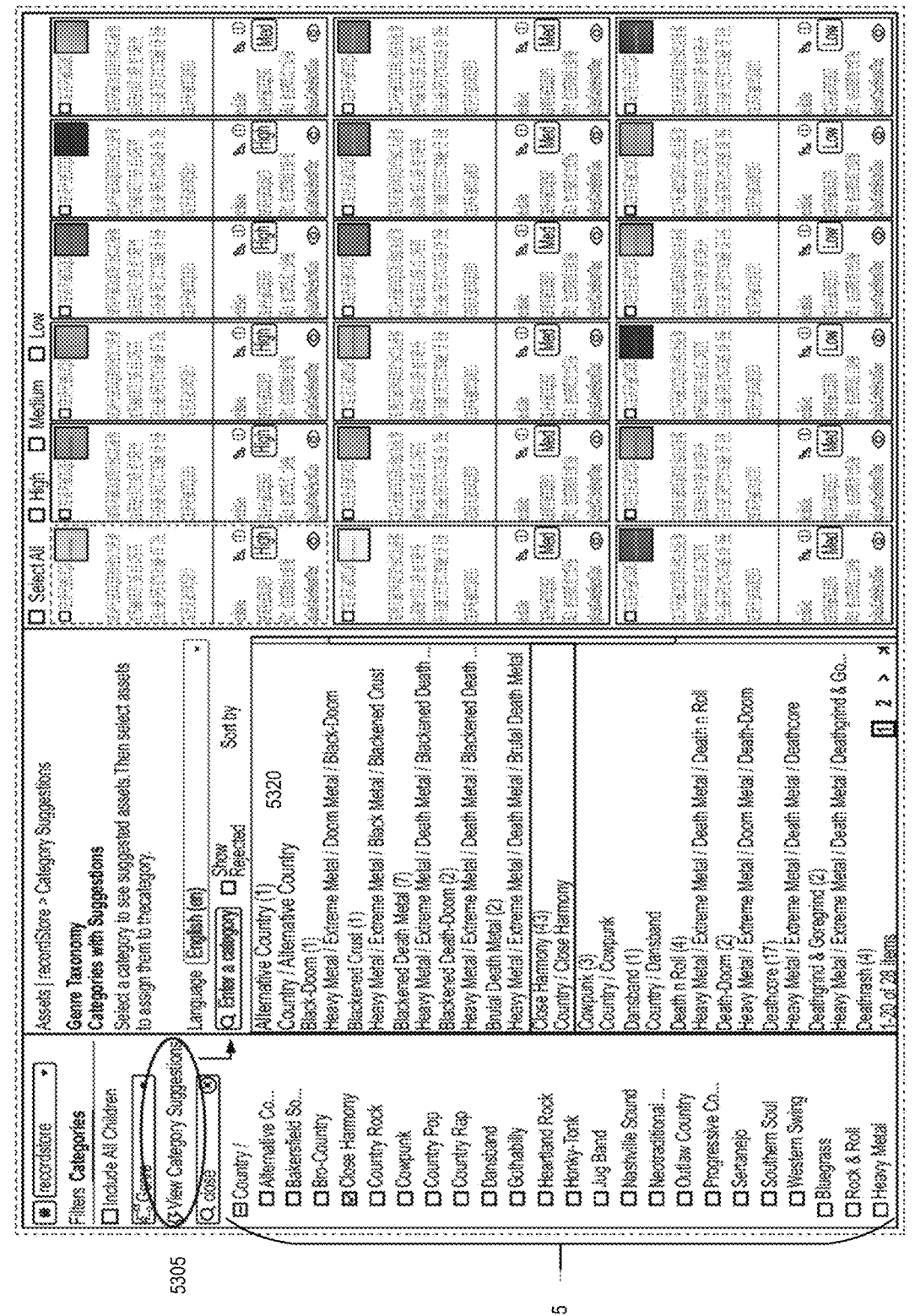
FIG. 53 illustrates a sample taxonomy tree with categories diagram, in accordance with an embodiment.

FIG. 53 illustrates a sample taxonomy tree with categories diagram, in accordance with an embodiment.

As illustrated in FIG. 53, in accordance with an embodiment, as shown in the screenshot of user interface 5300: (i) A sample taxonomy tree with categories, "View Category Suggestions" 5305 can take a user to a smart suggestions screen. This user interface 5300 is designed to assist in the classification of contents in singly or in bulk.

In accordance with an embodiment, each category in the screen shows the number of suggestions alongside the category. For example, content 5315 can be shown with a number of suggested categorizations 5320. Content suggestions are divided into three buckets (high, medium, low) based on the confidence score of that content to be placed in the category.

Figure 54:
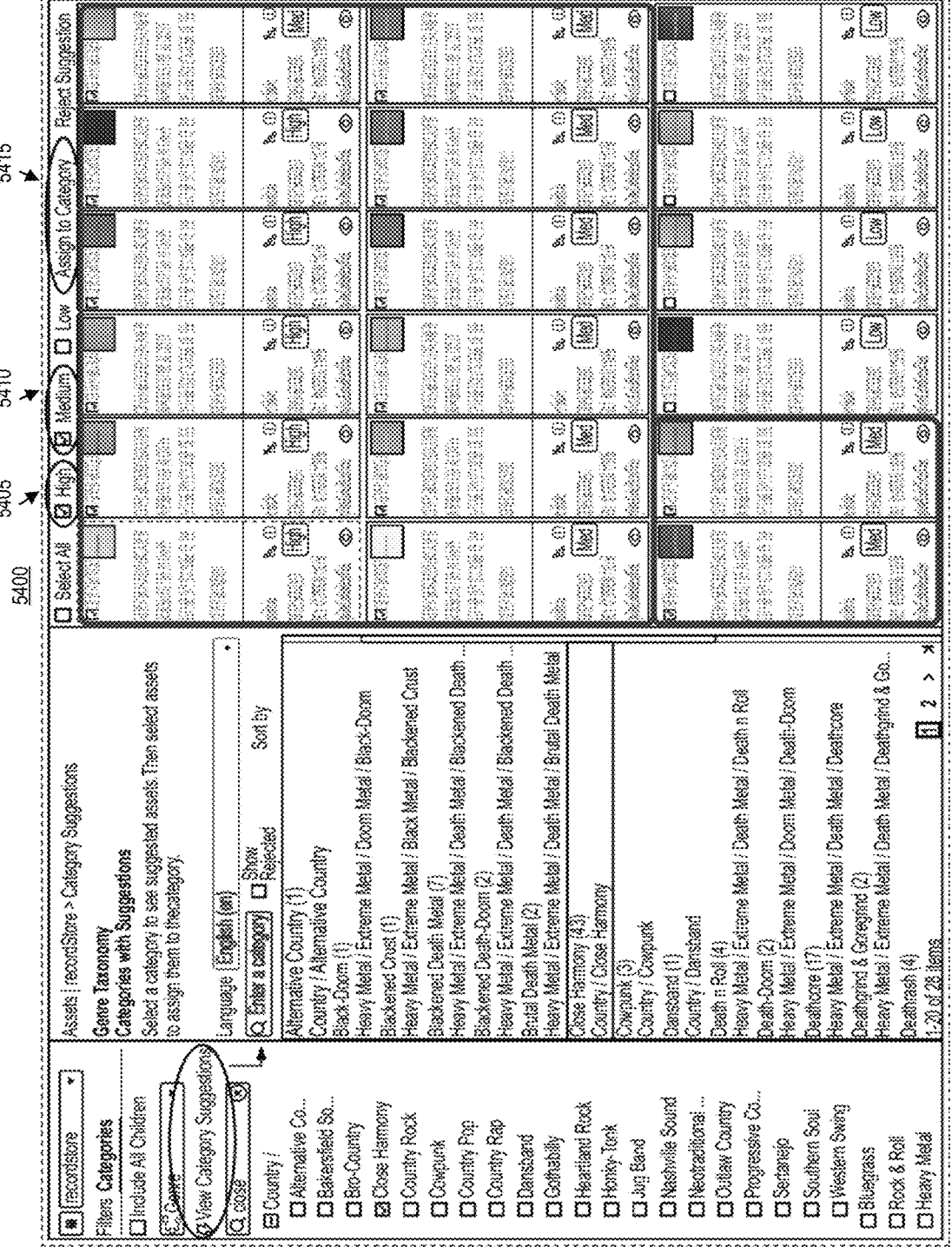
FIG. 54 further illustrates a sample taxonomy tree with categories diagram, in accordance with an embodiment.

FIG. 54 further illustrates a sample taxonomy tree with categories diagram, in accordance with an embodiment.

As illustrated in FIG. 54, in accordance with an embodiment, as shown in the screenshot of user interface 5400: (i) A sample taxonomy tree with categories, "View Category Suggestions" can take a user to a smart suggestions screen. This user interface 5400 is designed to assist in the classification of contents singly or in bulk.

As illustrated in FIG. 54, in accordance with an embodiment, in this example, contents with high 5405 and medium 5410 confidence are selected. The "Assign to Category" link 5415 enables the user to place all the selected contents to the respective category (ies).

In accordance with an embodiment, as described above, based upon the acceptance of the suggestions falling within the high and medium confidence suggestions, the categorization engine can further refine subsequent categorization suggestions.

Figure 55:
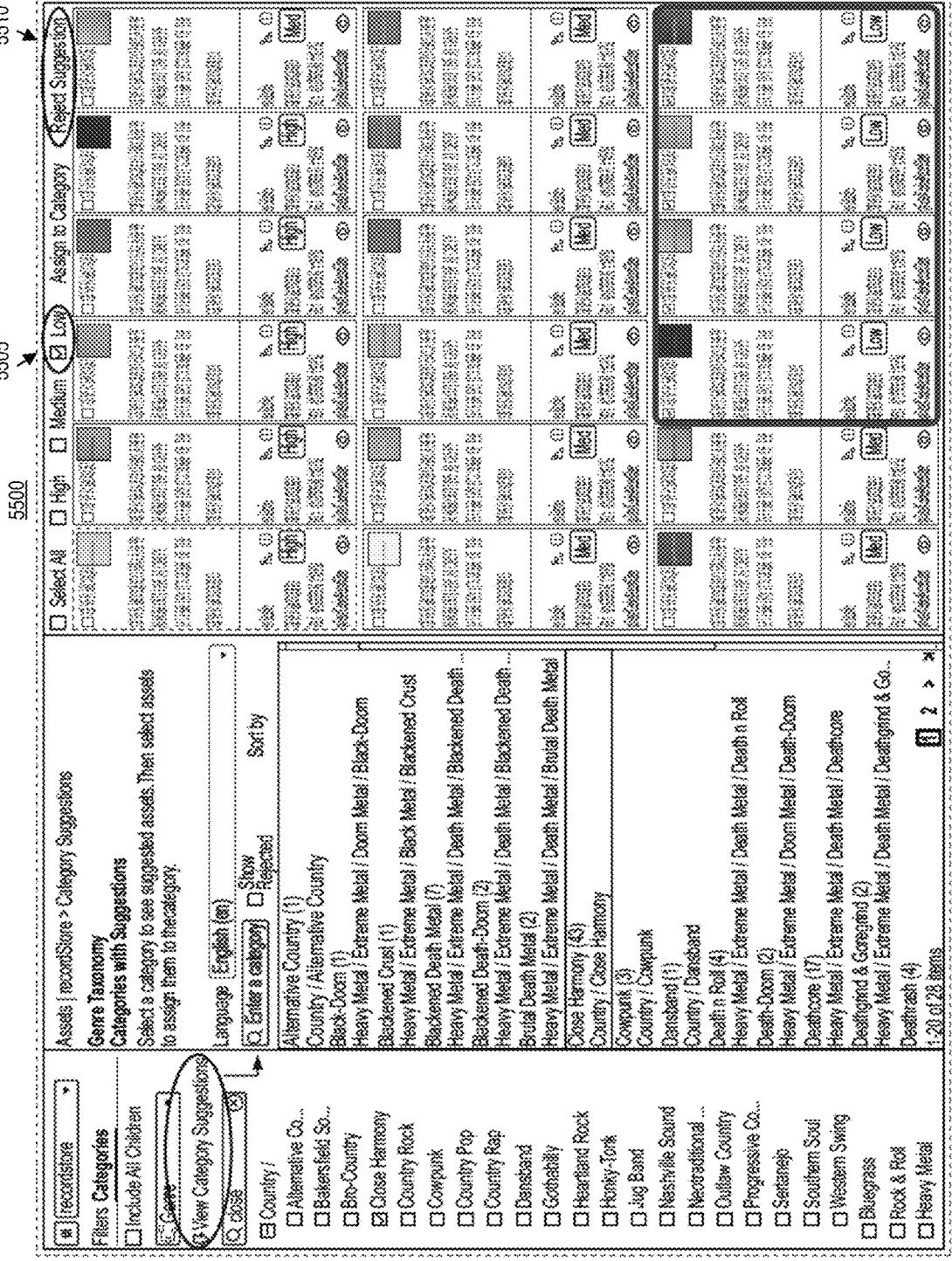
FIG. 55 further illustrates a sample taxonomy tree with categories diagram, in accordance with an embodiment.

FIG. 55 further illustrates a sample taxonomy tree with categories diagram, in accordance with an embodiment.

As illustrated in FIG. 55, in accordance with an embodiment, as shown in the screenshot of user interface 5500: (i) A sample taxonomy tree with categories, "View Category Suggestions" can take a user to a smart suggestions screen. This user interface 5500 is designed to assist in the classification of contents singly or in bulk.

As illustrated in FIG. 55, in accordance with an embodiment, the same way, a user can select contents (in this example, low confidence 5505 score items are selected). The user can then select an option to rejection 5510 all the low confidence score categorization suggestions.

In accordance with an embodiment, as described above, based upon the rejection of the suggestions falling within the low confidence suggestions, the categorization engine can further refine subsequent categorization suggestions.

Figure 56:
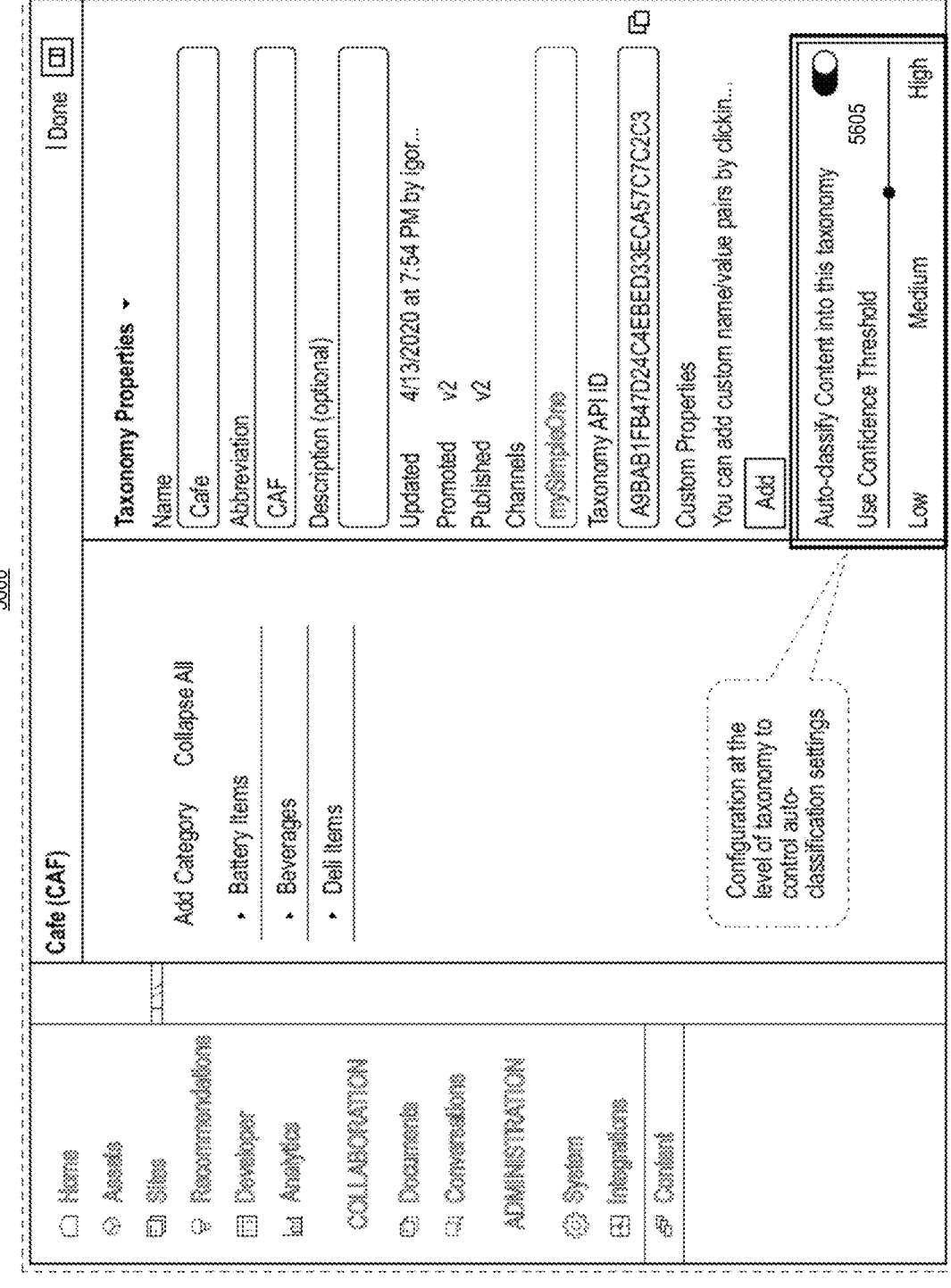
FIG. 56 illustrates configuring the auto-classification threshold diagram, in accordance with an embodiment.

FIG. 56 illustrates configuring the auto-classification threshold diagram, in accordance with an embodiment.

As illustrated in FIG. 56, in accordance with an embodiment, as shown in the screenshot of user interface 5600. This user interface 5600 is designed to assist in/allow a user to set an auto-classification threshold 5605 for confidence score.

In accordance with an embodiment, put another way, when the systems and methods are configured to allow for the automatic classification or categorization of content items, a threshold can be set such that any content item having a confidence score over the set threshold can be automatically classified/categorized by the system without further user interaction. As shown in the Figure, the configuration at the level of taxonomy to control auto-classification setting is set between a "medium" and a "high" confidence score. This implies that content having a confidence score above this threshold will be categorized/classified with the corresponding category. In addition, those content items having a confidence score below the set threshold can have the categorization/classification options automatically discarded, or, additionally or alternatively, put to a user for inputs as to a decision.

FIG. 57 illustrates a configuration to trigger reclassification of contents (in bulk) in a repository diagram, in accordance with an embodiment.

As illustrated in FIG. 57, in accordance with an embodiment, as shown in the screenshot of user interface 5700. This user interface 5700 is designed to assist in/allow a user to trigger, for example, a bulk classification of documents within a targeted repository 5705.

In accordance with an embodiment, for example, the screenshot shows that content items within an existing repository (e.g., at a content management system) can be reclassified via a background process. The background process can be run to produce new categorization/classification suggestions to be submitted to a user for a decision. Alternatively, for example, the background process can be run for automatic classification of content items based upon, for example, a calculated confidence score.

Concepts and Approaches

In various situations, a classical clustering approach does not work well from a content management system point of view, since it is difficult to categorize/classify content in the right category for a number of reasons, including but not limited to:

a. The number of contents within a content management system can grow tremendously over time;
b. The contents can arrive from various sectors and a domain specific solution may not work;
c. The categories/nodes in the taxonomy tree are unrestricted and new categories are introduced frequently;
d. The number of contents present in a category can vary from a single digit number to thousands and the same content can be assigned to multiple category;
e. The contents present in a category may not be semantically close to each other, it is possible that there are multiple disjoint subsets of similar contents sharing the same category;
f. A nearest neighbor approach may be accurate but not scalable considering the large amount of data;
g. A traditional classification algorithm may not work in such a scenario due to the uneven distribution of the contents to the categories and insufficiency of labelled data; and
h. A traditional clustering approach may not fit as the clusters can grow to any arbitrary size and shape as more and more contents are added and restructuring the clusters requires passes over the entire data points (contents) present in the cluster, which is not permissible in terms of scalability.

Figure 58:
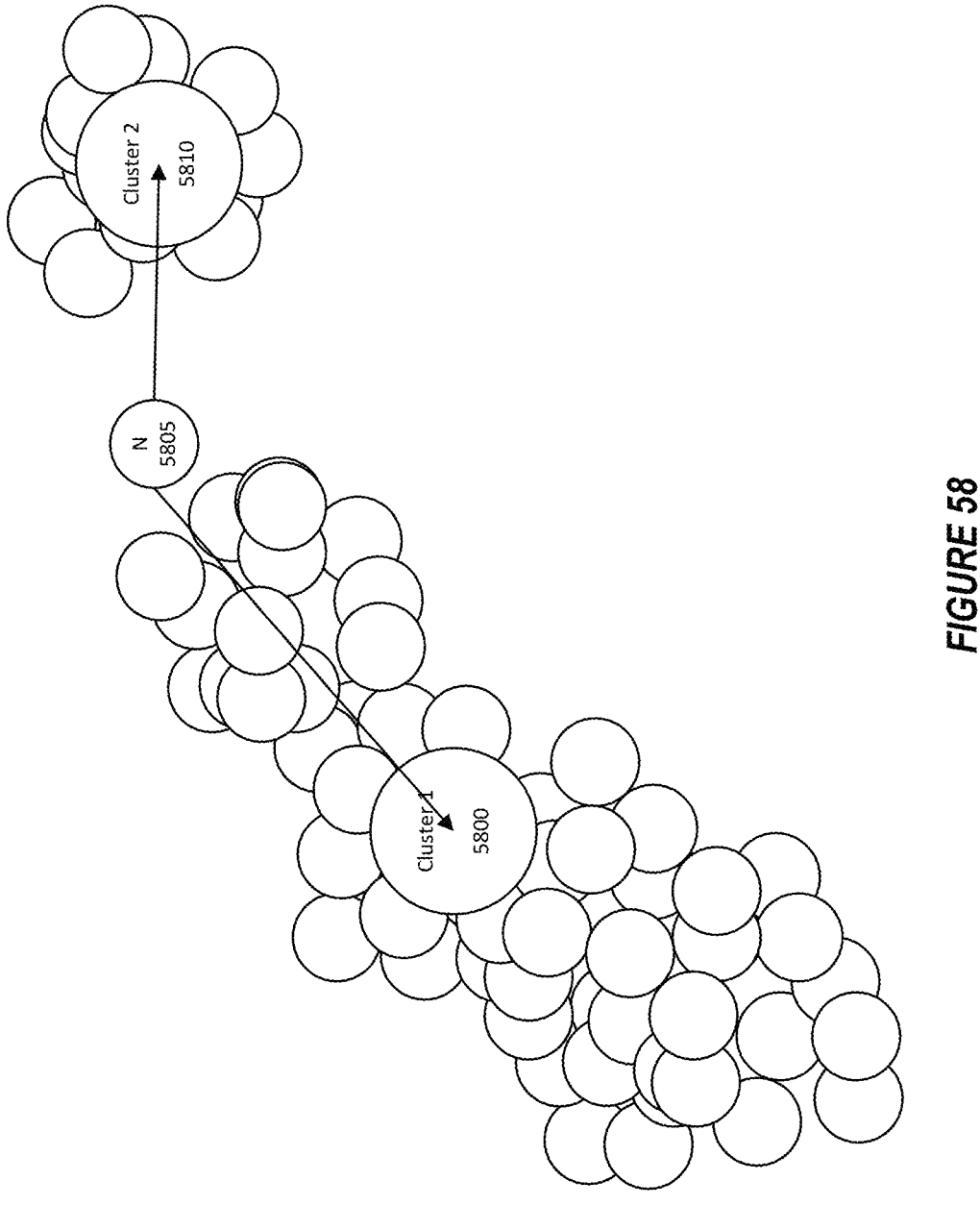
FIG. 58 illustrates a problem with traditional clustering where clusters can be of arbitrary shape, in accordance with an embodiment.

FIG. 58 illustrates a problem with traditional clustering where clusters can be of arbitrary shape, in accordance with an embodiment.

In accordance with an embodiment, a data point N 5805 is shown in a cluster map comprising cluster 1 5800 and cluster 2 5810. From the depicted embodiment, it is clearly visible the data point N 5805 should be part of cluster 1. However, in reality, the distance from N to the center of cluster 2 is actually less than the distance from N to the center of cluster 1. This implies that cluster 2 seems to be more accurate.

In accordance with an embodiment, keeping both accuracy and scalability in mind, the described approach provides a generic density based single-pass micro-clustering, that can discover clusters of any arbitrary shape (with regard to accuracy), reshape the clusters without looking into past data (in terms of scalability), continuously learn and evolve from the recent data and correctly predict the category of the new contents in bulk which in turn reduce the time and effort of categorizing the content in to the right category.

Adaptive Micro-Clustering

In accordance with an embodiment, the described approach comprises two parts or aspects: (1) extract features from document and create clusters—the learning phase; and (2) automatically classify the new content—the prediction phase.

1. Extracting Features from Documents

In accordance with an embodiment, the extracting of features from documents comprises creating and updating the clusters (micro-clusters). In this step, the better the clusters can be represented, the better is the accuracy of the system. As described in FIG. 59, a single cluster center may not alone represent the entire cluster well, micro-clusters can additionally formed inside a main cluster.

Figure 59:
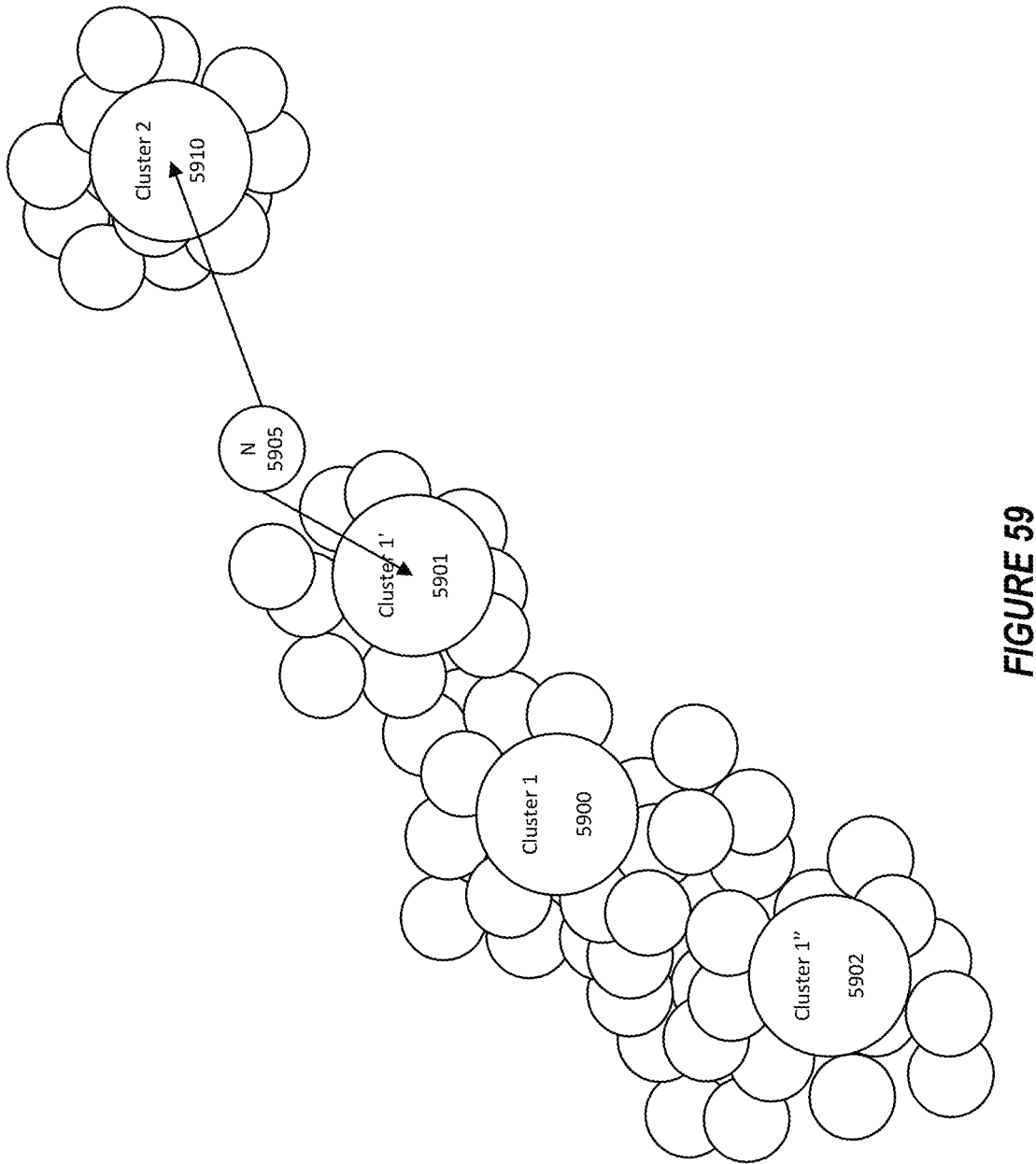
FIG. 59 illustrates micro-clustering, in accordance with an embodiment.

FIG. 59 illustrates micro-clustering, in accordance with an embodiment. In the same example as FIG. 58 above, the larger cluster, Cluster 1 from FIG. 58, is now represented with 3 points (e.g., micro clusters), Cluster 1 5900, Cluster 1' 5901, and Cluster 1" 5902. This time, the new data point N 5905 will be categorized as belonging to Cluster 1 as the as the closest point is to N is Cluster 1' 5901, and not Cluster 2 5910.

In accordance with an embodiment, there are number of steps to be performed to update the clusters and split the micro-clusters inside clusters, as described below:

A. Generation of Feature Vector from Text

In accordance with an embodiment, a first step is to convert the raw text documents into the feature vector for further processing. The feature space of text snippets are generated through a topic modelling system, that outputs a sparse text feature (e.g., 200k dimension). Subsequently, the text features are projected to a lower dimension (2048) dense feature space using a random projection technique, for fast processing. When content is sparse, the approach works with the content model itself, like the names and descriptions and other metadata used to define the taxonomies themselves.

B. Extraction of Named Entities from Text

In accordance with an embodiment, a named entity recognizer (NER) system performs the task of automatically extract entities such as names of people, organizations, customer products, countries, title of books or music albums and more.

In accordance with an embodiment, with named entity recognition, the system can obtain key information from unstructured text and classify them into user defined categories. Consider, for example, a scenario of documents from pharmaceutical industry often have the names of medicines, chemicals elements mentioned; whereas on the other hand a publishing house documents contain the names of the books, authors, fictional characters etc. Such documents can be classified into respective domain by only looking at the entities. Taking the named entity score of a document into account with respect to the distribution of named entities in user defined categories can make the classification task more effective, scalable and accurate.

C. Extraction of Topics from Text

In accordance with an embodiment, topic extraction automatically discovers the keywords and key phrases from a document by identifying the term frequency and grouping similar word patterns. The user-defined taxonomy tree can grow large both horizontally and vertically and statistical topic extraction models can be used for macro level classification to choose the higher order nodes in the tree followed by a feature based micro-classifier while suggesting the categories for a document.

For example, an apparel customer may have a taxonomy tree hierarchy like "women>clothing>ethnic> sarees> cotton>chanderi" and "Home Linen>Bed Linen> Bedcovers> Cotton>Haiba", In this example, it is evident, to decide the macro level categories one does not need to compare every document at the leaf level (all the documents come under women clothing or bed linen), rather by looking into topics distribution of the articles in the top 3-4 nodes, the high level category can be chosen, and then a micro level (feature comparison) classifier can help to suggest the type of the saree (like chanderi or banarasi) or bedcovers (haiba).

Figure 60:
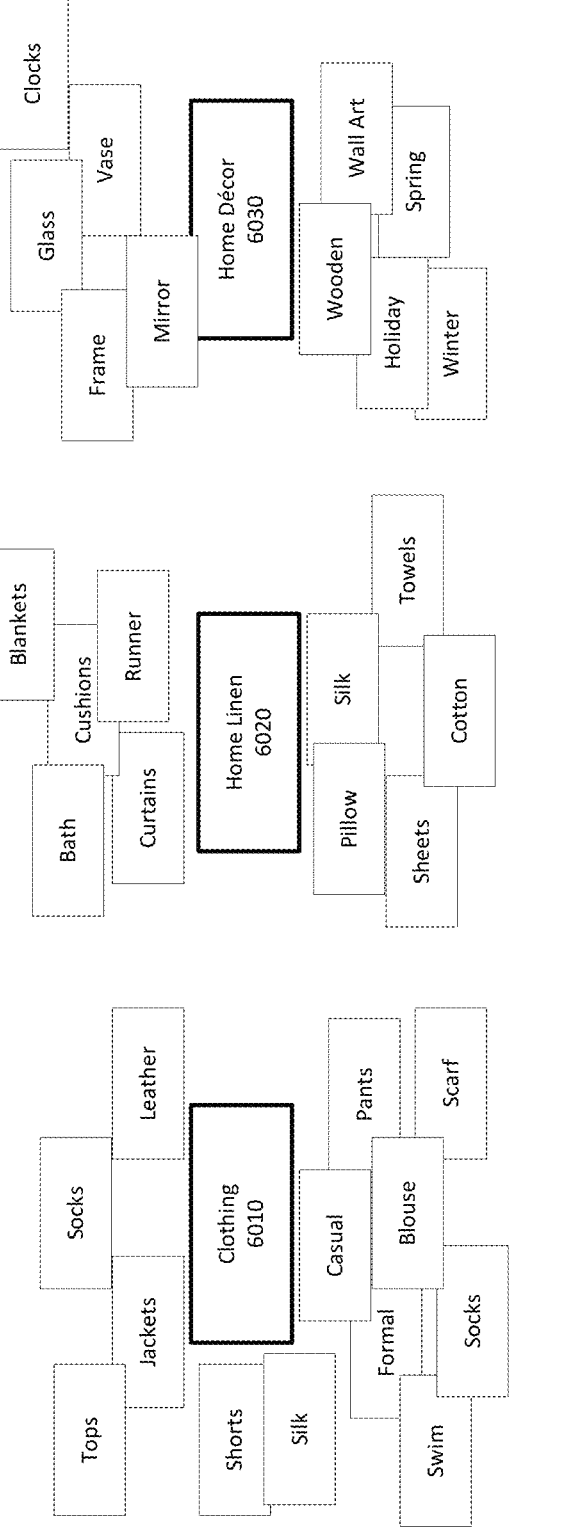
FIG. 60 illustrates a sample topic distribution for an apparel customer, in accordance with an embodiment.

FIG. 60 illustrates a sample topic distribution for an apparel customer, in accordance with an embodiment.

In accordance with an embodiment, as shown, the topic distribute comprises, for example, a clothing cluster 6001, a home linen cluster 6020, and a home decor cluster 6030. Shown around each cluster are example data points.

D. Creation of Clusters

In accordance with an embodiment, every category (nodes in the taxonomy tree) is assigned a cluster with it; wherein a cluster can comprise: a summarized feature space representation of the feature vectors associated with the contents present in that cluster, a distribution of named entities present in the documents in that cluster, and a distribution of topics extracted from the documents of that cluster.

In accordance with an embodiment, a cluster is created along with the category (initialized with the extracted feature vector, named entities and topics from the category metadata).

E. Definition of the Cluster

In accordance with an embodiment, a cluster can be defined using the following process. A cluster feature: In accordance with an embodiment, a cluster is defined in terms of centroid and radius. Centroid=A mean of the feature vectors of the contents present in the cluster, Radius=The average distance of the member feature vectors to the cluster centroid. A smaller radius signifies that the contents present in the cluster are closely related.

In accordance with an embodiment, a list of named entities along with frequency is attached to a cluster. The distribution is created by choosing the top-n named entities from each document belong to the cluster.

In accordance with an embodiment, similar to named entities, a topic distribution can be defined that identifies the most frequent topics are attached to a cluster. The topic distribution is also created by extracting the most relevant topics from each document.

Figure 61:
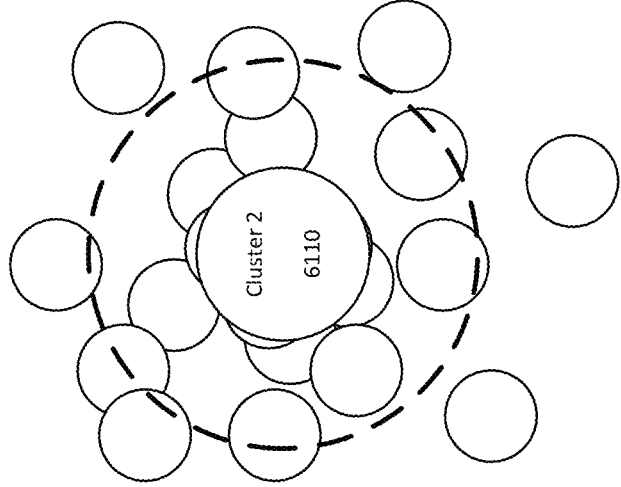
FIG. 61 illustrates visualizing the cluster radius, in accordance with an embodiment.

FIG. 61 illustrates visualizing the cluster radius, in accordance with an embodiment.

In accordance with an embodiment, FIG. 61 depicts two exemplary clusters, cluster 1 6100 and cluster 2 6110. As shown, Cluster 1 has a smaller radius than Cluster 2. As described above, a smaller radius signifies that the contents present in the cluster are closely related.

F. Update the Cluster Feature

In accordance with an embodiment, as illustrated in FIG. 61, a cluster with high density and small radius (left) can achieve the best possible accuracy. To accomplish this goal, the clusters are split into micro-clusters as more and more contents (e.g., new contents) are added. If new contents result in expanding the micro-cluster radius, they do not need to be immediately added to the micro-cluster, but can instead merely be identified as a potential micro-cluster.

In accordance with an embodiment, subsequently, as content grows, the potential micro-clusters can either grow into core micro-clusters as more and more similar contents are added, or they are ignored as outliers through a damping factor over time. This micro-clustering approach helps to find disjointed subsets of related contents inside a category.

The cluster centroid and radius can be updated in an online fashion (without looking into the past data).

FIG. 62 illustrates the cluster representation, in accordance with an embodiment.

In accordance with an embodiment, FIG. 62 depicts three exemplary clusters, cluster 1 6200, cluster 2 6210, and cluster 3 6230. As shown, each cluster has a different radius, each radius reflecting the how closely the content items in each cluster are related. As described above, a smaller radius signifies that the contents present in the cluster are closely related.

In accordance with an embodiment, as content grows, the potential micro-clusters can either grow into core micro-clusters as more and more similar contents are added, or they are ignored as outliers, such as O1 6240 and O2 6241, through a damping factor over time. This micro-clustering approach helps to find disjointed subsets of related contents inside a category.

In accordance with an embodiment, when a new document D is placed in a cluster, an associated named entity distribution and topic distribution is updated for that cluster by extracting the topics and named entities from D.

2. Classify the New Content into Relevant Categories

In accordance with an embodiment, the classification is a two-phase process, as described below, including a macro-level classification phase, and a micro-level classification phase:

A. Macro-Level Classification

In accordance with an embodiment, as described in the above, each category node has a topic distribution and named entity distribution associated with it. When a document is uploaded, first the topics and named entities are extracted from the document and the conditional probability score is calculated for each high level category in the taxonomy tree.

Figure 63:
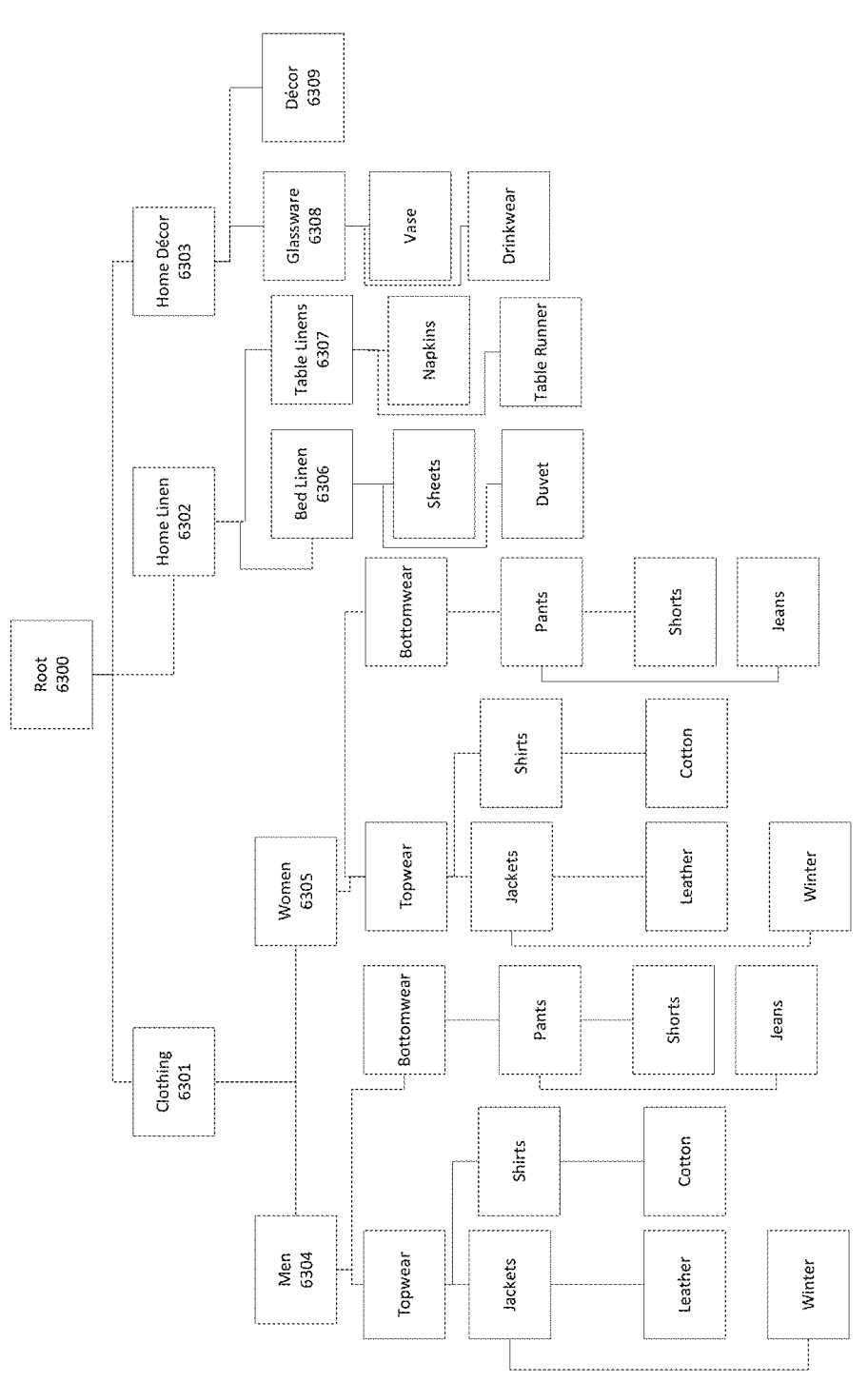
FIG. 63 illustrates a macro phase of categorization, in accordance with an embodiment.

FIG. 63 illustrates a macro phase of categorization, in accordance with an embodiment. More specifically, FIG. 63 depicts an embodiment wherein the topic distribution and named entity distribution of the document is matched with the high level cluster nodes, i.e., nodes 6300-6309.

In accordance with an embodiment, the score function can be viewed as, given a list of topics, for example, "shirts", "cotton" etc. (and the weight of the each topic to the document), what are the chances that the document will belong to the category "women clothing". Given a document D, having n topics (e.g., topic-1, topic-2, . . . , topic-n) and weight for each topic (weight$_{topic-1}$, weight$_{topic-2}$ . . . , weight$_{topic-n}$) the joint probability of that document with respect to a category Catg-C can be calculated as:

$$Score(D \mid Catg\text{-}C) = \left(P(\text{topic-1} \mid Catg\text{-}C) * \text{weight}_{topic\text{-}1}\right) +$$
$$\left(P(\text{topic-2} \mid Catg\text{-}C)\text{weight}_{topic\text{-}2}\right) + \dots +$$
$$\left(P(\text{topic-}n \mid \text{Category-}C) * \text{weight}_{topic\text{-}n}\right)$$

B. Micro-Level Classification

In accordance with an embodiment, during this phase the feature comparison is performed for a finer level classification of documents with every document present in the child nodes of the macro-selected categories.

Figure 64:
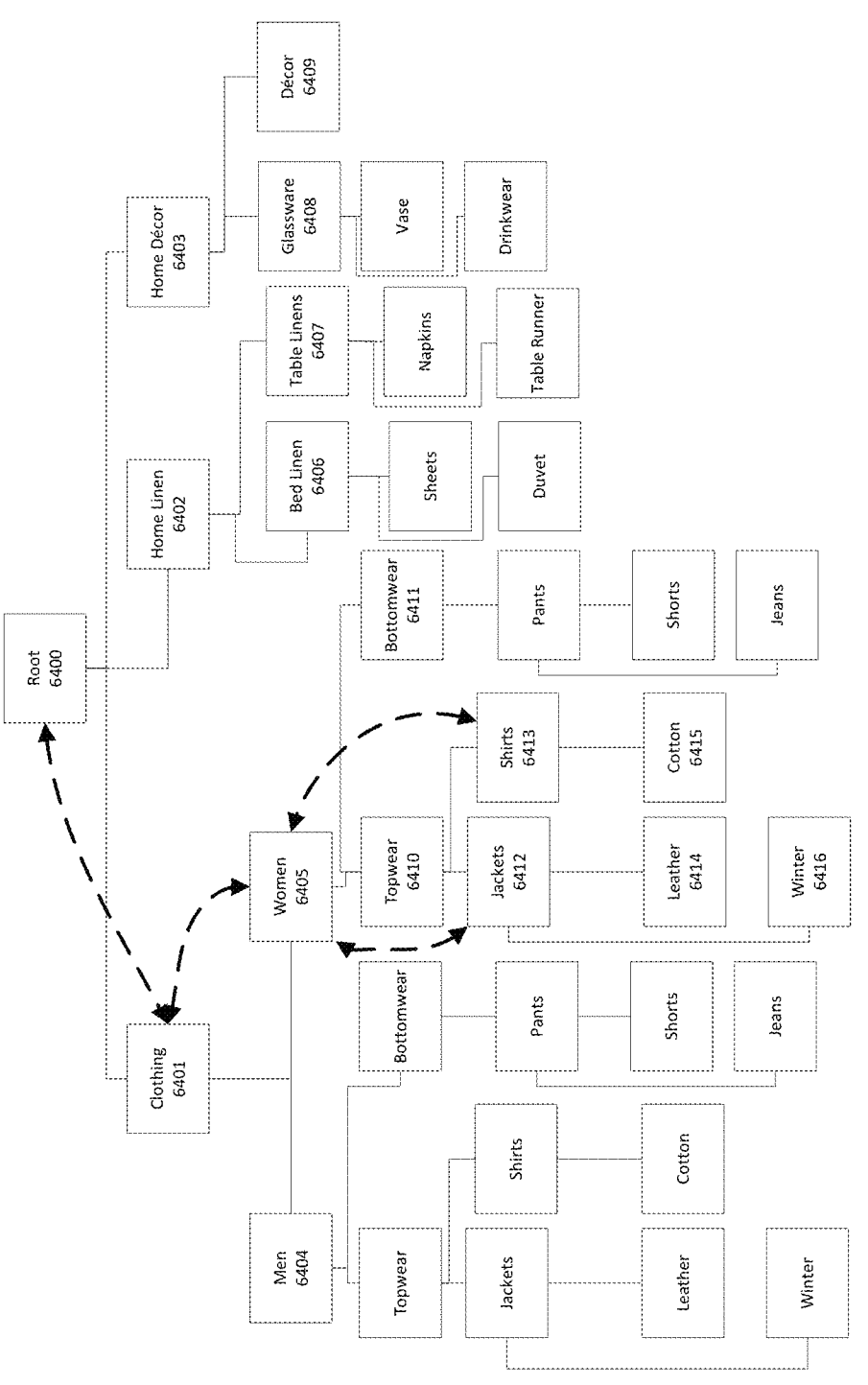
FIG. 64 illustrates a categorization once higher-level categories are chosen through the macro step.

FIG. 64 illustrates a categorization once higher-level categories are chosen through the macro step. In the micro step the categories under chosen tree, the chosen tree being clothing 6401→women 6405, and the categories under the chosen tree being categories 6410-6415 are expanded and compared in the feature space, in accordance with an embodiment.

In accordance with an embodiment, in order to categorize/classify new content into categories, the cosine-similarity of the content and the available micro-clusters can be computed in the feature space, and the category in which the most similar micro-cluster belongs to can be recommended for the new article.

In accordance with an embodiment, as new categories are introduced by, for example, the content user, and more and more content is placed in the categories, the number of micro-clusters can reach a very high value. Comparing a new content with all the existing micro-clusters in the high dimensional feature space can be resource intensive and can hurt the performance of the system. This problem can be resolved with a damping window model approach used in data stream clustering.

Damping Window Model (Weight Decay Over Time):

In accordance with an embodiment, in using a damping window model (weight decay over time), each content is associated with a weight which depends on its arrival time. When a new content arrives, it is assigned the highest possible weight, this weight decreases (e.g., exponentially) over time according to an ageing function. A typically used ageing function for the damped window model is the exponential fading function. The weight of a micro-cluster can be computed as the sum of the weights of the contents present in it. While comparing a new content with existing micro clusters, it is possible to first sort (descending order) the micro-clusters based on the weight and then choosing only the top n micro-clusters for feature similarity calculation. This way, the recently used dense micro-clusters can get higher priority over less frequently used micro-clusters.

Figure 65:
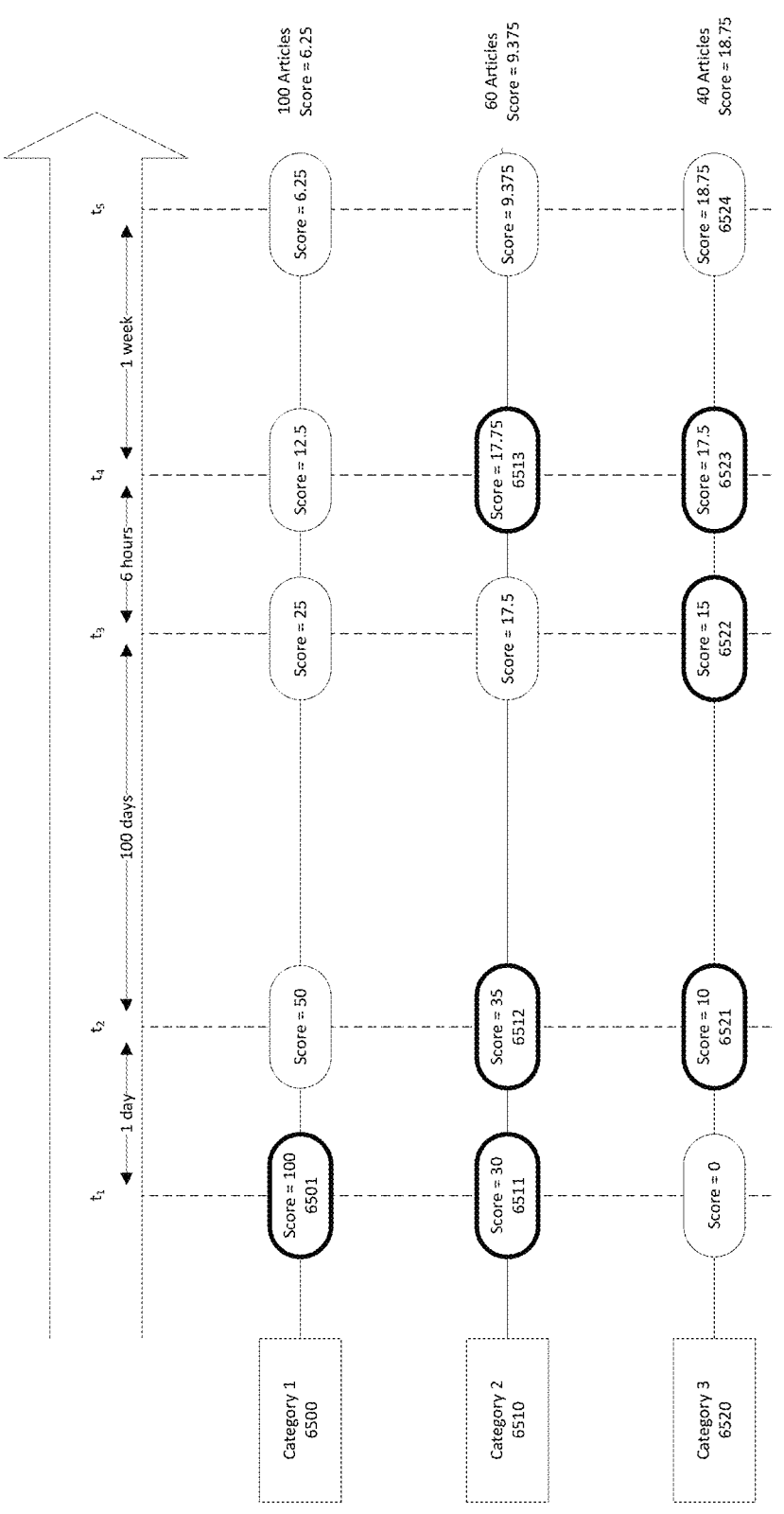
FIG. 65 is an illustration of how cluster weights may decay over time, and illustrates an example of damping window model, in accordance with an embodiment.

FIG. 65 is an illustration of how cluster weights may decay over time, and illustrates an example of damping window model, in accordance with an embodiment.

In accordance with an embodiment, as shown in FIG. 65, three categories are shown, category 1 6510, category 2 6520, and category 3 6530. In accordance with an embodiment, the damping function applied to the categories is:

$$f(t) = 2^{-\lambda(t-T_0)}$$
$$\text{where } \lambda = 1$$

In accordance with an embodiment, taking the above equation, if category 1 6500 has 100 articles added at t1, shown in the figure as the bolded score box 6501, then category 1 will have a score of 100 at t1, which will be damped as shown in the figure. If no further articles are added for category 1 by t5, then the score for the 100 articles as calculated by the damping function will be 6.25.

In accordance with an embodiment, taking the above equation, if category 2 6510 has 30 articles added at t1, 20 articles at t2, and 10 articles at t4, shown in the figure as the bolded score boxes 6511, 6512, and 6513, then category 2 will have a score of 30 at t1, a score of 35 at t2, a score of 17.5 at t3, and a score of 17.75 at t4. If no further articles are added for category 2 by t5, then the score for the 60 articles will be 9.375.

In accordance with an embodiment, taking the above equation, if category 3 6510 has 10 articles added at t2, 10 articles at t3, 10 articles at t4, and 10 articles added at t5, as shown in the figure as the bolded score boxes 6521, 6522, 6523, and 6524, then category 3 will have a score of 0 at t1, a score of 10 at t2, a score of 15 at t3, and a score of 17.5 at t4, and a score of 18.75 at t5 with 40 articles.

Learning from User Behavior

In accordance with an embodiment, a user has the options to accept/reject the suggestions provided by the system as to content categorization/classification. Depending on user action, the system can add to a machine learning database in, for example, the following way:

User Accepts the Suggestion

In accordance with an embodiment, a recent acceptance strengthens existing signals. The content now becomes part of the category cluster, and content feature is included to the cluster feature. This is not a direct average update of the cluster feature, the damping factor plays a major role in this update. The previous cluster feature is damped by a fraction and then added to the recently placed content feature to calculate the updated cluster feature. This enables the system to provide more weights to the recently added contents while classifying the next batch. The frequency of named entities and topics are also updated for the category.

User Rejects the Suggestion

In accordance with an embodiment, when the user rejects a particular content categorization/classification, such rejection eventually could lead to two scenarios:

i. The user rejects and place the article in some different category: This action will lead to the same effect as acceptance, the category in which the content is now placed by the user will consume the weighted content feature and the updated cluster feature will start to recommend similar contents with higher confidence going forward.

ii. The user rejects the content and it remains "uncategorized": In this situation, the system has no way to know what to do with the content (or similar contents), as it does not contribute to any of the clusters. To keep track of such contents a category called "shadow cluster" is introduced. The shadow cluster contains rejected and uncategorized contents from all the previously rejected suggestions. When a new content arrives, if it gets the highest similarity score with the shadow cluster, the system does not suggest any category for the content.

Figure 66:
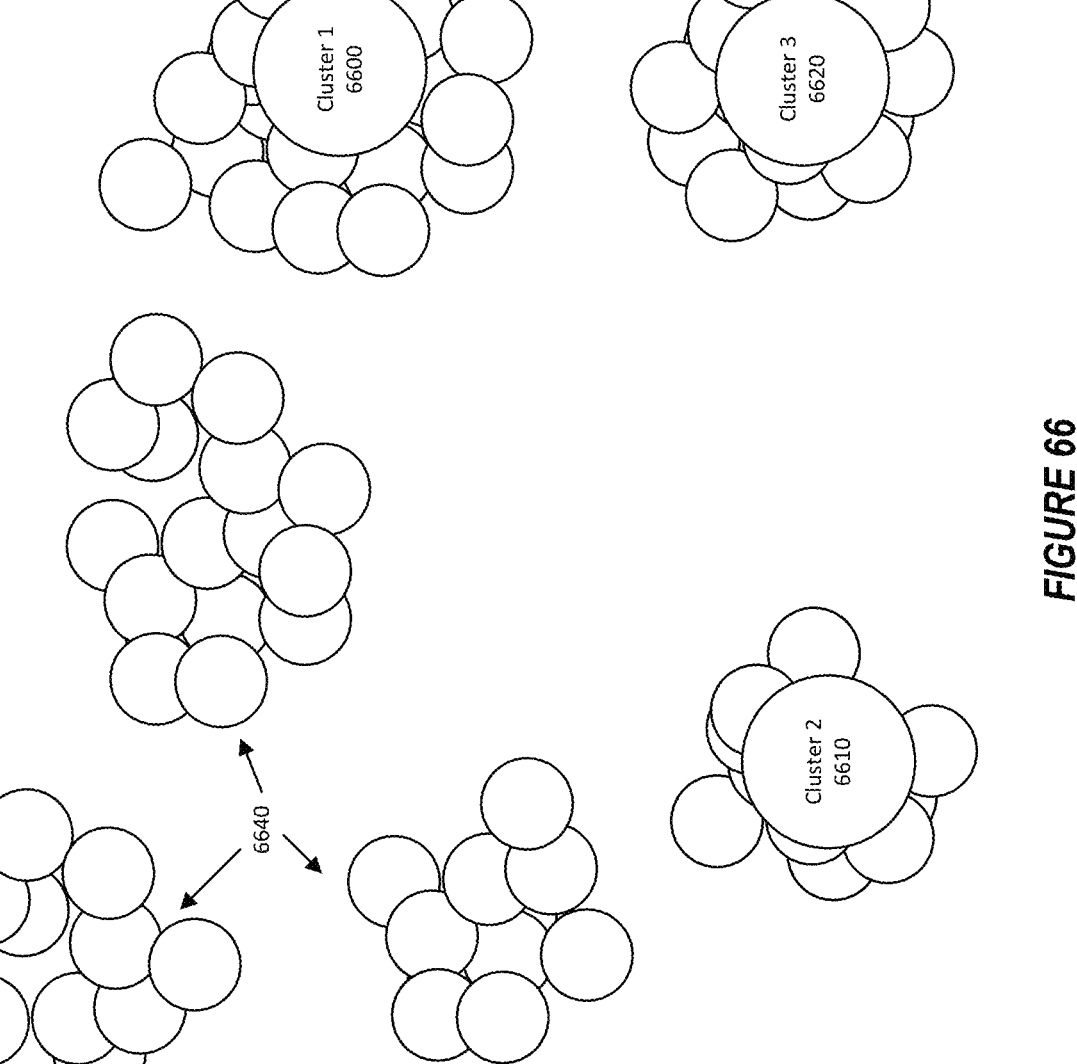
FIG. 66 illustrates a graphical view of how shadow cluster can appear, in accordance with an embodiment.

FIG. 66 illustrates a graphical view of how shadow cluster can appear, in accordance with an embodiment.

In accordance with an embodiment, as described above, cluster 1 6600, cluster 2 6610, and cluster 3 6620 can be populated with content items that have been assign/categorized/classified.

In accordance with an embodiment, however, as described above, over time, shadow clusters 6640 may grow. These shadow cluster may grow indefinitely in shape and size, and as a result, the system might end up suggesting no categories for a large portion of newly created content. To avoid such a scenario, the same micro-clustering approach can applied to the shadow cluster. Micro-clustering helps to group similar uncategorized content within the shadow cluster.

Figure 67:
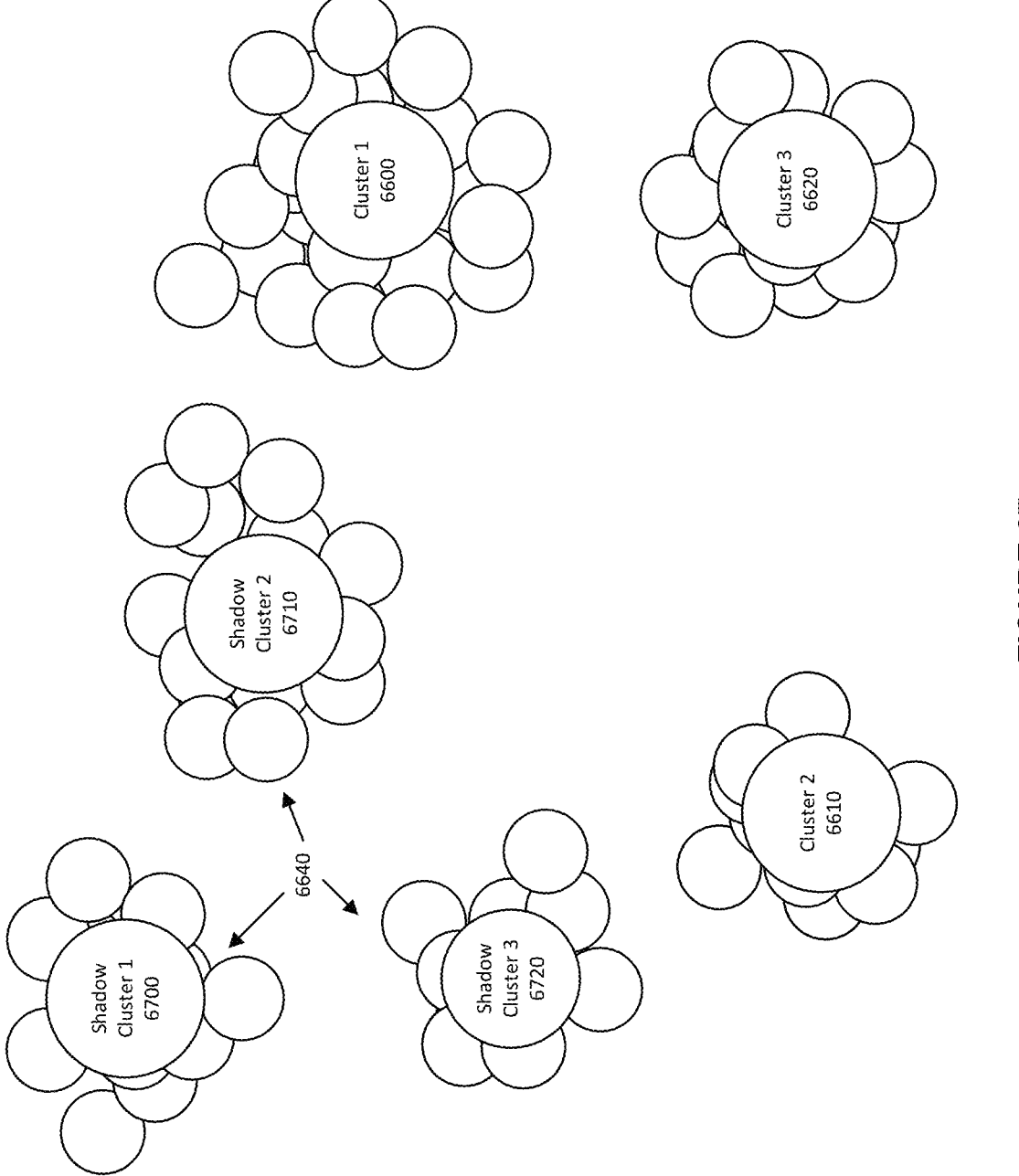
FIG. 67 illustrates a graphical view of how shadow cluster can appear, in accordance with an embodiment.

FIG. 67 illustrates a graphical view of how shadow cluster can appear, in accordance with an embodiment.

More specifically, FIG. 67 illustrates shadow cluster 1 6700, shadow cluster 2 6710, and shadow cluster 3 6720 can be generated as micro-clusters within the shadow cluster, in accordance with an embodiment.

In accordance with an embodiment, as the micro clusters inside shadow cluster grows, the recommender system (e.g., categorization engine) can start generating suggestions for such new micro clusters and provide these suggestions to a user. Such uncategorized contents might form a category and suggest the name of the categories based on the most frequent topics used in the system. A user can form a new category out of these contents through the Create New Category option.

Figure 68:
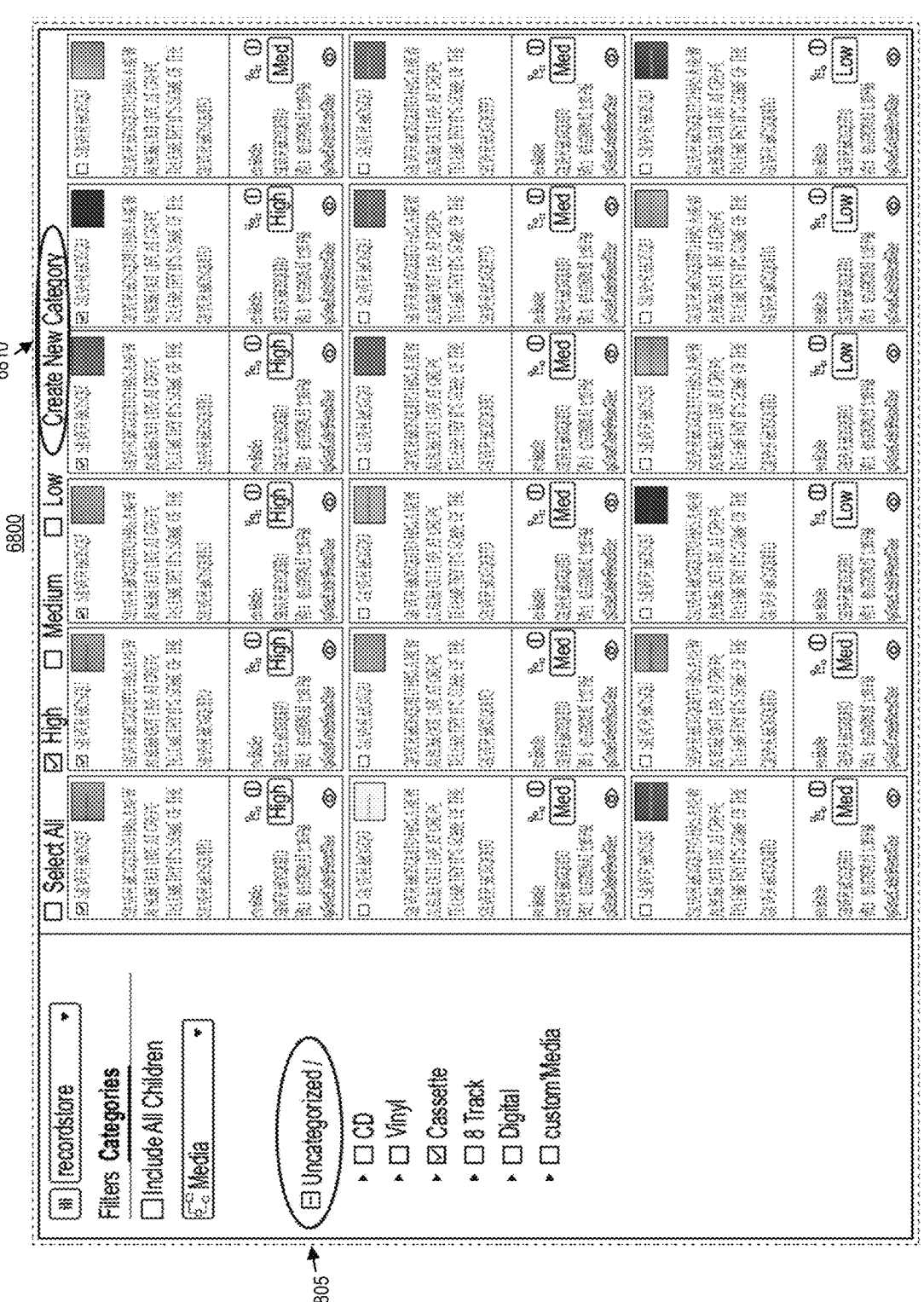
FIG. 68 illustrates suggesting the user to create a new category out of uncategorized contents, in accordance with an embodiment.

FIG. 68 illustrates suggesting the user to create a new category out of uncategorized contents, in accordance with an embodiment.

In accordance with an embodiment, shown in FIG. 68 is an exemplary screenshot of a user interface 6800. In the depicted embodiment, uncategorized content 6805 is being displayed. The user can be presented with a suggestion to create a new category 6810 (e.g., within the taxonomy) for such uncategorized content.

FIG. 69 is a flowchart of a method for smart categorization of content in a content management system, in accordance with an embodiment.

In accordance with an embodiment, at step 6900, the method can provide one or more computers, including a processor, that provide access to a content management system.

In accordance with an embodiment, at step 6910, the method can provide a content categorization engine at the one or more computers, the content categorization engine having access to a taxonomy.

In accordance with an embodiment, at step 6920, the method can generate, by a recommendation system of the content categorization engine, feature vectors from contents at the content management system, the recommendation system having access to a AI/ML engine and a database of the content categorization engine, wherein the generation of the feature vectors is based at least on an evaluation of previously categorized content within the taxonomy.

In accordance with an embodiment, at step 6930, the method can utilize the generated feature vectors in categorizing new content into the taxonomy.

Although specific implementations have been described, various modifications, alterations, alternative constructions, and equivalents are possible. Implementations described in the present disclosure are not restricted to operation within certain specific data processing environments, but are free to operate within a plurality of data processing environments. Additionally, although implementations have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described implementations may be used individually or jointly.

Further, while implementations described in the present disclosure have been described using a particular combination of hardware and software, it should be recognized that other combinations of hardware and software are also possible. Some implementations described herein may be implemented only in hardware, or only in software, or using combinations thereof. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation, such as by executing computer instructions or code, or processors or cores programmed to execute code or instructions stored on a non-transitory memory medium, or any combination thereof. Processes can communicate using a variety of techniques including, but not limited to, conventional techniques for inter-process communication, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope of the disclosure. Thus, although specific implementations have been described, these are not intended to be limiting; various modifications and equivalents are within the scope of the disclosure.

Embodiments described herein can be implemented using one or more general purpose or specialized digital computer, computing device, machine, or microprocessor, or other type of computer, including one or more processors, memory and/or computer-readable storage media programmed according to the teachings of the present disclosure. Appropriate software coding can readily be prepared by skilled programmers based on the teachings of the present disclosure, as will be apparent to those skilled in the software art.

In accordance with some embodiments, features described herein can be implemented, in whole or in part, in a cloud environment, as part of, or as a service of, a cloud computing system which enables on-demand network access to a shared pool of configurable computing resources (e.g., networks, servers, storage, applications, and services), and which can include characteristics, for example, as defined by the National Institute of Standards and Technology, such as, for example: on-demand self-service; broad network access; resource pooling; rapid elasticity; and measured service. Example cloud deployment models can include: public cloud, private cloud, and hybrid cloud; while example cloud service models can include Software as a Service (SaaS), Platform as a Service (PaaS), Database as a Service (DBaaS), and Infrastructure as a Service (IaaS). In accordance with an embodiment, unless otherwise specified, a cloud, as used herein, can encompass public cloud, private cloud, and hybrid cloud embodiments, and all cloud deployment models including, but not limited to, cloud SaaS, cloud DBaaS, cloud PaaS, and cloud IaaS.

In accordance with some embodiments, a computer program product can be provided which is a non-transitory computer-readable storage medium (media) having instructions stored thereon/in, which can be used to program a computer to perform any of the processes described herein. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for smart categorization of content in a content management system, comprising:
a content categorization engine provided at one or more computers, the content categorization engine having access to a taxonomy tree comprising a hierarchical classification structure having a plurality of nodes,
wherein the nodes of the taxonomy tree represent categories with which content items can be associated, and
wherein each of a plurality of categories or nodes within the taxonomy tree is assigned a cluster that comprises a summarized feature space representation of the feature vectors associated with contents present in that cluster; and
a recommendation system that generates feature vectors associated with content items at a content management system, the recommendation system having access to a database of the content categorization engine;
wherein the feature vectors associated with the content items are generated based on an evaluation of clusters of content within the taxonomy, including:
determining, for a new content item, a plurality of topics associated therewith, and calculating a score for the new content item that represents a probability of the new content item belonging to a particular category represented by the taxonomy tree, and
subsequently assessing a similarity between feature vectors associated with the new content item and those of previously determined clusters, and associating, with the new content item, a category associated with a cluster determined in feature space to be similar to that of the new content item.

2. The system of claim 1, wherein the recommendation system creates clusters in feature space based on previously categorized content.

3. The system of claim 2, wherein the recommendation system generates one or more recommendations for the new content into the taxonomy through feature space distance calculation from the clusters.

4. The system of claim 1,
wherein the recommendation system is used to create a new taxonomy or modify the taxonomy.

5. The system of claim 1,
wherein the database of the content categorization engine comprises a historical record of user acceptances of prior categorization recommendations; and
wherein the database of the content categorization engine comprises a historical record of user rejections of prior categorization recommendations.

6. The system of claim 5,
wherein the recommendation system generates one or more recommendations for the new content into the taxonomy based upon the historical record of user acceptances of prior categorization records and the historical record of user rejections of prior categorization recommendations.

7. The system of claim 1,
wherein the recommendation system generates a recommendation for a creation of a new category within the taxonomy for a plurality of uncategorized content items.

8. A method for smart categorization of content in a content management system, comprising:

providing a content categorization engine at one or more computers, the content categorization engine having access to a taxonomy tree comprising a hierarchical classification structure having a plurality of nodes, wherein the nodes of the taxonomy tree represent categories with which content items can be associated, and wherein each of a plurality of categories or nodes within the taxonomy tree is assigned a cluster that comprises a summarized feature space representation of the feature vectors associated with contents present in that cluster; and generating, by a recommendation system, feature vectors associated with content items at a content management system, the recommendation system having access to a database of the content categorization engine;

wherein the feature vectors associated with the content items are generated based on an evaluation of clusters of content within the taxonomy, including:

determining for a new content item a plurality of topics associated therewith, and calculating a score for the new content item that represents a probability of the new content item belonging to a particular category represented by the taxonomy tree, and subsequently assessing a similarity between feature vectors associated with the new content item and those of previously determined clusters, and associating, with the new content item, a category associated with a cluster determined in feature space to be similar to that of the new content item.

9. The method of claim 8, further comprising:

creating, by the recommendation system, clusters in feature space based on the previously categorized content within the taxonomy.

10. The method of claim 9, further comprising:

generating, by the recommendation system, one or more recommendations for the new content into the taxonomy through feature space distance calculation from the clusters.

11. The method of claim 8, wherein the recommendation system is used to create a new taxonomy or modify the taxonomy.

12. The method of claim 8, wherein the database of the content categorization engine comprises a historical record of user acceptances of prior categorization recommendations; and wherein the database of the content categorization engine comprises a historical record of user rejections of prior categorization recommendations.

13. The method of claim 12, further comprising:

generating, by the recommendation system, one or more recommendations for the new content into the taxonomy based upon the historical record of user acceptances of prior categorization records and the historical record of user rejections of prior categorization recommendations.

14. The method of claim 8, further comprising:

generating, by the recommendation system, a recommendation for a creation of a new category within the taxonomy for a plurality of uncategorized content items.

15. A non-transitory computer readable storage medium having instructions thereon, which when read and executed by one or more computer cause the computer to perform a method comprising:

providing a content categorization engine, the content categorization engine having access to a taxonomy tree comprising a hierarchical classification structure having a plurality of nodes, wherein the nodes of the taxonomy tree represent categories with which content items can be associated, and wherein each of a plurality of categories or nodes within the taxonomy tree is assigned a cluster that comprises a summarized feature space representation of the feature vectors associated with contents present in that cluster; and generating, by a recommendation system, feature vectors associated with content items at a content management system, the recommendation system having access to a database of the content categorization engine;

wherein the feature vectors associated with the content items are generated based on an evaluation of clusters of content within the taxonomy, including:

determining for a new content item a plurality of topics associated therewith, and calculating a score for the new content item that represents a probability of the new content item belonging to a particular category represented by the taxonomy tree, and subsequently assessing a similarity between feature vectors associated with the new content item and those of previously determined clusters, and associating, with the new content item, a category associated with a cluster determined in feature space to be similar to that of the new content item.

16. The non-transitory computer readable storage medium of claim 15, the method further comprising:

creating, by the recommendation system, clusters in feature space based on the previously categorized content within the taxonomy.

17. The non-transitory computer readable storage medium of claim 16, the method further comprising:

generating, by the recommendation system, one or more recommendations for the new content into the taxonomy through feature space distance calculation from the clusters.

18. The non-transitory computer readable storage medium of claim 15, wherein the recommendation system is used to create a new taxonomy or modify the taxonomy.

19. The non-transitory computer readable storage medium of claim 15, wherein the database of the content categorization engine comprises a historical record of user acceptances of prior categorization recommendations; and wherein the database of the content categorization engine comprises a historical record of user rejections of prior categorization recommendations.

20. The non-transitory computer readable storage medium of claim 19, the method further comprising:

generating, by the recommendation system, one or more recommendations for the new content into the taxonomy based upon the historical record of user acceptances of prior categorization records and the historical record of user rejections of prior categorization recommendations.

* * * * *